United States Patent
Traverso et al.

(10) Patent No.: US 12,433,847 B2
(45) Date of Patent: Oct. 7, 2025

(54) BRANCHED POLY(-AMINO ESTERS) FOR THE DELIVERY OF NUCLEIC ACIDS

(71) Applicants: Massachusetts Institute of Technology, Cambridge, MA (US); The Brigham and Women's Hospital, Inc., Boston, MA (US)

(72) Inventors: Carlo Giovanni Traverso, Newton, MA (US); Ameya R. Kirtane, Minneapolis, MN (US); Robert S. Langer, Newton, MA (US); Hyunjoon Kim, Cambridge, MA (US); Gary W Liu, Cambridge, MA (US); James Byrne, Boston, MA (US); Daniel Reker, Durham, NC (US); Yunhua Shi, Belmont, MA (US); Grace Junyue Zhong, Cambridge, MA (US); Netra Rajesh, Brampton (CA)

(73) Assignees: Massachusetts Institute of Technology, Cambridge, MA (US); The Brigham and Women's Hospital, Inc., Boston, MA (US)

( * ) Notice: Subject to any disclaimer, the term of this patent is extended or adjusted under 35 U.S.C. 154(b) by 678 days.

(21) Appl. No.: 17/689,314

(22) Filed: Mar. 8, 2022

(65) Prior Publication Data
US 2022/0287983 A1    Sep. 15, 2022

Related U.S. Application Data

(60) Provisional application No. 63/158,441, filed on Mar. 9, 2021.

(51) Int. Cl.
| | | |
|---|---|---|
| *A61K 9/51* | (2006.01) | |
| *A61K 39/00* | (2006.01) | |
| *A61K 48/00* | (2006.01) | |
| *A61P 35/00* | (2006.01) | |
| *C08G 63/682* | (2006.01) | |
| *C08G 63/685* | (2006.01) | |

(52) U.S. Cl.
CPC ........ *A61K 9/5153* (2013.01); *A61K 39/0011* (2013.01); *A61K 48/0041* (2013.01); *A61P 35/00* (2018.01); *C08G 63/685* (2013.01); *A61K 2039/53* (2013.01)

(58) Field of Classification Search
CPC .............. A61K 9/5153; A61K 39/0011; A61K 48/0041; A61K 2039/53; A61P 35/00; C08G 63/685
See application file for complete search history.

(56) References Cited

U.S. PATENT DOCUMENTS

| | | |
|---|---|---|
| 2,759,913 A | 8/1956 | Hulse |
| 3,963,771 A | 6/1976 | Robson et al. |
| 4,224,365 A | 9/1980 | Ali-Zaidi |
| 4,348,511 A | 9/1982 | Haug |
| 4,883,689 A | 11/1989 | Gradeff et al. |
| 5,180,424 A | 1/1993 | Hutter |
| 5,364,634 A | 11/1994 | Lew |
| 5,462,990 A | 10/1995 | Hubbell et al. |
| 5,525,357 A | 6/1996 | Keefer et al. |
| 5,573,934 A | 11/1996 | Hubbell et al. |
| 5,705,188 A | 1/1998 | Junichi et al. |
| 5,770,637 A | 6/1998 | Vanderlaan et al. |
| 5,858,746 A | 1/1999 | Hubbell et al. |
| 5,904,927 A | 5/1999 | Amiji |
| 5,962,520 A | 10/1999 | Smith et al. |
| 6,060,582 A | 5/2000 | Hubbell et al. |
| 6,444,725 B1 | 9/2002 | Trom et al. |
| 6,984,404 B1 | 1/2006 | Talton et al. |
| 6,998,115 B2 | 2/2006 | Langer et al. |
| 7,427,394 B2 | 9/2008 | Anderson et al. |
| 8,071,082 B2 | 12/2011 | Zugates et al. |
| RE43,612 E | 8/2012 | Anderson et al. |
| 8,287,849 B2 | 10/2012 | Langer et al. |
| 8,557,231 B2 | 10/2013 | Langer et al. |
| 8,562,966 B2 | 10/2013 | Zugates et al. |
| 8,748,551 B2 | 6/2014 | Puerta et al. |
| 8,808,681 B2 | 8/2014 | Anderson et al. |
| 9,101,666 B2 | 8/2015 | Langer et al. |
| 9,700,627 B2 | 7/2017 | Langer et al. |
| 11,041,069 B2 | 6/2021 | Palmiero et al. |
| 11,464,860 B2 | 10/2022 | Anderson et al. |
| 11,608,412 B2 | 3/2023 | Kaczmarek et al. |
| 11,696,953 B2 | 7/2023 | Anderson et al. |

(Continued)

FOREIGN PATENT DOCUMENTS

| | | | | |
|---|---|---|---|---|
| CN | 111718494 A | * | 9/2020 | ........... A61K 31/713 |
| DE | 16 68 502 A1 | | 9/1971 | |

(Continued)

OTHER PUBLICATIONS

CN 111718494 A English Translation provided by EPO (Year: 2025).*
Extended European Search Report, mailed Jan. 28, 2008, for EP 07013193.3.
Invitation to Pay Additional Fees for PCT/US2004/016521 mailed Sep. 29, 2004.

(Continued)

*Primary Examiner* — Michael P Cohen
(74) *Attorney, Agent, or Firm* — Wolf, Greenfield & Sacks, P.C.

(57) ABSTRACT

The present disclosure provides branched poly($\beta$-amino esters) (PBAEs) of Formula (I) made by reacting primary amines with diacrylates. Further provided herein are compositions comprising the polymers of Formula (I), and methods of using the compositions and polymers as described herein for the treatment of disease.

$L\text{-}(R)_n$    (I)

20 Claims, 45 Drawing Sheets

(56) References Cited

U.S. PATENT DOCUMENTS

| | | |
|---|---|---|
| 2001/0048940 A1 | 12/2001 | Tousignant et al. |
| 2002/0131951 A1 | 9/2002 | Langer et al. |
| 2004/0028694 A1 | 2/2004 | Young et al. |
| 2004/0071654 A1 | 4/2004 | Anderson et al. |
| 2004/0175328 A1 | 9/2004 | Sutton et al. |
| 2005/0059005 A1 | 3/2005 | Tuschl et al. |
| 2005/0122550 A1 | 6/2005 | Plewa et al. |
| 2005/0238716 A1 | 10/2005 | Verrijk et al. |
| 2005/0244504 A1 | 11/2005 | Little et al. |
| 2005/0265961 A1 | 12/2005 | Langer et al. |
| 2006/0062821 A1 | 3/2006 | Simhambhatla et al. |
| 2006/0105975 A1 | 5/2006 | Pendergrast et al. |
| 2007/0178126 A1 | 8/2007 | Angot et al. |
| 2008/0145338 A1 | 6/2008 | Anderson et al. |
| 2008/0242626 A1 | 10/2008 | Zugates et al. |
| 2010/0036084 A1 | 2/2010 | Langer et al. |
| 2010/0196492 A1 | 8/2010 | Green et al. |
| 2012/0065358 A1 | 3/2012 | Langer et al. |
| 2012/0149630 A1 | 6/2012 | Zugates et al. |
| 2012/0294944 A1 | 11/2012 | Emanuel et al. |
| 2013/0302401 A1 | 11/2013 | Ma et al. |
| 2014/0094399 A1 | 4/2014 | Langer et al. |
| 2014/0271861 A1 | 9/2014 | Emanuel |
| 2015/0273071 A1 | 10/2015 | Green et al. |
| 2016/0022821 A1 | 1/2016 | Langer et al. |
| 2017/0216455 A1 | 8/2017 | Wang et al. |
| 2019/0125874 A1 | 5/2019 | Anderson et al. |
| 2019/0194390 A1 | 6/2019 | Palmiero et al. |
| 2019/0194444 A1 | 6/2019 | Palmiero et al. |
| 2020/0172663 A1 | 6/2020 | Kaczmarek et al. |
| 2021/0388196 A1 | 12/2021 | Palmiero et al. |
| 2023/0061974 A1 | 3/2023 | Anderson et al. |

FOREIGN PATENT DOCUMENTS

| | | |
|---|---|---|
| DE | 25 20 814 A1 | 11/1976 |
| DE | 19626567 A1 | 1/1998 |
| EP | 0 959 092 A1 | 11/1999 |
| EP | 1489126 A1 | 12/2004 |
| GB | 1257638 | 12/1971 |
| JP | 52-045327 A | 4/1977 |
| JP | H06-122731 A | 5/1994 |
| JP | 08-092369 A | 4/1996 |
| JP | 2004-506000 A | 2/2004 |
| WO | WO 98/16202 A2 | 4/1998 |
| WO | WO 02/13767 A2 | 2/2002 |
| WO | WO 2002/031025 A2 | 4/2002 |
| WO | WO 2004/106411 A2 | 12/2004 |
| WO | WO 2006/138380 A2 | 12/2006 |
| WO | WO 2008/011561 A2 | 1/2008 |
| WO | WO 2014/136100 A1 | 9/2014 |
| WO | WO 2016/020474 A1 | 2/2016 |
| WO | WO 2016/154622 A1 | 9/2016 |
| WO | WO 2020/077347 A2 | 4/2020 |

OTHER PUBLICATIONS

International Search Report and Written Opinion for PCT/US2004/016521 mailed Dec. 8, 2004.
International Preliminary Report on Patentability for PCT/US2004/016521 mailed Dec. 15, 2005.
International Search Report and Written Opinion for PCT/US2008/056168 mailed Nov. 6, 2008.
International Preliminary Report on Patentability for PCT/US2008/056168 mailed Sep. 17, 2009.
International Search Report for PCT/US2001/031270 mailed May 22, 2002.
Written Opinion for PCT/US2001/031270 mailed Jan. 2, 2003.
International Preliminary Examination Report for PCT/US2001/031270 mailed Aug. 19, 2003.
Extended European Search Report for EP 07813156.2 mailed Oct. 5, 2009.
International Search Report and Written Opinion for PCT/US2007/073976 mailed Sep. 29, 2008.
International Preliminary Report on Patentability for PCT/US2007/073976 mailed Feb. 5, 2009.
Extended European Search Report for EP 07798132.2 mailed Jul. 18, 2011.
International Search Report and Written Opinion for PCT/US2007/070430 mailed Dec. 13, 2007.
International Preliminary Report on Patentability for PCT/US2007/070430 mailed Dec. 24, 2008.
International Search Report and Written Opinion for PCT/US2018/057448 mailed Feb. 21, 2019.
International Preliminary Report on Patentability for PCT/US2018/057448 mailed May 7, 2020.
International Search Report and Written Opinion for PCT/US2018/058898, mailed on Feb. 22, 2019.
International Preliminary Report on Patentability for PCT/US2018/058898, mailed on May 14, 2020.
International Search Report and Written Opinion for PCT/US2018/058985, mailed Feb. 26, 2019.
International Preliminary Report on Patentability for PCT/US2018/058985 mailed May 14, 2020.
International Search Report and Written Opinion for PCT/US2019/058064, mailed on Apr. 9, 2020.
International Preliminary Report on Patentability for PCT/US2019/058064, mailed on May 6, 2021.
International Search Report and Written Opinion for PCT/US2022/019236, mailed on May 30, 2022.
[No Author Listed], HIV Vaccine Failure Prompts Merck to Halt Trial. Nature. 2007;449:390.
Abramson et al., Oral mRNA delivery using capsule-mediated gastrointestinal tissue injections. Matter. Mar. 2, 2022;5(3):975-87. doi: 10.1016/j.matt.2021.12.022.
Akhtar et al., Toxicogenomics of non-viral drug delivery systems for RNAi: potential impact on siRNA-mediated gene silencing activity and specificity. Advanced drug delivery reviews 2007, 59 (2-3), 164-82.
Akinc et al., A combinatorial library of lipid-like materials for delivery of RNAi therapeutics. Nat Biotechnol. May 2008;26(5):561-9. doi: 10.1038/nbt1402. Epub Apr. 27, 2008.
Akinc et al., Measuring the pH environment of DNA delivered using nonviral vectors: implications for lysosomal trafficking. Biotechnol Bioeng. Jun. 5, 2002;78(5):503-8.
Akinc et al., Parallel synthesis and biophysical characterization of a degradable polymer library for gene delivery. J Am Chem Soc. May 7, 2003;125(18):5316-23.
Akinc et al., Synthesis of poly(beta-amino ester)s optimized for highly effective gene delivery. Bioconjug Chem. Sep.-Oct. 2003;14(5):979-88. doi: 10.1021/bc034067y.
Allison, The mode of action of immunological adjuvants. Dev Biol Stand. 1998;92:3-11.
Anderson et al., A polymer library approach to suicide gene therapy for cancer. Proc Natl Acad Sci USA. Nov. 9, 2004;101(45):16028-33. Epub Nov. 1, 2004.
Anderson et al., Biodegradation and biocompatibility of PLA and PLGA microspheres. Adv Drug Deliv Rev. Oct. 13, 1997;28(1):5-24.
Anderson et al., Nanoliter-scale synthesis of arrayed biomaterials and application to human embryonic stem cells. Nat Biotechnol. Jul. 2004;22(7):863-6. Epub Jun. 13, 2004.
Anderson et al., Semi-automated synthesis and screening of a large library of degradable cationic polymers for gene delivery. Angew Chem Int Ed Engl. Jul. 14, 2003;42(27):3153-8.
Anderson et al., Structure/property studies of polymeric gene delivery using a library of poly(beta-amino esters). Mol Ther. Mar. 2005;11(3):426-34.
Anderson, Human gene therapy. Nature. Apr. 30, 1998;392(6679 Suppl):25-30.
Ando et al., PLGA microspheres containing plasmid DNA: preservation of supercoiled DNA via cryopreparation and carbohydrate stabilization. J Pharm Sci. Jan. 1999;88(1):126-30.
Angeloni et al., Liquid crystalline poly (β-aminoester)s containing different mesogenic groups. Makromlekulare Chemie. 1985;186:977-97.

(56) References Cited

OTHER PUBLICATIONS

Anseth et al., In situ forming degradable networks and their application in tissue engineering and drug delivery. J Control Release. Jan. 17, 2002;78(1-3):199-209.
Anseth et al., New Directions in Photopolymerizable Biomaterials. Mrs Bull. 2002;27:130-136.
Anseth et al., Photopolymerizable degradable polyanhydrides with osteocompatibility. Nat Biotechnol. Feb. 1999;17(2):156-9.
Anseth et al., Polymeric Dental Composites: Properties and Reaction Behavior of Multimethacrylate Dental Restorations. Advances in Polymer Science. 1995;122:177-217.
Arote et al., A biodegradable poly(ester amine) based on polycaprolactone and polyethylenimine as a gene carrier. Biomaterials. Feb. 2007;28(4):735-44. Epub Oct. 10, 2006.
Bals et al., Innate immunity in the lung: how epithelial cells fight against respiratory pathogens. Eur Respir J. Feb. 2004;23(2):327-33.
Bantikassegn et al., Isolation of epithelial, endothelial, and immune cells from lungs of transgenic mice with oncogene-induced lung adenocarcinomas. Am J Respir Cell Mol Biol. Apr. 2015;52(4):409-17. doi:10.1165/rcmb.2014-0312MA.
Barbucci et al. Macroinorganics. 7. Property-Structure Relationships for Polymeric Bases Whose Monomeric Units Behave Independently towards Protonation. Macromolecules 1981;14:1203-09.
Barbucci et al., Protonation studies of multifunctional polymers with a poly(amido-amine) structure. Polymer. 1978;19:1329-34.
Barbucci et al., Thermodynamic and 13C n.m.r. data on the protonation of polymeric bases whose repeating units behave independently towards protonation. Polymer. 1980;21:81-85.
Barrera et al., Synthesis and RGD Peptide Modification of a New Biodegradable Copolymer: Poly(lactic acid-co-lysine). J Am Chem Soc. 1993;115:11010-11.
Beebe et al., Microfluidic tectonics: a comprehensive construction platform for microfluidic systems. Proc Natl Acad Sci U S A. Dec. 5, 2000;97(25):13488-93.
Behr, Synthetic Gene-Transfer Vectors. Acc Chem Res. 1993;26:274-78.
Behr, The Proton Sponge: a Trick to Enter Cells the Viruses Did Not Exploit. Chimia. 1997;51:34-36.
Benns et al., pH-sensitive cationic polymer gene delivery vehicle: N-Ac-poly(L-histidine)-graft-poly(L-lysine) comb shaped polymer. Bioconjug Chem. Sep.-Oct. 2000;11(5):637-45.
Blake et al., Organocatalytic ring-opening polymerization of morpholinones: new strategies to functionalized polyesters. J Am Chem Soc. Jul. 2, 2014;136(26):9252-5. doi: 10.1021/ja503830c. Epub Jun. 19, 2014.
Blanco et al., Principles of nanoparticle design for overcoming biological barriers to drug delivery. Nat Biotechnol. Sep. 2015;33(9):941-51. doi:10.1038/nbt.3330.
Bobo et al., Nanoparticle-Based Medicines: A Review of FDA-Approved Materials and Clinical Trials to Date. Pharmaceutical Research, 2016, 33, 2373-2387.
Boussif et al., A versatile vector for gene and oligonucleotide transfer into cells in culture and in vivo: polyethylenimine. Proc Natl Acad Sci U S A. Aug. 1, 1995;92(16):7297-301.
Brazeau et al., In vitro myotoxicity of selected cationic macromolecules used in non-viral gene delivery. Pharm Res. May 1998;15(5):680-4.
Brey et al., Controlling poly(beta-amino ester) network properties through macromer branching. Acta Biomater. Mar. 2008;4(2):207-17. Epub Oct. 22, 2007.
Brey et al., Influence of macromer molecular weight and chemistry on poly(beta-amino ester) network properties and initial cell interactions. J Biomed Mater Res A. Jun. 1, 2008;85(3):731-41.
Brocchini et al., A Combinatorial Approach for Polymer Designs. J Am Chem Soc. 1997;119:4553-54.
Brocchini, Combinatorial chemistry and biomedical polymer development. Adv Drug Deliv Rev. Dec. 3, 2001;53(1):123-30.

Bryant et al., Cytocompatibility of UV and visible light photoinitiating systems on cultured NIH/3T3 fibroblasts in vitro. J Biomater Sci Polym Ed. 2000;11(5):439-57.
Burdick et al., Photoencapsulation of osteoblasts in injectable RGD-modified PEG hydrogels for bone tissue engineering. Biomaterials. Nov. 2002;23(22):4315-23.
Burdick et al., Stimulation of neurite outgrowth by neurotrophins delivered from degradable hydrogels. Biomaterials. Jan. 2006;27(3):452-9. Epub Aug. 22, 2005.
Byk et al., Synthesis, activity, and structure--activity relationship studies of novel cationic lipids for DNA transfer. J Med Chem. Jan. 15, 1998;41(2):229-35. doi: 10.1021/jm9704964.
Byloos et al., Phase Transitions of Alkanethiol Self-Assembled Monolayers at an Electrified Gold Surface. J Phys Chem B. 2001;105:5900-05.
Caminschi et al., Molecular cloning of F4/80-like-receptor, a seven-span membrane protein expressed differentially by dendritic cell and monocyte-macrophage subpopulations. J Immunol. Oct. 1, 2001;167(7):3570-6.
Capan et al., Preparation and characterization of poly (D,L-lactide-co-glycolide) microspheres for controlled release of poly(L-lysine) complexed plasmid DNA. Pharm Res. Apr. 1999;16(4):509-13.
Carai et al., Central Effects of 1,4-Butanediol are Mediated by GABA(B) Receptors via its Conversion into γ-Hydroxybutyric Acid. European Journal of Pharmacology, 2002, 441, 157-163.
Carothers, Polymers and Polyfunctionality. Transactions of the Faraday Society, 1936, 32, 39-49.
Casimiro et al., Vaccine-induced immunity in baboons by using DNA and replication-incompetent adenovirus type 5 vectors expressing a human immunodeficiency virus type 1 gag gene. J Virol. Jul. 2003;77(13):7663-8.
Chan et al., Triplex DNA: fundamentals, advances, and potential applications for gene therapy. J Mol Med. Apr. 1997;75(4):267-82.
Chen et al., Production and Clinical Development of Nanoparticles for Gene Delivery. Mol. Ther. Methods Clin. Dev., 2016, 3, 16023.
Chen et al., Rapid discovery of potent siRNA-containing lipid nanoparticles enabled by controlled microfluidic formulation. J Am Chem Soc. Apr. 25, 2012;134(16):6948-51. doi: 10.1021/ja301621z. Epub Apr. 10, 2012.
Cho et al., A proposed mechanism for the induction of cytotoxic T lymphocyte production by heat shock fusion proteins. Immunity. Mar. 2000;12(3):263-72.
Cho et al., Homeostasis-stimulated proliferation drives cotton T cells to differentiate directly into memory T cells. J Exp Med. Aug. 21, 2000;192(4):549-56.
Choksakulnimitr et al., In vitro cytotoxicity of macromolecules in different cell culture systems. J Control Rel. 1995;34:233-41.
Cotten et al., Receptor-mediated transport of DNA into eukaryotic cells. Methods Enzymol. 1993;217:618-44.
Crooke, Evaluating the mechanism of action of antiproliferative antisense drugs. Antisense Nucleic Acid Drug Dev. Apr. 2000;10(2):123-6; discussion 127.
Crooke, Molecular mechanisms of action of antisense drugs. Biochim Biophys Acta. Dec. 10, 1999;1489(1):31-44.
Crystal, Transfer of genes to humans: early lessons and obstacles to success. Science. Oct. 20, 1995;270(5235):404-10.
Dahlman et al., In vivo endothelial siRNA delivery using polymeric nanoparticles with low molecular weight. Nature nanotechnology 2014;9 (8):648-55.
Danusso et al., Nuovi alti polimeri da poliaddizione di piperazina o 2-metilpiperazina a diesteri acrilici o divinilsolfone. Chim Ind (Milan). 1967;49:826-30. Italian.
Danusso et al., Synthesis of tertiary amine polymers. Polymer. 1970;11:88-113.
Dash et al., Polymeric modification and its implication in drug delivery: poly-ε-caprolactone (PCL) as a model polymer. Mol Pharm. Sep. 4, 2012;9(9):2365-79. doi: 10.1021/mp3001952. Epub Aug. 14, 2012.
Dash et al., Poly-ε-caprolactone Based Formulations for Drug Delivery and Tissue Engineering: A Review. Journal of Controlled Release, 2012, 158, 15-33.

(56) References Cited

OTHER PUBLICATIONS

Davis, The first targeted delivery of siRNA in humans via a self-assembling, cyclodextrin polymer-based nanoparticle: from concept to clinic. Molecular pharmaceutics 2009;6(3):659-68.
De Smedt et al., Cationic polymer based gene delivery systems. Pharm Res. Feb. 2000;17(2):113-26.
Demeneix et al., Chapter 14. The Proton Sponge: A Trick the Viruses Did Not Exploit. Artificial Self Assembly Systems for Gene Delivery (Felgner et al Eds). 1996:146-51.
Deshmukh et al., Liposome and polylysine mediated gene transfer. New J Chem. 1997;21:113-24.
Dong et al., Lipopeptide nanoparticles for potent and selective siRNA delivery in rodents and nonhuman primates. Proc Natl Acad Sci U S A. Mar. 18, 2014;111(11):3955-60. doi: 10.1073/pnas. 1322937111. Epub Feb. 10, 2014. Erratum in: Proc Natl Acad Sci U S A. Apr. 15, 2014;111(15):5753.
Dowdy, Overcoming cellular barriers for RNA therapeutics. Nat Biotechnol. Mar. 2017;35(3):222-229. doi: 10.1038/nbt.3802. Epub Feb. 27, 2017.
Draghici et al., Synthetic nucleic acid delivery systems: present and perspectives. J Med Chem. May 28, 2015;58(10):4091-130. doi: 10.1021/jm500330k. Epub Feb. 20, 2015.
Eddington et al., Flow control with hydrogels. Adv Drug Deliv Rev. Feb. 10, 200;56(2):199-210.
Elisseeff et al., Transdermal photopolymerization for minimally invasive implantation. Proc Natl Acad Sci U S A. Mar. 16, 1999;96(6):3104-7.
Eltoukhy et al., Degradable terpolymers with alkyl side chains demonstrate enhanced gene delivery potency and nanoparticle stability. Adv Mater. Mar. 13, 2013;25(10):1487-93. doi:10.1002/adma. 201204346. Epub Jan. 4, 2013.
Eltoukhy et al., Effect of molecular weight of amine end-modified poly(β-amino ester)s on gene delivery efficiency and toxicity. Biomaterials. May 2012;33(13):3594-603. doi:10.1016/j.biomaterials. 2012.01.046. Epub Feb. 14, 2012.
Fahnhorst et al., Synthesis and Study of Sustainable Polymers in the Organic Chemistry Laboratory: An Inquiry-Based Experiment Exploring the Effects of Size and Composition on the Properties of Renewable Block Polymers. In: Green Chemistry Experiments in Undergraduate Laboratories. ACS Symposium Series. Fahey et al., Eds. American Chemical Society. 2016. Chapter 8, pp. 123-147.
Fenton et al., Bioinspired Alkenyl Amino Alcohol Ionizable Lipid Materials for Highly Potent In Vivo mRNA Delivery. Adv Mater. Apr. 20, 2016;28(15):2939-43. doi: 10.1002/adma.201505822. Epub Feb. 18, 2016.
Fenton et al., Synthesis and Biological Evaluation of Ionizable Lipid Materials for the In Vivo Delivery of Messenger RNA to B Lymphocytes. Adv Mater. Sep. 2017;29(33). doi: 10.1002/adma. 201606944. Epub Jul. 6, 2017.
Ferrari et al., ε-Caprolactone-based Macromonomers Suitable for Biodegradable Nanoparticles Synthesis Through Free Radical Polymerization. Macromolecules, 2011, 44, 9205-9212.
Ferruti et al., A novel modification of poly(l-lysine) leading to a soluble cationic polymer with reduced toxicity and with potential as a transfection agent. Macromol Chem Phys 1998;199:2565-75.
Ferruti et al., Linear Amino Polymers: Synthesis, Protonation and Complex Formation. Advances in Polymer Sci. 1984;58:55-92.
Ferruti et al., Recent results on functional polymers and macromonomers of interest as biomaterials or for biomaterial modification. Biomaterials. Dec. 1994;15(15):1235-41.
Ferruti et al., Synthesis, characterisation and antitumour activity of platinum (II) complexes of novel functionalised poly(amido amine)s. Macromol Chem Phys. 1999;200:1644-54.
Ferruti et al., Synthesis, physico-chemical properties and biomedical applications of poly(amido-amine)s. Polymer. 1985;26:1336-48.
Field et al., A simple predictive model for spherical indentation. J Mater Res. 1993;8(2):297-306.
Fire et al., Potent and specific genetic interference by double-stranded RNA in Caenorhabditis elegans. Nature. Feb. 19, 1998;391(6669):806-11.

Fisher et al., Photoinitiated Polymerization of Biomaterials. Annu Rev Mater Res. 2001;31:171-181.
Fisher et al., Synthesis and properties of photocross-linked poly-(propylene fumarate) scaffolds. J Biomater Sci Polym Ed. 2001;12(6):673-87.
Flory, Principles of Polymer Chemistry. Cornell University Press. Ithaca, New York. 1953:40-46, 318-23.
Fominaya et al., Target cell-specific DNA transfer mediated by a chimeric multidomain protein. Novel non-viral gene delivery system. J Biol Chem. May 3, 1996;271(18):10560-8.
Friedmann, Human gene therapy—an immature genie, but certainly out of the bottle. Nat Med. Feb. 1996;2(2):144-7.
Fritz et al., Gene transfer into mammalian cells using histone-condensed plasmid DNA. Hum Gene Ther. Aug. 1, 1996;7(12):1395-404.
Fu et al., Visual Evidence of Acidic Environment Within Degrading Poly(lactic-co-glycolic acid) (PLGA) Microspheres. Pharma Res. 2000;17(1):100-06.
Gao et al., Hyperbranched polymers: from synthesis to applications. Prog Polym Sci. Mar. 2004;29(3):183-275. doi: 10.1016/j.progpolymsci. 2003.12.002.
Garg et al., Genetic tagging shows increased frequency and longevity of antigen-presenting, skin-derived dendritic cells in vivo. Nat Immunol. Sep. 2003;4(9):907-12. Epub Aug. 10, 2003. Corrigendum Nat Immunol Oct. 2003:4(10):1037.
Gebhart et al., Evaluation of polyplexes as gene transfer agents. J Control Release. Jun. 15, 2001;73(2-3):401-16.
Gerasimov et al., Cytosolic drug delivery using pH- and light-sensitive liposomes. Adv Drug Deliv Rev. Aug. 20, 1999;38(3):317-338.
Gilboa et al., Cancer Immunotherapy with mRNA-transfected Dendritic Cells. Immunological Reviews, 2004, 199, 251-263.
Gonzalez et al., New class of polymers for the delivery of macromolecular therapeutics. Bioconjug Chem. Nov.-Dec. 1999;10(6):1068-74.
Gore et al., Executive Summary to EDC-2: The Endocrine Society's Second Scientific Statement on Endocrine-Disrupting Chemicals. Endocrine Reviews, 2015, 36, 593-602.
Gori et al., Delivery and Specificity of CRISPR/Cas9 Genome Editing Technologies for Human Gene Therapy. Human Gene Therapy, 2015, 26, 443-451.
Green et al., A combinatorial polymer library approach yields insight into nonviral gene delivery. Acc Chem Res. Jun. 2008;41(6):749-59. doi: 10.1021/ar7002336.
Green et al., Biodegradable polymeric vectors for gene delivery to human endothelial cells. Bioconjug Chem. Sep.-Oct. 2006;17(5):1162-9.
Green et al., Poly(beta-amino esters): procedures for synthesis and gene delivery. Methods Mol Biol. 2009;480:53-63. doi: 10.1007/978-1-59745-429-2_4.
Green et al., The role of the endothelium in asthma and chronic obstructive pulmonary disease (COPD). Respir Res. Jan. 18, 2017;18(1):20. doi:10.1186/s12931-017-0505-1.
Grumelli et al., An immune basis for lung parenchymal destruction in chronic obstructive pulmonary disease and emphysema. PLoS Med. Oct. 2004;1(1):e8. Epub Oct. 19, 2004.
Guan et al., Nanotechnologies in delivery of mRNA therapeutics using nonviral vector-based delivery systems. Gene Ther. Mar. 2017;24(3):133-143. doi:10.1038/gt.2017.5. Epub Jan. 17, 2017.
Guerrero-Cázares et al., Biodegradable Polymeric Nanoparticles Show High Efficacy and Specificity at DNA Delivery to Human Glioblastoma in Vitro and in Vivo. ACS Nano, 2014, 8, 5141-5153.
Haensler et al., Polyamidoamine cascade polymers mediate efficient transfection of cells in culture. Bioconjug Chem. Sep.-Oct. 1993;4(5):372-9.
Hanes et al., New advances in microsphere-based single-dose vaccines. Adv Drug Deliv Rev. Oct. 13, 1997;28(1):97-119.
Hansen et al., Re-examination and further development of a precise and rapid dye method for measuring cell growth/cell kill. J Immunol Methods. May 12, 1989;119(2):203-10.
Hao et al., Progress towards the Synthesis of Amino Polyesters via Ring-Opening Polymerization (ROP) of Functional Lactones. Synlett 2016; 27(16): 2285-2292. DOI: 10.1055/s-0035-1562505.

(56) References Cited

OTHER PUBLICATIONS

Hao et al., Rapid Synthesis of a Lipocationic Polyester Library via Ring-Opening Polymerization of Functional Valerolactones for Efficacious siRNA Delivery. Journal of the American Chemical Society 2015;137(29):9206-9.
Hashemi et al., Preparation of Effective and Safe Gene Carriers by Grafting Alkyl Chains to Generation 5 Polypropyleneimine. AAPS PharmSciTech. Oct. 2015;16(5):1002-12. doi: 10.1208/s12249-015-0284-2. Epub Jan. 22, 2015.
Hashimoto et al., Electroporation Enables the Efficient mRNA Delivery into the Mouse Zygotes and Facilitates CRISPR/Cas9-based Genome Editing. Scientific Reports, 2015, 5.
Haugland, Handbook of Fluorescent Probes and Research Chemicals. 6th ed. Molecular Probes, Inc. 1996:29.
He et al., Experimental Investigation into One-Step and Two-Steps Polymerization Via Michael Addition from Primary Amine. Polymer Preprints. 2001;42(2):335-36.
Hedley et al., Microspheres containing plasmid-encoded antigens elicit cytotoxic T-cell responses. Nat Med. Mar. 1998;4(3):365-8.
Hill et al., In vitro cytotoxicity of poly(amidoamine)s: relevance to DNA delivery. Biochim Biophys Acta. Apr. 19, 1999;1427(2):161-74.
Hofland et al., Formation of stable cationic lipid/DNA complexes for gene transfer. Proc Natl Acad Sci U S A. Jul. 9, 1996;93(14):7305-9. doi: 10.1073/pnas.93.14.7305.
Holter et al., Degree of branching in hyperbranched polymers. Acta Polymer 1997, 48, 30-35.
Hope et al., Cationic lipids, phosphatidylethanolamine and the intracellular delivery of polymeric, nucleic acid-based drugs (review). Mol Membr Biol. Jan.-Mar. 1998;15(1):1-14.
Huang et al., Long-term in vivo gene expression via delivery of PEI-DNA condensates from porous polymer scaffolds. Hum Gene Ther. May 2005;16(5):609-17.
Hutchison et al., Robust polymer microfluidic device fabrication via contact liquid photolithographic polymerization (CLiPP). Lab Chip. 2004;4:658-662.
Hwang et al., Effects of structure of beta-cyclodextrin-containing polymers on gene delivery. Bioconjug Chem. Mar.-Apr. 2001;12(2):280-90.
Irfan et al., Synthesis and meticulous molecular, morphological and thermal characterization of linear and star-shaped polycaprolactones. RSC Adv. Oct. 10, 2016;6:98117-27. doi: 10.1039/C6RA23890D.
Jerome et al., Recent advances in the synthesis of aliphatic polyesters by ringopening polymerization. Advanced drug delivery reviews. 2008;60(9):1056-76.
Jin et al., Current Progress in Gene Delivery Technology Based on Chemical Methods and Nano-carriers. Theranostics 2014, 4, 240-255.
Kabanov et al., DNA complexes with polycations for the delivery of genetic material into cells. Bioconjug Chem. Jan.-Feb. 1995;6(1):7-20.
Kabanov, Taking polycation gene delivery systems from in vitro to in vivo. Pharm Sci Technolo Today. Sep. 1999;2(9):365-372.
Kaczmarek et al., Advances in the delivery of RNA therapeutics: from concept to clinical reality. Genome Med. Jun. 27, 2017;9(1):60. doi: 10.1186/s13073-017-0450-0.
Kaczmarek et al., Polymer-Lipid Nanoparticles for Systemic Delivery of mRNA to the Lungs. Angew Chem Int Ed Engl. Oct. 24, 2016;55(44):13808-13812. doi:10.1002/anie.201608450. Epub Sep. 30, 2016.
Kamaly et al., Degradable Controlled-Release Polymers and Polymeric Nanoparticles: Mechanisms of Controlling Drug Release. Chemical reviews. 2016;116 (4), 2602-63.
Kamat et al., Lung Cancer in Vitro and in Vivo. Molecular Cancer Therapeutics, 2013, 12, 405-415.
Kamat et al., Poly(β-amino ester) nanoparticle delivery of TP53 has activity against small cell lung cancer in vitro and in vivo. Mol Cancer Ther. Apr. 2013;12(4):405-15. doi: 10.1158/1535-7163.MCT-12-0956. Epub Jan. 30, 2013.

Kanasty et al., Delivery materials for siRNA therapeutics. Nat Mater. Nov. 2013;12(11):967-77. doi: 10.1038/nmat3765.
Kargina et al., Self-Splitted Water-Soluble Ionogenic Polymers. Vysokomol Soedin Seriya. 1986;28:1139-44. Russian.
Kauffman et al., Materials for non-viral intracellular delivery of messenger RNA therapeutics. J Control Release. Oct. 28, 2016;240:227-234. doi: 10.1016/j.jconrel.2015.12.032. Epub Dec. 21, 2015.
Kauffman et al., Optimization of Lipid Nanoparticle Formulations for mRNA Delivery in Vivo with Fractional Factorial and Definitive Screening Designs. Nano Lett. Nov. 11, 2015;15(11):7300-6. doi: 10.1021/acs.nanolett.5b02497. Epub Oct. 20, 2015.
Kawata et al., Finer features for functional microdevices. Nature. Aug. 16, 2001;412(6848):697-8.
Kay et al., Viral vectors for gene therapy: the art of turning infectious agents into vehicles of therapeutics. Nat Med. Jan. 2001;7(1):33-40.
Khademhosseini et al., Molded polyethylene glycol microstructures for capturing cells within microfluidic channels. Lab Chip. Oct. 2004;4(5):425-30. Epub Jul. 26, 2004.
Khosravi-Darani et al., Calcium Based Non-viral Gene Delivery: An Overview of Methodology and Applications. Acta Med Iranica, 2010, 48, 133-141.
Kim et al., Differential polymer Strucute Tunes Mechanism of Cellular Uptake and Transfection Routes of Poly (β-amino ester) Polyplexes in Human Breast Cancer Cells. Bioconjugate Chemistry, 2013, 25, 43-51.
Kim et al., Persistent activation of an innate immune response translates respiratory viral infection into chronic lung disease. Nat Med. Jun. 2008;14(6):633-40. doi:10.1038/nm1770. Epub May 18, 2008.
Kim et al., Synthesis of biodegradable cross-linked poly(beta-amino ester) for gene delivery and its modification, inducing enhanced transfection efficiency and stepwise degradation. Bioconjug Chem. Sep.-Oct. 2005;16(5):1140-8.
Kranz et al., Systemic RNA Delivery to Dendritic Cells Exploits Antiviral Defence for Cancer Immunotherapy. Nature, 2016, 534, 396-401.
Kukowska-Latallo et al., Efficient transfer of genetic material into mammalian cells using Starburst polyamidoamine dendrimers. Proc Natl Acad Sci U S A. May 14, 1996;93(10):4897-902.
Kumari et al., Biodegradable Polymeric Nanoparticles Based Drug Delivery Systems. Colloids and Surfaces B: Biointerfaces, 2010, 75, 1-18.
Kunath et al., Integrin targeting using RGD-PEI conjugates for in vitro gene transfer. J Gene Med. Jul. 2003;5(7):588-99.
Kursa et al., Novel shielded transferrin-polyethylene glycol-polyethylenimine/DNA complexes for systemic tumor-targeted gene transfer. Bioconjug Chem. Jan.-Feb. 2003;14(1):222-31.
Kweon et al., A novel degradable polycaprolactone networks for tissue engineering. Biomaterials. Feb. 2003;24(5):801-8. doi: 10.1016/s0142-9612(02)00370-8.
Kwon et al., Pseudopoly(amino acids): A Study of the Synthesis and Characterization of Poly(trans-4-hydroxy-N-acyl-1-proline esters). Macromolecules. 1989;22:3250-55.
Leach et al., Bone engineering by controlled delivery of osteoinductive molecules and cells. Expert Opin Biol Ther. Jul. 2004;4(7):1015-27.
Leach et al., Photocrosslinked hyaluronic acid hydrogels: natural, biodegradable tissue engineering scaffolds. Biotechnology and Bioengineering. 2003;82:578-589.
Ledley, Nonviral gene therapy: the promise of genes as pharmaceutical products. Hum Gene Ther. Sep. 1995;6(9):1129-44.
Leus et al., VCAM-1 specific PEGylated SAINT-based lipoplexes deliver siRNA to activated endothelium in vivo but do not attenuate target gene expression. Int J Pharm. Jul. 20, 2014;469(1):121-31. doi: 10.1016/j.ijpharm.2014.04.041. Epub Apr. 18, 2014.
Li et al., Lipid-based nanoparticles for nucleic acid delivery. Pharm Res. Mar. 2007;24(3):438-49. doi: 10.1007/s11095-006-9180-5.
Lim et al., A Self-Destroying Polycationic Polymer: Biodegradable Poly(4-hydroxy-1-proline ester). J Am Chem Soc. 1999;121:5633-39.

(56) References Cited

OTHER PUBLICATIONS

Lim et al., Biodegradable, endosome disruptive, and cationic network-type polymer as a highly efficient and nontoxic gene delivery carrier. Bioconjug Chem. Sep.-Oct. 2002;13(5):952-7.

Lim et al., Cationic hyperbranched poly(amino ester): a novel class of DNA condensing molecule with cationic surface, biodegradable three-dimensional structure, and tertiary amine groups in the interior. J Am Chem Soc. Mar. 14, 2001;123(10):2460-1.

Lim et al., Development of a Safe Gene Delivery System Using Biodegradable Polymer, Poly[α-(4-aminobutyl)-1-glycolic acid].J Am Chem Soc. 2000;122:6524-25.

Lim et al., Self-assembled ternary complex of cationic dendrimer, cucurbituril, and DNA: noncovalent strategy in developing a gene delivery carrier. Bioconjug Chem. Nov.-Dec. 2002;13(6):1181-5.

Linhardt et al., Free-Radical Synthesis of Poly(2-ethylacrylic acid) Fractions of Low Polydispersity: Effects of Molecular Weight and Polydispersity on the pH-Dependent Conformational Transition in Aqueous Solutions. Macromolecules. 1999;32:4457-59.

Linhardt et al., pH-Induced Fusion and Lysis of Phosphatidylcholine Vesicles by the Hydrophobic Polyelectrolyte Poly(2-ethylacrylic Acid). Langmuir. 2000;16:122-27.

Liu et al., Poly(β-Amino Esters): Synthesis, Formulations, and Their Biomedical Applications. Adv Healthc Mater. Jan. 2019;8(2):e1801359. doi: 10.1002/adhm.201801359. Epub Dec. 14, 2018.

Liu et al., Three-dimensional photopatterning of hydrogels containing living cells. Biomedical Microdevices. 2002;4:257-266.

Loan et al., Oligoamidoamines and oligoesteramines based on antibiotics containing β-lactam ring. Euro Poly J. 1996;32:957-62.

Loan et al., Poly(amdio amine)s and poly(ester amine)s based on aromatic amines containg carboxyl groups. Macromolecular Chem and Phys. 1995;11:3525-33.

Luman et al., The convergent synthesis of poly(glycerol-succinic acid) dendritic macromolecules. Chemistry. Nov. 21, 2003;9(22):5618-26.

Luo et al., Synthetic DNA delivery systems. Nat Biotechnol. Jan. 2000;18(1):33-7.

Luten et al., Biodegradable Polymers as Non-viral Carriers for Plasmid DNA Delivery. J Control Release, 2008, 126, 97-110.

Lv et al., Toxicity of cationic lipids and cationic polymers in gene delivery. Journal of controlled release: official journal of the Controlled Release Society. 2006;114 ( 1 ), 100-9.

Lynn et al., Accelerated discovery of synthetic transfection vectors: parallel synthesis and screening of a degradable polymer library. J Am Chem Soc. Aug. 22, 2001;123(33):8155-6.

Lynn et al., Degradable Poly(β-amino esters): Synthesis, Characterization, and Self-Assembly with Plasmid DNA. J Am Chem Soc. Oct. 18, 2000;122(44):10761-8.

Lynn et al., pH-Responsive Polymer Microspheres: Rapid Release of Encapsulated Material within the Range of Intracellular pH. Angew Chem Int Ed Engl. May 4, 2001;40(9):1707-1710.

Mangraviti et al., Polymeric Nanoparticles for Nonviral Gene Therapy Extend Brain Tumor Survival in Vivo. ACS Nano, 2015, 9, 1236-1249.

Mann et al., Smooth muscle cell growth in photopolymerized hydrogels with cell adhesive and proteolytically degradable domains: synthetic ECM analogs for tissue engineering. Biomaterials. Nov. 2001;22(22):3045-51.

Maruo et al., Three-dimensional microfabrication with two-photon-absorbed photopolymerization. Opt Lett. Jan. 15, 1997;22(2):132-4.

Mathiowitz et al., Novel Mircocapsules for Delivery Sytems. Reactive Polymers. 1987;6:275-283.

Mathiowitz et al., Polyanhydride Microspheres as Drug Carriers. I. Hot-Melt Microencapsulation. J Polym Rel. 1987;5:13-22.

Mathiowitz et al., Polyanhydride Microspheres as Drug Carriers. II. Microencapsulation by Solvent Removal. J Appl Polymer Sci. 1988;35:755-74.

Matsui et al., Messenger RNA-based Therapeutics for the Treatment of Apoptosis-associated Diseases. Scientific Reports 2015, 5.

Mcnamara et al., RNA-based Vaccines in Cancer Immunotherapy. Journal of Immunology Research, 2015, 2015.

Merdan et al., Prospects for cationic polymers in gene and oligonucleotide therapy against cancer. Adv Drug Deliv Rev. Sep. 13, 2002;54(5):715-58.

Midoux et al., Efficient gene transfer by histidylated polylysine/pDNA complexes. Bioconjug Chem. May-Jun, 1999;10(3):406-11.

Miller, Cationic Liposomes for Gene Therapy. Angew Chem Int Ed. 1998;37:1769-85.

Mirmira et al., Obesity, and Type 2 Diabetes Mellitus: Genuine Concern or Unnecessary Preoccupation? Translational Research, 2014, 164, 13-21.

Muh et al., Bismethacrylate-Based Hybrid Monomers via Michael-Addition Reactions. Macromolecules. 2001;34(17):5778-5785.

Mulligan, The basic science of gene therapy. Science. May 14, 1993;260(5110):926-32.

Murphy et al., A combinatorial approach to the discovery of efficient cationic peptoid reagents for gene delivery. Proc Natl Acad Sci U S A. Feb. 17, 1998;95(4):1517-22.

Narang et al., Cationic lipids with increased DNA binding affinity for nonviral gene transfer in dividing and nondividing cells. Bioconjug Chem. Jan.-Feb. 2005;16(1):156-68. doi: 10.1021/bc049818q.

Nguyen et al., Photopolymerizable hydrogels for tissue engineering applications. Biomaterials. Nov. 2002;23(22):4307-14.

O'Donnell et al., Preparation of microspheres by the solvent evaporation technique. Adv Drug Delivery Rev. 1997;28:25-42.

O'Hagan et al., Induction of potent immune responses by cationic microparticles with adsorbed human immunodeficiency virus DNA vaccines. J Virol. Oct. 2001;75(19):9037-43.

Odian et al., Step Polymerization. In: Principles of Polymerization. John Wiley & Sons, Inc. New York. 1991:73-89.

Ogris et al., Tumor-targeted gene therapy: strategies for the preparation of ligand-polyethylene glycol-polyethylenimine/DNA complexes. J Control Release. Aug. 28, 2003;91(1-2):173-81.

Okada, One- and three-month release injectable microspheres of the LH-RH superagonist leuprorelin acetate. Adv Drug Deliv Rev. Oct. 13, 1997;28(1):43-70.

Pack et al., Design and development of polymers for gene delivery. Nat Rev Drug Discov. Jul. 2005;4(7):581-93.

Pack et al., Design of imidazole-containing endosomolytic biopolymers for gene delivery. Biotechnol Bioeng. Jan. 20, 2000;67(2):217-23.

Phillips et al., Enhanced antibody response to liposome-associated protein antigens: preferential stimulation of IgG2a/b production. Vaccine. 1992;10(3):151-8.

Pollard et al., Challenges and Advances Towards the Rational Design of mRNA Vaccines. Trends in Molecular Medicine, 2013, 19, 705-713.

Prabha et al., Size-dependency of nanoparticle-mediated gene transfection: studies with fractionated nanoparticles. Int J Pharm. Sep. 5, 2002;244(1-2):105-15.

Putnam et al., Poly(4-hydroxy-1-proline ester): Low-Temperature Polycondensation and Plasmid DNA Complexation. Macromolecules 1999;32:3658-62.

Putnam et al., Polymer-based gene delivery with low cytotoxicity by a unique balance of side-chain termini. Proc Natl Acad Sci U S A. Jan. 30, 2001;98(3):1200-5. Epub Jan. 23, 2001.

Rao et al., Poly(butanediol Spermate): A Hydrolytically Labile Polyester-Based Nitric Oxide Carrier. J Bioactive Compatible Polymers. 1999;14:54-63.

Remy et al., Gene transfer with lipospermines and polyethylenimines. Adv Drug Deliv Rev. Mar. 2, 1998;30(1-3):85-95.

Roberts et al., Preliminary biological evaluation of polyamidoamine (PAMAM) Starburst dendrimers. J Biomed Mater Res. Jan. 1996;30(1):53-65.

Robinson et al., Nucleic acid immunizations. Curr. Protoc. Immunol. 2001, Chapter 2: Unit 2.14.

Ruoslahti, The RGD story: a personal account. Matrix Biol. Nov. 2003;22(6):459-65.

Sahoo et al., Residual polyvinyl alcohol associated with poly (D,L-lactide-co-glycolide) nanoparticles affects their physical properties and cellular uptake. J Control Release. Jul. 18, 2002;82(1):105-14.

Sanford, The biolistic process. Trends Biotechnol. 1988;6:299-302.

(56) References Cited

OTHER PUBLICATIONS

Satta et al., Drosophila Metabolize 1,4-Butanediol into γ-Hydroxybutyric Acid in Vivo. European Journal of Pharmacology, 2003, 473, 149-152.

Schaffer et al., Vector unpacking as a potential barrier for receptor-mediated polyplex gene delivery. Biotechnol Bioeng. Mar. 5, 2000;67(5):598-606.

Schrom et al., Translation of Angiotensin-Converting Enzyme 2 upon Liver- and Lung-Targeted Delivery of Optimized Chemically Modified mRNA. Mol Ther Nucleic Acids. Jun. 16, 2017;7:350-365. doi: 10.1016/j.omtn.2017.04.006. Epub Apr. 13, 2017.

Schwartz et al., Peptide-mediated cellular delivery. Curr Opin Mol Ther. Apr. 2000;2(2):162-7.

Schweikl et al., Triethylene glycol dimethacrylate induces large deletions in the hprt gene of V79 cells. Mutat Res. Jan. 2, 1999;438(1):71-8.

Sergeeva et al., mRNA-based therapeutics-Advances and perspectives. Biochemistry (Moscow) 2016, 81, 709-722.

Shchori, Poly(secondary Amine)s from Diacrylates and Diamines. J Polym Sci Polymer. 1983;21:413-15.

Shmueli et al., Gene delivery nanoparticles specific for human microvasculature and macrovasculature. Nanomedicine. Oct. 2012;8(7):1200-7. doi: 10.1016/j.nano.2012.01.006. Epub Feb. 1, 2012.

Singh et al., Cationic microparticles: A potent delivery system for DNA vaccines. Proc Natl Acad Sci U S A. Jan. 18, 2000;97(2):811-6.

Smeds et al., Photocrosslinkable polysaccharides for in situ hydrogel formation. J Biomed Mater Res. Jan. 2001;54(1):115-21.

Somia et al., Gene therapy: trials and tribulations. Nat Rev Genet. Nov. 2000;1(2):91-9.

Strong et al., A General Synthetic Route to Defined, Biologically Active Multivalent Arrays. J Am Chem Soc. 1999;121:6193-96.

Su et al., In vitro and in vivo mRNA delivery using lipid-enveloped pH-responsive polymer nanoparticles. Mol Pharm. Jun. 6, 2011;8(3):774-87. doi: 10.1021/mp100390w. Epub Apr. 1, 2011.

Suh et al., An angiogenic, endothelial-cell-targeted polymeric gene carrier. Mol Ther. Nov. 2002;6(5):664-72.

Sullivan et al., Development of a novel gene delivery scaffold utilizing colloidal gold-polyethylenimine conjugates for DNA condensation. Gene Therapy. 2003;10:1882-90.

Sunshine et al., Poly (β-amino ester)-nanoparticle Mediated Transfection of Retinal Pigment Epithelial Cells in Vitro and in Vivo. PloS one, 2012, 7, e37543.

Sunshine et al., Small-Molecule End-Groups of Linear Polymer Determin Cell-type Gene-Delivery Efficacy. Advanced Materials, 2009, 21, 4947-4951.

Tang et al., In vitro gene delivery by degraded polyamidoamine dendrimers. Bioconjug Chem. Nov.-Dec. 1996;7(6):703-14.

Thomas et al., Non-viral gene therapy: polycation-mediated DNA delivery. Appl Microbiol Biotechnol. Jul. 2003;62(1):27-34. Epub Apr. 29, 2003.

Tian et al., Biodegradable synthetic polymers: Preparation, functionalization and biomedical application. Prog Polym Sci. 2012;37(2):237-280.

Tosatti et al., RGD-containing peptide GCRGYGRGDSPG reduces enhancement of osteoblast differentiation by poly(L-lysine)-graft-poly(ethylene glycol)-coated titanium surfaces. J Biomed Mater Res A. Mar. 1, 2004;68(3):458-72.

Trubetskoy et al., Recharging cationic DNA complexes with highly charged polyanions for in vitro and in vivo gene delivery. Gene Ther. Feb. 2003;10(3):261-71.

Tweedie et al., Combinatorial material mechanics: high-throughput polymer synthesis and nanomechanical screening. Adv Mater. 2005;17:2599-2604.

Tzeng et al., Cystamine-terminated Poly (beta-amino ester)s for siRNA Delivery to Human Mesenchymal Stem Cells and Enhancement of Osteogenic Differentiation. Biomaterials, 2012, 33, 8142-8151.

Uhrich, Hyperbranched Polymers for Drug Discovery. Trends Polymer Sci. 1997;5:388-93.

Unal et al., Influence of filler addition on the mechanical properties of nylon-6 polymer. Journal of Reinforced Plastics and Composites. 2004;23(5):461-469.

Unkeless et al., Structure and function of human and murine receptors for IgG. Annu Rev Immunol. 1988;6:251-81.

Van De Wetering et al., Structure-activity relationships of water-soluble cationic methacrylate/methacrylamide polymers for nonviral gene delivery. Bioconjug Chem. Jul.-Aug. 1999;10(4):589-97.

Vázquez et al., Construction of hydrolytically-degradable thin films via layer-by-layer deposition of degradable polyelectrolytes. J Am Chem Soc. Nov. 27, 2002;124(47):13992-3.

Vu et al., Generation of a Focused Poly (amino ether) Library: Polymer-mediated Transgene Delivery and Gold-nanorod Based Theranostic Systems. Theranostics. 2012, 2, 1160-1173.

Vuorimaa et al., Poly(β-amino ester)-DNA complexes: time-resolved fluorescence and cellular transfection studies. J Control Release. Sep. 5, 2011;154(2):171-6. doi: 10.1016/j.jconrel.2011.06.016. Epub Jun. 15, 2011.

Wagner et al., Influenza virus hemagglutinin HA-2 N-terminal fusogenic peptides augment gene transfer by transferrin-polylysine-DNA complexes: toward a synthetic virus-like gene-transfer vehicle. Proc Natl Acad Sci U S A. Sep. 1, 1992;89(17):7934-8.

Walter et al., Microencapsulation of DNA using poly(DL-lactide-co-glycolide): stability issues and release characteristics. J Control Release. Sep. 20, 1999;61(3):361-74.

Wang et al., Mechanical and rheological properties of HDPE/graphite composite with enhanced thermal conductivity. Polymer Composites. 2001;22(1):97-103.

Wang et al., One-step Generation of Mice Carrying Mutations in Multiple Genes by CRISPR/Cas-mediated Genome Engineering. Cell, 2013, 153, 910-918.

Wang et al., Synthesis and Gene Delivery of Poly(amido amine)s with Different Branched Architecture. Biomacromolecules 2010; 11(2):489-495. DOI: 10.1021/bm901215s.

Weiss et al., mRNA Vaccination as a Safe Approach for Specific Protection from Type I Allergy. Expert Review of Vaccines, 2012, 11, 55-67.

West et al., Photopolymerized hydrogel materials for drug delivery applications. Reactive Polymers. 1995; 25:139-147.

Whitehead et al., In vitro-in vivo translation of lipid nanoparticles for hepatocellular siRNA delivery. ACS Nano. Aug. 28, 2012;6(8):6922-9. doi:10.1021/nn301922x. Epub Jul. 6, 2012.

Wiethoff et al., Barriers to nonviral gene delivery. J Pharm Sci. Feb. 2003;92(2):203-17.

Wu et al., Cationic lipid polymerization as a novel approach for constructing new DNA delivery agents. Bioconjug Chem. Mar.-Apr. 2001;12(2):251-7. doi: 10.1021/bc000097e.

Wu et al., Effects of Chemistries of Trifunctional Amines on Mechanisms of Michael Addition Polymerizations with Diacrylates. Macromolecules, 2004;37(18):6763-6770. DOI: 10.1021/ma0493832.

Wu et al., Hyperbranched poly(amino ester)s with different terminal amine groups for DNA delivery. Biomacromolecules. Jun. 2006;7(6):1879-83.

Yang et al., A new approach to identifying genotoxic carcinogens: p53 induction as an indicator of genotoxic damage. Carcinogenesis. Jun. 1998;19(6):1117-25.

Yin et al., Non-viral vectors for gene-based therapy. Nature Reviews Genetics 2014, 15 (8), 541-555.

Zauner et al., Polylysine-based transfection systems utilizing receptor-mediated delivery. Adv Drug Deliv Rev. Mar. 2, 1998;30(1-3):97-113.

Zhang et al., Structure/property relationships in erodible multilayered films: influence of polycation structure on erosion profiles and the release of anionic polyelectrolytes. Langmuir. Jan. 3, 2006;22(1):239-45.

Zhao et al., Synthesis of Amphiphilic Poly (β-amino ester) for Efficiently Minicircle DNA Delivery in Vivo. ACS Applied Materials & Interfaces, 2016, 8, 19284-19290.

Zhou et al., Biodegradable poly( amine-co-ester) terpolymers for targeted gene delivery. Nature materials. 2011, 11 (1):82-90.

(56) References Cited

OTHER PUBLICATIONS

Zhou et al., Development of Branched Poly(5-Amino-1-pentanol-co-1,4-butanediol Diacrylate) with High Gene Transfection Potency Across Diverse Cell Types. ACS Appl Mater Interfaces. Dec. 21, 2016;8(50):34218-34226. doi: 10.1021/acsami.6b12078. Epub Dec. 6, 2016.

Zhou et al., Highly Branched Poly (β-amino ester)s for Skin Gene Therapy. Journal of Controlled Release, 2016, 244, 336-346.

Zhou et al., Preparation of Poly(1-serine ester): A Structural Analogue of Conventional Poly(1-serine). Macromolecules. 1990;23:3399-406.

Zhou et al., The transition from linear to highly branched poly(β-amino ester)s: Branching matters for gene delivery. Sci Adv. Jun. 17, 2016;2(6):e1600102. doi: 10.1126/sciadv.1600102.

Zhu et al., Synthesis of Star Poly (ε-caprolactone) Catalyzed by Lanthanum Tris (2,6-di-tert-butyl-4-methylphenolate). Chinese J Catalysis. Jun. 2007;28(6):547-50.

Zuber et al., Towards synthetic viruses. Adv Drug Deliv Rev. Nov. 19, 2001;52(3):245-53.

Zugates et al., Rapid Optimization of Gene Delivery by Parallel End-modification of Poly(β-amino ester)s. Mol Ther. Jul. 2007;15(7):1306-1312. doi:10.1038/sj.mt.6300132. Epub Dec. 7, 2016.

International Preliminary Report on Patentability for PCT/US2022/019236, mailed on Sep. 21, 2023.

Balashanmugam et al., Preparation and characterization of novel PBAE/PLGA polymer blend microparticles for DNA vaccine delivery. Scientific WorldJournal. 2014;2014:385135. doi: 10.1155/2014/385135. Epub Oct. 27, 2014.

* cited by examiner

| Amine | Diacrylate | Molar ratio of amine: diacrylate | Endcap | Linear polymer code |
|---|---|---|---|---|
| B | 1 | 1.2 | No | 1 |
| B | 1 | 1.1 | No | 2 |
| B | 2 | 0.95 | No | 12 |
| B | 1 | 0.83 | No | 13 |
| B | 1 | 0.91 | No | 14 |
| B | 3 | 1.1 | No | 26 |
| B | 3 | 0.91 | No | 29 |
| G | 2 | 1.1 | No | 92 |
| G | 2 | 0.91 | No | 95 |
| J | 2 | 1.2 | No | 196 |
| J | 2 | 0.83 | No | 198 |
| B | 1 | 0.91 | Yes | 222 |
| B | 3 | 0.91 | Yes | 224 |
| G | 2 | 0.91 | Yes | 227 |
| J | 2 | 0.83 | Yes | 282 |
FIG. 1B
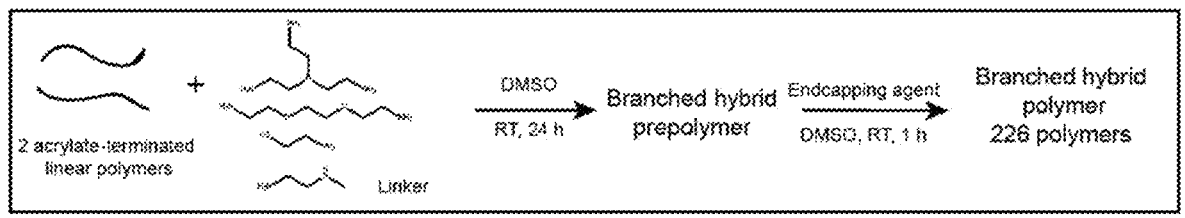
FIG. 1C
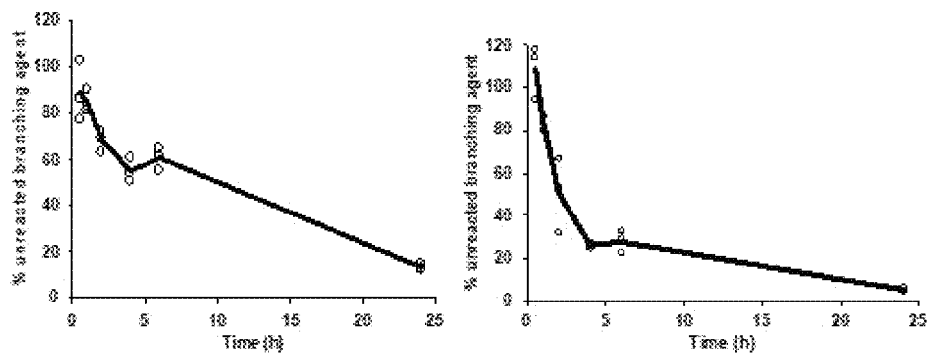
FIG. 1D

| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| A | 801 | 802 | 803 | 804 | 805 | 806 | 807 | 808 | 809 | 810 | 811 | 814 | 815 | 816 | 817 | 818 | 819 |
| B | 820 | 821 | 822 | 823 | 824 | 825 | 826 | 827 | 828 | 829 | 830 | 831 | 832 | 834 | 835 | 836 | 837 |
| C | 838 | 839 | 840 | 841 | 842 | 843 | 844 | 845 | 846 | 847 | 848 | 849 | 850 | 851 | 852 | 854 | 855 |
| D | 856 | 857 | 858 | 859 | 860 | 861 | 863 | 866 | 867 | 868 | 869 | 870 | 871 | 872 | 873 | 874 | 875 |
| E | 876 | 877 | 878 | 879 | 880 | 881 | 882 | 886 | 887 | 888 | 889 | 890 | 891 | 892 | 893 | 894 | 895 |
| F | 896 | 897 | 898 | 899 | 900 | 904 | 906 | 907 | 908 | 909 | 910 | 911 | 912 | 913 | 914 | 915 | 916 |
| G | 917 | 918 | 919 | 920 | 930 | 934 | 936 | 937 | 939 | 940 | 946 | 951 | 956 | 957 | 959 | 960 | 970 |
| H | 971 | 975 | 976 | 977 | 978 | 979 | 980 | 991 | 994 | 995 | 996 | 997 | 998 | 999 | 1000 | 1006 | 1011 |
| I | 1015 | 1016 | 1018 | 1019 | 1020 | 1034 | 1036 | 1037 | 1038 | 1039 | 1040 | 1049 | 1050 | 1053 | 1054 | 1056 | 1057 |
| J | 1058 | 1059 | 1060 | 1075 | 1076 | 1078 | 1079 | 1080 | 1090 | 1095 | 1096 | 1098 | 1099 | 1100 | 1104 | 1106 | 1107 |
| K | 1108 | 1109 | 1110 | 1111 | 1113 | 1114 | 1115 | 1116 | 1117 | 1118 | 1119 | 1120 | 1122 | 1126 | 1127 | 1128 | 1129 |
| L | 1130 | 1131 | 1133 | 1134 | 1135 | 1136 | 1137 | 1138 | 1139 | 1140 | 1143 | 1146 | 1147 | 1149 | 1150 | 1151 | 1153 |
| M | 1154 | 1155 | 1156 | 1158 | 1159 | 1160 | 1166 | | | | | | | | | | |

| Branched polymer | Component linear polymer (50 mg) | Branching agent | Quantity of branching agent (mg) | End cap (25 mg) |
|---|---|---|---|---|
| 501 | 95 | Tris(2-aminoethyl)amine | 0.486 | 1-(3-aminopropyl)-4-methylpiperazine |
| 502 | 29 | Tris(2-aminoethyl)amine | 0.54 | 1-(3-aminopropyl)-4-methylpiperazine |
| 503 | 95 | Tris(2-aminoethyl)amine | 0.567 | 1-(3-aminopropyl)-4-methylpiperazine |
| 504 | 29 | Tris(2-aminoethyl)amine | 0.631 | 1-(3-aminopropyl)-4-methylpiperazine |
| 505 | 95 | Tris(2-aminoethyl)amine | 0.682 | 1-(3-aminopropyl)-4-methylpiperazine |
| 506 | 29 | Tris(2-aminoethyl)amine | 0.758 | 1-(3-aminopropyl)-4-methylpiperazine |
| 507 | 95 | Tris(2-aminoethyl)amine | 0.855 | 1-(3-aminopropyl)-4-methylpiperazine |
| 508 | 29 | Tris(2-aminoethyl)amine | 0.95 | 1-(3-aminopropyl)-4-methylpiperazine |
| 509 | 198 | Tris(2-aminoethyl)amine | 0.983 | 1-(3-aminopropyl)-4-methylpiperazine |
| 510 | 13 | Tris(2-aminoethyl)amine | 1 | 1-(3-aminopropyl)-4-methylpiperazine |
| 511 | 95 | Tris(2-aminoethyl)amine | 1.144 | 1-(3-aminopropyl)-4-methylpiperazine |
| 512 | 198 | Tris(2-aminoethyl)amine | 1.148 | 1-(3-aminopropyl)-4-methylpiperazine |
| 513 | 13 | Tris(2-aminoethyl)amine | 1.168 | 1-(3-aminopropyl)-4-methylpiperazine |
| 515 | 198 | Tris(2-aminoethyl)amine | 1.38 | 1-(3-aminopropyl)-4-methylpiperazine |
| 516 | 13 | Tris(2-aminoethyl)amine | 1.403 | 1-(3-aminopropyl)-4-methylpiperazine |
| 517 | 198 | Tris(2-aminoethyl)amine | 1.729 | 1-(3-aminopropyl)-4-methylpiperazine |
| 518 | 13 | Tris(2-aminoethyl)amine | 1.758 | 1-(3-aminopropyl)-4-methylpiperazine |
| 519 | 198 | Tris(2-aminoethyl)amine | 2.315 | 1-(3-aminopropyl)-4-methylpiperazine |
| 520 | 13 | Tris(2-aminoethyl)amine | 2.354 | 1-(3-aminopropyl)-4-methylpiperazine |
| 521 | 95 | N-methylethylenediamine | 0.493 | 1-(3-aminopropyl)-4-methylpiperazine |
| 522 | 29 | N-methylethylenediamine | 0.548 | 1-(3-aminopropyl)-4-methylpiperazine |
| 523 | 95 | N-methylethylenediamine | 0.575 | 1-(3-aminopropyl)-4-methylpiperazine |
| 524 | 29 | N-methylethylenediamine | 0.64 | 1-(3-aminopropyl)-4-methylpiperazine |
| 525 | 95 | N-methylethylenediamine | 0.692 | 1-(3-aminopropyl)-4-methylpiperazine |
| 526 | 29 | N-methylethylenediamine | 0.769 | 1-(3-aminopropyl)-4-methylpiperazine |
| 527 | 95 | N-methylethylenediamine | 0.866 | 1-(3-aminopropyl)-4-methylpiperazine |
| 528 | 29 | N-methylethylenediamine | 0.963 | 1-(3-aminopropyl)-4-methylpiperazine |
| 529 | 198 | N-methylethylenediamine | 0.997 | 1-(3-aminopropyl)-4-methylpiperazine |
| 530 | 13 | N-methylethylenediamine | 1.014 | 1-(3-aminopropyl)-4-methylpiperazine |
| 531 | 95 | N-methylethylenediamine | 1.16 | 1-(3-aminopropyl)-4-methylpiperazine |
| 532 | 198 | N-methylethylenediamine | 1.164 | 1-(3-aminopropyl)-4-methylpiperazine |
| 533 | 13 | N-methylethylenediamine | 1.184 | 1-(3-aminopropyl)-4-methylpiperazine |
| 534 | 29 | N-methylethylenediamine | 1.29 | 1-(3-aminopropyl)-4-methylpiperazine |
| 535 | 198 | N-methylethylenediamine | 1.399 | 1-(3-aminopropyl)-4-methylpiperazine |
| 536 | 13 | N-methylethylenediamine | 1.423 | 1-(3-aminopropyl)-4-methylpiperazine |
| 537 | 198 | N-methylethylenediamine | 1.753 | 1-(3-aminopropyl)-4-methylpiperazine |
| 538 | 13 | N-methylethylenediamine | 1.783 | 1-(3-aminopropyl)-4-methylpiperazine |
| 539 | 198 | N-methylethylenediamine | 2.347 | 1-(3-aminopropyl)-4-methylpiperazine |
| 540 | 13 | N-methylethylenediamine | 2.387 | 1-(3-aminopropyl)-4-methylpiperazine |

FIG. 21A

| | | | |
|---|---|---|---|
| 541 | 95 | 2,2'-(Ethylenedioxy)bis(ethylamine) | 0.739 | 1-(3-aminopropyl)-4-methylpiperazine |
| 542 | 29 | 2,2'-(Ethylenedioxy)bis(ethylamine) | 0.821 | 1-(3-aminopropyl)-4-methylpiperazine |
| 543 | 95 | 2,2'-(Ethylenedioxy)bis(ethylamine) | 0.863 | 1-(3-aminopropyl)-4-methylpiperazine |
| 544 | 29 | 2,2'-(Ethylenedioxy)bis(ethylamine) | 0.959 | 1-(3-aminopropyl)-4-methylpiperazine |
| 545 | 95 | 2,2'-(Ethylenedioxy)bis(ethylamine) | 1.037 | 1-(3-aminopropyl)-4-methylpiperazine |
| 546 | 29 | 2,2'-(Ethylenedioxy)bis(ethylamine) | 1.153 | 1-(3-aminopropyl)-4-methylpiperazine |
| 547 | 95 | 2,2'-(Ethylenedioxy)bis(ethylamine) | 1.299 | 1-(3-aminopropyl)-4-methylpiperazine |
| 548 | 29 | 2,2'-(Ethylenedioxy)bis(ethylamine) | 1.445 | 1-(3-aminopropyl)-4-methylpiperazine |
| 549 | 198 | 2,2'-(Ethylenedioxy)bis(ethylamine) | 1.495 | 1-(3-aminopropyl)-4-methylpiperazine |
| 550 | 13 | 2,2'-(Ethylenedioxy)bis(ethylamine) | 1.52 | 1-(3-aminopropyl)-4-methylpiperazine |
| 551 | 95 | 2,2'-(Ethylenedioxy)bis(ethylamine) | 1.74 | 1-(3-aminopropyl)-4-methylpiperazine |
| 552 | 198 | 2,2'-(Ethylenedioxy)bis(ethylamine) | 1.746 | 1-(3-aminopropyl)-4-methylpiperazine |
| 553 | 13 | 2,2'-(Ethylenedioxy)bis(ethylamine) | 1.775 | 1-(3-aminopropyl)-4-methylpiperazine |
| 554 | 29 | 2,2'-(Ethylenedioxy)bis(ethylamine) | 1.934 | 1-(3-aminopropyl)-4-methylpiperazine |
| 555 | 198 | 2,2'-(Ethylenedioxy)bis(ethylamine) | 2.098 | 1-(3-aminopropyl)-4-methylpiperazine |
| 556 | 13 | 2,2'-(Ethylenedioxy)bis(ethylamine) | 2.134 | 1-(3-aminopropyl)-4-methylpiperazine |
| 557 | 198 | 2,2'-(Ethylenedioxy)bis(ethylamine) | 2.629 | 1-(3-aminopropyl)-4-methylpiperazine |
| 558 | 13 | 2,2'-(Ethylenedioxy)bis(ethylamine) | 2.674 | 1-(3-aminopropyl)-4-methylpiperazine |
| 559 | 198 | 2,2'-(Ethylenedioxy)bis(ethylamine) | 3.52 | 1-(3-aminopropyl)-4-methylpiperazine |
| 560 | 13 | 2,2'-(Ethylenedioxy)bis(ethylamine) | 3.579 | 1-(3-aminopropyl)-4-methylpiperazine |
| 561 | 95 | Cysteamine | 0.513 | 1-(3-aminopropyl)-4-methylpiperazine |
| 562 | 29 | Cysteamine | 0.57 | 1-(3-aminopropyl)-4-methylpiperazine |
| 563 | 95 | Cysteamine | 0.599 | 1-(3-aminopropyl)-4-methylpiperazine |
| 564 | 29 | Cysteamine | 0.666 | 1-(3-aminopropyl)-4-methylpiperazine |
| 565 | 95 | Cysteamine | 0.72 | 1-(3-aminopropyl)-4-methylpiperazine |
| 566 | 29 | Cysteamine | 0.8 | 1-(3-aminopropyl)-4-methylpiperazine |
| 567 | 95 | Cysteamine | 0.902 | 1-(3-aminopropyl)-4-methylpiperazine |
| 568 | 29 | Cysteamine | 1.003 | 1-(3-aminopropyl)-4-methylpiperazine |
| 569 | 198 | Cysteamine | 1.038 | 1-(3-aminopropyl)-4-methylpiperazine |
| 570 | 13 | Cysteamine | 1.055 | 1-(3-aminopropyl)-4-methylpiperazine |
| 571 | 95 | Cysteamine | 1.207 | 1-(3-aminopropyl)-4-methylpiperazine |
| 572 | 198 | Cysteamine | 1.212 | 1-(3-aminopropyl)-4-methylpiperazine |
| 573 | 13 | Cysteamine | 1.232 | 1-(3-aminopropyl)-4-methylpiperazine |
| 574 | 29 | Cysteamine | 1.342 | 1-(3-aminopropyl)-4-methylpiperazine |
| 575 | 198 | Cysteamine | 1.457 | 1-(3-aminopropyl)-4-methylpiperazine |
| 576 | 13 | Cysteamine | 1.481 | 1-(3-aminopropyl)-4-methylpiperazine |
| 577 | 198 | Cysteamine | 1.825 | 1-(3-aminopropyl)-4-methylpiperazine |
| 578 | 13 | Cysteamine | 1.856 | 1-(3-aminopropyl)-4-methylpiperazine |
| 579 | 198 | Cysteamine | 2.443 | 1-(3-aminopropyl)-4-methylpiperazine |
| 580 | 13 | Cysteamine | 2.484 | 1-(3-aminopropyl)-4-methylpiperazine |

FIG. 21B

| Branched hybrid polymer | Linear polymer 1 | Linear polymer 2 | Quantity of linear polymer 1 (mg) | Quantity of linear polymer 2 (mg) | Branching agent | Quantity of branching agent (mg) | End cap (25 mg) |
|---|---|---|---|---|---|---|---|
| 801 | 198 | 13 | 30 | 50 | Tris(2-aminoethyl)amine | 3.74 | 1-(3-aminopropyl)-4-methylpiperazine |
| 802 | 198 | 13 | 30 | 50 | Tris(2-aminoethyl)amine | 2.8 | 1-(3-aminopropyl)-4-methylpiperazine |
| 803 | 198 | 13 | 30 | 50 | Tris(2-aminoethyl)amine | 2.23 | 1-(3-aminopropyl)-4-methylpiperazine |
| 804 | 198 | 13 | 30 | 50 | Tris(2-aminoethyl)amine | 1.86 | 1-(3-aminopropyl)-4-methylpiperazine |
| 805 | 198 | 13 | 30 | 50 | Tris(2-aminoethyl)amine | 1.59 | 1-(3-aminopropyl)-4-methylpiperazine |
| 806 | 198 | 13 | 30 | 50 | Cysteamine | 3.95 | 1-(3-aminopropyl)-4-methylpiperazine |
| 807 | 198 | 13 | 30 | 50 | Cysteamine | 2.95 | 1-(3-aminopropyl)-4-methylpiperazine |
| 808 | 198 | 13 | 30 | 50 | Cysteamine | 2.35 | 1-(3-aminopropyl)-4-methylpiperazine |
| 809 | 198 | 13 | 30 | 50 | Cysteamine | 1.96 | 1-(3-aminopropyl)-4-methylpiperazine |
| 810 | 198 | 13 | 30 | 50 | Cysteamine | 1.68 | 1-(3-aminopropyl)-4-methylpiperazine |
| 811 | 198 | 13 | 30 | 50 | 2,2'-(Ethylenedioxy)bis(ethylamine) | 5.69 | 1-(3-aminopropyl)-4-methylpiperazine |
| 814 | 198 | 13 | 30 | 50 | 2,2'-(Ethylenedioxy)bis(ethylamine) | 2.82 | 1-(3-aminopropyl)-4-methylpiperazine |
| 815 | 198 | 13 | 30 | 50 | 2,2'-(Ethylenedioxy)bis(ethylamine) | 2.42 | 1-(3-aminopropyl)-4-methylpiperazine |
| 816 | 198 | 13 | 30 | 50 | N-methylethylenediamine | 3.8 | 1-(3-aminopropyl)-4-methylpiperazine |
| 817 | 198 | 13 | 30 | 50 | N-methylethylenediamine | 2.83 | 1-(3-aminopropyl)-4-methylpiperazine |
| 818 | 198 | 13 | 30 | 50 | N-methylethylenediamine | 2.26 | 1-(3-aminopropyl)-4-methylpiperazine |
| 819 | 198 | 13 | 30 | 50 | N-methylethylenediamine | 1.88 | 1-(3-aminopropyl)-4-methylpiperazine |
| 820 | 198 | 13 | 30 | 50 | N-methylethylenediamine | 1.61 | 1-(3-aminopropyl)-4-methylpiperazine |
| 821 | 198 | 13 | 30 | 40 | Tris(2-aminoethyl)amine | 3.74 | 1-(3-aminopropyl)-4-methylpiperazine |
| 822 | 198 | 13 | 40 | 40 | Tris(2-aminoethyl)amine | 2.79 | 1-(3-aminopropyl)-4-methylpiperazine |
| 823 | 198 | 13 | 40 | 40 | Tris(2-aminoethyl)amine | 2.23 | 1-(3-aminopropyl)-4-methylpiperazine |
| 824 | 198 | 13 | 40 | 40 | Tris(2-aminoethyl)amine | 1.85 | 1-(3-aminopropyl)-4-methylpiperazine |
| 825 | 198 | 13 | 40 | 40 | Tris(2-aminoethyl)amine | 1.59 | 1-(3-aminopropyl)-4-methylpiperazine |
| 826 | 198 | 13 | 40 | 40 | Cysteamine | 3.94 | 1-(3-aminopropyl)-4-methylpiperazine |
| 827 | 198 | 13 | 40 | 40 | Cysteamine | 2.94 | 1-(3-aminopropyl)-4-methylpiperazine |
| 828 | 198 | 13 | 40 | 40 | Cysteamine | 2.35 | 1-(3-aminopropyl)-4-methylpiperazine |
| 829 | 198 | 13 | 40 | 40 | Cysteamine | 1.96 | 1-(3-aminopropyl)-4-methylpiperazine |
| 830 | 198 | 13 | 40 | 40 | Cysteamine | 1.67 | 1-(3-aminopropyl)-4-methylpiperazine |
| 831 | 198 | 13 | 40 | 40 | 2,2'-(Ethylenedioxy)bis(ethylamine) | 5.68 | 1-(3-aminopropyl)-4-methylpiperazine |

FIG. 22A

| | | | | | |
|---|---|---|---|---|---|
| 832 | 198 | 13 | 40 | 2,2'-(Ethylenedioxy)bis(ethylamine) | 4.24 | 1-(3-aminopropyl)-4-methylpiperazine |
| 834 | 198 | 13 | 40 | 2,2'-(Ethylenedioxy)bis(ethylamine) | 2.82 | 1-(3-aminopropyl)-4-methylpiperazine |
| 835 | 198 | 13 | 40 | 2,2'-(Ethylenedioxy)bis(ethylamine) | 2.41 | 1-(3-aminopropyl)-4-methylpiperazine |
| 836 | 198 | 13 | 40 | N-methylethylenediamine | 3.79 | 1-(3-aminopropyl)-4-methylpiperazine |
| 837 | 198 | 13 | 40 | N-methylethylenediamine | 2.83 | 1-(3-aminopropyl)-4-methylpiperazine |
| 838 | 198 | 13 | 40 | N-methylethylenediamine | 2.26 | 1-(3-aminopropyl)-4-methylpiperazine |
| 839 | 198 | 13 | 40 | N-methylethylenediamine | 1.88 | 1-(3-aminopropyl)-4-methylpiperazine |
| 840 | 198 | 13 | 40 | N-methylethylenediamine | 1.61 | 1-(3-aminopropyl)-4-methylpiperazine |
| 841 | 198 | 13 | 30 | Tris(2-aminoethyl)amine | 3.73 | 1-(3-aminopropyl)-4-methylpiperazine |
| 842 | 198 | 13 | 30 | Tris(2-aminoethyl)amine | 2.78 | 1-(3-aminopropyl)-4-methylpiperazine |
| 843 | 198 | 13 | 30 | Tris(2-aminoethyl)amine | 2.22 | 1-(3-aminopropyl)-4-methylpiperazine |
| 844 | 198 | 13 | 30 | Tris(2-aminoethyl)amine | 1.85 | 1-(3-aminopropyl)-4-methylpiperazine |
| 845 | 198 | 13 | 30 | Tris(2-aminoethyl)amine | 1.58 | 1-(3-aminopropyl)-4-methylpiperazine |
| 846 | 198 | 13 | 30 | Cysteamine | 3.93 | 1-(3-aminopropyl)-4-methylpiperazine |
| 847 | 198 | 13 | 30 | Cysteamine | 2.94 | 1-(3-aminopropyl)-4-methylpiperazine |
| 848 | 198 | 13 | 30 | Cysteamine | 2.35 | 1-(3-aminopropyl)-4-methylpiperazine |
| 849 | 198 | 13 | 30 | Cysteamine | 1.95 | 1-(3-aminopropyl)-4-methylpiperazine |
| 850 | 198 | 13 | 30 | Cysteamine | 1.67 | 1-(3-aminopropyl)-4-methylpiperazine |
| 851 | 198 | 13 | 30 | 2,2'-(Ethylenedioxy)bis(ethylamine) | 5.67 | 1-(3-aminopropyl)-4-methylpiperazine |
| 852 | 198 | 13 | 30 | 2,2'-(Ethylenedioxy)bis(ethylamine) | 4.23 | 1-(3-aminopropyl)-4-methylpiperazine |
| 854 | 198 | 13 | 30 | 2,2'-(Ethylenedioxy)bis(ethylamine) | 2.81 | 1-(3-aminopropyl)-4-methylpiperazine |
| 855 | 198 | 13 | 30 | 2,2'-(Ethylenedioxy)bis(ethylamine) | 2.41 | 1-(3-aminopropyl)-4-methylpiperazine |
| 856 | 198 | 13 | 50 | N-methylethylenediamine | 3.78 | 1-(3-aminopropyl)-4-methylpiperazine |
| 857 | 198 | 13 | 50 | N-methylethylenediamine | 2.82 | 1-(3-aminopropyl)-4-methylpiperazine |
| 858 | 198 | 13 | 50 | N-methylethylenediamine | 2.25 | 1-(3-aminopropyl)-4-methylpiperazine |
| 859 | 198 | 13 | 50 | N-methylethylenediamine | 1.87 | 1-(3-aminopropyl)-4-methylpiperazine |
| 860 | 198 | 13 | 50 | N-methylethylenediamine | 1.6 | 1-(3-aminopropyl)-4-methylpiperazine |
| 861 | 13 | 95 | 30 | Tris(2-aminoethyl)amine | 2.44 | 1-(3-aminopropyl)-4-methylpiperazine |
| 863 | 13 | 95 | 30 | Tris(2-aminoethyl)amine | 1.47 | 1-(3-aminopropyl)-4-methylpiperazine |
| 866 | 13 | 95 | 30 | Cysteamine | 2.57 | 1-(3-aminopropyl)-4-methylpiperazine |

FIG. 22B

| ID | | | | | | |
|---|---|---|---|---|---|---|
| 867 | 13 | 95 | 30 | Cysteamine | 1.92 | 1-(3-aminopropyl)-4-methylpiperazine |
| 868 | 13 | 95 | 30 | Cysteamine | 1.55 | 1-(3-aminopropyl)-4-methylpiperazine |
| 869 | 13 | 95 | 30 | Cysteamine | 1.29 | 1-(3-aminopropyl)-4-methylpiperazine |
| 870 | 13 | 95 | 30 | Cysteamine | 1.1 | 1-(3-aminopropyl)-4-methylpiperazine |
| 871 | 13 | 95 | 30 | 2,2'-(Ethylenedioxy)bis(ethylamine) | 3.71 | 1-(3-aminopropyl)-4-methylpiperazine |
| 872 | 13 | 95 | 30 | 2,2'-(Ethylenedioxy)bis(ethylamine) | 2.77 | 1-(3-aminopropyl)-4-methylpiperazine |
| 873 | 13 | 95 | 30 | 2,2'-(Ethylenedioxy)bis(ethylamine) | 2.23 | 1-(3-aminopropyl)-4-methylpiperazine |
| 874 | 13 | 95 | 30 | 2,2'-(Ethylenedioxy)bis(ethylamine) | 1.85 | 1-(3-aminopropyl)-4-methylpiperazine |
| 875 | 13 | 95 | 30 | 2,2'-(Ethylenedioxy)bis(ethylamine) | 1.59 | 1-(3-aminopropyl)-4-methylpiperazine |
| 876 | 13 | 95 | 30 | N-methylethylenediamine | 2.47 | 1-(3-aminopropyl)-4-methylpiperazine |
| 877 | 13 | 95 | 30 | N-methylethylenediamine | 1.85 | 1-(3-aminopropyl)-4-methylpiperazine |
| 878 | 13 | 95 | 30 | N-methylethylenediamine | 1.49 | 1-(3-aminopropyl)-4-methylpiperazine |
| 879 | 13 | 95 | 30 | N-methylethylenediamine | 1.24 | 1-(3-aminopropyl)-4-methylpiperazine |
| 880 | 13 | 95 | 30 | N-methylethylenediamine | 1.06 | 1-(3-aminopropyl)-4-methylpiperazine |
| 881 | 13 | 95 | 40 | Tris(2-aminoethyl)amine | 2.71 | 1-(3-aminopropyl)-4-methylpiperazine |
| 882 | 13 | 95 | 40 | Tris(2-aminoethyl)amine | 2.02 | 1-(3-aminopropyl)-4-methylpiperazine |
| 886 | 13 | 95 | 40 | Cysteamine | 2.86 | 1-(3-aminopropyl)-4-methylpiperazine |
| 887 | 13 | 95 | 40 | Cysteamine | 2.13 | 1-(3-aminopropyl)-4-methylpiperazine |
| 888 | 13 | 95 | 40 | Cysteamine | 1.71 | 1-(3-aminopropyl)-4-methylpiperazine |
| 889 | 13 | 95 | 40 | Cysteamine | 1.42 | 1-(3-aminopropyl)-4-methylpiperazine |
| 890 | 13 | 95 | 40 | Cysteamine | 1.22 | 1-(3-aminopropyl)-4-methylpiperazine |
| 891 | 13 | 95 | 40 | 2,2'-(Ethylenedioxy)bis(ethylamine) | 4.12 | 1-(3-aminopropyl)-4-methylpiperazine |
| 892 | 13 | 95 | 40 | 2,2'-(Ethylenedioxy)bis(ethylamine) | 3.07 | 1-(3-aminopropyl)-4-methylpiperazine |
| 893 | 13 | 95 | 40 | 2,2'-(Ethylenedioxy)bis(ethylamine) | 2.47 | 1-(3-aminopropyl)-4-methylpiperazine |
| 894 | 13 | 95 | 40 | 2,2'-(Ethylenedioxy)bis(ethylamine) | 2.04 | 1-(3-aminopropyl)-4-methylpiperazine |
| 895 | 13 | 95 | 40 | 2,2'-(Ethylenedioxy)bis(ethylamine) | 1.76 | 1-(3-aminopropyl)-4-methylpiperazine |
| 896 | 13 | 95 | 40 | N-methylethylenediamine | 2.75 | 1-(3-aminopropyl)-4-methylpiperazine |
| 897 | 13 | 95 | 40 | N-methylethylenediamine | 2.05 | 1-(3-aminopropyl)-4-methylpiperazine |
| 898 | 13 | 95 | 40 | N-methylethylenediamine | 1.64 | 1-(3-aminopropyl)-4-methylpiperazine |
| 899 | 13 | 95 | 40 | N-methylethylenediamine | 1.36 | 1-(3-aminopropyl)-4-methylpiperazine |

FIG. 22C

| | | | | | |
|---|---|---|---|---|---|
| 900 | 13 | 95 | 40 | N-methylethylenediamine | 1.17 | 1-(3-aminopropyl)-4-methylpiperazine |
| 904 | 13 | 95 | 50 | 30 | Tris(2-aminoethyl)amine | 1.48 | 1-(3-aminopropyl)-4-methylpiperazine |
| 906 | 13 | 95 | 50 | 30 | Cysteamine | 3.11 | 1-(3-aminopropyl)-4-methylpiperazine |
| 907 | 13 | 95 | 50 | 30 | Cysteamine | 2.34 | 1-(3-aminopropyl)-4-methylpiperazine |
| 908 | 13 | 95 | 50 | 30 | Cysteamine | 1.88 | 1-(3-aminopropyl)-4-methylpiperazine |
| 909 | 13 | 95 | 50 | 30 | Cysteamine | 1.57 | 1-(3-aminopropyl)-4-methylpiperazine |
| 910 | 13 | 95 | 50 | 30 | Cysteamine | 1.34 | 1-(3-aminopropyl)-4-methylpiperazine |
| 911 | 13 | 95 | 50 | 30 | 2,2'-(Ethylenedioxy)bis(ethylamine) | 4.48 | 1-(3-aminopropyl)-4-methylpiperazine |
| 912 | 13 | 95 | 50 | 30 | 2,2'-(Ethylenedioxy)bis(ethylamine) | 3.37 | 1-(3-aminopropyl)-4-methylpiperazine |
| 913 | 13 | 95 | 50 | 30 | 2,2'-(Ethylenedioxy)bis(ethylamine) | 2.7 | 1-(3-aminopropyl)-4-methylpiperazine |
| 914 | 13 | 95 | 50 | 30 | 2,2'-(Ethylenedioxy)bis(ethylamine) | 2.26 | 1-(3-aminopropyl)-4-methylpiperazine |
| 915 | 13 | 95 | 50 | 30 | 2,2'-(Ethylenedioxy)bis(ethylamine) | 1.92 | 1-(3-aminopropyl)-4-methylpiperazine |
| 916 | 13 | 95 | 50 | 30 | N-methylethylenediamine | 2.99 | 1-(3-aminopropyl)-4-methylpiperazine |
| 917 | 13 | 95 | 50 | 30 | N-methylethylenediamine | 2.25 | 1-(3-aminopropyl)-4-methylpiperazine |
| 918 | 13 | 95 | 50 | 30 | N-methylethylenediamine | 1.8 | 1-(3-aminopropyl)-4-methylpiperazine |
| 919 | 13 | 95 | 50 | 30 | N-methylethylenediamine | 1.5 | 1-(3-aminopropyl)-4-methylpiperazine |
| 920 | 13 | 95 | 50 | 30 | N-methylethylenediamine | 1.28 | 1-(3-aminopropyl)-4-methylpiperazine |
| 930 | 13 | 29 | 30 | 50 | Cysteamine | 1.16 | 1-(3-aminopropyl)-4-methylpiperazine |
| 934 | 13 | 29 | 30 | 50 | 2,2'-(Ethylenedioxy)bis(ethylamine) | 1.95 | 1-(3-aminopropyl)-4-methylpiperazine |
| 936 | 13 | 29 | 30 | 50 | N-methylethylenediamine | 2.6 | 1-(3-aminopropyl)-4-methylpiperazine |
| 937 | 13 | 29 | 30 | 50 | N-methylethylenediamine | 1.94 | 1-(3-aminopropyl)-4-methylpiperazine |
| 939 | 13 | 29 | 30 | 50 | N-methylethylenediamine | 1.3 | 1-(3-aminopropyl)-4-methylpiperazine |
| 940 | 13 | 29 | 30 | 50 | N-methylethylenediamine | 1.11 | 1-(3-aminopropyl)-4-methylpiperazine |
| 946 | 13 | 29 | 40 | 40 | Cysteamine | 2.97 | 1-(3-aminopropyl)-4-methylpiperazine |
| 951 | 13 | 29 | 40 | 40 | 2,2'-(Ethylenedioxy)bis(ethylamine) | 4.27 | 1-(3-aminopropyl)-4-methylpiperazine |
| 956 | 13 | 29 | 40 | 40 | N-methylethylenediamine | 2.85 | 1-(3-aminopropyl)-4-methylpiperazine |
| 957 | 13 | 29 | 40 | 40 | N-methylethylenediamine | 2.12 | 1-(3-aminopropyl)-4-methylpiperazine |
| 959 | 13 | 29 | 40 | 40 | N-methylethylenediamine | 1.41 | 1-(3-aminopropyl)-4-methylpiperazine |
| 960 | 13 | 29 | 40 | 40 | N-methylethylenediamine | 1.22 | 1-(3-aminopropyl)-4-methylpiperazine |
| 970 | 13 | 29 | 50 | 30 | Cysteamine | 1.37 | 1-(3-aminopropyl)-4-methylpiperazine |

FIG. 22D

| | | | | | |
|---|---|---|---|---|---|
| 971 | 13 | 29 | 50 | 30 | 2,2'-(Ethylenedioxy)bis(ethylamine) | 4.59 | 1-(3-aminopropyl)-4-methylpiperazine |
| 975 | 13 | 29 | 50 | 30 | Cysteamine | 1.37 | 1-(3-aminopropyl)-4-methylpiperazine |
| 976 | 13 | 29 | 50 | 30 | N-methylethylenediamine | 3.06 | 1-(3-aminopropyl)-4-methylpiperazine |
| 977 | 13 | 29 | 50 | 30 | N-methylethylenediamine | 2.31 | 1-(3-aminopropyl)-4-methylpiperazine |
| 978 | 13 | 29 | 50 | 30 | N-methylethylenediamine | 1.85 | 1-(3-aminopropyl)-4-methylpiperazine |
| 979 | 13 | 29 | 50 | 30 | N-methylethylenediamine | 1.53 | 1-(3-aminopropyl)-4-methylpiperazine |
| 980 | 13 | 29 | 50 | 30 | N-methylethylenediamine | 1.32 | 1-(3-aminopropyl)-4-methylpiperazine |
| 991 | 29 | 198 | 30 | 50 | 2,2'-(Ethylenedioxy)bis(ethylamine) | 4.53 | 1-(3-aminopropyl)-4-methylpiperazine |
| 994 | 29 | 198 | 30 | 50 | 2,2'-(Ethylenedioxy)bis(ethylamine) | 2.27 | 1-(3-aminopropyl)-4-methylpiperazine |
| 995 | 29 | 198 | 30 | 50 | 2,2'-(Ethylenedioxy)bis(ethylamine) | 1.95 | 1-(3-aminopropyl)-4-methylpiperazine |
| 996 | 29 | 198 | 30 | 50 | N-methylethylenediamine | 3.02 | 1-(3-aminopropyl)-4-methylpiperazine |
| 997 | 29 | 198 | 30 | 50 | N-methylethylenediamine | 2.28 | 1-(3-aminopropyl)-4-methylpiperazine |
| 998 | 29 | 198 | 30 | 50 | N-methylethylenediamine | 1.83 | 1-(3-aminopropyl)-4-methylpiperazine |
| 999 | 29 | 198 | 30 | 50 | N-methylethylenediamine | 1.51 | 1-(3-aminopropyl)-4-methylpiperazine |
| 1000 | 29 | 198 | 30 | 50 | N-methylethylenediamine | 1.3 | 1-(3-aminopropyl)-4-methylpiperazine |
| 1006 | 29 | 198 | 40 | 40 | Cysteamine | 2.93 | 1-(3-aminopropyl)-4-methylpiperazine |
| 1011 | 29 | 198 | 40 | 40 | 2,2'-(Ethylenedioxy)bis(ethylamine) | 4.23 | 1-(3-aminopropyl)-4-methylpiperazine |
| 1015 | 29 | 198 | 40 | 40 | 2,2'-(Ethylenedioxy)bis(ethylamine) | 1.8 | 1-(3-aminopropyl)-4-methylpiperazine |
| 1016 | 29 | 198 | 40 | 40 | N-methylethylenediamine | 2.82 | 1-(3-aminopropyl)-4-methylpiperazine |
| 1018 | 29 | 198 | 40 | 40 | N-methylethylenediamine | 1.69 | 1-(3-aminopropyl)-4-methylpiperazine |
| 1019 | 29 | 198 | 40 | 40 | N-methylethylenediamine | 1.4 | 1-(3-aminopropyl)-4-methylpiperazine |
| 1020 | 29 | 198 | 40 | 40 | N-methylethylenediamine | 1.2 | 1-(3-aminopropyl)-4-methylpiperazine |
| 1034 | 29 | 198 | 50 | 30 | 2,2'-(Ethylenedioxy)bis(ethylamine) | 1.93 | 1-(3-aminopropyl)-4-methylpiperazine |
| 1036 | 29 | 198 | 50 | 30 | N-methylethylenediamine | 2.57 | 1-(3-aminopropyl)-4-methylpiperazine |
| 1037 | 29 | 198 | 50 | 30 | N-methylethylenediamine | 1.92 | 1-(3-aminopropyl)-4-methylpiperazine |
| 1038 | 29 | 198 | 50 | 30 | N-methylethylenediamine | 1.53 | 1-(3-aminopropyl)-4-methylpiperazine |
| 1039 | 29 | 198 | 50 | 30 | N-methylethylenediamine | 1.29 | 1-(3-aminopropyl)-4-methylpiperazine |
| 1040 | 29 | 198 | 50 | 30 | N-methylethylenediamine | 1.1 | 1-(3-aminopropyl)-4-methylpiperazine |
| 1049 | 29 | 95 | 30 | 50 | Cysteamine | 0.92 | 1-(3-aminopropyl)-4-methylpiperazine |
| 1050 | 29 | 95 | 30 | 50 | Cysteamine | 0.78 | 1-(3-aminopropyl)-4-methylpiperazine |

FIG. 22E

| ID | | | | | | | |
|---|---|---|---|---|---|---|---|
| 1053 | 29 | 95 | 30 | 50 | 2,2'-(Ethylenedioxy)bis(ethylamine) | 1.58 | 1-(3-aminopropyl)-4-methylpiperazine |
| 1054 | 29 | 95 | 30 | 50 | 2,2'-(Ethylenedioxy)bis(ethylamine) | 1.32 | 1-(3-aminopropyl)-4-methylpiperazine |
| 1056 | 29 | 95 | 30 | 50 | N-methylethylenediamine | 1.76 | 1-(3-aminopropyl)-4-methylpiperazine |
| 1057 | 29 | 95 | 30 | 50 | N-methylethylenediamine | 1.32 | 1-(3-aminopropyl)-4-methylpiperazine |
| 1058 | 29 | 95 | 30 | 50 | N-methylethylenediamine | 1.05 | 1-(3-aminopropyl)-4-methylpiperazine |
| 1059 | 29 | 95 | 30 | 50 | N-methylethylenediamine | 0.88 | 1-(3-aminopropyl)-4-methylpiperazine |
| 1060 | 29 | 95 | 30 | 50 | N-methylethylenediamine | 0.75 | 1-(3-aminopropyl)-4-methylpiperazine |
| 1075 | 29 | 95 | 40 | 40 | 2,2'-(Ethylenedioxy)bis(ethylamine) | 1.15 | 1-(3-aminopropyl)-4-methylpiperazine |
| 1076 | 29 | 95 | 40 | 40 | N-methylethylenediamine | 1.79 | 1-(3-aminopropyl)-4-methylpiperazine |
| 1078 | 29 | 95 | 40 | 40 | N-methylethylenediamine | 1.07 | 1-(3-aminopropyl)-4-methylpiperazine |
| 1079 | 29 | 95 | 40 | 40 | N-methylethylenediamine | 0.89 | 1-(3-aminopropyl)-4-methylpiperazine |
| 1080 | 29 | 95 | 40 | 40 | N-methylethylenediamine | 0.76 | 1-(3-aminopropyl)-4-methylpiperazine |
| 1090 | 29 | 95 | 50 | 30 | Cysteamine | 1.12 | 1-(3-aminopropyl)-4-methylpiperazine |
| 1095 | 29 | 95 | 50 | 30 | 2,2'-(Ethylenedioxy)bis(ethylamine) | 1.16 | 1-(3-aminopropyl)-4-methylpiperazine |
| 1096 | 29 | 95 | 50 | 30 | N-methylethylenediamine | 1.81 | 1-(3-aminopropyl)-4-methylpiperazine |
| 1098 | 29 | 95 | 50 | 30 | N-methylethylenediamine | 1.08 | 1-(3-aminopropyl)-4-methylpiperazine |
| 1099 | 29 | 95 | 50 | 30 | N-methylethylenediamine | 0.91 | 1-(3-aminopropyl)-4-methylpiperazine |
| 1100 | 29 | 95 | 50 | 30 | N-methylethylenediamine | 0.77 | 1-(3-aminopropyl)-4-methylpiperazine |
| 1104 | 198 | 95 | 30 | 50 | Tris(2-aminoethyl)amine | 1.21 | 1-(3-aminopropyl)-4-methylpiperazine |
| 1106 | 198 | 95 | 30 | 50 | Cysteamine | 2.55 | 1-(3-aminopropyl)-4-methylpiperazine |
| 1107 | 198 | 95 | 30 | 50 | Cysteamine | 1.91 | 1-(3-aminopropyl)-4-methylpiperazine |
| 1108 | 198 | 95 | 30 | 50 | Cysteamine | 1.53 | 1-(3-aminopropyl)-4-methylpiperazine |
| 1109 | 198 | 95 | 30 | 50 | Cysteamine | 1.27 | 1-(3-aminopropyl)-4-methylpiperazine |
| 1110 | 198 | 95 | 30 | 50 | Cysteamine | 1.09 | 1-(3-aminopropyl)-4-methylpiperazine |
| 1111 | 198 | 95 | 30 | 50 | 2,2'-(Ethylenedioxy)bis(ethylamine) | 3.67 | 1-(3-aminopropyl)-4-methylpiperazine |
| 1113 | 198 | 95 | 30 | 50 | 2,2'-(Ethylenedioxy)bis(ethylamine) | 2.21 | 1-(3-aminopropyl)-4-methylpiperazine |
| 1114 | 198 | 95 | 30 | 50 | 2,2'-(Ethylenedioxy)bis(ethylamine) | 1.84 | 1-(3-aminopropyl)-4-methylpiperazine |
| 1115 | 198 | 95 | 30 | 50 | 2,2'-(Ethylenedioxy)bis(ethylamine) | 1.57 | 1-(3-aminopropyl)-4-methylpiperazine |
| 1116 | 198 | 95 | 30 | 50 | N-methylethylenediamine | 2.45 | 1-(3-aminopropyl)-4-methylpiperazine |
| 1117 | 198 | 95 | 30 | 50 | N-methylethylenediamine | 1.83 | 1-(3-aminopropyl)-4-methylpiperazine |

FIG. 22F

| ID | C1 | C2 | C3 | C4 | Amine A | Value | Amine B |
|---|---|---|---|---|---|---|---|
| 1118 | 198 | 95 | 30 | 50 | N-methylethylenediamine | 1.47 | 1-(3-aminopropyl)-4-methylpiperazine |
| 1119 | 198 | 95 | 30 | 50 | N-methylethylenediamine | 1.22 | 1-(3-aminopropyl)-4-methylpiperazine |
| 1120 | 198 | 95 | 30 | 50 | N-methylethylenediamine | 1.05 | 1-(3-aminopropyl)-4-methylpiperazine |
| 1122 | 198 | 95 | 40 | 40 | Tris(2-aminoethyl)amine | 1.99 | 1-(3-aminopropyl)-4-methylpiperazine |
| 1126 | 198 | 95 | 40 | 40 | Cysteamine | 2.83 | 1-(3-aminopropyl)-4-methylpiperazine |
| 1127 | 198 | 95 | 40 | 40 | Cysteamine | 2.11 | 1-(3-aminopropyl)-4-methylpiperazine |
| 1128 | 198 | 95 | 40 | 40 | Cysteamine | 1.69 | 1-(3-aminopropyl)-4-methylpiperazine |
| 1129 | 198 | 95 | 40 | 40 | Cysteamine | 1.4 | 1-(3-aminopropyl)-4-methylpiperazine |
| 1130 | 198 | 95 | 40 | 40 | Cysteamine | 1.21 | 1-(3-aminopropyl)-4-methylpiperazine |
| 1131 | 198 | 95 | 40 | 40 | 2,2'-(Ethylenedioxy)bis(ethylamine) | 4.08 | 1-(3-aminopropyl)-4-methylpiperazine |
| 1133 | 198 | 95 | 40 | 40 | 2,2'-(Ethylenedioxy)bis(ethylamine) | 2.44 | 1-(3-aminopropyl)-4-methylpiperazine |
| 1134 | 198 | 95 | 40 | 40 | 2,2'-(Ethylenedioxy)bis(ethylamine) | 2.02 | 1-(3-aminopropyl)-4-methylpiperazine |
| 1135 | 198 | 95 | 40 | 40 | 2,2'-(Ethylenedioxy)bis(ethylamine) | 1.74 | 1-(3-aminopropyl)-4-methylpiperazine |
| 1136 | 198 | 95 | 40 | 40 | N-methylethylenediamine | 2.72 | 1-(3-aminopropyl)-4-methylpiperazine |
| 1137 | 198 | 95 | 40 | 40 | N-methylethylenediamine | 2.02 | 1-(3-aminopropyl)-4-methylpiperazine |
| 1138 | 198 | 95 | 40 | 40 | N-methylethylenediamine | 1.63 | 1-(3-aminopropyl)-4-methylpiperazine |
| 1139 | 198 | 95 | 40 | 40 | N-methylethylenediamine | 1.35 | 1-(3-aminopropyl)-4-methylpiperazine |
| 1140 | 198 | 95 | 40 | 40 | N-methylethylenediamine | 1.16 | 1-(3-aminopropyl)-4-methylpiperazine |
| 1143 | 198 | 95 | 50 | 30 | Tris(2-aminoethyl)amine | 1.76 | 1-(3-aminopropyl)-4-methylpiperazine |
| 1146 | 198 | 95 | 50 | 30 | Cysteamine | 3.07 | 1-(3-aminopropyl)-4-methylpiperazine |
| 1147 | 198 | 95 | 50 | 30 | Cysteamine | 2.31 | 1-(3-aminopropyl)-4-methylpiperazine |
| 1149 | 198 | 95 | 50 | 30 | Cysteamine | 1.55 | 1-(3-aminopropyl)-4-methylpiperazine |
| 1150 | 198 | 95 | 50 | 30 | Cysteamine | 1.32 | 1-(3-aminopropyl)-4-methylpiperazine |
| 1151 | 198 | 95 | 50 | 30 | 2,2'-(Ethylenedioxy)bis(ethylamine) | 4.42 | 1-(3-aminopropyl)-4-methylpiperazine |
| 1153 | 198 | 95 | 50 | 30 | 2,2'-(Ethylenedioxy)bis(ethylamine) | 2.67 | 1-(3-aminopropyl)-4-methylpiperazine |
| 1154 | 198 | 95 | 50 | 30 | 2,2'-(Ethylenedioxy)bis(ethylamine) | 2.23 | 1-(3-aminopropyl)-4-methylpiperazine |
| 1155 | 198 | 95 | 50 | 30 | 2,2'-(Ethylenedioxy)bis(ethylamine) | 1.9 | 1-(3-aminopropyl)-4-methylpiperazine |
| 1156 | 198 | 95 | 50 | 30 | N-methylethylenediamine | 2.95 | 1-(3-aminopropyl)-4-methylpiperazine |
| 1158 | 198 | 95 | 50 | 30 | N-methylethylenediamine | 1.78 | 1-(3-aminopropyl)-4-methylpiperazine |
| 1159 | 198 | 95 | 50 | 30 | N-methylethylenediamine | 1.49 | 1-(3-aminopropyl)-4-methylpiperazine |
| 1160 | 198 | 95 | 50 | 30 | N-methylethylenediamine | 1.27 | 1-(3-aminopropyl)-4-methylpiperazine |
| 1166 | 29 | 95 | 30 | 50 | 2,2'-(Ethylenedioxy)bis(ethylamine) | 1.13 | 1-(3-aminopropyl)-4-methylpiperazine |

FIG. 22G

| Polymer | Mn | Mw | Mz | Particle size | Polydispersity index | Zeta potential | Encapsulation efficiency |
|---|---|---|---|---|---|---|---|
| | (Da) | (Da) | (Da) | (nm) | | (mV) | |
| 846 | 20348 | 21537 | 22153 | 99.2 ± 1.1 | 0.31 ± 0.01 | 14.7 ± 1.1 | 75.7 ± 1.9 |
| 877 | 23099 | 24530 | 26841 | 97.6 ± 3.9 | 0.39 ± 0.01 | 15.2 ± 4 | 64.3 ± 5.5 |
| 995 | 20637 | 22609 | 24168 | 106.1 ± 7.9 | 0.38 ± 0.02 | 7.9 ± 1.8 | 40.5 ± 5.9 |

FIG. 23

BRANCHED POLY(-AMINO ESTERS) FOR THE DELIVERY OF NUCLEIC ACIDS

RELATED APPLICATIONS

This application claims priority under 35 U.S.C. § 119(e) to U.S. Provisional Application, U.S. Ser. No. 63/158,441, filed Mar. 9, 2021, the content of which is incorporated herein by reference in its entirety.

GOVERNMENT SUPPORT

This invention was made with Government support under EB000244 awarded by the National Institutes of Health, and W81XWH-20-1-0225 awarded by the Defense Health Agency. The Government has certain rights in the invention.

BACKGROUND OF THE INVENTION

Efficient delivery of nucleic acids into cells is an important challenge in the field of drug delivery. It is believed that due to the large size of nucleic acids and their charge, nucleic acids do not cross cell membranes efficiently. Hence, improving the delivery of nucleic acids into cells has been the focus of intense research.[1,2] Several strategies have had varied success in achieving this goal.[3-6] To that end, polymer-based vectors for the delivery of nucleic acids have been developed.

Polymers offer the unique advantages of facile synthesis and the ability to alter building blocks and perform other modifications to optimize performance.[7-9] Some of the first polymers tested were naturally occurring ones, such as poly(lysine) and chitosan. However, these systems suffered from poor transfection efficiency and toxicities. Poly(ethyleneimine) is a synthetic polymer that shows significantly higher transfection efficiency as compared to poly(lysine) but has similar toxicities associated with it.[7-9]

Linear poly(β-amino esters) (PBAEs) were later developed to overcome these limitations.[10-14, 20] These polymers are made by reacting primary amines with diacrylate monomers. A wide range of polymers, or a polymer library, can be constructed by altering the amine and diacrylate used, and by varying the stoichiometry of the monomers. Certain linear polymers of this type showed an improved ability to deliver nucleic acids as compared to poly(ethyleneimine). Importantly, due to the presence of ester bonds in these polymers, such polymers showed biodegradability and improved biocompatibility in comparison to polymers, such as poly(ethyleneimine).[10-14]

Despite advances in the field, there remains a need for additional polymer-based vectors for nucleic acid delivery having improved transfection efficiency.

SUMMARY OF THE INVENTION

The polymers described herein comprise at least two different linear PBAE polymers, which are connected via branched linkers. The resulting branched hybrid polymers show improved properties, including for example, the ability to deliver nucleic acids to cells, relative to linear PBAE polymers.

Provided herein is a branched polymer of Formula (I):

$$L\text{-}(R)_n \quad (I)$$

or a salt thereof, wherein:
L is a substituted or unsubstituted heteroalkylene;
n is 3, 4, 5, or 6; and
each R is independently hydrogen, Formula (II), or Formula (III);
Formula (II) is:

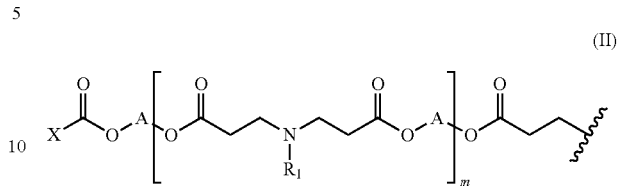

wherein:
m is an integer of 1-1000, inclusive;
A is optionally substituted alkylene or optionally substituted heteroalkylene;
X is $-CH=CH_2$, $-CH_2CH_2OR_2$, $-CH_2CH_2SR_3$, $-CH_2CH_2N(R_2)(R_3)$, or $-CH_2CH_2L(R_4)_q$;
q is 2, 3, 4, or 5;
$R_1$ is optionally substituted alkyl or optionally substituted heteroalkyl;
$R_2$ is hydrogen, optionally substituted alkyl, or optionally substituted heteroalkyl;
$R_3$ is optionally substituted alkyl or optionally substituted heteroalkyl; or
$R_2$ and $R_3$ combine to form a 4-7 membered ring; and
each $R_4$ is independently hydrogen, Formula (II), or Formula (III);
Formula (III) is:

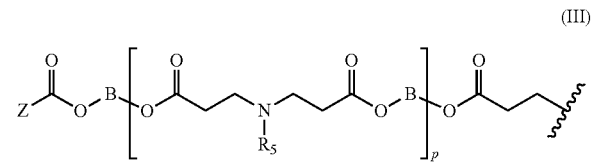

wherein:
p is an integer of 1-1000, inclusive;
B is optionally substituted alkylene or optionally substituted heteroalkylene;
Z is $-CH=CH_2$, $-CH_2CH_2OR_6$, $-CH_2CH_2SR_7$, $-CH_2CH_2N(R_6)(R_7)$, or $-CH_2CH_2L(R_8)_v$;
v is 2, 3, 4, or 5;
$R_5$ is optionally substituted alkyl or optionally substituted heteroalkyl;
$R_6$ is hydrogen, optionally substituted alkyl, or optionally substituted heteroalkyl;
$R_7$ is optionally substituted alkyl or optionally substituted heteroalkyl; or
$R_6$ and $R_7$ combine to form a 4-7 membered ring; and
each $R_8$ is independently hydrogen, Formula (II), or Formula (III);
provided that at least one R is Formula (II) or Formula (III), and provided that Formula (II) and Formula (III) are not the same.

Further provided herein are compositions comprising the polymer of Formula (I). For example, in certain embodiments, provided is a composition comprising a polymer of the invention, or a salt thereof, and optionally an excipient.

Also provided by this disclosure are methods of using the polymers or compositions described herein for delivering an agent to a subject or cell, the method comprising administering to the subject or contacting the cell with a composition as described herein. Further provided herein is a method of treating or preventing a disease in a subject in need thereof, the method comprising administering to the subject a composition or polymer as described herein.

In another aspect, the disclosure provides kits comprising the compositions, and polymers as described herein. In certain embodiments, the kit comprises a composition as described herein; and instructions for using the kit.

The details of certain embodiments of the invention are set forth in the Detailed Description of Certain Embodiments, as described below. Other features, objects, and advantages of the invention will be apparent from the Definitions, Figures, Examples, and Claims.

BRIEF DESCRIPTION OF THE DRAWINGS

FIG. 1B shows the molar ratio of the amines and diacrylates used to prepare the linear PBAEs and polymer numbers used to identify them. The end-capping agent [1-(3-aminopropyl)-4-methylpiperazine] was used to generate the linear PBAEs. FIG. 1C shows the reaction used to prepare branched hybrid polymers. FIG. 1D shows results of a colorimetric assay to confirm the branching reaction.

FIG. 2A shows the rate of reaction of the amine with the linear PBAE polymers. FIG. 2B shows the results of a study to determine if the newly synthesized linear, branched, or hybrid branched polymers could complex plasmid DNA. For this experiment, plasmid DNA was mixed with either a linear polymer or with a branched hybrid polymer. FIG. 2C shows the results of dynamic light scattering analysis carried out on complexes formed between linear, linear hybrid, branched, and branched hybrid polymers. FIG. 2D shows the zeta potential of the complexes between various polymers and plasmid DNA.

FIG. 4C shows the relative abundance of branching agents in HeLa and MSC hits compared to the starting library.

FIG. 8A shows mRNA delivery in mice after gastric injection. FIG. 8B shows oral mRNA delivery in pigs. FIG. 8C shows results of polymer 844 OVA-nanoparticles in vivo activation of T cells and B cells.

(FIG. 15A) Particle size (n=4-11) and (FIG. 15B): zeta potential (n=2-3) of polymer nanoparticles (Bar=Mean).

(FIGS. 16B-16G) In vitro transfection efficiency of plasmid DNA encapsulated in linear PBAE, branched PBAE, or hybrid branched PBAE nanoparticles in (FIG. 16B) HeLa, (FIG. 16C) Caco2, (FIG. 16D) mesenchymal stem, (FIG. 16E) PK15, (FIG. 16F) RAW, and (FIG. 16G) human aortic epithelial cells. (FIG. 16H) In vitro transfection efficiency of mRNA encapsulated in hybrid branched PBAE nanoparticles in Caco2 cells. (FIG. 16I) Transfection efficiency of GFP-encoding mRNA encapsulated in branched hybrid PBAE nanoparticles after lyophilization in Caco2 cells.

FIGS. 21A-21B show components of branched polymers.

FIGS. 22A-22G show components of hybrid branched polymers.

FIG. 23 shows physicochemical properties of selected polymers.

DEFINITIONS

Figure 1A:
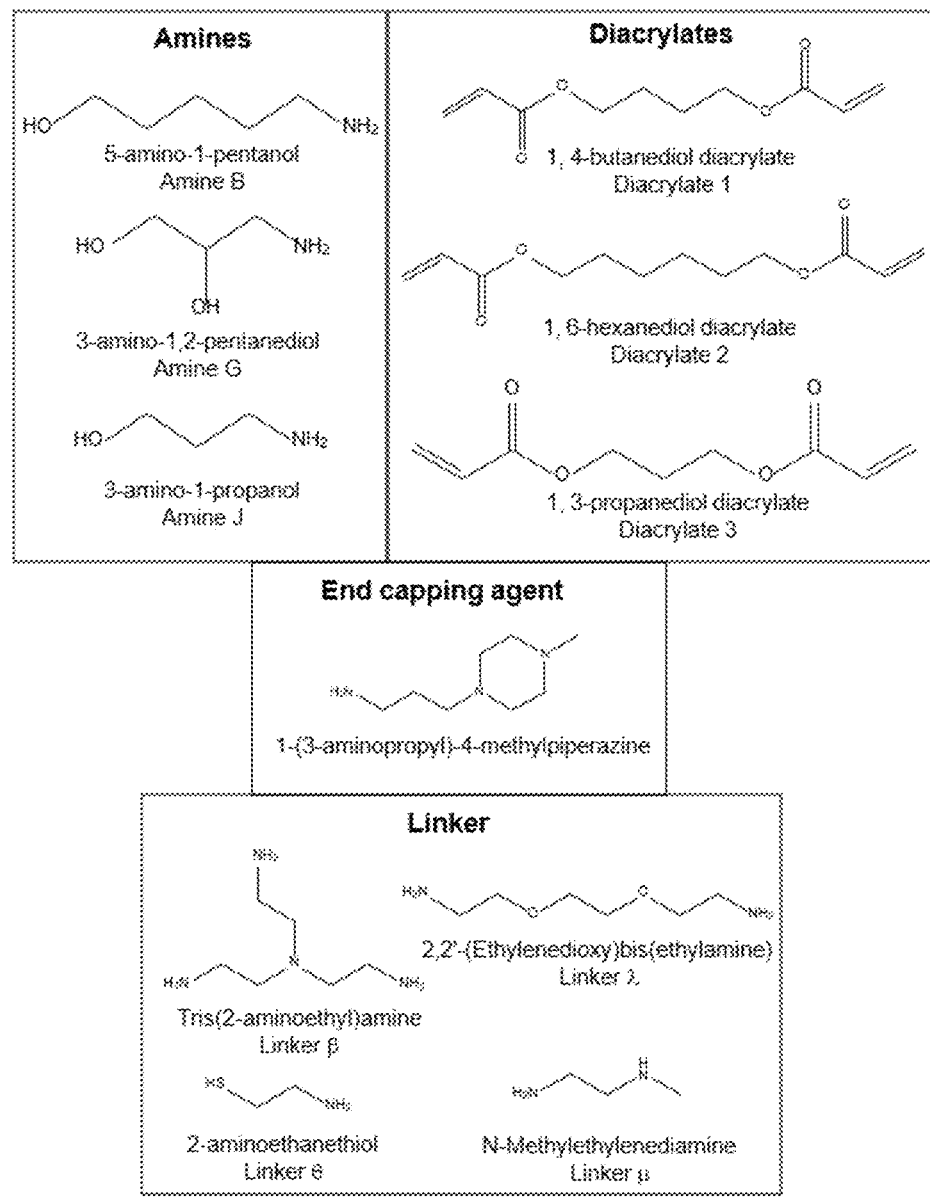
FIG. 1A shows the list of amines and diacrylates used in the polymers of the present disclosure.

Unless otherwise required by context, singular terms shall include pluralities, and plural terms shall include the singular.

The language "in some embodiments" and the language "in certain embodiments" are used interchangeably.

The singular terms "a," "an," and "the" include plural references unless the context clearly indicates otherwise. Similarly, the word "or" is intended to include "and" unless the context clearly indicates otherwise.

The terms "compound" and "polymer" are used interchangeably.

Other than in the examples, or where otherwise indicated, all numbers expressing quantities of ingredients or reaction conditions used herein should be understood as modified in all instances by the term "about." "About" and "approximately" shall generally mean an acceptable degree of error for the quantity measured given the nature or precision of the measurements. Exemplary degrees of error are within 20 percent (%), typically, within 10%, or more typically, within 5%, 4%, 3%, 2%, or 1% of a given value or range of values.

As used herein, the term "salt" refers to any and all salts and encompasses pharmaceutically acceptable salts.

The term "pharmaceutically acceptable salt" refers to those salts which are, within the scope of sound medical judgment, suitable for use in contact with the tissues of humans and lower animals without undue toxicity, irritation, allergic response, and the like, and are commensurate with a reasonable benefit/risk ratio. Pharmaceutically acceptable salts are well known in the art. For example, Berge et al. describe pharmaceutically acceptable salts in detail in *J. Pharmaceutical Sciences*, 1977, 66, 1-19, incorporated herein by reference. Pharmaceutically acceptable salts of the compounds of this invention include those derived from suitable inorganic and organic acids and bases. Examples of pharmaceutically acceptable, nontoxic acid addition salts are salts of an amino group formed with inorganic acids, such as hydrochloric acid, hydrobromic acid, phosphoric acid, sulfuric acid, and perchloric acid or with organic acids, such as acetic acid, oxalic acid, maleic acid, tartaric acid, citric acid, succinic acid, or malonic acid or by using other methods known in the art such as ion exchange. Other pharmaceutically acceptable salts include adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate salts, and the like. Salts derived from appropriate bases include alkali metal, alkaline earth metal, ammonium, and $N^+(C_{1-4} \text{ alkyl})_4^-$ salts. Representative alkali or alkaline earth metal salts include sodium, lithium, potassium, calcium, magnesium, and the like. Further pharmaceutically acceptable salts include, when appropriate, nontoxic ammonium, quaternary ammonium, and amine cations formed using counterions, such as halide, hydroxide, carboxylate, sulfate, phosphate, nitrate, lower alkyl sulfonate, and aryl sulfonate.

Definitions of specific functional groups and chemical terms are described in more detail below. The chemical elements are identified in accordance with the Periodic Table of the Elements, CAS version, *Handbook of Chemistry and Physics*, $75^{th}$ Ed., inside cover, and specific functional groups are generally defined as described therein. Additionally, general principles of organic chemistry, as well as specific functional moieties and reactivity, are described in Thomas Sorrell, *Organic Chemistry*, University Science Books, Sausalito, 1999; Michael B. Smith, *March's Advanced Organic Chemistry*, $7^{th}$ Edition, John Wiley & Sons, Inc., New York, 2013; Richard C. Larock, *Comprehensive Organic Transformations*, John Wiley & Sons, Inc., New York, 2018; and Carruthers, *Some Modern Methods of Organic Synthesis*, $3^{rd}$ Edition, Cambridge University Press, Cambridge, 1987.

Compounds described herein can comprise one or more asymmetric centers, and thus can exist in various stereoisomeric forms, e.g., enantiomers and/or diastereomers. For example, the compounds described herein can be in the form of an individual enantiomer, diastereomer or geometric isomer, or can be in the form of a mixture of stereoisomers, including racemic mixtures and mixtures enriched in one or more stereoisomer. Isomers can be isolated from mixtures by methods known to those skilled in the art, including chiral high-pressure liquid chromatography (HPLC) and the formation and crystallization of chiral salts; or preferred isomers can be prepared by asymmetric syntheses. See, for example, Jacques et al., *Enantiomers, Racemates and Resolutions* (Wiley Interscience, New York, 1981); Wilen et al., *Tetrahedron* 33:2725 (1977); Eliel, E. L. *Stereochemistry of Carbon Compounds* (McGraw-Hill, N Y, 1962); and Wilen, S. H., *Tables of Resolving Agents and Optical Resolutions* p. 268 (E. L. Eliel, Ed., Univ. of Notre Dame Press, Notre Dame, IN 1972). The invention additionally encompasses compounds as individual isomers substantially free of other isomers, and alternatively, as mixtures of various isomers.

Unless otherwise provided, a formula includes compounds that do not include isotopically enriched atoms and also compounds that include isotopically enriched atoms. Compounds that include isotopically enriched atoms may be useful, for example, as analytical tools and/or probes in biological assays.

When a range of values ("range") is listed, it is intended to encompass each value and sub-range within the range. A range is inclusive of the values at the two ends of the range unless otherwise provided. For example "$C_{1-6}$ alkyl" is intended to encompass, $C_1$, $C_2$, $C_3$, $C_4$, $C_5$, $C_6$, $C_{1-6}$, $C_{1-5}$, $C_{1-4}$, $C_{1-3}$, $C_{1-2}$, $C_{2-6}$, $C_{2-5}$, $C_{2-4}$, $C_{2-3}$, $C_{3-6}$, $C_{3-5}$, $C_{3-4}$, $C_{4-6}$, $C_{4-5}$, and $C_{5-6}$ alkyl.

The term "alkyl" refers to a radical of a straight-chain or branched saturated hydrocarbon group having from 1 to 20 carbon atoms ("$C_{1-20}$ alkyl"). In some embodiments, an alkyl group has 1 to 12 carbon atoms ("$C_{1-12}$ alkyl"). In some embodiments, an alkyl group has 1 to 10 carbon atoms ("$C_{1-10}$ alkyl"). In some embodiments, an alkyl group has 1 to 9 carbon atoms ("$C_{1-9}$ alkyl"). In some embodiments, an alkyl group has 1 to 8 carbon atoms ("$C_{1-8}$ alkyl"). In some embodiments, an alkyl group has 1 to 7 carbon atoms ("$C_{1-7}$ alkyl"). In some embodiments, an alkyl group has 1 to 6 carbon atoms ("$C_{1-6}$ alkyl"). In some embodiments, an alkyl group has 1 to 5 carbon atoms ("$C_{1-5}$ alkyl"). In some embodiments, an alkyl group has 1 to 4 carbon atoms ("$C_{1-4}$ alkyl"). In some embodiments, an alkyl group has 1 to 3 carbon atoms ("$C_{1-3}$ alkyl"). In some embodiments, an alkyl group has 1 to 2 carbon atoms ("$C_{1-2}$ alkyl"). In some embodiments, an alkyl group has 1 carbon atom ("$C_1$ alkyl"). In some embodiments, an alkyl group has 2 to 6 carbon atoms ("$C_{2-6}$ alkyl"). Examples of $C_{1-6}$ alkyl groups include methyl ($C_1$), ethyl ($C_2$), propyl ($C_3$) (e.g., n-propyl, isopropyl), butyl ($C_4$) (e.g., n-butyl, tert-butyl, sec-butyl, isobutyl), pentyl ($C_5$) (e.g., n-pentyl, 3-pentanyl, amyl, neopentyl, 3-methyl-2-butanyl, tert-amyl), and hexyl ($C_6$) (e.g., n-hexyl). Additional examples of alkyl groups include n-heptyl ($C_7$), n-octyl ($C_8$), n-dodecyl ($C_{12}$), and the like. Unless otherwise specified, each instance of an alkyl group is independently unsubstituted (an "unsubstituted alkyl") or substituted (a "substituted alkyl") with one or more substituents (e.g., halogen, such as F). In certain embodiments, the alkyl group is an unsubstituted $C_{1-12}$ alkyl (such as unsubstituted $C_{1-6}$ alkyl, e.g., —CH$_3$ (Me), unsubstituted ethyl (Et), unsubstituted propyl (Pr, e.g., unsubstituted n-propyl (n-Pr), unsubstituted isopropyl (i-Pr)), unsubstituted butyl (Bu, e.g., unsubstituted n-butyl (n-Bu), unsubstituted tert-butyl (tert-Bu or t-Bu), unsubstituted sec-butyl (sec-Bu or s-Bu), unsubstituted isobutyl (i-Bu)). In certain embodiments, the alkyl group is a substituted $C_{1-12}$ alkyl (such as substituted $C_{1-6}$ alkyl, e.g., —CH$_2$F, —CHF$_2$, —CF$_3$, —CH$_2$CH$_2$F, —CH$_2$CHF$_2$, —CH$_2$CF$_3$, or benzyl (Bn)).

The term "alkenyl" refers to a radical of a straight-chain or branched hydrocarbon group having from 1 to 20 carbon atoms and one or more carbon-carbon double bonds (e.g., 1, 2, 3, or 4 double bonds). In some embodiments, an alkenyl group has 1 to 20 carbon atoms ("$C_{1-20}$ alkenyl"). In some embodiments, an alkenyl group has 1 to 12 carbon atoms ("$C_{1-12}$ alkenyl"). In some embodiments, an alkenyl group has 1 to 11 carbon atoms ("$C_{1-11}$ alkenyl"). In some embodiments, an alkenyl group has 1 to 10 carbon atoms ("$C_{1-10}$ alkenyl"). In some embodiments, an alkenyl group has 1 to 9 carbon atoms ("$C_{1-9}$ alkenyl"). In some embodiments, an alkenyl group has 1 to 8 carbon atoms ("$C_{1-8}$ alkenyl"). In some embodiments, an alkenyl group has 1 to 7 carbon atoms ("$C_{1-7}$ alkenyl"). In some embodiments, an alkenyl group has 1 to 6 carbon atoms ("$C_{1-6}$ alkenyl"). In some embodiments, an alkenyl group has 1 to 5 carbon atoms ("$C_{1-5}$ alkenyl"). In some embodiments, an alkenyl group has 1 to 4 carbon atoms ("$C_{1-4}$ alkenyl"). In some embodiments, an alkenyl group has 1 to 3 carbon atoms ("$C_{1-3}$ alkenyl"). In some embodiments, an alkenyl group has 1 to 2 carbon atoms ("$C_{1-2}$ alkenyl"). In some embodiments, an alkenyl group has 1 carbon atom ("$C_1$ alkenyl"). The one or more carbon-carbon double bonds can be internal (such as in 2-butenyl) or terminal (such as in 1-butenyl). Examples of $C_{1-4}$ alkenyl groups include methylidenyl ($C_1$), ethenyl ($C_2$), 1-propenyl ($C_3$), 2-propenyl ($C_3$), 1-butenyl ($C_4$), 2-butenyl ($C_4$), butadienyl ($C_4$), and the like. Examples of $C_{1-6}$ alkenyl groups include the aforementioned $C_{2-4}$ alkenyl groups as well as pentenyl ($C_5$), pentadienyl ($C_5$), hexenyl ($C_6$), and the like. Additional examples of alkenyl include heptenyl ($C_7$), octenyl ($C_8$), octatrienyl ($C_8$), and the like. Unless otherwise specified, each instance of an alkenyl group is independently unsubstituted (an "unsubstituted alkenyl") or substituted (a "substituted alkenyl") with one or more substituents. In certain embodiments, the alkenyl group is an unsubstituted $C_{1-20}$ alkenyl. In certain embodiments, the alkenyl group is a substituted $C_{1-20}$ alkenyl. In an alkenyl group, a C═C double bond for which the stereochemistry is not specified (e.g., —CH═CHCH$_3$ or

) may be in the (E) or (Z)-configuration.

The term "heteroalkyl" refers to an alkyl group, which further includes at least one heteroatom (e.g., 1, 2, 3, or 4 heteroatoms) selected from oxygen, nitrogen, or sulfur within (e.g., inserted between adjacent carbon atoms of) and/or placed at one or more terminal position(s) of the parent chain. In certain embodiments, a heteroalkyl group refers to a saturated group having from 1 to 20 carbon atoms and 1 or more heteroatoms within the parent chain ("hetero$C_{1-20}$ alkyl"). In certain embodiments, a heteroalkyl group refers to a saturated group having from 1 to 12 carbon atoms and 1 or more heteroatoms within the parent chain ("hetero$C_{1-12}$ alkyl"). In some embodiments, a heteroalkyl group is a saturated group having 1 to 11 carbon atoms and 1 or more heteroatoms within the parent chain ("hetero$C_{1-11}$ alkyl"). In some embodiments, a heteroalkyl group is a saturated group having 1 to 10 carbon atoms and 1 or more heteroatoms within the parent chain ("hetero$C_{1-10}$ alkyl"). In some embodiments, a heteroalkyl group is a saturated group having 1 to 9 carbon atoms and 1 or more heteroatoms within the parent chain ("hetero$C_{1-9}$ alkyl"). In some embodiments, a heteroalkyl group is a saturated group having 1 to 8 carbon atoms and 1 or more heteroatoms within the parent chain ("hetero$C_{1-8}$ alkyl"). In some embodiments, a heteroalkyl group is a saturated group having 1 to 7 carbon atoms and 1 or more heteroatoms within the parent chain ("hetero$C_{1-7}$ alkyl"). In some embodiments, a heteroalkyl group is a saturated group having 1 to 6 carbon atoms and 1 or more heteroatoms within the parent chain ("hetero$C_{1-6}$ alkyl"). In some embodiments, a heteroalkyl group is a saturated group having 1 to 5 carbon atoms and 1 or 2 heteroatoms within the parent chain ("hetero$C_{1-5}$ alkyl").

In some embodiments, a heteroalkyl group is a saturated group having 1 to 4 carbon atoms and 1 or 2 heteroatoms within the parent chain ("hetero$C_{1-4}$ alkyl"). In some embodiments, a heteroalkyl group is a saturated group having 1 to 3 carbon atoms and 1 heteroatom within the parent chain ("hetero$C_{1-3}$ alkyl"). In some embodiments, a heteroalkyl group is a saturated group having 1 to 2 carbon atoms and 1 heteroatom within the parent chain ("hetero$C_{1-2}$ alkyl"). In some embodiments, a heteroalkyl group is a saturated group having 1 carbon atom and 1 heteroatom ("hetero$C_1$ alkyl"). In some embodiments, a heteroalkyl group is a saturated group having 2 to 6 carbon atoms and 1 or 2 heteroatoms within the parent chain ("hetero$C_{2-6}$ alkyl"). Unless otherwise specified, each instance of a heteroalkyl group is independently unsubstituted (an "unsubstituted heteroalkyl") or substituted (a "substituted heteroalkyl") with one or more substituents. In certain embodiments, the heteroalkyl group is an unsubstituted hetero$C_{1-12}$ alkyl. In certain embodiments, the heteroalkyl group is a substituted hetero$C_{1-12}$ alkyl.

The term "heteroalkenyl" refers to an alkenyl group, which further includes at least one heteroatom (e.g., 1, 2, 3, or 4 heteroatoms) selected from oxygen, nitrogen, or sulfur within (e.g., inserted between adjacent carbon atoms of) and/or placed at one or more terminal position(s) of the parent chain. In certain embodiments, a heteroalkenyl group refers to a group having from 1 to 20 carbon atoms, at least one double bond, and 1 or more heteroatoms within the parent chain ("heteroC$_{1-20}$ alkenyl"). In certain embodiments, a heteroalkenyl group refers to a group having from 1 to 12 carbon atoms, at least one double bond, and 1 or more heteroatoms within the parent chain ("heteroC$_{1-12}$ alkenyl"). In certain embodiments, a heteroalkenyl group refers to a group having from 1 to 11 carbon atoms, at least one double bond, and 1 or more heteroatoms within the parent chain ("heteroC$_{1-11}$ alkenyl"). In certain embodiments, a heteroalkenyl group refers to a group having from 1 to 10 carbon atoms, at least one double bond, and 1 or more heteroatoms within the parent chain ("heteroC$_{1-10}$ alkenyl"). In some embodiments, a heteroalkenyl group has 1 to 9 carbon atoms at least one double bond, and 1 or more heteroatoms within the parent chain ("heteroC$_{1-9}$ alkenyl"). In some embodiments, a heteroalkenyl group has 1 to 8 carbon atoms, at least one double bond, and 1 or more heteroatoms within the parent chain ("heteroC$_{1-8}$ alkenyl"). In some embodiments, a heteroalkenyl group has 1 to 7 carbon atoms, at least one double bond, and 1 or more heteroatoms within the parent chain ("heteroC$_{1-7}$ alkenyl").

In some embodiments, a heteroalkenyl group has 1 to 6 carbon atoms, at least one double bond, and 1 or more heteroatoms within the parent chain ("heteroC$_{1-6}$ alkenyl"). In some embodiments, a heteroalkenyl group has 1 to 5 carbon atoms, at least one double bond, and 1 or 2 heteroatoms within the parent chain ("heteroC$_{1-5}$ alkenyl"). In some embodiments, a heteroalkenyl group has 1 to 4 carbon atoms, at least one double bond, and 1 or 2 heteroatoms within the parent chain ("heteroC$_{1-4}$ alkenyl"). In some embodiments, a heteroalkenyl group has 1 to 3 carbon atoms, at least one double bond, and 1 heteroatom within the parent chain ("heteroC$_{1-3}$ alkenyl"). In some embodiments, a heteroalkenyl group has 1 to 2 carbon atoms, at least one double bond, and 1 heteroatom within the parent chain ("heteroC$_{1-2}$ alkenyl"). In some embodiments, a heteroalkenyl group has 1 to 6 carbon atoms, at least one double bond, and 1 or 2 heteroatoms within the parent chain ("heteroC$_{1-6}$ alkenyl"). Unless otherwise specified, each instance of a heteroalkenyl group is independently unsubstituted (an "unsubstituted heteroalkenyl") or substituted (a "substituted heteroalkenyl") with one or more substituents. In certain embodiments, the heteroalkenyl group is an unsubstituted heteroC$_{1-20}$ alkenyl. In certain embodiments, the heteroalkenyl group is a substituted heteroC$_{1-20}$ alkenyl.

The term "alkynyl" refers to a radical of a straight-chain or branched hydrocarbon group having from 1 to 20 carbon atoms and one or more carbon-carbon triple bonds (e.g., 1, 2, 3, or 4 triple bonds) ("C$_{1-20}$ alkynyl"). In some embodiments, an alkynyl group has 1 to 10 carbon atoms ("C$_{1-10}$ alkynyl"). In some embodiments, an alkynyl group has 1 to 9 carbon atoms ("C$_{1-9}$ alkynyl"). In some embodiments, an alkynyl group has 1 to 8 carbon atoms ("C$_{1-8}$ alkynyl"). In some embodiments, an alkynyl group has 1 to 7 carbon atoms ("C$_{1-7}$ alkynyl"). In some embodiments, an alkynyl group has 1 to 6 carbon atoms ("C$_{1-6}$ alkynyl"). In some embodiments, an alkynyl group has 1 to 5 carbon atoms ("C$_{1-5}$ alkynyl"). In some embodiments, an alkynyl group has 1 to 4 carbon atoms ("C$_{1-4}$ alkynyl"). In some embodiments, an alkynyl group has 1 to 3 carbon atoms ("C$_{1-3}$ alkynyl"). In some embodiments, an alkynyl group has 1 to 2 carbon atoms ("C$_{1-2}$ alkynyl"). In some embodiments, an alkynyl group has 1 carbon atom ("C$_1$ alkynyl"). The one or more carbon-carbon triple bonds can be internal (such as in 2-butynyl) or terminal (such as in 1-butynyl). Examples of C$_{1-4}$ alkynyl groups include, without limitation, methylidynyl (C$_1$), ethynyl (C$_2$), 1-propynyl (C$_3$), 2-propynyl (C$_3$), 1-butynyl (C$_4$), 2-butynyl (C$_4$), and the like. Examples of C$_{1-6}$ alkenyl groups include the aforementioned C$_{2-4}$ alkynyl groups as well as pentynyl (C$_5$), hexynyl (C$_6$), and the like. Additional examples of alkynyl include heptynyl (C$_7$), octynyl (C$_5$), and the like. Unless otherwise specified, each instance of an alkynyl group is independently unsubstituted (an "unsubstituted alkynyl") or substituted (a "substituted alkynyl") with one or more substituents. In certain embodiments, the alkynyl group is an unsubstituted C$_{1-20}$ alkynyl. In certain embodiments, the alkynyl group is a substituted C$_{1-20}$ alkynyl.

The term "heteroalkynyl" refers to an alkynyl group, which further includes at least one heteroatom (e.g., 1, 2, 3, or 4 heteroatoms) selected from oxygen, nitrogen, or sulfur within (e.g., inserted between adjacent carbon atoms of) and/or placed at one or more terminal position(s) of the parent chain. In certain embodiments, a heteroalkynyl group refers to a group having from 1 to 20 carbon atoms, at least one triple bond, and 1 or more heteroatoms within the parent chain ("heteroC$_{1-20}$ alkynyl"). In certain embodiments, a heteroalkynyl group refers to a group having from 1 to 10 carbon atoms, at least one triple bond, and 1 or more heteroatoms within the parent chain ("heteroC$_{1-10}$ alkynyl"). In some embodiments, a heteroalkynyl group has 1 to 9 carbon atoms, at least one triple bond, and 1 or more heteroatoms within the parent chain ("heteroC$_{1-9}$ alkynyl"). In some embodiments, a heteroalkynyl group has 1 to 8 carbon atoms, at least one triple bond, and 1 or more heteroatoms within the parent chain ("heteroC$_{1-8}$ alkynyl"). In some embodiments, a heteroalkynyl group has 1 to 7 carbon atoms, at least one triple bond, and 1 or more heteroatoms within the parent chain ("heteroC$_{1-7}$ alkynyl"). In some embodiments, a heteroalkynyl group has 1 to 6 carbon atoms, at least one triple bond, and 1 or more heteroatoms within the parent chain ("heteroC$_{1-6}$ alkynyl"). In some embodiments, a heteroalkynyl group has 1 to 5 carbon atoms, at least one triple bond, and 1 or 2 heteroatoms within the parent chain ("heteroC$_{1-5}$ alkynyl"). In some embodiments, a heteroalkynyl group has 1 to 4 carbon atoms, at least one triple bond, and 1 or 2 heteroatoms within the parent chain ("heteroC$_{1-4}$ alkynyl"). In some embodiments, a heteroalkynyl group has 1 to 3 carbon atoms, at least one triple bond, and 1 heteroatom within the parent chain ("heteroC$_{1-3}$ alkynyl"). In some embodiments, a heteroalkynyl group has 1 to 2 carbon atoms, at least one triple bond, and 1 heteroatom within the parent chain ("heteroC$_{1-2}$ alkynyl"). In some embodiments, a heteroalkynyl group has 1 to 6 carbon atoms, at least one triple bond, and 1 or 2 heteroatoms within the parent chain ("heteroC$_{1-6}$ alkynyl"). Unless otherwise specified, each instance of a heteroalkynyl group is independently unsubstituted (an "unsubstituted heteroalkynyl") or substituted (a "substituted heteroalkynyl") with one or more substituents. In certain embodiments, the heteroalkynyl group is an unsubstituted heteroC$_{1-20}$ alkynyl. In certain embodiments, the heteroalkynyl group is a substituted heteroC$_{1-20}$ alkynyl.

The term "carbocyclyl" or "carbocyclic" refers to a radical of a non-aromatic cyclic hydrocarbon group having from 3 to 14 ring carbon atoms ("C$_{3-14}$ carbocyclyl") and zero heteroatoms in the non-aromatic ring system. In some embodiments, a carbocyclyl group has 3 to 14 ring carbon atoms ("$C_{3-14}$ carbocyclyl"). In some embodiments, a carbocyclyl group has 3 to 13 ring carbon atoms ("$C_{3-13}$ carbocyclyl"). In some embodiments, a carbocyclyl group has 3 to 12 ring carbon atoms ("$C_{3-12}$ carbocyclyl"). In some embodiments, a carbocyclyl group has 3 to 11 ring carbon atoms ("$C_{3-11}$ carbocyclyl"). In some embodiments, a carbocyclyl group has 3 to 10 ring carbon atoms ("$C_{3-10}$ carbocyclyl"). In some embodiments, a carbocyclyl group has 3 to 8 ring carbon atoms ("$C_{3-8}$ carbocyclyl"). In some embodiments, a carbocyclyl group has 3 to 7 ring carbon atoms ("$C_{3-7}$ carbocyclyl"). In some embodiments, a carbocyclyl group has 3 to 6 ring carbon atoms ("$C_{3-6}$ carbocyclyl"). In some embodiments, a carbocyclyl group has 4 to 6 ring carbon atoms ("$C_{4-6}$ carbocyclyl"). In some embodiments, a carbocyclyl group has 5 to 6 ring carbon atoms ("$C_{5-6}$ carbocyclyl"). In some embodiments, a carbocyclyl group has 5 to 10 ring carbon atoms ("$C_{5-10}$ carbocyclyl"). Exemplary $C_{3-6}$ carbocyclyl groups include cyclopropyl ($C_3$), cyclopropenyl ($C_3$), cyclobutyl ($C_4$), cyclobutenyl ($C_4$), cyclopentyl ($C_5$), cyclopentenyl ($C_5$), cyclohexyl ($C_6$), cyclohexenyl ($C_6$), cyclohexadienyl ($C_6$), and the like. Exemplary $C_{3-8}$ carbocyclyl groups include the aforementioned $C_{3-6}$ carbocyclyl groups as well as cycloheptyl ($C_7$), cycloheptenyl ($C_7$), cycloheptadienyl ($C_7$), cycloheptatrienyl ($C_7$), cyclooctyl ($C_8$), cyclooctenyl ($C_8$), bicyclo[2.2.1]heptanyl ($C_7$), bicyclo[2.2.2]octanyl ($C_8$), and the like. Exemplary $C_{3-10}$ carbocyclyl groups include the aforementioned $C_{3-8}$ carbocyclyl groups as well as cyclononyl ($C_9$), cyclononenyl ($C_9$), cyclodecyl ($C_{10}$), cyclodecenyl ($C_{10}$), octahydro-1H-indenyl ($C_9$), decahydronaphthalenyl ($C_{10}$), spiro[4.5]decanyl ($C_{10}$), and the like. Exemplary $C_{3-8}$ carbocyclyl groups include the aforementioned $C_{3-10}$ carbocyclyl groups as well as cycloundecyl ($C_{11}$), spiro[5.5]undecanyl ($C_{11}$), cyclododecyl ($C_{12}$), cyclododecenyl ($C_{12}$), cyclotridecane ($C_{13}$), cyclotetradecane ($C_{14}$), and the like. As the foregoing examples illustrate, in certain embodiments, the carbocyclyl group is either monocyclic ("monocyclic carbocyclyl") or polycyclic (e.g., containing a fused, bridged or spiro ring system such as a bicyclic system ("bicyclic carbocyclyl") or tricyclic system ("tricyclic carbocyclyl")) and can be saturated or can contain one or more carbon-carbon double or triple bonds. "Carbocyclyl" also includes ring systems wherein the carbocyclyl ring, as defined above, is fused with one or more aryl or heteroaryl groups wherein the point of attachment is on the carbocyclyl ring, and in such instances, the number of carbons continue to designate the number of carbons in the carbocyclic ring system. Unless otherwise specified, each instance of a carbocyclyl group is independently unsubstituted (an "unsubstituted carbocyclyl") or substituted (a "substituted carbocyclyl") with one or more substituents. In certain embodiments, the carbocyclyl group is an unsubstituted $C_{3-14}$ carbocyclyl. In certain embodiments, the carbocyclyl group is a substituted $C_{3-14}$ carbocyclyl.

In some embodiments, "carbocyclyl" is a monocyclic, saturated carbocyclyl group having from 3 to 14 ring carbon atoms ("$C_{3-14}$ cycloalkyl"). In some embodiments, a cycloalkyl group has 3 to 10 ring carbon atoms ("$C_{3-10}$ cycloalkyl"). In some embodiments, a cycloalkyl group has 3 to 8 ring carbon atoms ("$C_{3-8}$ cycloalkyl"). In some embodiments, a cycloalkyl group has 3 to 6 ring carbon atoms ("$C_{3-6}$ cycloalkyl"). In some embodiments, a cycloalkyl group has 4 to 6 ring carbon atoms ("$C_{4-6}$ cycloalkyl"). In some embodiments, a cycloalkyl group has 5 to 6 ring carbon atoms ("$C_{5-6}$ cycloalkyl"). In some embodiments, a cycloalkyl group has 5 to 10 ring carbon atoms ("$C_{5-10}$ cycloalkyl"). Examples of $C_{5-6}$ cycloalkyl groups include cyclopentyl ($C_5$) and cyclohexyl ($C_5$). Examples of $C_{3-6}$ cycloalkyl groups include the aforementioned $C_{5-6}$ cycloalkyl groups as well as cyclopropyl ($C_3$) and cyclobutyl ($C_4$). Examples of $C_{3-8}$ cycloalkyl groups include the aforementioned $C_{3-6}$ cycloalkyl groups as well as cycloheptyl ($C_7$) and cyclooctyl ($C_8$). Unless otherwise specified, each instance of a cycloalkyl group is independently unsubstituted (an "unsubstituted cycloalkyl") or substituted (a "substituted cycloalkyl") with one or more substituents. In certain embodiments, the cycloalkyl group is an unsubstituted $C_{3-14}$ cycloalkyl. In certain embodiments, the cycloalkyl group is a substituted $C_{3-14}$ cycloalkyl. In certain embodiments, the carbocyclyl includes 0, 1, or 2 C=C double bonds in the carbocyclic ring system, as valency permits.

The term "heterocyclyl" or "heterocyclic" refers to a radical of a 3- to 14-membered non-aromatic ring system having ring carbon atoms and 1 to 4 ring heteroatoms, wherein each heteroatom is independently selected from nitrogen, oxygen, and sulfur ("3-14 membered heterocyclyl"). In heterocyclyl groups that contain one or more nitrogen atoms, the point of attachment can be a carbon or nitrogen atom, as valency permits. A heterocyclyl group can either be monocyclic ("monocyclic heterocyclyl") or polycyclic (e.g., a fused, bridged or spiro ring system such as a bicyclic system ("bicyclic heterocyclyl") or tricyclic system ("tricyclic heterocyclyl")), and can be saturated or can contain one or more carbon-carbon double or triple bonds. Heterocyclyl polycyclic ring systems can include one or more heteroatoms in one or both rings. "Heterocyclyl" also includes ring systems wherein the heterocyclyl ring, as defined above, is fused with one or more carbocyclyl groups wherein the point of attachment is either on the carbocyclyl or heterocyclyl ring, or ring systems wherein the heterocyclyl ring, as defined above, is fused with one or more aryl or heteroaryl groups, wherein the point of attachment is on the heterocyclyl ring, and in such instances, the number of ring members continue to designate the number of ring members in the heterocyclyl ring system. Unless otherwise specified, each instance of heterocyclyl is independently unsubstituted (an "unsubstituted heterocyclyl") or substituted (a "substituted heterocyclyl") with one or more substituents. In certain embodiments, the heterocyclyl group is an unsubstituted 3-14 membered heterocyclyl. In certain embodiments, the heterocyclyl group is a substituted 3-14 membered heterocyclyl. In certain embodiments, the heterocyclyl is substituted or unsubstituted, 3- to 7-membered, monocyclic heterocyclyl, wherein 1, 2, or 3 atoms in the heterocyclic ring system are independently oxygen, nitrogen, or sulfur, as valency permits.

In some embodiments, a heterocyclyl group is a 5-10 membered non-aromatic ring system having ring carbon atoms and 1-4 ring heteroatoms, wherein each heteroatom is independently selected from nitrogen, oxygen, and sulfur ("5-10 membered heterocyclyl"). In some embodiments, a heterocyclyl group is a 5-8 membered non-aromatic ring system having ring carbon atoms and 1-4 ring heteroatoms, wherein each heteroatom is independently selected from nitrogen, oxygen, and sulfur ("5-8 membered heterocyclyl"). In some embodiments, a heterocyclyl group is a 5-6 membered non-aromatic ring system having ring carbon atoms and 1-4 ring heteroatoms, wherein each heteroatom is independently selected from nitrogen, oxygen, and sulfur ("5-6 membered heterocyclyl"). In some embodiments, the 5-6 membered heterocyclyl has 1-3 ring heteroatoms selected from nitrogen, oxygen, and sulfur. In some embodiments, the 5-6 membered heterocyclyl has 1-2 ring heteroatoms selected from nitrogen, oxygen, and sulfur. In some embodiments, the 5-6 membered heterocyclyl has 1 ring heteroatom selected from nitrogen, oxygen, and sulfur.

Exemplary 3-membered heterocyclyl groups containing 1 heteroatom include azirdinyl, oxiranyl, and thiiranyl. Exemplary 4-membered heterocyclyl groups containing 1 heteroatom include azetidinyl, oxetanyl, and thietanyl. Exemplary 5-membered heterocyclyl groups containing 1 heteroatom include tetrahydrofuranyl, dihydrofuranyl, tetrahydrothiophenyl, dihydrothiophenyl, pyrrolidinyl, dihydropyrrolyl, and pyrrolyl-2,5-dione. Exemplary 5-membered heterocyclyl groups containing 2 heteroatoms include dioxolanyl, oxathiolanyl, and dithiolanyl. Exemplary 5-membered heterocyclyl groups containing 3 heteroatoms include triazolinyl, oxadiazolinyl, and thiadiazolinyl. Exemplary 6-membered heterocyclyl groups containing 1 heteroatom include piperidinyl, tetrahydropyranyl, dihydropyridinyl, and thianyl. Exemplary 6-membered heterocyclyl groups containing 2 heteroatoms include piperazinyl, morpholinyl, dithianyl, and dioxanyl. Exemplary 6-membered heterocyclyl groups containing 3 heteroatoms include triazinyl. Exemplary 7-membered heterocyclyl groups containing 1 heteroatom include azepanyl, oxepanyl and thiepanyl. Exemplary 8-membered heterocyclyl groups containing 1 heteroatom include azocanyl, oxecanyl and thiocanyl. Exemplary bicyclic heterocyclyl groups include indolinyl, isoindolinyl, dihydrobenzofuranyl, dihydrobenzothienyl, tetrahydrobenzothienyl, tetrahydrobenzofuranyl, tetrahydroindolyl, tetrahydroquinolinyl, tetrahydroisoquinolinyl, decahydroquinolinyl, decahydroisoquinolinyl, octahydrochromenyl, octahydroisochromenyl, decahydronaphthyridinyl, decahydro-1,8-naphthyridinyl, octahydropyrrolo[3,2-b]pyrrole, indolinyl, phthalimidyl, naphthalimidyl, chromanyl, chromenyl, 1H-benzo[e][1,4]diazepinyl, 1,4,5,7-tetrahydropyrano[3,4-b]pyrrolyl, 5,6-dihydro-4H-furo[3,2-b]pyrrolyl, 6,7-dihydro-5H-furo[3,2-b]pyranyl, 5,7-dihydro-4H-thieno[2,3-c]pyranyl, 2,3-dihydro-1H-pyrrolo[2,3-b]pyridinyl, 2,3-dihydrofuro[2,3-b]pyridinyl, 4,5,6,7-tetrahydro-1H-pyrrolo[2,3-b]pyridinyl, 4,5,6,7-tetrahydrofuro[3,2-c]pyridinyl, 4,5,6,7-tetrahydrothieno[3,2-b]pyridinyl, 1,2,3,4-tetrahydro-1,6-naphthyridinyl, and the like.

The term "aryl" refers to a radical of a monocyclic or polycyclic (e.g., bicyclic or tricyclic) 4n+2 aromatic ring system (e.g., having 6, 10, or 14 π electrons shared in a cyclic array) having 6-14 ring carbon atoms and zero heteroatoms provided in the aromatic ring system ("$C_{6-14}$ aryl"). In some embodiments, an aryl group has 6 ring carbon atoms ("$C_6$ aryl"; e.g., phenyl). In some embodiments, an aryl group has 10 ring carbon atoms ("$C_{10}$ aryl"; e.g., naphthyl such as 1-naphthyl and 2-naphthyl). In some embodiments, an aryl group has 14 ring carbon atoms ("$C_{14}$ aryl"; e.g., anthracyl). "Aryl" also includes ring systems wherein the aryl ring, as defined above, is fused with one or more carbocyclyl or heterocyclyl groups wherein the radical or point of attachment is on the aryl ring, and in such instances, the number of carbon atoms continue to designate the number of carbon atoms in the aryl ring system. Unless otherwise specified, each instance of an aryl group is independently unsubstituted (an "unsubstituted aryl") or substituted (a "substituted aryl") with one or more substituents. In certain embodiments, the aryl group is an unsubstituted $C_{6-14}$ aryl. In certain embodiments, the aryl group is a substituted $C_{6-14}$ aryl.

"Aralkyl" is a subset of "alkyl" and refers to an alkyl group substituted by an aryl group, wherein the point of attachment is on the alkyl moiety.

The term "heteroaryl" refers to a radical of a 5-14 membered monocyclic or polycyclic (e.g., bicyclic, tricyclic) 4n+2 aromatic ring system (e.g., having 6, 10, or 14 pi electrons shared in a cyclic array) having ring carbon atoms and 1-4 ring heteroatoms provided in the aromatic ring system, wherein each heteroatom is independently selected from nitrogen, oxygen, and sulfur ("5-14 membered heteroaryl"). In heteroaryl groups that contain one or more nitrogen atoms, the point of attachment can be a carbon or nitrogen atom, as valency permits. Heteroaryl polycyclic ring systems can include one or more heteroatoms in one or both rings. "Heteroaryl" includes ring systems wherein the heteroaryl ring, as defined above, is fused with one or more carbocyclyl or heterocyclyl groups wherein the point of attachment is on the heteroaryl ring, and in such instances, the number of ring members continue to designate the number of ring members in the heteroaryl ring system. "Heteroaryl" also includes ring systems wherein the heteroaryl ring, as defined above, is fused with one or more aryl groups wherein the point of attachment is either on the aryl or heteroaryl ring, and in such instances, the number of ring members designates the number of ring members in the fused polycyclic (aryl/heteroaryl) ring system. Polycyclic heteroaryl groups wherein one ring does not contain a heteroatom (e.g., indolyl, quinolinyl, carbazolyl, and the like) the point of attachment can be on either ring, e.g., either the ring bearing a heteroatom (e.g., 2-indolyl) or the ring that does not contain a heteroatom (e.g., 5-indolyl). In certain embodiments, the heteroaryl is substituted or unsubstituted, 5- or 6-membered, monocyclic heteroaryl, wherein 1, 2, 3, or 4 atoms in the heteroaryl ring system are independently oxygen, nitrogen, or sulfur. In certain embodiments, the heteroaryl is substituted or unsubstituted, 9- or 10-membered, bicyclic heteroaryl, wherein 1, 2, 3, or 4 atoms in the heteroaryl ring system are independently oxygen, nitrogen, or sulfur.

In some embodiments, a heteroaryl group is a 5-10 membered aromatic ring system having ring carbon atoms and 1-4 ring heteroatoms provided in the aromatic ring system, wherein each heteroatom is independently selected from nitrogen, oxygen, and sulfur ("5-10 membered heteroaryl"). In some embodiments, a heteroaryl group is a 5-8 membered aromatic ring system having ring carbon atoms and 1-4 ring heteroatoms provided in the aromatic ring system, wherein each heteroatom is independently selected from nitrogen, oxygen, and sulfur ("5-8 membered heteroaryl"). In some embodiments, a heteroaryl group is a 5-6 membered aromatic ring system having ring carbon atoms and 1-4 ring heteroatoms provided in the aromatic ring system, wherein each heteroatom is independently selected from nitrogen, oxygen, and sulfur ("5-6 membered heteroaryl"). In some embodiments, the 5-6 membered heteroaryl has 1-3 ring heteroatoms selected from nitrogen, oxygen, and sulfur. In some embodiments, the 5-6 membered heteroaryl has 1-2 ring heteroatoms selected from nitrogen, oxygen, and sulfur. In some embodiments, the 5-6 membered heteroaryl has 1 ring heteroatom selected from nitrogen, oxygen, and sulfur. Unless otherwise specified, each instance of a heteroaryl group is independently unsubstituted (an "unsubstituted heteroaryl") or substituted (a "substituted heteroaryl") with one or more substituents. In certain embodiments, the heteroaryl group is an unsubstituted 5-14 membered heteroaryl. In certain embodiments, the heteroaryl group is a substituted 5-14 membered heteroaryl.

Exemplary 5-membered heteroaryl groups containing 1 heteroatom include pyrrolyl, furanyl, and thiophenyl. Exemplary 5-membered heteroaryl groups containing 2 heteroatoms include imidazolyl, pyrazolyl, oxazolyl, isoxazolyl, thiazolyl, and isothiazolyl. Exemplary 5-membered heteroaryl groups containing 3 heteroatoms include triazolyl, oxadiazolyl, and thiadiazolyl. Exemplary 5-membered heteroaryl groups containing 4 heteroatoms include tetrazolyl. Exemplary 6-membered heteroaryl groups containing 1 heteroatom include pyridinyl. Exemplary 6-membered heteroaryl groups containing 2 heteroatoms include pyridazinyl, pyrimidinyl, and pyrazinyl. Exemplary 6-membered heteroaryl groups containing 3 or 4 heteroatoms include triazinyl and tetrazinyl, respectively. Exemplary 7-membered heteroaryl groups containing 1 heteroatom include azepinyl, oxepinyl, and thiepinyl. Exemplary 5,6-bicyclic heteroaryl groups include indolyl, isoindolyl, indazolyl, benzotriazolyl, benzothiophenyl, isobenzothiophenyl, benzofuranyl, benzoisofuranyl, benzimidazolyl, benzoxazolyl, benzisoxazolyl, benzoxadiazolyl, benzthiazolyl, benzisothiazolyl, benzthiadiazolyl, indolizinyl, and purinyl. Exemplary 6,6-bicyclic heteroaryl groups include naphthyridinyl, pteridinyl, quinolinyl, isoquinolinyl, cinnolinyl, quinoxalinyl, phthalazinyl, and quinazolinyl. Exemplary tricyclic heteroaryl groups include phenanthridinyl, dibenzofuranyl, carbazolyl, acridinyl, phenothiazinyl, phenoxazinyl, and phenazinyl.

"Heteroaralkyl" is a subset of "alkyl" and refers to an alkyl group substituted by a heteroaryl group, wherein the point of attachment is on the alkyl moiety.

The term "unsaturated bond" refers to a double or triple bond.

The term "unsaturated" or "partially unsaturated" refers to a moiety that includes at least one double or triple bond.

The term "saturated" or "fully saturated" refers to a moiety that does not contain a double or triple bond, e.g., the moiety only contains single bonds.

The term "halo" or "halogen" refers to fluorine (fluoro, —F), chlorine (chloro, —Cl), bromine (bromo, —Br), or iodine (iodo, —I).

The term "hydroxyl" or "hydroxy" refers to the group —OH. The term "substituted hydroxyl" or "substituted hydroxyl," by extension, refers to a hydroxyl group wherein the oxygen atom directly attached to the parent molecule is substituted with a group other than hydrogen, and includes groups selected from —$OR^{aa}$, —$ON(R^{bb})_2$, —$OC(=O)SR^{aa}$, —$OC(=O)R^{aa}$, —$OCO_2R^{aa}$, —$OC(=O)N(R^{bb})_2$, —$OC(=NR^{bb})R^{aa}$, —$OC(=NR^{bb})OR^{aa}$, —$OC(=NR^{bb})N(R^{bb})_2$, —$OS(=O)R^{aa}$, —$OSO_2R^{aa}$, —$OSi(R^{aa})_3$, —$OP(R^{cc})_2$, —$OP(R^{cc})_3{}^+X^-$, —$OP(OR^{cc})_2$, —$OP(OR^{cc})_3{}^+X^-$, —$OP(=O)(R^{cc})_2$, —$OP(=O)(OR^{cc})_2$, and —$OP(=O)(N(R^{bb}))_2$, wherein $X^-$, $R^{aa}$, $R^{bb}$, and $R^{cc}$ are as defined herein.

The term "alkoxy" refers to the group where the oxygen atom directly attached to the parent molecule is substituted with a group other than hydrogen.

The term "thiol" or "thio" refers to the group —SH. The term "substituted thiol" or "substituted thio," by extension, refers to a thiol group wherein the sulfur atom directly attached to the parent molecule is substituted with a group other than hydrogen, and includes groups selected from —$SR^{aa}$, —$S=SR^{cc}$, —$SC(=S)SR^{aa}$, —$SC(=S)OR^{aa}$, —$SC(=S)N(R^{bb})_2$, —$SC(=O)SR^{aa}$, —$SC(=O)OR^{aa}$, —$SC(=O)N(R^{bb})_2$, and —$SC(=O)R^{aa}$, wherein $R^{aa}$ and $R^{cc}$ are as defined herein.

The term "amino" refers to the group —$NH_2$. The term "substituted amino," by extension, refers to a monosubstituted amino, a disubstituted amino, or a trisubstituted amino. In certain embodiments, the "substituted amino" is a monosubstituted amino or a disubstituted amino group.

The term "monosubstituted amino" refers to an amino group wherein the nitrogen atom directly attached to the parent molecule is substituted with one hydrogen and one group other than hydrogen, and includes groups selected from —$NH(R^{bb})$, —$NHC(=O)R^{aa}$, —$NHCO_2R^{aa}$, —$NHC(=O)N(R^{bb})_2$, —$NHC(=NR^{bb})N(R^{bb})_2$, —$NHSO_2R^{aa}$, —$NHP(=O)(OR^{cc})_2$, and —$NHP(=O)(N(R^{bb})_2)_2$, wherein $R^{aa}$, $R^{bb}$ and $R^{cc}$ are as defined herein, and wherein $R^{bb}$ of the group —$NH(R^{bb})$ is not hydrogen.

The term "disubstituted amino" refers to an amino group wherein the nitrogen atom directly attached to the parent molecule is substituted with two groups other than hydrogen, and includes groups selected from —$N(R^{bb})_2$, —$NR^{bb}C(=O)R^{aa}$, —$NR^{bb}CO_2R^{aa}$, —$NR^{bb}C(=O)N(R^{bb})_2$, —$NR^{bb}C(=NR^{bb})N(R^{bb})_2$, —$NR^{bb}SO_2R^{aa}$, —$NR^{bb}P(=O)(OR^{cc})_2$, and —$NR^{bb}P(=O)(N(R^{bb})_2)_2$, wherein $R^{aa}$, $R^{bb}$, and $R^{cc}$ are as defined herein, with the proviso that the nitrogen atom directly attached to the parent molecule is not substituted with hydrogen.

The term "trisubstituted amino" refers to an amino group wherein the nitrogen atom directly attached to the parent molecule is substituted with three groups, and includes groups selected from —$N(R^{bb})_3$ and —$N(R^{bb})_3{}^+X^-$, wherein $R^{bb}$ and $X^-$ are as defined herein.

The term "amino" refers to the group —$NH_2$. The term "substituted amino," by extension, refers to a monosubstituted amino, a disubstituted amino, or a trisubstituted amino. In certain embodiments, the "substituted amino" is a monosubstituted amino or a disubstituted amino group.

Affixing the suffix "-ene" to a group indicates the group is a divalent moiety, e.g., alkylene is the divalent moiety of alkyl, alkenylene is the divalent moiety of alkenyl, alkynylene is the divalent moiety of alkynyl, heteroalkylene is the divalent moiety of heteroalkyl, heteroalkenylene is the divalent moiety of heteroalkenyl, heteroalkynylene is the divalent moiety of heteroalkynyl, carbocyclylene is the divalent moiety of carbocyclyl, heterocyclylene is the divalent moiety of heterocyclyl, arylene is the divalent moiety of aryl, and heteroarylene is the divalent moiety of heteroaryl.

A group is optionally substituted unless expressly provided otherwise. The term "optionally substituted" refers to being substituted or unsubstituted. In certain embodiments, alkyl, alkenyl, alkynyl, heteroalkyl, heteroalkenyl, heteroalkynyl, carbocyclyl, heterocyclyl, aryl, and heteroaryl groups are optionally substituted. "Optionally substituted" refers to a group which may be substituted or unsubstituted (e.g., "substituted" or "unsubstituted" alkyl, "substituted" or "unsubstituted" alkenyl, "substituted" or "unsubstituted" alkynyl, "substituted" or "unsubstituted" heteroalkyl, "substituted" or "unsubstituted" heteroalkenyl, "substituted" or "unsubstituted" heteroalkynyl, "substituted" or "unsubstituted" carbocyclyl, "substituted" or "unsubstituted" heterocyclyl, "substituted" or "unsubstituted" aryl or "substituted" or "unsubstituted" heteroaryl group). In general, the term "substituted" means that at least one hydrogen present on a group is replaced with a permissible substituent, e.g., a substituent which upon substitution results in a stable compound, e.g., a compound which does not spontaneously undergo transformation such as by rearrangement, cyclization, elimination, or other reaction.

Unless otherwise indicated, a "substituted" group has a substituent at one or more substitutable positions of the group, and when more than one position in any given structure is substituted, the substituent is either the same or different at each position. The term "substituted" is contemplated to include substitution with all permissible substituents of organic compounds, and includes any of the substituents described herein that results in the formation of a stable compound. The present invention contemplates any and all such combinations in order to arrive at a stable compound. For purposes of this invention, heteroatoms such as nitrogen may have hydrogen substituents and/or any suitable substituent as described herein which satisfy the valencies of the heteroatoms and results in the formation of a stable moiety. The invention is not intended to be limited in any manner by the exemplary substituents described herein.

Exemplary carbon atom substituents include halogen, —CN, —NO$_2$, —N$_3$, —SO$_2$H, —SO$_3$H, —OH, —OR$^{aa}$, —ON(R$^{bb}$)$_2$, —N(R$^{bb}$)$_2$, —N(R$^{bb}$)$_3$$^+$X$^-$, —N(OR$^{cc}$)R$^{bb}$, —SH, —SR$^{aa}$, —SSR$^{cc}$, —C(=O)R$^{aa}$, —CO$_2$H, —CHO, —C(OR$^{cc}$)$_2$, —CO$_2$R$^{aa}$, —OC(=O)R$^{aa}$, —OCO$_2$R$^{aa}$, —C(=O)N(R$^{bb}$)$_2$, —OC(=O)N(R$^{bb}$)$_2$, —NR$^{bb}$C(=O)R$^{aa}$, —NR$^{bb}$CO$_2$R$^{aa}$, —NR$^{bb}$C(=O)N(R$^{bb}$)$_2$, —C(=NR$^{bb}$)R$^{aa}$, —C(=NR$^{bb}$)OR$^{aa}$, —OC(=NR$^{bb}$)R$^{aa}$, —OC(=NR$^{bb}$)OR$^{aa}$, —C(=NR$^{bb}$)N(R$^{bb}$)$_2$, —OC(=NR$^{bb}$)N(R$^{bb}$)$_2$, —NR$^{bb}$C(=NR$^{bb}$)N(R$^{bb}$)$_2$, —C(=O)NR$^{bb}$SO$_2$R$^{aa}$, —NR$^{bb}$SO$_2$R$^{aa}$, —SO$_2$N(R$^{bb}$)$_2$, —SO$_2$R$^{aa}$, —SO$_2$OR$^{aa}$, —OSO$_2$R$^{aa}$, —S(=O)R$^{aa}$, —OS(=O)R$^{aa}$, —Si(R$^{aa}$)$_3$, —OSi(R$^{aa}$)$_3$ —C(=S)N(R$^{bb}$)$_2$, —C(=O)SR$^{aa}$, —C(=S)SR$^{aa}$, —SC(=S)SR$^{aa}$, —SC(=O)SR$^{aa}$, —OC(=O)SR$^{aa}$, —SC(=O)OR$^{aa}$, —SC(=O)R$^{aa}$, —P(=O)(R$^{aa}$)$_2$, —P(=O)(OR$^{cc}$)$_2$, —OP(=O)(R$^{aa}$)$_2$, —OP(=O)(OR$^{cc}$)$_2$, —P(=O)(N(R$^{bb}$)$_2$)$_2$, —OP(=O)(N(R$^{bb}$)$_2$)$_2$, —NR$^{bb}$P(=O)(R$^{aa}$)$_2$, —NR$^{bb}$P(=O)(OR$^{cc}$)$_2$, —NR$^{bb}$P(=O)(N(R$^{bb}$)$_2$)$_2$, —P(R$^{cc}$)$_2$, —P(OR$^{cc}$)$_2$, —P(R$^{cc}$)$_3$$^+$X$^-$, —P(OR$^{cc}$)$_3$$^+$X$^-$, —P(R$^{cc}$)$_4$, —P(OR$^{cc}$)$_4$, —OP(R$^{cc}$)$_2$, —OP(R$^{cc}$)$_3$$^+$X$^-$, —OP(OR$^{cc}$)$_2$, —OP(OR$^{cc}$)$_3$$^+$X$^-$, —OP(R$^{cc}$)$_4$, —OP(OR$^{cc}$)$_4$, —B(R$^{aa}$)$_2$, —B(OR$^{cc}$)$_2$, —BR$^{aa}$(OR$^{cc}$), C$_{1-20}$ alkyl, C$_{1-20}$ perhaloalkyl, C$_{1-20}$ alkenyl, C$_{1-20}$ alkynyl, heteroC$_{1-20}$ alkyl, heteroC$_{1-20}$ alkenyl, heteroC$_{1-20}$ alkynyl, C$_{3-10}$ carbocyclyl, 3-14 membered heterocyclyl, C$_{6-14}$ aryl, and 5-14 membered heteroaryl, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups; wherein X$^-$ is a counterion;

or two geminal hydrogens on a carbon atom are replaced with the group =O, =S, =NN(R$^{bb}$)$_2$, =NNR$^{bb}$C(=O)R$^{aa}$, =NNR$^{bb}$C(=O)OR$^{aa}$, =NNR$^{bb}$S(=O)$_2$R$^{aa}$, =NR$^{bb}$, or =NOR$^{cc}$;

each instance of R$^{aa}$ is, independently, selected from C$_{1-20}$ alkyl, C$_{1-20}$ perhaloalkyl, C$_{1-20}$ alkenyl, C$_{1-20}$ alkynyl, heteroC$_{1-20}$ alkyl, heteroC$_{1-20}$alkenyl, heteroC$_{1-20}$alkynyl, C$_{3-10}$ carbocyclyl, 3-14 membered heterocyclyl, C$_{6-14}$ aryl, and 5-14 membered heteroaryl, or two R$^{aa}$ groups are joined to form a 3-14 membered heterocyclyl or 5-14 membered heteroaryl ring, wherein each of the alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups;

each instance of R$^{bb}$ is, independently, selected from hydrogen, —OH, —OR$^{aa}$, —N(R$^{cc}$)$_2$, —CN, —C(=O)R$^{aa}$, —C(=O)N(R$^{cc}$)$_2$, —CO$_2$R$^{aa}$, —SO$_2$R$^{aa}$, —C(=NR$^{cc}$)OR$^{aa}$, —C(=NR$^{cc}$)N(R$^{cc}$)$_2$, —SO$_2$N(R$^{cc}$)$_2$, —SO$_2$R$^{aa}$, —SO$_2$OR$^{cc}$, —SOR$^{aa}$, —C(=S)N(R$^{cc}$)$_2$, —C(=O)SR$^{cc}$, —C(=S)SR$^{cc}$, —P(=O)(R$^{cc}$)$_2$, —P(=O)(OR$^{cc}$)$_2$, —P(=O)(N(R$^{cc}$)$_2$)$_2$, C$_{1-20}$ alkyl, C$_{1-20}$ perhaloalkyl, C$_{1-20}$ alkenyl, C$_{1-20}$ alkynyl, heteroC$_{1-20}$alkyl, heteroC$_{1-20}$alkenyl, heteroC$_{1-20}$alkynyl, C$_{3-10}$ carbocyclyl, 3-14 membered heterocyclyl, C$_{6-14}$ aryl, and 5-14 membered heteroaryl, or two R$^{bb}$ groups are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups;

each instance of R$^{cc}$ is, independently, selected from hydrogen, C$_{1-20}$ alkyl, C$_{1-20}$ perhaloalkyl, C$_{1-20}$ alkenyl, C$_{1-20}$ alkynyl, heteroC$_{1-20}$ alkyl, heteroC$_{1-20}$ alkenyl, heteroC$_{1-20}$ alkynyl, C$_{3-10}$ carbocyclyl, 3-14 membered heterocyclyl, C$_{6-14}$ aryl, and 5-14 membered heteroaryl, or two R$^{cc}$ groups are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups;

each instance of R$^{dd}$ is, independently, selected from halogen, —CN, —NO$_2$, —N$_3$, —SO$_2$H, —SO$_3$H, —OH, —OR$^{ee}$, —ON(R$^{ff}$)$_2$, —N(R$^{ff}$)$_2$, —N(R$^{ff}$)$_3$$^+$X$^-$, —N(OR$^{ee}$)R$^{ff}$, —SH, —SR$^{ee}$, —SSR$^{ee}$, —C(=O)R$^{ee}$, —CO$_2$H, —CO$_2$R$^{ee}$, —OC(=O)R$^{ee}$, —OCO$_2$R$^{ee}$, —C(=O)N(R$^{ff}$)$_2$, —OC(=O)N(R$^{ff}$)$_2$, —NR$^{ff}$C(=O)R$^{ee}$, —NR$^{ff}$CO$_2$R$^{ee}$, —NR$^{ff}$C(=O)N(R$^{ff}$)$_2$, —C(=NR$^{ff}$)OR$^{ee}$, —OC(=NR$^{ff}$)R$^{ee}$, —OC(=NR$^{ff}$)OR$^{ee}$, —C(=NR$^{ff}$)N(R$^{ff}$)$_2$, —OC(=NR$^{ff}$)N(R$^{ff}$)$_2$, —NR$^{ff}$C(=NR$^{ff}$)N(R$^{ff}$)$_2$, —NR$^{ff}$SO$_2$R$^{ee}$, —SO$_2$N(R$^{ff}$)$_2$, —SO$_2$R$^{ee}$, —SO$_2$OR$^{ee}$, —OSO$_2$R$^{ee}$, —S(=O)R$^{ee}$, —Si(R$^{ee}$)$_3$, —OSi(R$^{ee}$)$_3$, —C(=S)N(R$^{ff}$)$_2$, —C(=O)SR$^{ee}$, —C(=S)SR$^{ee}$, —SC(=S)SR$^{ee}$, —P(=O)(OR$^{ee}$)$_2$, —P(=O)(R$^{ee}$)$_2$, —OP(=O)(R$^{ee}$)$_2$, —OP(=O)(OR$^{ee}$)$_2$, C$_{1-10}$ alkyl, C$_{1-10}$ perhaloalkyl, C$_{1-10}$ alkenyl, C$_{1-10}$ alkynyl, heteroC$_{1-10}$alkyl, heteroC$_{1-10}$alkenyl, heteroC$_{1-10}$alkynyl, C$_{3-10}$ carbocyclyl, 3-10 membered heterocyclyl, C$_{6-10}$ aryl, 5-10 membered heteroaryl, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{gg}$ groups, or two geminal R$^{dd}$ substituents can be joined to form O or =S; wherein X$^-$ is a counterion;

each instance of R$^{ee}$ is, independently, selected from C$_{1-10}$ alkyl, C$_{1-10}$ perhaloalkyl, C$_{1-10}$ alkenyl, C$_{1-10}$ alkynyl, heteroC$_{1-10}$ alkyl, heteroC$_{1-10}$ alkenyl, heteroC$_{1-10}$ alkynyl, C$_{3-10}$ carbocyclyl, C$_{6-10}$ aryl, 3-10 membered heterocyclyl, and 3-10 membered heteroaryl, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{gg}$ groups; each instance of R$^f$ is, independently, selected from hydrogen, C$_{1-10}$ alkyl, C$_{1-10}$ perhaloalkyl, C$_{1-10}$ alkenyl, C$_{1-10}$ alkynyl, heteroC$_{1-10}$ alkyl, heteroC$_{1-10}$ alkenyl, heteroC$_{1-10}$ alkynyl, C$_{3-10}$ carbocyclyl, 3-10 membered heterocyclyl, C$_{6-10}$ aryl and 5-10 membered heteroaryl, or two R$^f$ groups are joined to form a 3-10 membered heterocyclyl or 5-10 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{gg}$ groups;

each instance of R$^{gg}$ is, independently, halogen, —CN, —NO$_2$, —N$_3$, —SO$_2$H, —SO$_3$H, —OH, —OC$_{1-6}$ alkyl, —ON(C$_{1-6}$ alkyl)$_2$, —N(C$_{1-6}$ alkyl)$_2$, —N(C$_{1-6}$ alkyl)$_3$$^+$X$^-$, —NH(C$_{1-6}$ alkyl)$_2$$^+$X$^-$, —NH$_2$(C$_{1-6}$ alkyl)$^+$X$^-$, —NH$_3$$^+$X$^-$, —N(OC$_{1-6}$ alkyl)(C$_{1-6}$ alkyl), —N(OH)(C$_{1-6}$ alkyl), —NH(OH), —SH, —SC$_{1-6}$ alkyl, —SS(C$_{1-6}$ alkyl), —C(=O)(C$_{1-6}$ alkyl), —CO$_2$H, —CO$_2$(C$_{1-6}$ alkyl), —OC(=O)(C$_{1-6}$ alkyl), —OCO$_2$(C$_{1-6}$ alkyl), —C(=O)NH$_2$, —C(=O)N(C$_{1-6}$ alkyl)$_2$, —OC(=O)NH(C$_{1-6}$ alkyl), —NHC(=O)(C$_{1-6}$ alkyl), —N(C$_{1-6}$ alkyl)C(=O)(C$_{1-6}$ alkyl), —NHCO$_2$ (C$_{1-6}$ alkyl), —NHC(=O)N(C$_{1-6}$ alkyl)$_2$, —NHC (=O)NH(C$_{1-6}$ alkyl), —NHC(=O)NH$_2$, —C(=NH) O(C$_{1-6}$ alkyl), —OC(=NH)(C$_{1-6}$ alkyl), —OC(=NH) OC$_{1-6}$ alkyl, —C(=NH)N(C$_{1-6}$ alkyl)$_2$, —C(=NH) NH(C$_{1-6}$ alkyl), —C(=NH)NH$_2$, —OC(=NH)N(C$_{1-6}$ alkyl)$_2$, —OC(NH)NH(C$_{1-6}$ alkyl), —OC(NH)NH$_2$, —NHC(NH)N(C$_{1-6}$ alkyl)$_2$, —NHC(=NH)NH$_2$, —NHSO$_2$(C$_{1-6}$ alkyl), —SO$_2$N(C$_{1-6}$ alkyl)$_2$, —SO$_2$NH (C$_{1-6}$ alkyl), —SO$_2$NH$_2$, —SO$_2$C$_{1-6}$ alkyl, —SO$_2$OC$_{1-6}$ alkyl, —OSO$_2$C$_{1-6}$ alkyl, —SOC$_{1-6}$ alkyl, —Si(C$_{1-6}$ alkyl)$_3$, —OSi(C$_{1-6}$ alkyl)$_3$-C(=S)N(C$_{1-6}$ alkyl)$_2$, C(=S)NH(C$_{1-6}$ alkyl), C(=S)NH$_2$, —C(=O)S(C$_{1-6}$ alkyl), —C(=S)SC$_{1-6}$ alkyl, —SC(=S)SC$_{1-6}$ alkyl, —P(=O)(OC$_{1-6}$ alkyl)$_2$, —P(=O)(C$_{1-6}$ alkyl)$_2$, —OP (=O)(C$_{1-6}$ alkyl)$_2$, —OP(=O)(OC$_{1-6}$ alkyl)$_2$, C$_{1-10}$ alkyl, C$_{1-10}$ perhaloalkyl, C$_{1-10}$ alkenyl, C$_{1-10}$ alkynyl, heteroC$_{1-10}$ alkyl, heteroC$_{1-10}$ alkenyl, heteroC$_{1-10}$ alkynyl, C$_{3-10}$ carbocyclyl, C$_{6-10}$ aryl, 3-10 membered heterocyclyl, or 5-10 membered heteroaryl; or two geminal R$^{gg}$ substituents can be joined to form =O or =S; and each X$^-$ is a counterion.

In certain embodiments, the carbon atom substituents are independently halogen, substituted (e.g., substituted with one or more halogen) or unsubstituted C$_{1-6}$ alkyl, —OR$^{aa}$, —SR, —N(R$^{bb}$)$_2$, —CN, —SCN, —NO$_2$, —C(=O)R$^{aa}$, —CO$_2$R$^{aa}$, —C(=O)N(R$^{bb}$)$_2$, —OC(=O)R$^{aa}$, —OCO$_2$R$^{aa}$, —OC(=O)N(R$^{bb}$)$_2$, —NR$^{bb}$C(=O)R$^{aa}$, —NR$^{bb}$CO$_2$R$^{aa}$, or —NR$^{bb}$C(=O)N(R$^{bb}$)$_2$. In certain embodiments, the carbon atom substituents are independently halogen, substituted (e.g., substituted with one or more halogen) or unsubstituted C$_{1-10}$ alkyl, —OR$^{aa}$, —SR$^a$, —N(R$^{bb}$)$_2$, —CN, —SCN, —NO$_2$, —C(=O)R$^{aa}$, —CO$_2$R$^{aa}$, —C(=O)N(R$^{bb}$)$_2$, —OC(=O)R$^{aa}$, —OCO$_2$R$^{aa}$, —OC(=O)N(R$^{bb}$)$_2$, —NR$^{bb}$C(=O)R$^{aa}$, —NR$^{bb}$CO$_2$R$^{aa}$, or —NR$^{bb}$C(=O)N(R$^{bb}$)$_2$, wherein R$^{aa}$ is hydrogen, substituted (e.g., substituted with one or more halogen) or unsubstituted C$_{1-10}$ alkyl, an oxygen protecting group (e.g., silyl, TBDPS, TBDMS, TIPS, TES, TMS, MOM, THP, t-Bu, Bn, allyl, acetyl, pivaloyl, or benzoyl) when attached to an oxygen atom, or a sulfur protecting group (e.g., acetamidomethyl, t-Bu, 3-nitro-2-pyridine sulfenyl, 2-pyridine-sulfenyl, or triphenylmethyl) when attached to a sulfur atom; and each R$^{bb}$ is independently hydrogen, substituted (e.g., substituted with one or more halogen) or unsubstituted C$_{1-10}$ alkyl, or a nitrogen protecting group (e.g., Bn, Boc, Cbz, Fmoc, trifluoroacetyl, triphenylmethyl, acetyl, or Ts). In certain embodiments, the carbon atom substituents are independently halogen, substituted (e.g., substituted with one or more halogen) or unsubstituted C$_{1-6}$ alkyl, —OR$^{aa}$, —SR$^a$, —N(R$^{bb}$)$_2$, —CN, —SCN, or —NO$_2$. In certain embodiments, the carbon atom substituents are independently halogen, substituted (e.g., substituted with one or more halogen moieties) or unsubstituted C$_{1-10}$ alkyl, —OR$^{aa}$, —SR$^{aa}$, —N(R$^{bb}$)$_2$, —CN, —SCN, or —NO$_2$, wherein R$^{aa}$ is hydrogen, substituted (e.g., substituted with one or more halogen) or unsubstituted C$_{1-10}$ alkyl, an oxygen protecting group (e.g., silyl, TBDPS, TBDMS, TIPS, TES, TMS, MOM, THP, t-Bu, Bn, allyl, acetyl, pivaloyl, or benzoyl) when attached to an oxygen atom, or a sulfur protecting group (e.g., acetamidomethyl, t-Bu, 3-nitro-2-pyridine sulfenyl, 2-pyridine-sulfenyl, or triphenylmethyl) when attached to a sulfur atom; and each R$^{bb}$ is independently hydrogen, substituted (e.g., substituted with one or more halogen) or unsubstituted C$_{1-10}$ alkyl, or a nitrogen protecting group (e.g., Bn, Boc, Cbz, Fmoc, trifluoroacetyl, triphenylmethyl, acetyl, or Ts).

Nitrogen atoms can be substituted or unsubstituted as valency permits, and include primary, secondary, tertiary, and quaternary nitrogen atoms. Exemplary nitrogen atom substituents include hydrogen, —OH, —OR$^{aa}$, —N(R$^{cc}$)$_2$, —CN, —C(=O)R$^{aa}$, —C(=O)N(R$^{cc}$)$_2$, —CO$_2$R$^{aa}$, —SO$_2$R$^{aa}$, —C(=NR$^{bb}$)R$^{aa}$, —C(=NR$^{cc}$)OR$^{aa}$, —C(=NR$^{cc}$)N(R$^{cc}$)$_2$, —SO$_2$N(R$^{cc}$)$_2$, —SO$_2$R$^{aa}$, —SO$_2$OR$^{cc}$, —SOR$^{aa}$, —C(=S)N(R$^{cc}$)$_2$, —C(=O)SR$^{cc}$, —C(=S)SR$^{cc}$, —P(=O)(OR$^{cc}$)$_2$, —P(=O)(R$^{cc}$)$_2$, —P(=O)(N(R$^{cc}$)$_2$)$_2$, C$_{1-20}$ alkyl, C$_{1-20}$ perhaloalkyl, C$_{1-20}$ alkenyl, C$_{1-20}$ alkynyl, hetero C$_{1-20}$ alkyl, hetero C$_{1-20}$ alkenyl, hetero C$_{1-20}$ alkynyl, C$_{3-10}$ carbocyclyl, 3-14 membered heterocyclyl, C$_{6-14}$ aryl, and 5-14 membered heteroaryl, or two R$^{cc}$ groups attached to an N atom are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups, and wherein R$^{aa}$, R$^{bb}$, R$^{cc}$ and Rad are as defined above.

In certain embodiments, the nitrogen atom substituents are independently substituted (e.g., substituted with one or more halogen) or unsubstituted C$_{1-6}$ alkyl, —C(=O)R$^{aa}$, —CO$_2$R$^{aa}$, —C(=O)N(R$^{bb}$)$_2$, or a nitrogen protecting group. In certain embodiments, the nitrogen atom substituents are independently substituted (e.g., substituted with one or more halogen) or unsubstituted C$_{1-10}$ alkyl, —C(=O)R$^{aa}$, —CO$_2$R$^{aa}$, —C(=O)N(R$^{bb}$)$_2$, or a nitrogen protecting group, wherein R$^{aa}$ is hydrogen, substituted (e.g., substituted with one or more halogen) or unsubstituted C$_{1-10}$ alkyl, or an oxygen protecting group when attached to an oxygen atom; and each R$^{bb}$ is independently hydrogen, substituted (e.g., substituted with one or more halogen) or unsubstituted C$_{1-10}$ alkyl, or a nitrogen protecting group. In certain embodiments, the nitrogen atom substituents are independently substituted (e.g., substituted with one or more halogen) or unsubstituted C$_{1-6}$ alkyl or a nitrogen protecting group.

In certain embodiments, the substituent present on the nitrogen atom is an nitrogen protecting group (also referred to herein as an "amino protecting group"). Nitrogen protecting groups include —OH, —OR$^{aa}$, —N(R$^{cc}$)$_2$, —C(=O)R$^{aa}$, —C(=O)N(R$^{cc}$)$_2$, —CO$_2$R$^{aa}$, —SO$_2$R$^{aa}$, —C(=NR$^{cc}$)R$^{aa}$, —C(=NR$^{cc}$)OR$^{aa}$, —C(=NR$^{cc}$) N(R$^{cc}$)$_2$, —SO$_2$N(R$^{cc}$)$_2$, —SO$_2$R$^{aa}$, —SO$_2$OR$^{cc}$, —SOR$^{aa}$, —C(=S)N(R$^{cc}$)$_2$, —C(=O)SR$^{cc}$, —C(=S)SR$^{cc}$, C$_{1-10}$ alkyl (e.g., aralkyl, heteroaralkyl), C$_{1-20}$ alkenyl, C$_{1-20}$ alkynyl, hetero C$_{1-20}$ alkyl, hetero C$_{1-20}$ alkenyl, hetero C$_{1-20}$ alkynyl, C$_{3-10}$ carbocyclyl, 3-14 membered heterocyclyl, C$_{6-14}$ aryl, and 5-14 membered heteroaryl groups, wherein each alkyl, alkenyl, alkynyl, heteroalkyl, heteroalkenyl, heteroalkynyl, carbocyclyl, heterocyclyl, aralkyl, aryl, and heteroaryl is independently substituted with 0, 1, 2, 3, 4, or 5 R$^{dd}$ groups, and wherein R$^{aa}$, R$^{bb}$, R$^{cc}$ and R$^{dd}$ are as defined herein. Nitrogen protecting groups are well known in the art and include those described in detail in *Protecting Groups in Organic Synthesis*, T. W. Greene and P. G. M. Wuts, 3$^{rd}$ edition, John Wiley & Sons, 1999, incorporated herein by reference.

In certain embodiments, the nitrogen protecting groups include Bn, Boc, Cbz, Fmoc, trifluoroacetyl, triphenylmethyl, acetyl, or Ts.

In certain embodiments, the oxygen atom substituents are independently substituted (e.g., substituted with one or more halogen) or unsubstituted C$_{1-10}$ alkyl, —C(=O)R$^{aa}$, —CO$_2$R$^{aa}$, —C(=O)N(R$^{bb}$)$_2$, or an oxygen protecting group. In certain embodiments, the oxygen atom substituents are independently substituted (e.g., substituted with one or more halogen) or unsubstituted $C_{1-6}$ alkyl, $—C(=O)R^{aa}$, $—CO_2R^{aa}$, $—C(=O)N(R^{bb})_2$, or an oxygen protecting group, wherein $R^{aa}$ is hydrogen, substituted (e.g., substituted with one or more halogen) or unsubstituted $C_{1-10}$ alkyl, or an oxygen protecting group when attached to an oxygen atom; and each $R^{bb}$ is independently hydrogen, substituted (e.g., substituted with one or more halogen) or unsubstituted $C_{1-10}$ alkyl, or a nitrogen protecting group. In certain embodiments, the oxygen atom substituents are independently substituted (e.g., substituted with one or more halogen) or unsubstituted $C_{1-6}$ alkyl or an oxygen protecting group.

In certain embodiments, the substituent present on an oxygen atom is an oxygen protecting group (also referred to herein as an "hydroxyl protecting group"). Oxygen protecting groups include $—R^{aa}$, $—N(R^{bb})_2$, $—C(=O)SR^{aa}$, $—C(=O)R^{aa}$, $—CO_2R^{aa}$, $—C(=O)N(R^{bb})_2$, $—C(=NR^{bb})R^{aa}$, $—C(=NR^{bb})OR^{aa}$, $—C(=NR^{bb})N(R^{bb})_2$, $—S(=O)R^{aa}$, $—SO_2R^{aa}$, $—Si(R^{cc})_3$, $—P(R^{cc})_2$, $—P(R^{cc})_3{}^+X^-$, $—P(OR^{cc})_2$, $—P(OR^{cc})_3{}^+X^-$, $—P(=O)(R^{aa})_2$, $—P(=O)(OR^{cc})_2$, and $—P(=O)(N(R^{bb})2)_2$, wherein $X^-$, $R^{aa}$, $R^{bb}$, and $R^{cc}$ are as defined herein. Oxygen protecting groups are well known in the art and include those described in detail in *Protecting Groups in Organic Synthesis*, T. W. Greene and P. G. M. Wuts, 3rd edition, John Wiley & Sons, 1999, incorporated herein by reference.

In certain embodiments, an oxygen protecting group is silyl, TBDPS, TBDMS, TIPS, TES, TMS, MOM, THP, t-Bu, Bn, allyl, acetyl, pivaloyl, or benzoyl.

In certain embodiments, the sulfur atom substituents are independently substituted (e.g., substituted with one or more halogen) or unsubstituted $C_{1-10}$ alkyl, $—C(=O)R^{aa}$, $—CO_2R^{aa}$, $—C(=O)N(R^{bb})_2$, or a sulfur protecting group. In certain embodiments, the sulfur atom substituents are independently substituted (e.g., substituted with one or more halogen) or unsubstituted $C_{1-10}$ alkyl, $—C(=O)R^{aa}$, $—CO_2R^{aa}$, $—C(=O)N(R^{bb})_2$, or a sulfur protecting group, wherein $R^{aa}$ is hydrogen, substituted (e.g., substituted with one or more halogen) or unsubstituted $C_{1-10}$ alkyl, or an oxygen protecting group when attached to an oxygen atom; and each $R^{bb}$ is independently hydrogen, substituted (e.g., substituted with one or more halogen) or unsubstituted $C_{1-10}$ alkyl, or a nitrogen protecting group. In certain embodiments, the sulfur atom substituents are independently substituted (e.g., substituted with one or more halogen) or unsubstituted $C_{1-6}$ alkyl or a sulfur protecting group.

In certain embodiments, the substituent present on a sulfur atom is a sulfur protecting group (also referred to as a "thiol protecting group"). Sulfur protecting groups include $—R^{aa}$, $—N(R^{bb})_2$, $—C(=O)SR^{aa}$, $—C(=O)R^{aa}$, $—CO_2R^{aa}$, $—C(=O)N(R^{bb})_2$, $—C(=NR^{bb})R^{aa}$, $—C(=NR^{bb})OR^{aa}$, $—C(=NR^{bb})N(R^{bb})_2$, $—S(=O)R^{aa}$, $—SO_2R^{aa}$, $—Si(R^{aa})_3$, $—P(R^{cc})_2$, $—P(R^{cc})_3{}^+X^-$, $—P(OR^{cc})_2$, $—P(OR^{cc})_3{}^+X^-$, $—P(=O)(R^{cc})_2$, $—P(=O)(OR^{cc})_2$, and $—P(=O)(N(R^{bb})_2)_2$, wherein $R^a$, $R^{bb}$, and $R^{cc}$ are as defined herein. Sulfur protecting groups are well known in the art and include those described in detail in *Protecting Groups in Organic Synthesis*, T. W. Greene and P. G. M. Wuts, 3rd edition, John Wiley & Sons, 1999, incorporated herein by reference.

In certain embodiments, the molecular weight of a substituent is lower than 250, lower than 200, lower than 150, lower than 100, or lower than 50 g/mol. In certain embodiments, a substituent consists of carbon, hydrogen, fluorine, chlorine, bromine, iodine, oxygen, sulfur, nitrogen, and/or silicon atoms. In certain embodiments, a substituent consists of carbon, hydrogen, fluorine, chlorine, bromine, iodine, oxygen, sulfur, and/or nitrogen atoms. In certain embodiments, a substituent consists of carbon, hydrogen, fluorine, chlorine, bromine, and/or iodine atoms. In certain embodiments, a substituent consists of carbon, hydrogen, fluorine, and/or chlorine atoms. In certain embodiments, a substituent comprises 0, 1, 2, or 3 hydrogen bond donors. In certain embodiments, a substituent comprises 0, 1, 2, or 3 hydrogen bond acceptors.

Use of the phrase "at least one instance" refers to 1, 2, 3, 4, or more instances, but also encompasses a range, e.g., for example, from 1 to 4, from 1 to 3, from 1 to 2, from 2 to 4, from 2 to 3, or from 3 to 4 instances, inclusive.

The term "particle" refers to a small object, fragment, or piece of a substance that may be a single element, inorganic material, organic material, or mixture thereof. Examples of particles include polymeric particles, single-emulsion particles, double-emulsion particles, coacervates, liposomes, microparticles, nanoparticles, macroscopic particles, pellets, crystals, aggregates, composites, pulverized, milled or otherwise disrupted matrices, and cross-linked protein or polysaccharide particles, each of which have an average characteristic dimension of about less than about 1 mm and at least 1 nm, where the characteristic dimension, or "critical dimension," of the particle is the smallest cross-sectional dimension of the particle. A particle may be composed of a single substance or multiple substances. In certain embodiments, the particle is not a viral particle. In other embodiments, the particle is not a liposome. In certain embodiments, the particle is not a micelle. In certain embodiments, the particle is substantially solid throughout. In certain embodiments, the particle is a nanoparticle. In certain embodiments, the particle is a microparticle.

The term "nanoparticle" refers to a particle having an average (e.g., mean) dimension (e.g., diameter) of between about 1 nanometer (nm) and about 1 micrometer (μm) (e.g., between about 1 nm and about 300 nm, between about 1 nm and about 100 nm, between about 1 nm and about 30 nm, between about 1 nm and about 10 nm, or between about 1 nm and about 3 nm), inclusive.

The term "microparticle" refers to a particle having an average (e.g., mean) dimension (e.g., diameter) of between about 1 micrometer (μm) and about 1 millimeter (mm) (e.g., between about 1 μm and about 100 μm, between about 1 μm and about 30 μm, between about 1 μm and about 10 μm, or between about 1 μm and about 3 μm), inclusive.

The terms "composition" and "formulation" are used interchangeably.

A "subject" to which administration is contemplated refers to a human (i.e., male or female of any age group, e.g., pediatric subject (e.g., infant, child, or adolescent) or adult subject (e.g., young adult, middle-aged adult, or senior adult)) or non-human animal. In certain embodiments, the non-human animal is a mammal (e.g., primate (e.g., cynomolgus monkey or rhesus monkey), commercially relevant mammal (e.g., cattle, pig, horse, sheep, goat, cat, or dog), or bird (e.g., commercially relevant bird, such as chicken, duck, goose, or turkey)). In certain embodiments, the non-human animal is a fish, reptile, or amphibian. The non-human animal may be a male or female at any stage of development. The non-human animal may be a transgenic animal or genetically engineered animal. The term "patient" refers to a human subject in need of treatment of a disease.

The term "administer," "administering," or "administration" refers to implanting, absorbing, ingesting, injecting, inhaling, or otherwise introducing a compound described herein, or a composition thereof, in or on a subject.

The terms "treatment," "treat," and "treating" refer to reversing, alleviating, delaying the onset of, or inhibiting the progress of a disease described herein. In some embodiments, treatment may be administered after one or more signs or symptoms of the disease have developed or have been observed. In other embodiments, treatment may be administered in the absence of signs or symptoms of the disease. For example, treatment may be administered to a susceptible subject prior to the onset of symptoms (e.g., in light of a history of symptoms and/or in light of exposure to a pathogen). Treatment may also be continued after symptoms have resolved, for example, to delay or prevent recurrence.

The terms "condition," "disease," and "disorder" are used interchangeably.

An "effective amount" of a compound described herein refers to an amount sufficient to elicit the desired biological response. An effective amount of a compound described herein may vary depending on such factors as the desired biological endpoint, the pharmacokinetics of the compound, the condition being treated, the mode of administration, and the age and health of the subject. In certain embodiments, an effective amount is a therapeutically effective amount. In certain embodiments, an effective amount is a prophylactic treatment. In certain embodiments, an effective amount is the amount of a compound described herein in a single dose. In certain embodiments, an effective amount is the combined amounts of a compound described herein in multiple doses.

A "therapeutically effective amount" of a compound described herein is an amount sufficient to provide a therapeutic benefit in the treatment of a condition or to delay or minimize one or more symptoms associated with the condition. A therapeutically effective amount of a compound means an amount of therapeutic agent, alone or in combination with other therapies, which provides a therapeutic benefit in the treatment of the condition. The term "therapeutically effective amount" can encompass an amount that improves overall therapy, reduces or avoids symptoms, signs, or causes of the condition, and/or enhances the therapeutic efficacy of another therapeutic agent.

A "prophylactically effective amount" of a compound described herein is an amount sufficient to prevent a condition, or one or more symptoms associated with the condition or prevent its recurrence. A prophylactically effective amount of a compound means an amount of a therapeutic agent, alone or in combination with other agents, which provides a prophylactic benefit in the prevention of the condition. The term "prophylactically effective amount" can encompass an amount that improves overall prophylaxis or enhances the prophylactic efficacy of another prophylactic agent.

These and other exemplary substituents are described in more detail in the Detailed Description, Examples, and Claims. The invention is not intended to be limited in any manner by the above exemplary listing of substituents.

DETAILED DESCRIPTION OF CERTAIN EMBODIMENTS OF THE INVENTION

Before the disclosed polymers, compositions, systems, methods, uses, and kits are described in more detail, it should be understood that the aspects described herein are not limited to specific embodiments, methods, apparatus, or configurations, and as such can, of course, vary. It is also to be understood that the terminology used herein is for the purpose of describing particular aspects only and, unless specifically defined herein, is not intended to be limiting.

The present disclosure provides branched linear polymers of Formula (I):

L-(R)$_n$    (I)

or a salt thereof, wherein:
L is a substituted or unsubstituted heteroalkylene;
n is 3, 4, 5, or 6; and
each R is independently hydrogen, Formula (II), or Formula (III);
Formula (II) is:

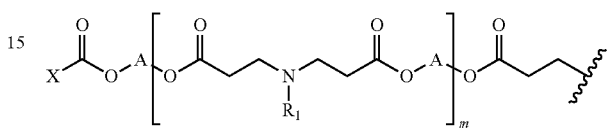

(II)

wherein:
m is an integer of 1-1000, inclusive;
A is optionally substituted alkylene or optionally substituted heteroalkylene;
X is —CH=CH$_2$, —CH$_2$CH$_2$OR$_2$, —CH$_2$CH$_2$SR$_3$, —CH$_2$CH$_2$N(R$_2$)(R$_3$), or —CH$_2$CH$_2$L(R$_4$)$_q$;
q is 2, 3, 4, or 5;
R$_1$ is optionally substituted alkyl or optionally substituted heteroalkyl;
R$_2$ is hydrogen, optionally substituted alkyl, or optionally substituted heteroalkyl;
R$_3$ is optionally substituted alkyl or optionally substituted heteroalkyl; or
R$_2$ and R$_3$ combine to form a 4-7 membered ring; and
each R$_4$ is independently hydrogen, Formula (II), or Formula (III);
Formula (III) is:

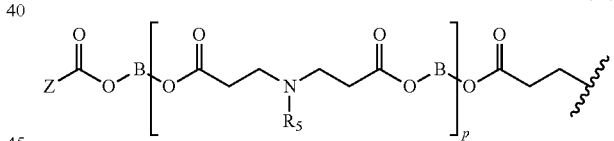

(III)

wherein:
p is an integer of 1-1000, inclusive;
B is optionally substituted alkylene or optionally substituted heteroalkylene;
Z is —CH=CH$_2$, —CH$_2$CH$_2$OR$_6$, —CH$_2$CH$_2$SR$_7$, —CH$_2$CH$_2$N(R$_6$)(R$_7$), or —CH$_2$CH$_2$L(R$_8$)$_v$;
v is 2, 3, 4, or 5;
R$_5$ is optionally substituted alkyl or optionally substituted heteroalkyl;
R$_6$ is hydrogen, optionally substituted alkyl, or optionally substituted heteroalkyl;
R$_7$ is optionally substituted alkyl or optionally substituted heteroalkyl; or
R$_6$ and R$_7$ combine to form a 4-7 membered ring; and
each R$_8$ is independently hydrogen, Formula (II), or Formula (III);
provided that at least one R is Formula (II) or Formula (III), and provided that Formula (II) and Formula (III) are not the same.

The polymer of Formula (I) described herein contains a linker L. In certain embodiments, L is substituted or unsubstituted heteroalkylene. In certain embodiments, each instance of L is the same. In certain embodiments, two or more instances of L are different.

In certain embodiments, L is substituted or unsubstituted $C_{1-50}$ heteroalkylene comprising 2 or more (e.g., 2, 3, 4, 5, or 6) heteroatoms selected from the group consisting of nitrogen, sulfur, and oxygen. In certain embodiments, L is substituted or unsubstituted $C_{1-25}$ heteroalkylene comprising 2 or more (e.g., 2, 3, 4, 5, or 6) heteroatoms selected from the group consisting of nitrogen, sulfur, and oxygen. In certain embodiments, L is substituted or unsubstituted $C_{1-15}$ heteroalkylene comprising 2 or more (e.g., 2, 3, 4, 5, or 6) heteroatoms selected from the group consisting of nitrogen, sulfur, and oxygen. In certain embodiments, L is substituted or unsubstituted $C_{1-10}$ heteroalkylene comprising 2 or more (e.g., 2, 3, 4, 5, or 6) heteroatoms selected from the group consisting of nitrogen, sulfur, and oxygen. In certain embodiments, L is substituted $C_{1-50}$ heteroalkylene comprising at least 2 heteroatoms selected from the group consisting of nitrogen, sulfur, and oxygen, wherein the $C_{1-50}$ heteroalkylene is substituted with at least one $C_{1-10}$ heteroalkylene comprising 1 or more heteroatoms selected from the group consisting of nitrogen, sulfur, and oxygen.

In certain embodiments, each L is independently of the formula:

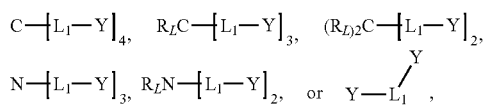

wherein each Y is independently:

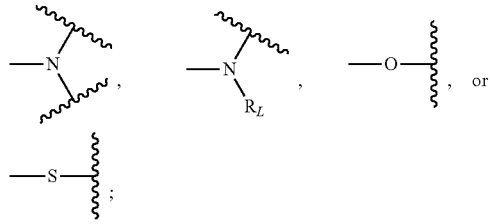

each $L_1$ is independently substituted or unsubstituted $C_{1-10}$ alkylene or substituted or unsubstituted $C_{1-10}$ heteroalkylene; and each $R_L$ is independently hydrogen, halogen, substituted or unsubstituted $C_{1-5}$ alkylene, or substituted or unsubstituted $C_{1-5}$ heteroalkylene.

In certain embodiments, L is of the formula:

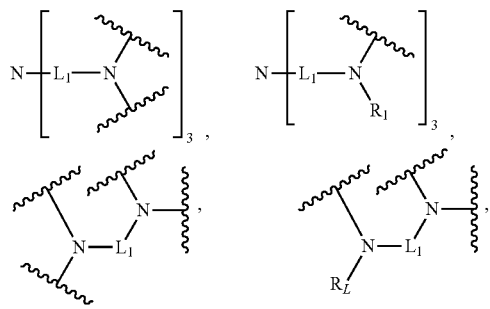

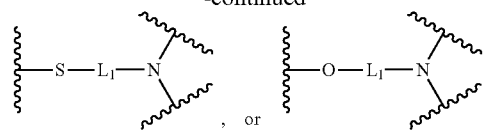

In certain embodiments, L is of the formula:

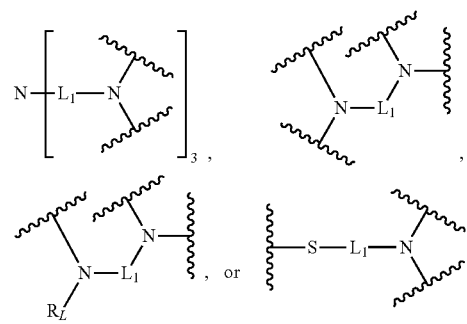

In certain embodiments, L is of the formula:

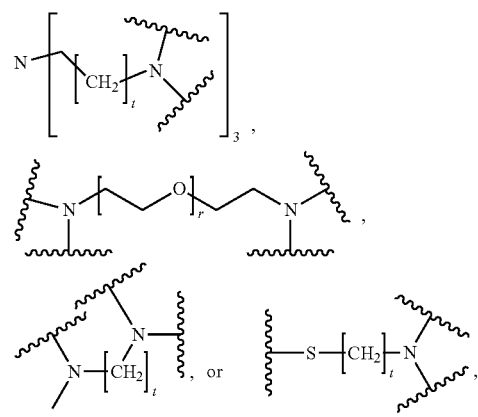

wherein t is an integer 1-10, inclusive.

In certain embodiments, L is of the formula:

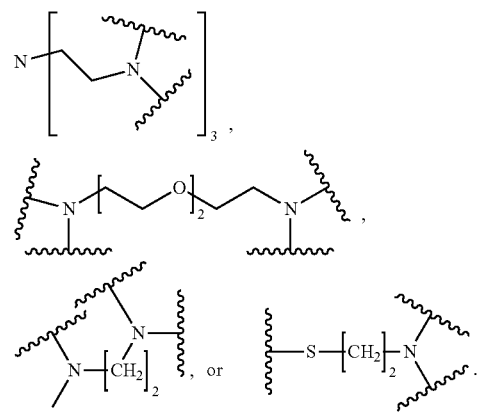

In certain embodiments, $L_1$ is methylene, ethylene, propylene, butylene, pentylene, hexylene, heptylene, or octylene.

In certain embodiments, $L_1$ comprises

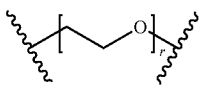

wherein r is an integer 1-10, inclusive.

In certain embodiments, $L_1$ comprises

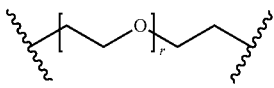

wherein r is an integer 1-10, inclusive.

The polymer of Formula (I) contains n instances of a substituent R. In certain embodiments, each R is independently hydrogen, Formula (II), or Formula (III). In certain embodiments, at least one instance of R is of Formula (II). In certain embodiments, at least one instance of R is Formula (III). In certain embodiments, at least one instance of R is of Formula (II), and at least one instance of R is of Formula (III). In certain embodiments, each instance of R is Formula (II) or Formula (III). In certain embodiments, 1, 2, or 3 instances of R are hydrogen.

In certain embodiments, n is 3, 4, 5, or 6. In certain embodiment, n is 3, 4, or 6. In certain embodiments, n is 3. In certain embodiments, n is 4. In certain embodiments, n is 5. In certain embodiments, n is 6.

In certain embodiments, Formula (II) is:

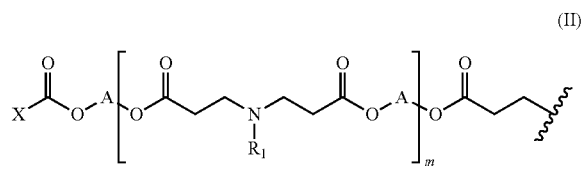

(II)

wherein:
m is an integer of 1-1000, inclusive;
A is optionally substituted alkylene or optionally substituted heteroalkylene;
X is $-CH=CH_2$, $-CH_2CH_2OR_2$, $-CH_2CH_2SR_3$, $-CH_2CH_2N(R_2)(R_3)$, or $-CH_2CH_2L(R_4)_q$;
q is 2, 3, 4, or 5;
$R_1$ is optionally substituted alkyl or optionally substituted heteroalkyl;
$R_2$ is hydrogen, optionally substituted alkyl, or optionally substituted heteroalkyl;
$R_3$ is optionally substituted alkyl or optionally substituted heteroalkyl; or
$R_2$ and $R_3$ combine to form a 4-7 membered ring; and
each $R_4$ is independently hydrogen, Formula (II), or Formula (III)

In certain embodiments, m is an integer of 1-1000, inclusive. In certain embodiments, m is 10-1000. In certain embodiments, m is 1-100. In certain embodiments, m is 10-100.

In certain embodiments, $R_1$ is optionally substituted alkyl or optionally substituted heteroalkyl. In certain embodiments, $R_1$ is optionally substituted alkyl. In certain embodiments, $R_1$ is optionally substituted heteroalkyl. In certain embodiments, $R_1$ is optionally substituted $C_{1-20}$ alkyl or optionally substituted $C_{1-20}$ heteroalkyl. In certain embodiments, $R_1$ is optionally substituted $C_{1-20}$ alkyl. In certain embodiments, $R_1$ is optionally substituted $C_{1-20}$ heteroalkyl. In certain embodiments, $R_1$ is $C_{1-10}$ alkyl or $C_{1-10}$ heteroalkyl; optionally substituted with hydroxy, hydroxymethyl, hydroxyethyl, or hydroxypropyl. In certain embodiments, $R_1$ is $C_{1-10}$ alkyl; optionally substituted with hydroxy, hydroxymethyl, hydroxyethyl, or hydroxypropyl. In certain embodiments, $R_1$ is $C_{1-10}$ heteroalkyl; optionally substituted with hydroxy, hydroxymethyl, hydroxyethyl, or hydroxypropyl. In certain embodiments, $R_1$ is hydroxymethyl, hydroxyethyl, hydroxypropyl, hydroxybutyl, hydroxypentyl, hydroxyhexyl, hydroxyheptyl, or hydroxyoctyl. In certain embodiments, $R_1$ is hydroxymethyl. In certain embodiments, $R_1$ is hydroxyethyl. In certain embodiments, $R_1$ is hydroxypropyl. In certain embodiments, $R_1$ is hydroxybutyl. In certain embodiments, $R_1$ is hydroxypentyl. In certain embodiments, $R_1$ is hydroxyhexyl. In certain embodiments, $R_1$ is hydroxyheptyl. In certain embodiments, $R_1$ is hydroxyoctyl. In certain embodiments, $R_1$ is optionally substituted hydroxymethyl, optionally substituted hydroxyethyl, optionally substituted hydroxypropyl, optionally substituted hydroxybutyl, optionally substituted hydroxypentyl, optionally substituted hydroxyhexyl, optionally substituted hydroxyheptyl, or optionally substituted hydroxyoctyl; wherein the substituent is hydroxy, hydroxymethyl, or amino. In certain embodiments, $R_1$ is optionally substituted hydroxymethyl.

In certain embodiments, $R_1$ is optionally substituted hydroxyethyl. In certain embodiments, $R_1$ is optionally substituted hydroxypropyl. In certain embodiments, $R_1$ is optionally substituted hydroxybutyl. In certain embodiments, $R_1$ is optionally substituted hydroxypentyl. In certain embodiments, $R_1$ is optionally substituted hydroxyhexyl. In certain embodiments, $R_1$ is optionally substituted hydroxyheptyl. In certain embodiments, $R_1$ is optionally substituted hydroxyoctyl. In certain embodiments, the substituent on $R_1$ is hydroxy, hydroxymethyl, or amino.

In certain embodiments, A is optionally substituted alkylene or optionally substituted heteroalkylene. In certain embodiments, A is optionally substituted alkylene. In certain embodiments, A is optionally substituted heteroalkylene. In certain embodiments, A is substituted or unsubstituted $C_{1-10}$ alkylene or substituted or unsubstituted $C_{1-10}$ heteroalkylene. In certain embodiments, A is substituted or unsubstituted $C_{1-10}$ alkylene. In certain embodiments, A is substituted or unsubstituted $C_{1-10}$ heteroalkylene. In certain embodiments, A is methylene, ethylene, propylene, butylene, pentylene, hexylene, heptylene, or octylene. In certain embodiments, A is propylene, butylene, or hexylene. In certain embodiments, A is methylene. In certain embodiments, A is ethylene. In certain embodiments, A is propylene. In certain embodiments, A is butylene. In certain embodiments, A is pentylene. In certain embodiments, A is hexylene. In certain embodiments, A is heptylene. In certain embodiments, A is octylene.

In certain embodiments, X is $-CH=CH_2$, $-CH_2CH_2OR_2$, $-CH_2CH_2SR_3$, $-CH_2CH_2N(R_2)(R_3)$, or $-CH_2CH_2L(R_4)_q$;
wherein:
q is 2, 3, 4, or 5;
$R_1$ is optionally substituted alkyl or optionally substituted heteroalkyl;
$R_2$ is hydrogen, optionally substituted alkyl, or optionally substituted heteroalkyl;
$R_3$ is optionally substituted alkyl or optionally substituted heteroalkyl; or $R_2$ and $R_3$ combine to form a 4-7 membered ring; and
each $R_4$ is independently hydrogen, Formula (II), or Formula (III).

In certain embodiments, X is —CH=CH$_2$. In certain embodiments, X is —CH$_2$CH$_2$OR$_2$. In certain embodiments, X is —CH$_2$CH$_2$SR$_3$. In certain embodiments, X is —CH$_2$CH$_2$N(R$_2$)(R$_3$). In certain embodiments, X is —CH$_2$CH$_2$L(R$_4$)g. In certain embodiments, X is —CH=CH$_2$. In certain embodiments, X is

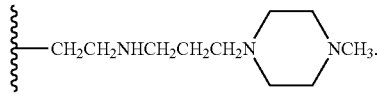

In certain embodiments, X is —CH$_2$CH$_2$L(R$_4$)$_q$, and each occurrence of L is the same. In certain embodiments, X is —CH$_2$CH$_2$L(R$_4$)$_q$, and wherein each branched poly(beta-aminoester) of Formula (I) comprises two or more unique L groups. In certain embodiments, X is —CH$_2$CH$_2$L(R$_4$)$_q$, and each occurrence of R$_4$ is the same.

In certain embodiments, R$_2$ is hydrogen, optionally substituted alkyl, or optionally substituted heteroalkyl. In certain embodiments, R$_2$ is hydrogen. In certain embodiments, R$_2$ is optionally substituted alkyl. In certain embodiments, R$_2$ is methyl.

In certain embodiments, R$_3$ is optionally substituted alkyl or optionally substituted heteroalkyl. In certain embodiments, R$_3$ is optionally substituted alkyl. In certain embodiments, R$_3$ is optionally substituted heteroalkyl. In certain embodiments, R$_3$ is optionally substituted C$_{1-20}$ alkyl or optionally substituted C$_{1-20}$ heteroalkyl. In certain embodiments, R$_3$ is C$_{1-10}$ alkyl substituted with amino, heterocyclyl, or heteroaryl. In certain embodiments, R$_3$ is C$_{1-10}$ alkyl substituted with pyrrolidinyl, piperidinyl, piperazinyl, morphonlinyl, thiomorphonlinyl, imidazolyl, pyrazolyl, pyridinyl, pyridazinyl, or pyrimidinyl, wherein the substituent is optionally substituted with halo or C$_{1-4}$ alkyl. In certain embodiments, R$_2$ and R$_3$ combine to form a pyrrolidinyl, piperidinyl, piperazinyl, morphonlinyl, or thiomorphonlinyl.

In certain embodiments, R$_4$ is independently hydrogen, Formula (II), or Formula (III). In certain embodiments, each R$_4$ is hydrogen. In certain embodiments, at least one R$_4$ is hydrogen, and at least one R$_4$ is Formula (II) or Formula (III). In certain embodiments, at least one R$_4$ is Formula (II) and at least one R$_4$ is Formula (III). In certain embodiments, each R$_4$ is independently Formula (II) or Formula (III).

In certain embodiments, q is 2, 3, 4, or 5. In certain embodiments, q is 2. In certain embodiments, q is 3. In certain embodiments, q is 4. In certain embodiments, q is 5.

In certain embodiments, X is —CH$_2$CH$_2$N(R$_2$)(R$_3$); R$_2$ is hydrogen; and R$_3$ is optionally substituted C$_{1-20}$ alkyl or optionally substituted C$_{1-20}$ heteroalkyl.

In certain embodiments, X is —CH$_2$CH$_2$N(R$_2$)(R$_3$); R$_2$ is hydrogen; and R$_3$ is C$_{1-10}$ alkyl substituted with amino, heterocyclyl, or heteroaryl.

In certain embodiments, X is —CH$_2$CH$_2$N(R$_2$)(R$_3$); R$_2$ is hydrogen; and R$_3$ is C$_{1-10}$ alkyl substituted with pyrrolidinyl, piperidinyl, piperazinyl, morphonlinyl, thiomorphonlinyl, imidazolyl, pyrazolyl, pyridinyl, pyridazinyl, or pyrimidinyl, wherein the substituent is optionally substituted with halo or C$_{1-4}$ alkyl.

In certain embodiments, X is —CH$_2$CH$_2$L(R$_4$)$_q$ and each occurrence of R$_4$ is independently Formula (II) or Formula (III).

In certain embodiments, Formula (III) is:

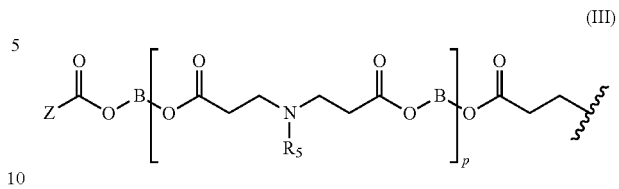

wherein:
p is an integer of 1-1000, inclusive;
B is optionally substituted alkylene or optionally substituted heteroalkylene;
Z is —CH=CH$_2$, —CH$_2$CH$_2$OR$_6$, —CH$_2$CH$_2$SR$_7$, —CH$_2$CH$_2$N(R$_6$)(R$_7$), or —CH$_2$CH$_2$L(R$_8$)$_v$;
v is 2, 3, 4, or 5;
R$_5$ is optionally substituted alkyl or optionally substituted heteroalkyl;
R$_6$ is hydrogen, optionally substituted alkyl, or optionally substituted heteroalkyl;
R$_7$ is optionally substituted alkyl or optionally substituted heteroalkyl; or
R$_6$ and R$_7$ combine to form a 4-7 membered ring; and
each R$_8$ is independently hydrogen, Formula (II), or Formula (III).

In certain embodiments, p is an integer of 1-1000, inclusive. In certain embodiments, p is 10-1000. In certain embodiments, p is 1-100. In certain embodiments, p is 10-100.

In certain embodiments, R$_5$ is optionally substituted alkyl or optionally substituted heteroalkyl. In certain embodiments, R$_5$ is optionally substituted alkyl. In certain embodiments, R$_5$ is optionally substituted heteroalkyl. In certain embodiments, R$_5$ is optionally substituted C$_{1-20}$ alkyl or optionally substituted C$_{1-20}$ heteroalkyl. In certain embodiments, R$_5$ is optionally substituted C$_{1-20}$ alkyl. In certain embodiments, R$_5$ is optionally substituted C$_{1-20}$ heteroalkyl. In certain embodiments, R$_5$ is C$_{1-10}$ alkyl or C$_{1-10}$ heteroalkyl; optionally substituted with hydroxy, hydroxymethyl, hydroxyethyl, or hydroxypropyl. In certain embodiments, R$_5$ is C$_{1-10}$ alkyl; optionally substituted with hydroxy, hydroxymethyl, hydroxyethyl, or hydroxypropyl. In certain embodiments, R$_5$ is C$_{1-10}$ heteroalkyl; optionally substituted with hydroxy, hydroxymethyl, hydroxyethyl, or hydroxypropyl. In certain embodiments, R$_5$ is hydroxymethyl, hydroxyethyl, hydroxypropyl, hydroxybutyl, hydroxypentyl, hydroxyhexyl, hydroxyheptyl, or hydroxyoctyl. In certain embodiments, R$_5$ is hydroxymethyl. In certain embodiments, R$_5$ is hydroxyethyl. In certain embodiments, R$_5$ is hydroxypropyl. In certain embodiments, R$_5$ is hydroxybutyl. In certain embodiments, R$_5$ is hydroxypentyl. In certain embodiments, R$_5$ is hydroxyhexyl. In certain embodiments, R$_5$ is hydroxyheptyl. In certain embodiments, R$_5$ is hydroxyoctyl. In certain embodiments, R$_5$ is optionally substituted hydroxymethyl, optionally substituted hydroxyethyl, optionally substituted hydroxypropyl, optionally substituted hydroxybutyl, optionally substituted hydroxypentyl, optionally substituted hydroxyhexyl, optionally substituted hydroxyheptyl, or optionally substituted hydroxyoctyl; wherein the substituent is hydroxy, hydroxymethyl, or amino. In certain embodiments, R$_5$ is optionally substituted hydroxymethyl. In certain embodiments, R$_5$ is optionally substituted hydroxyethyl. In certain embodiments, R$_5$ is optionally substituted hydroxypropyl. In certain embodiments, R$_5$ is optionally substituted hydroxybutyl. In certain embodiments, $R_5$ is optionally substituted hydroxypentyl. In certain embodiments, $R_5$ is optionally substituted hydroxyhexyl. In certain embodiments, $R_5$ is optionally substituted hydroxyheptyl. In certain embodiments, $R_5$ is optionally substituted hydroxyoctyl. In certain embodiments, the substituent on $R_5$ is hydroxy, hydroxymethyl, or amino.

In certain embodiments, B is optionally substituted alkylene or optionally substituted heteroalkylene. In certain embodiments, B is optionally substituted alkylene. In certain embodiments, B is optionally substituted heteroalkylene. In certain embodiments, B is substituted or unsubstituted $C_{1-10}$ alkylene or substituted or unsubstituted $C_{1-10}$ heteroalkylene. In certain embodiments, B is substituted or unsubstituted $C_{1-10}$ alkylene. In certain embodiments, B is substituted or unsubstituted $C_{1-10}$ heteroalkylene. In certain embodiments, B is methylene, ethylene, propylene, butylene, pentylene, hexylene, heptylene, or octylene. In certain embodiments, B is propylene, butylene, or hexylene. In certain embodiments, B is methylene. In certain embodiments, B is ethylene. In certain embodiments, B is propylene. In certain embodiments, B is butylene. In certain embodiments, B is pentylene. In certain embodiments, B is hexylene. In certain embodiments, B is heptylene. In certain embodiments, B is octylene.

In certain embodiments, Z is —CH=CH$_2$, —CH$_2$CH$_2$OR$_6$, —CH$_2$CH$_2$SR$_7$, —CH$_2$CH$_2$N(R$_6$)(R$_7$), or —CH$_2$CH$_2$L(R$_8$)$_v$;
wherein:
v is 2, 3, 4, or 5;
$R_5$ is optionally substituted alkyl or optionally substituted heteroalkyl;
$R_6$ is hydrogen, optionally substituted alkyl, or optionally substituted heteroalkyl;
$R_7$ is optionally substituted alkyl or optionally substituted heteroalkyl; or
$R_6$ and $R_7$ combine to form a 4-7 membered ring; and
each $R_8$ is independently hydrogen, Formula (II), or Formula (III).

In certain embodiments, Z is —CH=CH$_2$. In certain embodiments, Z is —CH$_2$CH$_2$OR$_6$. In certain embodiments, Z is —CH$_2$CH$_2$SR$_7$. In certain embodiments, Z is —CH$_2$CH$_2$N(R$_6$)(R$_7$). In certain embodiments, Z is —CH$_2$CH$_2$L(R$_8$)$_v$. In certain embodiments, Z is —CH=CH$_2$. In certain embodiments, Z is

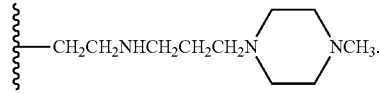

In certain embodiments, Z is —CH$_2$CH$_2$L(R$_8$)$_v$ and each occurrence of L is the same. In certain embodiments, Z is —CH$_2$CH$_2$L(R$_8$)$_v$ and wherein each branched poly(beta-aminoester) of Formula (I) comprises two or more unique L groups. In certain embodiments, Z is —CH$_2$CH$_2$L(R$_8$)$_v$ and each occurrence of $R_8$ is the same.

In certain embodiments, $R_6$ is hydrogen, optionally substituted alkyl, or optionally substituted heteroalkyl. In certain embodiments, $R_6$ is hydrogen. In certain embodiments, $R_6$ is optionally substituted alkyl. In certain embodiments, $R_6$ is methyl.

In certain embodiments, $R_7$ is optionally substituted alkyl or optionally substituted heteroalkyl. In certain embodiments, $R_7$ is optionally substituted alkyl. In certain embodiments, $R_7$ is optionally substituted heteroalkyl. In certain embodiments, $R_7$ is optionally substituted $C_{1-20}$ alkyl or optionally substituted $C_{1-20}$ heteroalkyl. In certain embodiments, $R_7$ is $C_{1-10}$ alkyl substituted with amino, heterocyclyl, or heteroaryl. In certain embodiments, $R_7$ is $C_{1-10}$ alkyl substituted with pyrrolidinyl, piperidinyl, piperazinyl, morphonlinyl, thiomorphonlinyl, imidazolyl, pyrazolyl, pyridinyl, pyridazinyl, or pyrimidinyl, wherein the substituent is optionally substituted with halo or $C_{1-4}$ alkyl. In certain embodiments, $R_6$ and $R_7$ combine to form a pyrrolidinyl, piperidinyl, piperazinyl, morphonlinyl, or thiomorphonlinyl.

In certain embodiments, $R_8$ is independently hydrogen, Formula (II), or Formula (III). In certain embodiments, each $R_8$ is hydrogen. In certain embodiments, at least one $R_8$ is hydrogen, and at least one $R_8$ is Formula (II) or Formula (III). In certain embodiments, at least one $R_8$ is Formula (II) and at least one $R_8$ is Formula (III). In certain embodiments, each $R_8$ is independently Formula (II) or Formula (III).

In certain embodiments, v is 2, 3, 4, or 5. In certain embodiments, v is 2. In certain embodiments, v is 3. In certain embodiments, v is 4. In certain embodiments, v is 5.

In certain embodiments, Z is —CH$_2$CH$_2$N(R$_6$)(R$_7$); $R_6$ is hydrogen; and $R_7$ is optionally substituted $C_{1-20}$ alkyl or optionally substituted $C_{1-20}$ heteroalkyl.

In certain embodiments, Z is —CH$_2$CH$_2$N(R$_6$)(R$_7$); $R_6$ is hydrogen; and $R_7$ is $C_{1-10}$ alkyl substituted with amino, heterocyclyl, or heteroaryl.

In certain embodiments, Z is —CH$_2$CH$_2$N(R$_6$)(R$_7$); $R_6$ is hydrogen; and $R_7$ is $C_{1-10}$ alkyl substituted with pyrrolidinyl, piperidinyl, piperazinyl, morphonlinyl, thiomorphonlinyl, imidazolyl, pyrazolyl, pyridinyl, pyridazinyl, or pyrimidinyl, wherein the substituent is optionally substituted with halo or $C_{1-4}$ alkyl.

In certain embodiments, Z is —CH$_2$CH$_2$L(R$_8$)$_v$ and each occurrence of $R_8$ is independently Formula (II) or Formula (III).

In certain embodiments, the polymer of Formula (I) is polymer number 844, defined as:
n is 2;
L is

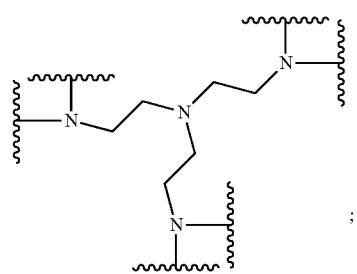

wherein in Formula (II):
A is —(CH$_2$)$_6$—;
X is —CH$_2$CH$_2$N(R$_2$)(R$_3$) or —CH$_2$CH$_2$L(R$_4$)$_q$;
$R_1$ is —(CH$_2$)$_3$OH;
$R_2$ is hydrogen; and
wherein in Formula (III):
B is —(CH$_2$)$_4$—;
Z is —CH$_2$CH$_2$N(R$_6$)(R$_7$) or —CH$_2$CH$_2$L(R$_8$)$_v$;
$R_5$ is —(CH$_2$)$_5$OH;
$R_6$ is hydrogen. In certain embodiments, the weight ratio of Formula (II) to Formula (III) is 1.67:1; and wherein the molar ratio of (Formula (II)+Formula (III)) to n is 1.25:1.

In certain embodiments, the polymer of Formula (I) is defined as:
n is 3;
L is

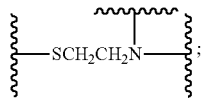

wherein in Formula (II):
A is —(CH$_2$)$_6$—;
X is —CH$_2$CH$_2$N(R$_2$)(R$_3$) or —CH$_2$CH$_2$L(R$_4$)$_q$;
R$_1$ is —(CH$_2$)$_3$OH;
R$_2$ is hydrogen;
R$_3$ is

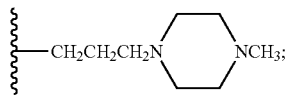

and
wherein in Formula (III):
B is —(CH$_2$)$_4$—;
Z is —CH$_2$CH$_2$N(R$_6$)(R$_7$) or —CH$_2$CH$_2$L(R$_8$)$_v$;
R$_5$ is —(CH$_2$)$_5$OH;
R$_2$ is hydrogen; and
R$_7$ is

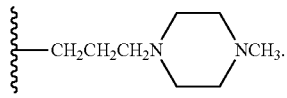

In certain embodiments, the polymer of Formula (I) is defined as:
n is 3
L is

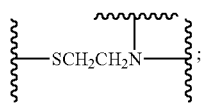

wherein in Formula (II):
A is —(CH$_2$)$_6$—;
X is —CH$_2$CH$_2$N(R$_2$)(R$_3$) or —CH$_2$CH$_2$L(R$_4$)$_q$;
R$_1$ is —(CH$_2$)$_3$OH;
R$_2$ is hydrogen;
R$_3$ is

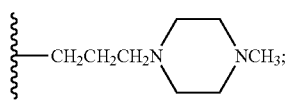

and
wherein in Formula (III):
B is —(CH$_2$)$_4$—;
Z is —CH$_2$CH$_2$N(R$_6$)(R$_7$) or —CH$_2$CH$_2$L(R$_8$)$_v$;
R$_5$ is —(CH$_2$)$_5$OH;
R$_6$ is hydrogen; and
R$_7$ is

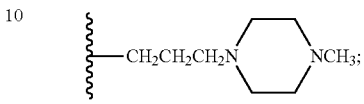

and wherein the weight ratio of Formula (II) to Formula (III) is 1.67:1; and wherein the molar ratio of (Formula (II)+ Formula (III)) to n is 0.62:1.

In certain embodiments, the polymer of Formula (I) is defined as:
n is 3;
L is

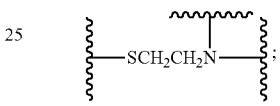

wherein in Formula (II):
A is —(CH$_2$)$_6$—;
X is —CH$_2$CH$_2$N(R$_2$)(R$_3$);
R$_1$ is —(CH$_2$)$_3$OH;
R$_2$ is hydrogen; and
R$_3$ is

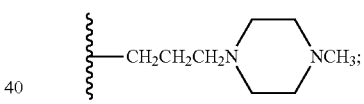

and
wherein in Formula (III):
B is —(CH$_2$)$_4$—;
Z is —CH$_2$CH$_2$N(R$_6$)(R$_7$);
R$_5$ is —(CH$_2$)$_5$OH;
R$_6$ is hydrogen; and
R$_7$ is

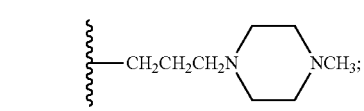

In certain embodiments, the polymer of Formula (I) is defined as:
n is 3;
L is

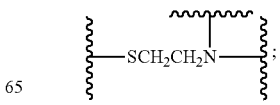

wherein in Formula (II):
A is —(CH$_2$)$_6$—;
X is —CH$_2$CH$_2$N(R$_2$)(R$_3$);
R$_1$ is —(CH$_2$)$_3$OH;
R$_2$ is hydrogen; and
R$_3$ is

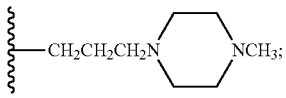

and
wherein in Formula (III):
B is —(CH$_2$)$_4$—;
Z is —CH$_2$CH$_2$N(R$_6$)(R$_7$);
R$_5$ is —(CH$_2$)$_5$OH;
R$_6$ is hydrogen; and
R$_7$ is

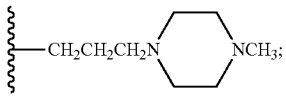

wherein the weight ratio of Formula (II) to Formula (III) is 1.67:1; and wherein the molar ratio of (Formula (II)+Formula (III)) to n is 0.62:1.

In certain embodiments, the polymer of Formula (I) is defined as:
n is 4;
L$_1$ is

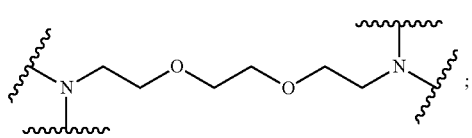 [SMILES: *N(*)CCOCCOCCN(*)*]

wherein in Formula (II):
A is —(CH$_2$)$_3$—;
X is —CH$_2$CH$_2$N(R$_2$)(R$_3$) or —CH$_2$CH$_2$L(R$_4$)$_q$;
R$_1$ is —(CH$_2$)$_5$OH;
R$_2$ is hydrogen; and
R$_3$ is

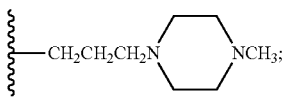

and
wherein in Formula (III):
B is —(CH$_2$)$_6$—;
Z is —CH$_2$CH$_2$N(R$_6$)(R$_7$) or —CH$_2$CH$_2$L(R$_8$)$_v$;
R$_5$ is —(CH$_2$)$_3$OH;
R$_6$ is hydrogen; and
R$_7$ is

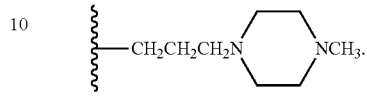

In certain embodiments, the polymer of Formula (I) is defined as:
n is 4;
L is

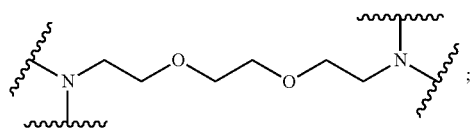 [SMILES: *N(*)CCOCCOCCN(*)*]

wherein in Formula (II):
A is —(CH$_2$)$_3$—;
X is —CH$_2$CH$_2$N(R$_2$)(R$_3$) or —CH$_2$CH$_2$L(R$_4$)$_q$;
R$_1$ is —(CH$_2$)$_5$OH;
R$_2$ is hydrogen; and
R$_3$ is

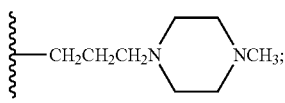

and
wherein in Formula (III):
B is —(CH$_2$)$_6$—;
Z is —CH$_2$CH$_2$N(R$_6$)(R$_7$) or —CH$_2$CH$_2$L(R$_8$)$_v$;
R$_5$ is —(CH$_2$)$_3$OH;
R$_6$ is hydrogen; and
R$_7$ is

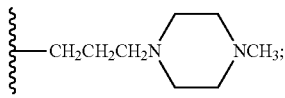

and wherein the weight ratio of Formula (II) to Formula (III) is 0.6:1; and wherein the molar ratio of (Formula (II)+Formula (III)) to n is 1.49:1.

In certain embodiments, the polymer of Formula (I) is defined as:
n is 4;
L is

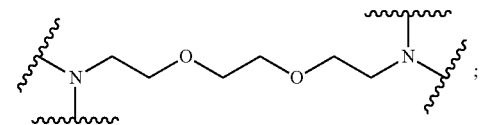 [SMILES: *N(*)CCOCCOCCN(*)*]

wherein in Formula (II):
A is —(CH$_2$)$_3$—;
X is —CH$_2$CH$_2$N(R$_2$)(R$_3$);
R$_1$ is —(CH$_2$)$_5$OH;
R$_2$ is hydrogen; and
R$_3$ is

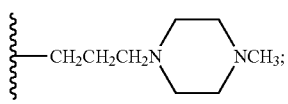

and
wherein in Formula (III):
B is —(CH$_2$)$_6$—;
Z is —CH$_2$CH$_2$N(R$_2$)(R$_3$);
R$_5$ is —(CH$_2$)$_3$OH;
R$_6$ is hydrogen; and
R$_7$ is

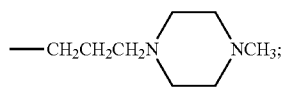

In certain embodiments, the polymer of Formula (I) is defined as:
n is 4;
L is

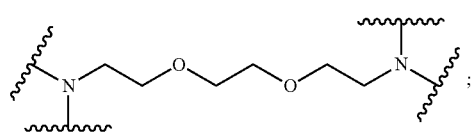 [SMILES: *N(*)CCOCCOCCN(*)*]

wherein in Formula (II):
A is —(CH$_2$)$_3$—;
X is —CH$_2$CH$_2$N(R$_2$)(R$_3$);
R$_1$ is —(CH$_2$)$_5$OH;
R$_2$ is hydrogen; and
R$_3$ is

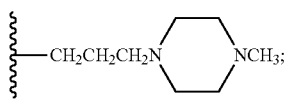

and
wherein in Formula (III):
B is —(CH$_2$)$_6$—;
Z is —CH$_2$CH$_2$N(R$_2$)(R$_3$);
R$_5$ is —(CH$_2$)$_3$OH;
R$_6$ is hydrogen; and
R$_7$ is

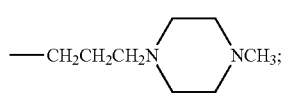

and wherein the weight ratio of Formula (II) to Formula (III) is 0.6:1; and wherein the molar ratio of (Formula (II)+ Formula (III)) to n is 1.49:1.

In certain embodiments, the polymer of Formula (I) is defined as:
n is 3;
L is;

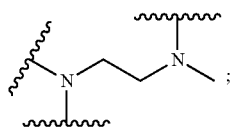 [SMILES: *N(*)CCN(*)C]

wherein in Formula (II):
A is —(CH$_2$)$_4$—;
X is —CH$_2$CH$_2$N(R$_2$)(R$_3$) or —CH$_2$CH$_2$L(R$_4$)$_q$;
R$_1$ is —(CH$_2$)$_5$OH;
R$_2$ is hydrogen; and
R$_3$ is

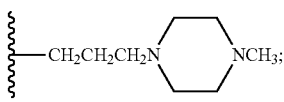

and
wherein in Formula (III):
B is —(CH$_2$)$_6$—;
Z is —CH$_2$CH$_2$N(R$_6$)(R$_7$) or —CH$_2$CH$_2$L(R$_8$)$_v$;
R$_5$ is —CH$_2$CH(OH)CH$_2$OH;
R$_6$ is hydrogen; and
R$_7$ is

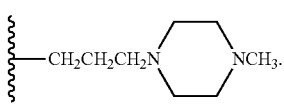

In certain embodiments, the polymer of Formula (I) is defined as:
n is 3;
L is

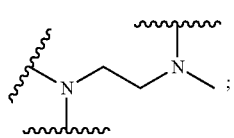

wherein in Formula (II):
A is —(CH$_2$)$_4$—;
X is —CH$_2$CH$_2$N(R$_2$)(R$_3$) or —CH$_2$CH$_2$L(R$_4$)$_q$;
R$_1$ is —(CH$_2$)$_5$OH;
R$_2$ is hydrogen; and
R$_3$ is

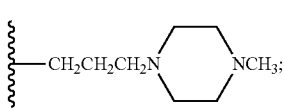

and
wherein in Formula (III):
B is —(CH$_2$)$_6$—;
Z is —CH$_2$CH$_2$N(R$_6$)(R$_7$) or —CH$_2$CH$_2$L(R$_8$)$_v$;
R$_5$ is —CH$_2$CH(OH)CH$_2$OH;
R$_6$ is hydrogen; and
R$_7$ is

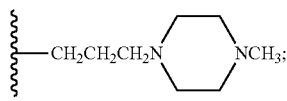

and wherein the weight ratio of Formula (II) to Formula (III) is 0.6:1; and wherein the molar ratio of (Formula (II)+Formula (III)) to n is 0.87:1.

In certain embodiments, the polymer of Formula (I) is defined as:
n is 3;
L is

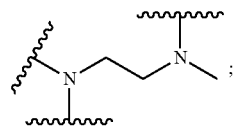 [SMILES: *N(*)CCN(*)C]

wherein in Formula (II):
A is —(CH$_2$)$_4$—;
X is —CH$_2$CH$_2$N(R$_2$)(R$_3$);
R$_1$ is —(CH$_2$)$_5$OH;
R$_2$ is hydrogen; and
R$_3$ is

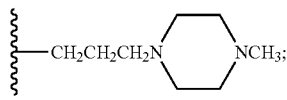

and
wherein in Formula (III):
B is —(CH$_2$)$_6$—;
Z is —CH$_2$CH$_2$N(R$_2$)(R$_3$);
R$_5$ is —CH$_2$CH(OH)CH$_2$OH;
R$_6$ is hydrogen; and
R$_7$ is

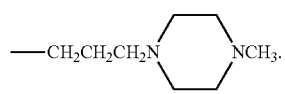

In certain embodiments, the polymer of Formula (I) is defined as:
n is 3;
L is

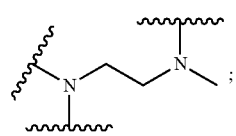

wherein in Formula (II):
A is —(CH$_2$)$_4$—;
X is —CH$_2$CH$_2$N(R$_2$)(R$_3$);
R$_1$ is —(CH$_2$)$_5$OH;
R$_2$ is hydrogen; and
R$_3$ is

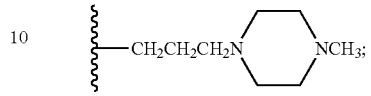

and
wherein in Formula (III):
B is —(CH$_2$)$_6$—;
Z is —CH$_2$CH$_2$N(R$_2$)(R$_3$);
R$_5$ is —CH$_2$CH(OH)CH$_2$OH;
R$_6$ is hydrogen; and
R$_7$ is

and wherein the weight ratio of Formula (II) to Formula (III) is 0.6:1; and wherein the molar ratio of (Formula (II)+Formula (III)) to n is 0.87:1.

In another aspect, provided herein is a polymer prepared by a process comprising: contacting a first poly(β-amino ester) having terminal acrylate moieties with a second poly(β-amino ester) having terminal acrylate moieties with a linker molecule having 3 or more nucleophilic functional groups selected from amine groups, hydroxyl groups, and thiol groups, to obtain a hybrid poly(β-amino ester). In certain embodiments, the hybrid poly(β-amino ester) is branched. In certain embodiments, the hybrid poly(β-amino ester) comprises terminal acrylate groups. In certain embodiments, the process further comprises contacting the hybrid poly(β-amino ester) comprising terminal acrylate groups with a capping reagent selected from an amine, an alcohol, and a thiol.

Compositions

In certain aspects, the disclosure further provides a polymer as described herein, e.g., a polymer of Formula (I), as a component of a composition. For example, in certain embodiments, provided is a composition comprising a polymer of the invention, or salt thereof, and optionally an excipient.

In certain embodiments, a composition as described comprises a polymer of Formula (I), or a salt thereof; an agent; and optionally an excipient.

In certain embodiments, the composition is useful for delivering the agent to a subject or cell. In certain embodiments, wherein the composition is a pharmaceutical composition, a cosmetic composition, a nutraceutical composition, or a composition with non-medical application. In certain embodiments, the composition is a pharmaceutical composition. In certain embodiments, the composition further comprises cholesterol. In certain embodiments, the composition further comprises a PEGylated lipid. In certain embodiments, the composition further comprises a phospholipid. In certain embodiments, the composition further comprises an apolipoprotein.

In certain embodiments, the agent is an organic molecule, inorganic molecule, nucleic acid, protein, peptide, polynucleotide, targeting agent, an isotopically labeled chemical compound, vaccine, an immunological agent, or an agent useful in bioprocessing.

In certain embodiments, the agent is an organic molecule. In certain embodiments, the agent is inorganic molecule. In certain embodiments, the agent is nucleic acid. In certain embodiments, the agent is protein. In certain embodiments, the agent is peptide. In certain embodiments, the agent is polynucleotide. In certain embodiments, the agent is targeting agent. In certain embodiments, the agent is an isotopically labeled chemical compound. In certain embodiments, the agent is vaccine. In certain embodiments, the agent is an immunological agent. In certain embodiments, the agent is an agent useful in bioprocessing. In certain embodiments, the agent is a polynucleotide.

In certain embodiments, the agent is an RNA. In certain embodiments, the agent is messenger RNA (mRNA), single-stranded RNA (ssRNA), double-stranded RNA (dsRNA), small interfering RNA (siRNA), precursor messenger RNA (pre-mRNA), small hairpin RNA or short hairpin RNA (shRNA), microRNA (miRNA), guide RNA (gRNA), transfer RNA (tRNA), antisense RNA (asRNA), heterogeneous nuclear RNA (hnRNA), coding RNA, non-coding RNA (ncRNA), long non-coding RNA (long ncRNA or lncRNA), satellite RNA, viral satellite RNA, signal recognition particle RNA, small cytoplasmic RNA, small nuclear RNA (snRNA), ribosomal RNA (rRNA), Piwi-interacting RNA (piRNA), polyinosinic acid, ribozyme, flexizyme, small nucleolar RNA (snoRNA), spliced leader RNA, viral RNA, or viral satellite RNA.

In certain embodiments, the agent is messenger RNA (mRNA). In certain embodiments, the agent is single-stranded RNA (ssRNA). In certain embodiments, the agent is double-stranded RNA (dsRNA). In certain embodiments, the agent is small interfering RNA (siRNA). In certain embodiments, the agent is precursor messenger RNA (pre-mRNA). In certain embodiments, the agent is small hairpin RNA or short hairpin RNA (shRNA). In certain embodiments, the agent is microRNA (miRNA). In certain embodiments, the agent is guide RNA (gRNA). In certain embodiments, the agent is transfer RNA (tRNA). In certain embodiments, the agent is antisense RNA (asRNA). In certain embodiments, the agent is heterogeneous nuclear RNA (hnRNA). In certain embodiments, the agent is coding RNA. In certain embodiments, the agent is non-coding RNA (ncRNA). In certain embodiments, the agent is long non-coding RNA (long ncRNA or lncRNA). In certain embodiments, the agent is satellite RNA. In certain embodiments, the agent is viral satellite RNA. In certain embodiments, the agent is signal recognition particle RNA. In certain embodiments, the agent is small cytoplasmic RNA. In certain embodiments, the agent is small nuclear RNA (snRNA). In certain embodiments, the agent is ribosomal RNA (rRNA). In certain embodiments, the agent is Piwi-interacting RNA (piRNA). In certain embodiments, the agent is polyinosinic acid. In certain embodiments, the agent is a ribozyme. In certain embodiments, the agent is flexizyme. In certain embodiments, the agent is small nucleolar RNA (snoRNA). In certain embodiments, the agent is spliced leader RNA. In certain embodiments, the agent is viral RNA. In certain embodiments, the agent is viral satellite RNA. In certain embodiments, the RNA is mRNA. In certain embodiments, the polynucleotide encodes a protein or a peptide.

In some embodiments, pDNA, siRNA, dsRNA, shRNA, miRNA, mRNA, tRNA, asRNA, and/or RNAi can be designed and/or predicted using one or more of a large number of available algorithms. To give but a few examples, the following resources can be utilized to design and/or predict polynucleotides: algorithms found at Alnylum Online; Dharmacon Online; OligoEngine Online; Molecula Online; Ambion Online; BioPredsi Online; RNAi Web Online; Chang Bioscience Online; Invitrogen Online; LentiWeb Online GenScript Online; Protocol Online; Reynolds et al., 2004, *Nat. Biotechnol.*, 22:326; Naito et al., 2006, *Nucleic Acids Res.*, 34:W448; Li et al., 2007, *RNA*, 13:1765; Yiu et al., 2005, *Bioinformatics*, 21:144; and Jia et al., 2006, *BMC Bioinformatics*, 7: 271.

The polynucleotide may be of any size or sequence, and they may be single- or double-stranded. In certain embodiments, the polynucleotide includes at least about 30, at least about 100, at least about 300, at least about 1,000, at least about 3,000, or at least about 10,000 base pairs. In certain embodiments, the polynucleotide includes less than about 10,000, less than about 3,000, less than about 1,000, less than about 300, less than about 100, or less than about 30 base pairs. Combinations of the above ranges (e.g., at least about 100 and less than about 1,000) are also within the scope of the invention. The polynucleotide may be provided by any means known in the art. In certain embodiments, the polynucleotide is engineered using recombinant techniques. See, e.g., Ausubel et al., *Current Protocols in Molecular Biology* (John Wiley & Sons, Inc., New York, 1999); *Molecular Cloning: A Laboratory Manual*, 2nd Ed., ed. by Sambrook, Fritsch, and Maniatis (Cold Spring Harbor Laboratory Press: 1989). The polynucleotide may also be obtained from natural sources and purified from contaminating components found normally in nature. The polynucleotide may also be chemically synthesized in a laboratory. In certain embodiments, the polynucleotide is synthesized using standard solid phase chemistry. The polynucleotide may be isolated and/or purified. In certain embodiments, the polynucleotide is substantially free of impurities. In certain embodiments, the polynucleotide is at least about 50%, at least about 60%, at least about 70%, at least about 80%, at least about 90%, at least about 95%, or at least about 99% free of impurities.

The polynucleotide may be modified by physical, chemical, and/or biological means. The modifications include methylation, phosphorylation, and end-capping, etc. In certain embodiments, the modifications lead to increased stability of the polynucleotide.

Wherever a polynucleotide is employed in the composition, a derivative of the polynucleotide may also be used. These derivatives include products resulted from modifications of the polynucleotide in the base moieties, sugar moieties, and/or phosphate moieties of the polynucleotide. Modified base moieties include, but are not limited to, 2-aminoadenosine, 2-thiothymidine, inosine, pyrrolo-pyrimidine, 3-methyl adenosine, 5-methylcytidine, C5-bromouridine, C5-fluorouridine, C5-iodouridine, C5-propynyl-uridine, C5-propynyl-cytidine, C5-methylcytidine, 7-deazaadenosine, 7-deazaguanosine, 8-oxoadenosine, 8-oxoguanosine, O(6)-methylguanine, and 2-thiocytidine. Modified sugar moieties include, but are not limited to, 2'-fluororibose, ribose, 2'-deoxyribose, 3'-azido-2',3'-dideoxyribose, 2',3'-dideoxyribose, arabinose (the 2'-epimer of ribose), acyclic sugars, and hexoses. The nucleosides may be strung together by linkages other than the phosphodiester linkage found in naturally occurring DNA and RNA. Modified linkages include, but are not limited to, phosphorothioate and 5'-N-phosphoramidite linkages. Combinations of the various modifications may be used in a single polynucleotide. These modified polynucleotides may be provided by any means known in the art; however, as will be appreciated by those of skill in the art, the modified polynucleotides may be prepared using synthetic chemistry in vitro.

The polynucleotide described herein may be in any form, such as a circular plasmid, a linearized plasmid, a cosmid, a viral genome, a modified viral genome, and an artificial chromosome.

The polynucleotide described herein may be of any sequence. In certain embodiments, the polynucleotide encodes a protein or peptide. The encoded protein may be an enzyme, structural protein, receptor, soluble receptor, ion channel, active (e.g., pharmaceutically active) protein, cytokine, interleukin, antibody, antibody fragment, antigen, coagulation factor, albumin, growth factor, hormone, and insulin, etc. The polynucleotide may also comprise regulatory regions to control the expression of a gene. These regulatory regions may include, but are not limited to, promoters, enhancer elements, repressor elements, TATA boxes, ribosomal binding sites, and stop sites for transcription, etc. In certain embodiments, the polynucleotide is not intended to encode a protein. For example, the polynucleotide may be used to fix an error in the genome of the cell being transfected.

In certain embodiments, the polynucleotide described herein comprises a sequence encoding an antigenic peptide or protein. A composition containing the polynucleotide can be delivered to a subject to induce an immunologic response sufficient to decrease the chance of a subsequent infection and/or lessen the symptoms associated with such an infection. The polynucleotide of these vaccines may be combined with interleukins, interferon, cytokines, and/or adjuvants described herein.

The antigenic protein or peptides encoded by the polynucleotide may be derived from bacterial organisms, such as *Streptocoeccus pneumoniae, Haemophilus influenzae, Staphylococcus aureus, Streptococcus pyogenes, Corynebacterium diphtheriae, Listeria monocytogenes, Bacillus anthracis, Clostridium tetani, Clostridium botulinum, Clostridium perfringens, Neisseria meningitidis, Neisseria gonorrhoeae, Streptococcus mutans, Pseudomonas aeruginosa, Salmonella typhi, Haemophilus parainfluenzae, Bordetella pertussis, Francisella tularensis, Yersinia pestis, Vibrio cholerae, Legionella pneumophila, Mycobacterium tuberculosis, Mycobacterium leprae, Treponema pallidum, Leptospirosis interrogans, Borrelia burgdorferi,* and *Camphylobacter jejuni*; from viruses, such as smallpox virus, influenza A virus, influenza B virus, respiratory syncytial virus, parainfluenza virus, measles virus, HIV virus, varicella-zoster virus, herpes simplex 1 virus, herpes simplex 2 virus, cytomegalovirus, Epstein-Barr virus, rotavirus, rhinovirus, adenovirus, papillomavirus, poliovirus, mumps virus, rabies virus, rubella virus, coxsackieviruses, equine encephalitis virus, Japanese encephalitis virus, yellow fever virus, Rift Valley fever virus, hepatitis A virus, hepatitis B virus, hepatitis C virus, hepatitis D virus, and hepatitis E virus; and from fungal, protozoan, or parasitic organisms, such as *Cryptococcus neoformans, Histoplasma capsulatum, Candida albicans, Candida tropicalis, Nocardia asteroides, Rickettsia rickettsii, Rickettsia typhi, Mycoplasma pneumoniae, Chlamydial psittaci, Chlamydial trachomatis, Plasmodium falciparum, Trypanosoma brucei, Entamoeba histolytica, Toxoplasma gondii, Trichomonas vaginalis,* and *Schistosoma mansoni*.

In certain embodiments, the protein is a damage suppressor (Dsup) mRNA. In certain embodiments, the Dsup protects DNA from the direct and indirect effects of radiation. See, Example 4.

In certain embodiments, the protein is an antigen. In certain embodiments, the agent is a DNA. In certain embodiments, the agent is a plasmid DNA (pDNA). In certain embodiments, the composition is a vaccine.

In certain embodiments, the agent and the compound, or the salt thereof, are not covalently attached.

In certain embodiments, the composition is in the form of a particle. In certain embodiments, the particle is a nanoparticle or microparticle. In certain embodiments, the particle is a micelle, liposome, or lipoplex. In certain embodiments, the particle encapsulates the agent.

In certain embodiments, the composition is a lyophilized solid.

The compositions described herein (e.g., pharmaceutical compositions) can be prepared by any method known in the art (e.g., pharmacologically). In general, such preparatory methods include the steps of bringing a compound into association with an agent described herein (i.e., the "active ingredient"), optionally with a carrier or excipient, and/or one or more other accessory ingredients, and then, if necessary and/or desirable, shaping, and/or packaging the product into a desired single- or multi-dose unit.

Compositions can be prepared, packaged, and/or sold in bulk, as a single unit dose, and/or as a plurality of single unit doses. As used herein, a "unit dose" is a discrete amount of the composition comprising a predetermined amount of the active ingredient. The amount of the active ingredient is generally equal to the dosage of the active ingredient which would be administered to a subject and/or a convenient fraction of such a dosage such as, for example, one-half or one-third of such a dosage.

Relative amounts of the active ingredient, the excipient (e.g., the pharmaceutically or cosmetically acceptable excipient), and/or any additional ingredients in a composition will vary, depending upon the identity, size, and/or condition of the subject treated and further depending upon the route by which the composition is to be administered. The composition may comprise between 0.1% and 100% (w/w) active ingredient.

Excipients used in the manufacture of provided compositions include inert diluents, dispersing and/or granulating agents, surface active agents and/or emulsifiers, disintegrating agents, binding agents, preservatives, buffering agents, lubricating agents, and/or oils. Excipients such as cocoa butter and suppository waxes, coloring agents, coating agents, sweetening, flavoring, and perfuming agents may also be present in the composition.

Exemplary diluents include calcium carbonate, sodium carbonate, calcium phosphate, dicalcium phosphate, calcium sulfate, calcium hydrogen phosphate, sodium phosphate lactose, sucrose, cellulose, microcrystalline cellulose, kaolin, mannitol, sorbitol, inositol, sodium chloride, dry starch, cornstarch, powdered sugar, and mixtures thereof.

Exemplary granulating and/or dispersing agents include potato starch, corn starch, tapioca starch, sodium starch glycolate, clays, alginic acid, guar gum, citrus pulp, agar, bentonite, cellulose, and wood products, natural sponge, cation-exchange resins, calcium carbonate, silicates, sodium carbonate, cross-linked poly(vinyl-pyrrolidone) (crospovidone), sodium carboxymethyl starch (sodium starch glycolate), carboxymethyl cellulose, cross-linked sodium carboxymethyl cellulose (croscarmellose), methylcellulose, pregelatinized starch (starch 1500), microcrystalline starch, water insoluble starch, calcium carboxymethyl cellulose, magnesium aluminum silicate (Veegum), sodium lauryl sulfate, quaternary ammonium compounds, and mixtures thereof.

Exemplary surface active agents and/or emulsifiers include natural emulsifiers (e.g., acacia, agar, alginic acid, sodium alginate, tragacanth, chondrux, cholesterol, xanthan, pectin, gelatin, egg yolk, casein, wool fat, cholesterol, wax, and lecithin), colloidal clays (e.g., bentonite (aluminum silicate) and Veegum (magnesium aluminum silicate)), long chain amino acid derivatives, high molecular weight alcohols (e.g., stearyl alcohol, cetyl alcohol, oleyl alcohol, triacetin monostearate, ethylene glycol distearate, glyceryl monostearate, and propylene glycol monostearate, polyvinyl alcohol), carbomers (e.g., carboxy polymethylene, polyacrylic acid, acrylic acid polymer, and carboxyvinyl polymer), carrageenan, cellulosic derivatives (e.g., carboxymethylcellulose sodium, powdered cellulose, hydroxymethyl cellulose, hydroxypropyl cellulose, hydroxypropyl methylcellulose, methylcellulose), sorbitan fatty acid esters (e.g., polyoxyethylene sorbitan monolaurate (Tween® 20), polyoxyethylene sorbitan (Tween® 60), polyoxyethylene sorbitan monooleate (Tween® 80), sorbitan monopalmitate (Span® 40), sorbitan monostearate (Span® 60), sorbitan tristearate (Span® 65), glyceryl monooleate, sorbitan monooleate (Span® 80), polyoxyethylene esters (e.g., polyoxyethylene monostearate (Myrj® 45), polyoxyethylene hydrogenated castor oil, polyethoxylated castor oil, polyoxymethylene stearate, and Solutol®), sucrose fatty acid esters, polyethylene glycol fatty acid esters (e.g., Cremophor®), polyoxyethylene ethers, (e.g., polyoxyethylene lauryl ether (Brij® 30)), poly(vinyl-pyrrolidone), diethylene glycol monolaurate, triethanolamine oleate, sodium oleate, potassium oleate, ethyl oleate, oleic acid, ethyl laurate, sodium lauryl sulfate, Pluronic® F-68, Poloxamer P-188, cetrimonium bromide, cetylpyridinium chloride, benzalkonium chloride, docusate sodium, and/or mixtures thereof.

Exemplary binding agents include starch (e.g., cornstarch and starch paste), gelatin, sugars (e.g., sucrose, glucose, dextrose, dextrin, molasses, lactose, lactitol, mannitol, etc.), natural and synthetic gums (e.g., acacia, sodium alginate, extract of Irish moss, panwar gum, ghatti gum, mucilage of isapol husks, carboxymethylcellulose, methylcellulose, ethylcellulose, hydroxyethylcellulose, hydroxypropyl cellulose, hydroxypropyl methylcellulose, microcrystalline cellulose, cellulose acetate, poly(vinyl-pyrrolidone), magnesium aluminum silicate (Veegum©), and larch arabogalactan), alginates, polyethylene oxide, polyethylene glycol, inorganic calcium salts, silicic acid, polymethacrylates, waxes, water, alcohol, and/or mixtures thereof.

Exemplary preservatives include antioxidants, chelating agents, antimicrobial preservatives, antifungal preservatives, antiprotozoan preservatives, alcohol preservatives, acidic preservatives, and other preservatives. In certain embodiments, the preservative is an antioxidant. In other embodiments, the preservative is a chelating agent.

Exemplary antioxidants include alpha tocopherol, ascorbic acid, acorbyl palmitate, butylated hydroxyanisole, butylated hydroxytoluene, monothioglycerol, potassium metabisulfite, propionic acid, propyl gallate, sodium ascorbate, sodium bisulfite, sodium metabisulfite, and sodium sulfite.

Exemplary chelating agents include ethylenediaminetetraacetic acid (EDTA) and salts and hydrates thereof (e.g., sodium edetate, disodium edetate, trisodium edetate, calcium disodium edetate, dipotassium edetate, and the like), citric acid and salts and hydrates thereof (e.g., citric acid monohydrate), fumaric acid and salts and hydrates thereof, malic acid and salts and hydrates thereof, phosphoric acid and salts and hydrates thereof, and tartaric acid and salts and hydrates thereof. Exemplary antimicrobial preservatives include benzalkonium chloride, benzethonium chloride, benzyl alcohol, bronopol, cetrimide, cetylpyridinium chloride, chlorhexidine, chlorobutanol, chlorocresol, chloroxylenol, cresol, ethyl alcohol, glycerin, hexetidine, imidurea, phenol, phenoxyethanol, phenylethyl alcohol, phenylmercuric nitrate, propylene glycol, and thimerosal.

Exemplary antifungal preservatives include butyl paraben, methyl paraben, ethyl paraben, propyl paraben, benzoic acid, hydroxybenzoic acid, potassium benzoate, potassium sorbate, sodium benzoate, sodium propionate, and sorbic acid.

Exemplary alcohol preservatives include ethanol, polyethylene glycol, phenol, phenolic compounds, bisphenol, chlorobutanol, hydroxybenzoate, and phenylethyl alcohol.

Exemplary acidic preservatives include vitamin A, vitamin C, vitamin E, beta-carotene, citric acid, acetic acid, dehydroacetic acid, ascorbic acid, sorbic acid, and phytic acid.

Other preservatives include tocopherol, tocopherol acetate, deteroxime mesylate, cetrimide, butylated hydroxyanisol (BHA), butylated hydroxytoluened (BHT), ethylenediamine, sodium lauryl sulfate (SLS), sodium lauryl ether sulfate (SLES), sodium bisulfite, sodium metabisulfite, potassium sulfite, potassium metabisulfite, Glydant® Plus, Phenonip®, methylparaben, Germall® 115, Germaben® II, Neolone®, Kathon®, and Euxyl®.

Exemplary buffering agents include citrate buffer solutions, acetate buffer solutions, phosphate buffer solutions, ammonium chloride, calcium carbonate, calcium chloride, calcium citrate, calcium glubionate, calcium gluceptate, calcium gluconate, D-gluconic acid, calcium glycerophosphate, calcium lactate, propanoic acid, calcium levulinate, pentanoic acid, dibasic calcium phosphate, phosphoric acid, tribasic calcium phosphate, calcium hydroxide phosphate, potassium acetate, potassium chloride, potassium gluconate, potassium mixtures, dibasic potassium phosphate, monobasic potassium phosphate, potassium phosphate mixtures, sodium acetate, sodium bicarbonate, sodium chloride, sodium citrate, sodium lactate, dibasic sodium phosphate, monobasic sodium phosphate, sodium phosphate mixtures, tromethamine, magnesium hydroxide, aluminum hydroxide, alginic acid, pyrogen-free water, isotonic saline, Ringer's solution, ethyl alcohol, and mixtures thereof.

Exemplary lubricating agents include magnesium stearate, calcium stearate, stearic acid, silica, talc, malt, glyceryl behanate, hydrogenated vegetable oils, polyethylene glycol, sodium benzoate, sodium acetate, sodium chloride, leucine, magnesium lauryl sulfate, sodium lauryl sulfate, and mixtures thereof.

Exemplary natural oils include almond, apricot kernel, avocado, babassu, bergamot, black current seed, borage, cade, camomile, canola, caraway, carnauba, castor, cinnamon, cocoa butter, coconut, cod liver, coffee, corn, cotton seed, emu, eucalyptus, evening primrose, fish, flaxseed, geraniol, gourd, grape seed, hazel nut, hyssop, isopropyl myristate, jojoba, kukui nut, lavandin, lavender, lemon, litsea cubeba, macadamia nut, mallow, mango seed, meadowfoam seed, mink, nutmeg, olive, orange, orange roughy, palm, palm kernel, peach kernel, peanut, poppy seed, pumpkin seed, rapeseed, rice bran, rosemary, safflower, sandalwood, sasquana, savoury, sea buckthorn, sesame, shea butter, silicone, soybean, sunflower, tea tree, thistle, tsubaki, vetiver, walnut, and wheat germ oils. Exemplary synthetic oils include, but are not limited to, butyl stearate, caprylic triglyceride, capric triglyceride, cyclomethicone, diethyl sebacate, dimethicone 360, isopropyl myristate, mineral oil, octyldodecanol, oleyl alcohol, silicone oil, and mixtures thereof.

Additionally, the composition may further comprise an apolipoprotein. Previous studies have reported that Apolipoprotein E (ApoE) was able to enhance cell uptake and gene silencing for a certain type of materials. See, e.g., Akinc, A. et al., Targeted delivery of RNAi therapeutics with endogenous and exogenous ligand-based mechanisms. Mol Ther. 18(7): p. 1357-64. In certain embodiments, the apolipoprotein is ApoA, ApoB, ApoC, ApoE, or ApoH, or an isoform thereof.

Liquid dosage forms for oral and parenteral administration include emulsions, microemulsions, solutions, suspensions, syrups and elixirs. In certain embodiments, the emulsions, microemulsions, solutions, suspensions, syrups and elixirs are or cosmetically acceptable emulsions, microemulsions, solutions, suspensions, syrups and elixirs. In addition to the active ingredients, the liquid dosage forms may comprise inert diluents commonly used in the art such as, for example, water or other solvents, solubilizing agents and emulsifiers such as ethyl alcohol, isopropyl alcohol, ethyl carbonate, ethyl acetate, benzyl alcohol, benzyl benzoate, propylene glycol, 1,3-butylene glycol, dimethylformamide, oils (e.g., cottonseed, groundnut, corn, germ, olive, castor, and sesame oils), glycerol, tetrahydrofurfuryl alcohol, polyethylene glycols and fatty acid esters of sorbitan, and mixtures thereof. Besides inert diluents, the oral compositions can include adjuvants such as wetting agents, emulsifying and suspending agents, sweetening, flavoring, and perfuming agents. In certain embodiments for parenteral administration, solubilizing agents such as Cremophor®, alcohols, oils, modified oils, glycols, polysorbates, cyclodextrins, polymers, and mixtures thereof, are used.

Injectable preparations, for example, sterile injectable aqueous or oleaginous suspensions can be formulated according to the known art using suitable dispersing or wetting agents and suspending agents. The sterile injectable preparation can be a sterile injectable solution, suspension, or emulsion in a nontoxic parenterally acceptable diluent or solvent, for example, as a solution in 1,3-butanediol. Among the acceptable vehicles and solvents that can be employed are water, Ringer's solution, U.S.P., and isotonic sodium chloride solution. In addition, sterile, fixed oils are conventionally employed as a solvent or suspending medium. For this purpose any bland fixed oil can be employed including synthetic mono- or di-glycerides. In addition, fatty acids such as oleic acid are used in the preparation of injectables.

The injectable formulations can be sterilized, for example, by filtration through a bacterial-retaining filter, or by incorporating sterilizing agents in the form of sterile solid compositions which can be dissolved or dispersed in sterile water or other sterile injectable medium prior to use.

In order to prolong the effect of the active ingredient, it is often desirable to slow its absorption from subcutaneous or intramuscular injection. This can be accomplished by the use of a liquid suspension of crystalline or amorphous material with poor water solubility. The rate of absorption of the active ingredient then depends upon its rate of dissolution, which, in turn, may depend upon crystal size and crystalline form. Alternatively, delayed absorption of a parenterally administered active ingredient may be accomplished by dissolving or suspending the composition in an oil vehicle.

Compositions for rectal or vaginal administration are typically suppositories which can be prepared with suitable non-irritating excipients or carriers such as cocoa butter, polyethylene glycol, or a suppository wax which are solid at ambient temperature but liquid at body temperature and therefore melt in the rectum or vaginal cavity and release the active ingredient.

Solid dosage forms for oral administration include capsules, tablets, pills, powders, and granules. In such solid dosage forms, the composition is mixed with at least one inert, excipient or carrier (e.g., pharmaceutically or cosmetically acceptable excipient or carrier) such as sodium citrate or dicalcium phosphate and/or (a) fillers or extenders such as starches, lactose, sucrose, glucose, mannitol, and silicic acid, (b) binders such as, for example, carboxymethylcellulose, alginates, gelatin, polyvinylpyrrolidinone, sucrose, and acacia, (c) humectants such as glycerol, (d) disintegrating agents such as agar, calcium carbonate, potato or tapioca starch, alginic acid, certain silicates, and sodium carbonate, (e) solution retarding agents such as paraffin, (f) absorption accelerators such as quaternary ammonium compounds, (g) wetting agents such as, for example, cetyl alcohol and glycerol monostearate, (h) absorbents such as kaolin and bentonite clay, and (I) lubricants such as talc, calcium stearate, magnesium stearate, solid polyethylene glycols, sodium lauryl sulfate, and mixtures thereof. In the case of capsules, tablets, and pills, the dosage form may include a buffering agent.

Solid compositions of a similar type can be employed as fillers in soft and hard-filled gelatin capsules using such excipients as lactose or milk sugar as well as high molecular weight polyethylene glycols and the like. The solid dosage forms of tablets, dragees, capsules, pills, and granules can be prepared with coatings and shells such as enteric coatings and other coatings well known in the art of pharmacology. They may optionally comprise opacifying agents that may release the active ingredient(s) only, or preferentially, in a certain part of the intestinal tract, optionally, in a delayed manner. Examples of encapsulating compositions which can be used include polymeric substances and waxes. Solid compositions of a similar type can be employed as fillers in soft and hard-filled gelatin capsules using such excipients as lactose or milk sugar as well as high molecular weight polyethylene glycols and the like.

The composition can be in a micro-encapsulated form with one or more excipients as noted above. The solid dosage forms of tablets, dragees, capsules, pills, and granules can be prepared with coatings and shells such as enteric coatings, release controlling coatings, and other coatings well known in the formulation art. In such solid dosage forms the composition can be admixed with at least one inert diluent such as sucrose, lactose, or starch. Such dosage forms may comprise, as is normal practice, additional substances other than inert diluents, e.g., tableting lubricants and other tableting aids such a magnesium stearate and microcrystalline cellulose. In the case of capsules, tablets and pills, the dosage forms may comprise buffering agents. They may optionally comprise opacifying agents and can be of a composition that they release the active ingredient(s) only, or preferentially, in a certain part of the intestinal tract, optionally, in a delayed manner.

Dosage forms for delivery to the stomach or gastrointestinal tract include liquid and non-liquid (e.g., gels and solids) formulations. Such dosage forms may be administered orally or by injection. In certain embodiments, dosage forms for delivery to the stomach or gastrointestinal tract are administered using an injection device.

Dosage forms for topical and/or transdermal administration of a composition may include ointments, pastes, creams, lotions, gels, hydrogels (e.g., using carboxymethylcellulose) powders, solutions, sprays, inhalants, and/or patches. Generally, the composition is admixed under sterile conditions with a carrier or excipient and/or any needed preservatives and/or buffers as can be required. Additionally, the use of transdermal patches is contemplated, which often have the added advantage of providing controlled delivery of an active ingredient to the body. Such dosage forms can be prepared, for example, by dispersing the composition in the proper medium. Alternatively or additionally, the rate can be controlled by either providing a rate controlling membrane and/or by dispersing the composition in a polymer matrix and/or gel.

Suitable devices for use in delivering intradermal compositions described herein include short needle devices such as those described in U.S. Pat. Nos. 4,886,499; 5,190,521; 5,328,483; 5,527,288; 4,270,537; 5,015,235; 5,141,496; and 5,417,662. Intradermal compositions can be administered by devices which limit the effective penetration length of a needle into the skin, such as those described in PCT publication WO 99/34850 and functional equivalents thereof. Alternatively or additionally, conventional syringes can be used in the classical mantoux method of intradermal administration. Jet injection devices which deliver liquid vaccines to the dermis via a liquid jet injector and/or via a needle which pierces the stratum corneum and produces a jet which reaches the dermis are suitable. Jet injection devices are described, for example, in U.S. Pat. Nos. 5,480,381; 5,599,302; 5,334,144; 5,993,412; 5,649,912; 5,569,189; 5,704,911; 5,383,851; 5,893,397; 5,466,220; 5,339,163; 5,312,335; 5,503,627; 5,064,413; 5,520,639; 4,596,556; 4,790,824; 4,941,880; 4,940,460; and PCT publications WO 97/37705 and WO 97/13537. Ballistic powder/particle delivery devices which use compressed gas to accelerate the agent in powder form through the outer layers of the skin to the dermis are suitable.

Suitable devices for use in delivering intradermal compositions (e.g., particles) described herein also include millineedles and microneedles, e.g., patches comprising millineedles or microneedles. In certain embodiments, the millineedles or microneedles are made of dissolvable materials in which the particles are entrained and preserved. In other embodiments, the millineedles or microneedles are coated with the composition (e.g., particles).

Formulations suitable for topical administration include, but are not limited to, liquid and/or semi-liquid preparations such as liniments, lotions, oil-in-water and/or water-in-oil emulsions such as creams, ointments, and/or pastes, and/or solutions and/or suspensions. Topically administrable formulations may, for example, comprise from about 1% to about 10% (w/w) active ingredient, although the concentration of the active ingredient can be as high as the solubility limit of the active ingredient in the solvent. Formulations for topical administration may further comprise one or more of the additional ingredients described herein.

A composition can be prepared, packaged, and/or sold in a formulation suitable for pulmonary administration via the buccal cavity. Such a formulation may comprise dry particles which comprise the composition and which have a diameter in the range from about 0.5 to about 7 nanometers, or from about 1 to about 6 nanometers. Such compositions are conveniently in the form of dry powders for administration using a device comprising a dry powder reservoir to which a stream of propellant can be directed to disperse the powder and/or using a self-propelling solvent/powder dispensing container such as a device comprising the active ingredient dissolved and/or suspended in a low-boiling propellant in a sealed container. Such powders comprise particles wherein at least 98% of the particles by weight have a diameter greater than 0.5 nanometers and at least 95% of the particles by number have a diameter less than 7 nanometers. Alternatively, at least 95% of the particles by weight have a diameter greater than 1 nanometer and at least 90% of the particles by number have a diameter less than 6 nanometers. Dry powder compositions may include a solid fine powder diluent such as sugar and are conveniently provided in a unit dose form.

Low boiling propellants generally include liquid propellants having a boiling point of below 65° F. at atmospheric pressure. Generally, the propellant may constitute 50 to 99.9% (w/w) of the composition, and the active ingredient may constitute 0.1 to 20% (w/w) of the composition. The propellant may further comprise additional ingredients such as a liquid non-ionic and/or solid anionic surfactant and/or a solid diluent (which may have a particle size of the same order as particles comprising the active ingredient).

Compositions formulated for pulmonary delivery may provide the active ingredient in the form of droplets of a solution and/or suspension. Such formulations can be prepared, packaged, and/or sold as aqueous and/or dilute alcoholic solutions and/or suspensions, optionally sterile, comprising the active ingredient, and may conveniently be administered using any nebulization and/or atomization device. Such formulations may further comprise one or more additional ingredients including, but not limited to, a flavoring agent such as saccharin sodium, a volatile oil, a buffering agent, a surface-active agent, and/or a preservative such as methylhydroxybenzoate. The droplets provided by this route of administration may have an average diameter in the range from about 0.1 to about 200 nanometers.

Formulations described herein as being useful for pulmonary delivery are useful for intranasal delivery of a composition. Another formulation suitable for intranasal administration is a coarse powder comprising the composition and having an average particle from about 0.2 to 500 micrometers. Such a formulation is administered by rapid inhalation through the nasal passage from a container of the powder held close to the nares.

Formulations for nasal administration may, for example, comprise from about as little as 0.1% (w/w) to as much as 100% (w/w) of the active ingredient, and may comprise one or more of the additional ingredients described herein.

A composition can be prepared, packaged, and/or sold in a formulation for buccal administration. Such formulations may, for example, be in the form of tablets and/or lozenges made using conventional methods, and may contain, for example, 0.1 to 20% (w/w) active ingredient, the balance comprising an orally dissolvable and/or degradable composition and, optionally, one or more of the additional ingredients described herein. Alternately, formulations for buccal administration may comprise a powder and/or an aerosolized and/or atomized solution and/or suspension comprising the active ingredient. Such powdered, aerosolized, and/or aerosolized formulations, when dispersed, may have an average particle and/or droplet size in the range from about 0.1 to about 200 nanometers, and may further comprise one or more of the additional ingredients described herein.

A composition can be prepared, packaged, and/or sold in a formulation for ophthalmic administration. Such formulations may, for example, be in the form of eye drops including, for example, a 0.1/1.0% (w/w) solution and/or suspension of the active ingredient in an aqueous or oily liquid carrier or excipient. Such drops may further comprise buffering agents, salts, and/or one or more other of the additional ingredients described herein. Other ophthalmically-administrable formulations which are useful include those which comprise the active ingredient in microcrystalline form and/or in a liposomal preparation. Ear drops and/or eye drops are also contemplated as being within the scope of this invention.

Although the descriptions of compositions provided herein are principally directed to compositions which are suitable for administration to humans, it will be understood by the skilled artisan that such compositions are generally suitable for administration to animals of all sorts. Modification of compositions suitable for administration to humans in order to render the compositions suitable for administration to various animals is well understood, and the ordinarily skilled veterinary pharmacologist can design and/or perform such modification with ordinary experimentation.

Compositions provided herein are typically formulated in dosage unit form for ease of administration and uniformity of dosage. It will be understood, however, that the total daily usage of the compositions will be decided by the attending physician within the scope of sound medical judgment. The specific therapeutically effective dose level for any particular subject or organism will depend upon a variety of factors including the disease being treated and the severity of the disorder; the activity of the specific active ingredient employed; the specific composition employed; the age, body weight, general health, sex, and diet of the subject; the time of administration, route of administration, and rate of excretion of the specific active ingredient employed; the duration of the treatment; drugs used in combination or coincidental with the specific active ingredient employed; and like factors well known in the medical arts.

The compositions provided herein can be administered by any route, including enteral (e.g., oral), parenteral, intravenous, intramuscular, intra-arterial, intramedullary, intrathecal, subcutaneous, intraventricular, transdermal, interdermal, rectal, intravaginal, intraperitoneal, topical (as by powders, ointments, creams, and/or drops), mucosal, nasal, bucal, sublingual; by intratracheal instillation, bronchial instillation, and/or inhalation; and/or as an oral spray, nasal spray, and/or aerosol. Specifically contemplated routes are oral administration, intravenous administration (e.g., systemic intravenous injection), regional administration via blood and/or lymph supply, and/or direct administration to an affected site. In general, the most appropriate route of administration will depend upon a variety of factors including the nature of the agent (e.g., its stability in the environment of the gastrointestinal tract), and/or the condition of the subject (e.g., whether the subject is able to tolerate oral administration).

The exact amount of an agent required to achieve an effective amount will vary from subject to subject, depending, for example, on species, age, and general condition of a subject, severity of the side effects or disorder, identity of the particular agent, mode of administration, and the like. The desired dosage can be delivered three times a day, two times a day, once a day, every other day, every third day, every week, every two weeks, every three weeks, or every four weeks. In certain embodiments, the desired dosage can be delivered using multiple administrations (e.g., two, three, four, five, six, seven, eight, nine, ten, eleven, twelve, thirteen, fourteen, or more administrations).

In certain embodiments, an effective amount of an agent for administration one or more times a day to a 70 kg adult human may comprise about 0.0001 mg to about 3000 mg, about 0.0001 mg to about 2000 mg, about 0.0001 mg to about 1000 mg, about 0.001 mg to about 1000 mg, about 0.01 mg to about 1000 mg, about 0.1 mg to about 1000 mg, about 1 mg to about 1000 mg, about 1 mg to about 100 mg, about 10 mg to about 1000 mg, or about 100 mg to about 1000 mg, of an agent per unit dosage form.

In certain embodiments, the agents described herein may be at dosage levels sufficient to deliver from about 0.001 mg/kg to about 100 mg/kg, from about 0.01 mg/kg to about 50 mg/kg, preferably from about 0.1 mg/kg to about 40 mg/kg, preferably from about 0.5 mg/kg to about 30 mg/kg, from about 0.01 mg/kg to about 10 mg/kg, from about 0.1 mg/kg to about 10 mg/kg, and more preferably from about 1 mg/kg to about 25 mg/kg, of subject body weight per day, one or more times a day, to obtain the desired therapeutic and/or prophylactic effect.

It will be appreciated that dose ranges as described herein provide guidance for the administration of provided compositions to an adult. The amount to be administered to, for example, a child or an adolescent can be determined by a medical practitioner or person skilled in the art and can be lower or the same as that administered to an adult.

Compositions described herein may further include a hydrophilic polymer (e.g., polyethylene glycol (PEG)). The compositions described herein may further include a lipid (e.g., a steroid, a substituted or unsubstituted cholesterol, or a polyethylene glycol (PEG)-containing material). In certain embodiments, the lipid included in the compositions is a triglyceride, a diglyceride, a PEGylated lipid, a phospholipid (e.g., 1,2-distearoyl-sn-glycero-3-phosphocholine (DSPC)), a steroid, a substituted or unsubstituted cholesterol, an apolipoprotein, or a combination thereof. In certain embodiments, the compositions include two components selected from the group consisting of the following components: a hydrophilic polymer, a triglyceride, a diglyceride, a PEGylated lipid, a phospholipid, a steroid, a substituted or unsubstituted cholesterol, and an apolipoprotein. In certain embodiments, the compositions include three components selected from the group consisting of the following components: a hydrophilic polymer, a triglyceride, a diglyceride, a PEGylated lipid, a phospholipid, a steroid, a substituted or unsubstituted cholesterol, and an apolipoprotein. In certain embodiments, the compositions include at least four components selected from the group consisting of the following components: a hydrophilic polymer, a triglyceride, a diglyceride, a PEGylated lipid, a phospholipid, a steroid, a substituted or unsubstituted cholesterol, and an apolipoprotein. In certain embodiments, the compositions include a hydrophilic polymer, a phospholipid, a steroid, and a substituted or unsubstituted cholesterol. In certain embodiments, the compositions include PEG, DSPC, and substituted or unsubstituted cholesterol.

The compositions may include cholesterol, a lipid (e.g., a PEGylated lipid, a phospholipid, a cholesterol lipid), and a apolipoprotein, in addition to a compound of Formula (I) and an agent described herein.

Exemplary phospholipids include, but are not limited to, 1,2-distearoyl-sn-glycero-3-phosphocholine (DSPC), dioleoylphosphatidylcholine (DOPC), dipalmitoylphosphatidylcholine (DPPC), dioleoylphosphatidylglycerol (DOPG), dipalmitoylphosphatidylglycerol (DPPG), dioleoylphosphatidylethanolamine (DOPE), palmitoyloleoylphosphatidylcholine (POPC), palmitoyloleoyl-phosphatidylethanolamine (POPE), dioleoyl-phosphatidylethanolamine 4-(N-maleimidomethyl)-cyclohexane-1-carboxylate (DOPE-mal), dipalmitoyl phosphatidyl ethanolamine (DPPE), dimyristoylphosphoethanolamine (DMPE), distearoyl-phosphatidyl-ethanolamine (DSPE), 16-O-monomethyl PE, 16-O-dimethyl PE, and 18-1-trans PE, 1-stearoyl-2-oleoyl-phosphatidyethanolamine (SOPE).

Exemplary cholesterol lipids include, but are not limited to, PEGylated cholesterol, and DC-Chol (N,N-dimethyl-N-ethylcarboxamidocholesterol).

Exemplary PEGylated lipids include, but are not limited to, PEGylated cholesterol, 1,2-dimyristoyl-sn-glycero-3-phosphoethanolamine-N-[methoxy(polyethyleneglycol)-2000] ($C_{14}$-PEG 2000, Avanti), N-Octanoyl-Sphingosine-1-[Succinyl(Methoxy Polyethylene Glycol)-2000], and dimyristoylglycerol (DMG)-PEG-2K. In some embodiments, the one or more PEGylated lipids comprise a poly (ethylene)glycol chain of up to 5 kDa in length covalently attached to a lipid with alkyl chain(s) of $C_6$-$C_{20}$ length.

In certain embodiments, the compositions include two or more components selected from the group consisting of the following components: a PEGylated lipid, a phospholipid, cholesterol, a cholesterol lipid, and a apolipoprotein. In certain embodiments, the compositions include a phospholipid, cholesterol, and a PEGylated lipid. In certain embodiments, the compositions include 1,2-distearoyl-sn-glycero-3-phosphocholine (DSPC), cholesterol, and $C_{14}$-PEG-2000.

Compositions described herein may be useful in other applications, e.g., non-medical applications. Nutraceutical compositions described herein may be useful in the delivery of an effective amount of a nutraceutical, e.g., a dietary supplement, to a subject in need thereof.

Cosmetic compositions described herein may be formulated as a cream, ointment, balm, paste, film, or liquid, etc., and may be useful in the application of make-up, hair products, and materials useful for personal hygiene, etc. Compositions described herein may be useful for other non-medical applications, e.g., such as an emulsion, emulsifier, or coating, useful, for example, as a food component, for extinguishing fires, for disinfecting surfaces, for oil cleanup, and/or as a bulk material. In certain embodiments, the composition is useful for treating or preventing a disease in a subject in need thereof.

Complexes of an Agent and a Compound of Formula (I)

It is contemplated that the polymers of Formula (I) are useful in the delivery of one or more agents (such as a polynucleotide (e.g., DNA (e.g., pDNA) or RNA (e.g., siRNA, mRNA), synthetic analogs of DNA and/or RNA, and DNA/RNA hybrids, etc.)) to a subject in need thereof. Without wishing to be bound by any particular theory, the polymers of Formula (I) have several desirable properties that make a composition comprising the compound and an agent suitable for delivering the agent to a subject in need thereof. The desirable properties include: 1) the ability of the compound to complex with and "protect" the agent that may otherwise be labile; 2) the ability of the compound to buffer the pH in an endosome of a cell of the subject; 3) the ability of the compound to act as a "proton sponge" and cause endosomolysis; and 4) the ability of the compound to substantially neutralize the negative charges of the agent.

A polymer of Formula (I) and an agent may form a complex in a composition as described herein. For example, a polymer of Formula (I) comprises secondary and tertiary amino moieties, which may be useful in enhancing the ability of an inventive composition including an agent (such as a polynucleotide) to deliver the agent to a subject (e.g., into a cell of the subject) in need thereof. The amino moieties, sterically hindered or not, may non-covalently interact with a polynucleotide. A polynucleotide may be contacted with a polymer of Formula (I) under conditions suitable to form a complex. In certain embodiments, the polynucleotide binds to a polymer of Formula (I) to form a complex through one or more non-covalent interactions described herein. In certain embodiments, the polynucleotide binds to a polymer of Formula (I) to form a complex through electrostatic interactions. Without wishing to be bound by any particular theory, one or more amino moieties of a compound of Formula (I) may be positively charged, and the polynucleotide (e.g., the monophosphate, diphosphate, and/or triphosphate moieties of the polynucleotide) may be negatively charged, when a polymer of Formula (I), or a composition thereof, is delivered to a subject in need thereof (e.g., when the compound, or a composition thereof, is delivered to the subject at the physiological pH). The polynucleotide may bind to a polymer of Formula (I) to form a complex through electrostatic interactions between the negative charges of the inventive compound and the positive charges of the polynucleotide. By substantially neutralizing the charges (e.g., negative charges) of the polynucleotide, the resulting complex may be able to more easily pass through the hydrophobic membranes (e.g., cytoplasmic, lysosomal, endosomal, nuclear) of a cell, compared to a polynucleotide whose charges are not neutralized. In certain embodiments, the complex is substantially neutral. In certain embodiments, the complex is slightly positively charged. In certain embodiments, the complex has a positive ζ-potential. In certain embodiments the ζ-potential is between 0 and +30. In certain embodiments, upon delivery of the agent into a cell of a subject in need thereof, the agent is able to interfere with the expression of a specific gene in the cell.

Polynucleotides may be degraded chemically and/or enzymatically (e.g., by nucleases and nucleotidases). The interaction of compound of Formula (I) with the polynucleotide is thought to at least partially prevent the degradation of the polynucleotide.

A polymer of Formula (I) may be at least partially provided as a salt (e.g., being protonated) so as to form a complex with a negatively charged agent (e.g., a polynucleotide). In certain embodiments, the complex form particles that are useful in the delivery of the agent to a subject. In certain embodiments, more than one polymer of Formula (I) may be associated with an agent. For example, the complex may include 1-10, 1-100, 1-1,000, 10-1,000, 100-1,000, or 100-10,000 compounds associated with an agent.

The ratio of the amount of a polymer of Formula (I) to the amount of an agent (e.g., a polynucleotide) in an composition including the compound and agent (e.g., as a complex) may be adjusted so that the agent may be more efficiently delivered to a subject in need thereof and/or the toxicity of the composition is decreased. In certain embodiments, the ratio of the compound of Formula (I), or salt thereof, to the agent is at least about 1:1, at least about 2:1, at least about 5:1, at least about 10:1, at least about 20:1, at least about 50:1, at least about 100:1, at least about 200:1, or at least about 500:1 mol/mol. In certain embodiments, the ratio of the polymer of Formula (I), or salt thereof, to the agent is less than about 500:1, less than about 200:1, less than about 100:1, less than about 50:1, less than about 20:1, less than about 10:1, less than about 5:1, less than about 2:1, or less than about 1:1 mol/mol. Combinations of the above ranges (e.g., at least about 10:1 and less than about 100:1) are also within the scope of the invention.

The ratio of the amount of the amino moieties of a polymer of Formula (I) to the amount of the phosphate moieties of a polynucleotide (i.e., nitrogen:phosphate ratio) in a composition including the compound and polynucleotide (e.g., as a complex) may also be adjusted so that the polynucleotide may be more efficiently delivered to a subject in need thereof and/or the toxicity of the composition is decreased. See, e.g., Incani et al., *Soft Matter* (2010) 6:2124-2138. In certain embodiments, the nitrogen:phosphate ratio is at least about 1:1, at least about 2:1, at least about 5:1, at least about 10:1, at least about 20:1, at least about 50:1, at least about 100:1, at least about 200:1, or at least about 500:1 mol/mol. In certain embodiments, the nitrogen:phosphate ratio is less than about 500:1, less than about 200:1, less than about 100:1, less than about 50:1, less than about 20:1, less than about 10:1, less than about 5:1, less than about 2:1,or less than about 1:1 mol/mol. Combinations of the above ranges (e.g., at least about 10:1 and less than about 100:1) are also within the scope of the invention.

Particles

A composition including a polymer of Formula (I) and an agent may be in the form of a particle. In certain embodiments, the polymer of Formula (I) and agent form a complex, and the complex is in the form of a particle. In certain embodiments, the polymer of Formula (I) encapsulates the agent and is in the form of a particle. In certain embodiments, the polymer of Formula (I) is mixed with the agent, and the mixture is in the form of a particle.

In certain embodiments, a complex of a polymer of Formula (I) and an agent in a composition of is in the form of a particle. In certain embodiments, the particle is a microparticle (i.e., particle having a characteristic dimension of less than about 1 millimeter and at least about 1 micrometer, where the characteristic dimension of the particle is the smallest cross-sectional dimension of the particle. In certain embodiments, the particle is a nanoparticle (i.e., a particle having a characteristic dimension of less than about 1 micrometer and at least about 1 nanometer, where the characteristic dimension of the particle is the smallest cross-sectional dimension of the particle). In certain embodiments, the average diameter of the particle is at least about 10 nm, at least about 30 nm, at least about 100 nm, at least about 300 nm, at least about 1 µm, at least about 3 µm, at least about 10 µm, at least about 30 µm, at least about 100 µm, at least about 300 µm, or at least about 1 mm. In certain embodiments, the average diameter of the particle is less than about 1 mm, less than about 300 µm, less than about 100 µm, less than about 30 µm less than about 10 µm, less than about 3 µm, less than about 1 µm, less than about 300 nm, less than about 100 nm, less than about 30 nm, or less than about 10 nm. Combinations of the above ranges (e.g., at least about 100 nm and less than about 1 µm) are also within the scope of the present invention.

The particles described herein may include additional materials such as polymers (e.g., synthetic polymers (e.g., PEG, PLGA) and natural polymers (e.g., phospholipids)). In certain embodiments, the additional materials are approved by a regulatory agency, such as the U.S. FDA, for human and veterinary use.

The particles may be prepared using any method known in the art, such as precipitation, milling, spray drying, single and double emulsion solvent evaporation, solvent extraction, phase separation, and simple and complex coacervation. In certain embodiments, methods of preparing the particles are the double emulsion process and spray drying. The conditions used in preparing the particles may be altered to yield particles of a desired size or property (e.g., hydrophobicity, hydrophilicity, external morphology, "stickiness", shape, polydispersity, etc.). The method of preparing the particle and the conditions (e.g., solvent, temperature, concentration, and air flow rate, etc.) used may also depend on the agent being complexed, encapsulated, or mixed, and/or the composition of the matrix.

Methods developed for making particles for delivery of agents that are included in the particles are described in the literature. See, e.g., Doubrow, M., Ed., "Microcapsules and Nanoparticles in Medicine and Pharmacy," CRC Press, Boca Raton, 1992; Mathiowitz and Langer, *J. Controlled Release* 5:13-22, 1987; Mathiowitz et al., *Reactive Polymers* 6:275-283, 1987; Mathiowitz et al., *J. Appl. Polymer Sci.* 35:755-774, 1988.

If the particles prepared by any of the above methods have a size range outside of the desired range, the particles can be sized, for example, using a sieve. The particles may also be coated. In certain embodiments, the particles are coated with a targeting agent. In certain embodiments, the particles are coated with a surface-altering agent. In some embodiments, the particles are coated to achieve desirable surface properties (e.g., a particular charge).

In certain embodiments, the polydispersity index (PDI, determined by dynamic light scattering) of the particles described herein (e.g., particles included in a composition described herein) is between 0.01 and 0.9, between 0.1 and 0.9, between 0.1 and 0.7, between 0.1 and 0.5, between 0.01 and 0.4, between 0.03 and 0.4, between 0.1 and 0.4, between 0.01 and 0.3, between 0.03 and 0.3, or between 0.1 and 0.3.

Micelles and Liposomes

A composition including a polymer of Formula (I) and an agent may be in the form of a micelle or liposome. In certain embodiments, the polymer of Formula (I) is in the form of a micelle or liposome. In certain embodiments, the agent is in the form of a micelle or liposome. In certain embodiments, the polymer of Formula (I) and agent form a complex, and the complex is in the form of a micelle or liposome. In certain embodiments, the polymer of Formula (I) encapsulates the agent and is in the form of a micelle or liposome. In certain embodiments, the polymer of Formula (I) is mixed with the agent, and the mixture is in the form of a micelle or liposome. Micelles and liposomes are particularly useful in delivering an agent, such as a hydrophobic agent. When the micelle or liposome is complexed with (e.g., encapsulates or covers) a polynucleotide, the resulting complex may be referred to as a "lipoplex." Many techniques for preparing micelles and liposomes are known in the art, and any such method may be used herein to make micelles and liposomes.

In certain embodiments, liposomes are formed through spontaneous assembly. In some embodiments, liposomes are formed when thin lipid films or lipid cakes are hydrated and stacks of lipid crystalline bilayers become fluid and swell. The hydrated lipid sheets detach during agitation and self-close to form large, multilamellar vesicles (LMV). This prevents interaction of water with the hydrocarbon core of the bilayers at the edges. Once these liposomes have formed, reducing the size of the liposomes can be modified through input of sonic energy (sonication) or mechanical energy (extrusion). See, e.g., Walde, P. "Preparation of Vesicles (Liposomes)" In *Encylopedia of Nanoscience and Nanotechnology*; Nalwa, H. S. Ed. American Scientific Publishers: Los Angeles, 2004; Vol. 9, pp. 43-79; Szoka et al., "Comparative Properties and Methods of Preparation of Lipid Vesicles (Liposomes)" *Ann. Rev. Biophys. Bioeng.* 9:467-508, 1980; each of which is incorporated herein by reference. The preparation of liposomes may involve preparing a compound of Formula (I) for hydration, hydrating the compound with agitation, and sizing the vesicles to achieve a homogenous distribution of liposomes. A compound of Formula (I) may be first dissolved in an organic solvent in a container to result in a homogeneous mixture. The organic solvent is then removed to form a polymer-derived film. This polymer-derived film is thoroughly dried to remove residual organic solvent by placing the container on a vacuum pump for a period of time. Hydration of the polymer-derived film is accomplished by adding an aqueous medium and agitating the mixture. Disruption of LMV suspensions using sonic energy typically produces small unilamellar vesicles (SUV) with diameters in the range of 15-50 nm. Lipid extrusion is a technique in which a lipid/polymer suspension is forced through a polycarbonate filter with a defined pore size to yield particles having a diameter near the pore size of the filter used. Extrusion through filters with 100 nm pores typically yields large, unilamellar polymer-derived vesicles (LUV) with a mean diameter of 120-140 nm. In certain embodiments, the amount of a compound of Formula (I) in the liposome ranges from about 30 mol % to about 80 mol %, from about 40 mol % to about 70 mol %, or from about 60 mol % to about 70 mol %. In certain embodiments, the polymer of Formula (I) employed further complexes an agent, such as a polynucleotide. In such embodiments, the application of the liposome is the delivery of the polynucleotide.

The following scientific papers described other methods for preparing liposomes and micelles: Narang et al., "Cationic Lipids with Increased DNA Binding Affinity for Nonviral Gene Transfer in Dividing and Nondividing Cells," *Bioconjugate Chem.* 16:156-68, 2005; Hofland et al., "Formation of stable cationic lipid/DNA complexes for gene transfer," *Proc. Natl. Acad. Sci. USA* 93:7305-7309, July 1996; Byk et al., "Synthesis, Activity, and Structure—Activity Relationship Studies of Novel Cationic Lipids for DNA Transfer," *J. Med. Chem.* 41(2):224-235, 1998; Wu et al., "Cationic Lipid Polymerization as a Novel Approach for Constructing New DNA Delivery Agents," *Bioconjugate Chem.* 12:251-57, 2001; Lukyanov et al., "Micelles from lipid derivatives of water-soluble polymers as delivery systems for poorly soluble drugs," *Advanced Drug Delivery Reviews* 56:1273-1289, 2004; Tranchant et al., "Physicochemical optimization of plasmid delivery by cationic lipids," *J. Gene Med.* 6:S24-S35, 2004; van Balen et al., "Liposome/Water Lipophilicity: Methods, Information Content, and Pharmaceutical Applications," *Medicinal Research Rev.* 24(3):299-324, 2004.

Kits

Also contemplated herein are kits (e.g., packs). The kits provided may comprise a composition as described herein and a container (e.g., a vial, ampule, bottle, syringe, and/or dispenser package, or other suitable container). In some embodiments, provided kits may optionally further include a second container comprising an excipient for dilution or suspension of the composition. In some embodiments, the composition provided in the first container and the composition provided in the second container are combined to form one unit dosage form. In certain embodiments, the kits further include instructions for administering the composition. The kits may also include information as required by a regulatory agency such as the U.S. Food and Drug Administration (FDA). In certain embodiments, the information included in the kits is prescribing information. In certain embodiments, the kits, including the instructions, provide for treating and/or preventing a disease described herein. The kit may include one or more agents described herein as a separate composition.

Methods and Uses

It is estimated that over 10,000 human diseases are caused by genetic disorders, which are abnormalities in genes or chromosomes. See, e.g., McClellan, J. and M. C. King, *Genetic heterogeneity in human disease.* Cell. 141(2): p. 210-7; Leachman, S. A. et al., *J. Dermatol. Sci.,* 2008. 51(3): p. 151-7. Many of these diseases are fatal, such as cancer, severe hypercholesterolemia, and familial amyloidotic polyneuropathy. See, e.g., Frank-Kamenetsky, M. et al., *Proc. Natl. Acad. Sci. U.S.A.* 2008. 105(33): p. 11915-20; Coelho, T., *Curr. Opin. Neurol.,* 1996. 9(5): p. 355-9. Since the discovery of gene expression silencing via RNA interference (RNAi) by Fire and Mello (Fire, A. et al., *Nature,* 1998. 391(6669): p. 806-11), there has been extensive effort toward developing therapeutic applications for RNAi in humans. See, e.g., Davis, M. E., *Mol. Pharm.* 2009. 6(3): p. 659-68; Whitehead, K. A., R. Langer, and D. G. Anderson, *Nat. Rev. Drug Discovery,* 2009. 8(2): p. 129-138; Tan, S. J. et al., *Small.* 7(7): p. 841-56; Castanotto, D. and J. J. Rossi, *Nature,* 2009. 457(7228): p. 426-33; Chen, Y. and L. Huang, *Expert Opin. Drug Deliv.* 2008. 5(12): p. 1301-11; Weinstein, S. and D. Peer, Nanotechnology. 21(23): p. 232001; Fenske, D. B. and P. R. Cullis, *Expert Opin. Drug Deliv.* 2008. 5(1): p. 25-44; and Thiel, K. W. and P. H. Giangrande, *Oligonucleotides,* 2009. 19(3): p. 209-22. Currently, there are more than 20 clinical trials ongoing or completed involving siRNA therapeutics, which have shown promising results for the treatment of various diseases. See, e.g., Burnett, J. C., J. J. Rossi, and K. Tiemann, *Biotechnol. J.* 6(9): p. 1130-46. However, the efficient and safe delivery of siRNA is still a key challenge in the development of siRNA therapeutics. See, e.g., Juliano, R. et al., *Mol. Pharm.* 2009. 6(3): p. 686-95.

Vaccines prevent many millions of illnesses and save numerous lives every year. For a number of reasons related to efficacy, scale, and speed of development and deployment, the development of more potent and versatile vaccine platforms is therefore urgently needed.

Nucleic acid therapeutics have emerged as promising alternatives to conventional vaccine approaches. In particular, mRNA vaccines represent a promising alternative to conventional vaccine approaches because of their high potency, capacity for rapid development and potential for low-cost manufacture and safe administration. However, their application has until recently been restricted by the instability and inefficient in vivo delivery of mRNA. See, e.g., *Nature Reviews Drug Discovery,* 17, 261-279(2018).

In one aspect, provided are methods of delivering an agent to a subject in need thereof, or to a tissue or cell. In certain embodiments, provided are methods of delivering the agent to a target tissue to the subject. In certain embodiments, described herein are methods of selectively delivering the agent to a target tissue, compared to a non-target tissue. In certain embodiments, described herein are methods of selectively delivering the agent to a target cell, compared to a non-target cell.

In certain embodiments, provided are methods of delivering a polynucleotide to the subject or cell. In certain embodiments, provided are methods of delivering a DNA to the subject or cell. In certain embodiments, provided are methods of delivering a pDNA to the subject or cell. In certain embodiments, provided are methods of delivering an RNA to the subject or cell.

In certain embodiments, provided are methods of delivering an siRNA to the subject or cell. In certain embodiments, provided are methods of delivering an mRNA to the subject or cell. In certain embodiments, the agent is delivered into a cell of the subject.

In certain embodiments, the cell is a liver cell, kidney cell, spleen cell, lung cell, skin cell, brain cell, epithelial cell, or a cell of the gastrointestinal tract. In certain embodiments, the cell of the gastrointestinal tract is a cell of the stomach.

In certain embodiments, the cell is an immune cell, e.g., a T cell or a B cell. In certain embodiments, the cell is an endothelial cell.

In certain embodiments, the cell described herein is in vivo. In certain embodiments, the cell is in vitro. In certain embodiments, the cell is ex vitro. In certain embodiments, the methods as described herein are in vivo methods. In certain embodiments, the methods as described herein are in vitro methods. In certain embodiments, the methods as described herein are ex vitro methods.

Another aspect relates to methods of increasing the delivery of an agent to a subject, tissue, or cell. In certain embodiments, the delivery of the agent to the subject, tissue, or cell is increased by a method described herein. In certain embodiments, the delivery of the agent to the subject, tissue, or cell by a method described herein is increased compared to the delivery of the agent to the subject, tissue, or cell by a control method that does not involve a polymer of Formula (I) as described herein.

In another aspect, provided are methods of treating and/or preventing a disease, e.g, a genetic disease, proliferative disease, hematological disease, neurological disease, liver disease, spleen disease, lung disease, painful condition, psychiatric disorder, musculoskeletal disease, a metabolic disorder, inflammatory disease, infectious disease, autoimmune disease, or a disease of the gastrointestinal tract. In certain embodiments, the disease that is treated and/or prevented by the inventive methods is a genetic disease. In certain embodiments, the disease that is treated and/or prevented is cancer. In certain embodiments, the disease that is treated and/or prevented is a benign neoplasm. In certain embodiments, the disease that is treated and/or prevented by the inventive methods is pathological angiogenesis. In certain embodiments, the disease that is treated and/or prevented by the inventive methods is an inflammatory disease. In certain embodiments, the disease that is treated and/or prevented by the inventive methods is an infectious disease (e.g., a virus). In certain embodiments, the disease that is treated and/or prevented by the inventive methods is an autoimmune disease. In certain embodiments, the disease that is treated and/or prevented by the inventive methods is a hematological disease, e.g., anemia. In certain embodiments, the disease that is treated and/or prevented by the inventive methods is a neurological disease. In certain embodiments, the disease that is treated and/or prevented by the inventive methods is a disease of the gastrointestinal tract. In certain embodiments, the disease that is treated and/or prevented by the inventive methods is a painful condition.

In yet another aspect, the present disclosure provides polymers of Formula (I), and pharmaceutical compositions thereof, for use in delivering an agent to a subject in need thereof, or to a tissue or cell. In certain embodiments, provided are methods of delivering the agent to a target tissue to the subject. In certain embodiments, described herein are methods of selectively delivering the agent to a target tissue, compared to a non-target tissue. In certain embodiments, described herein are methods of selectively delivering the agent to a target cell, compared to a non-target cell.

In yet another aspect, the present disclosure provides polymers of Formula (I), and pharmaceutical compositions thereof, for use in increasing the delivery of an agent to a subject, tissue, or cell. In certain embodiments, the delivery of the agent to the subject, tissue, or cell is increased by a method described herein. In certain embodiments, the delivery of the agent to the subject, tissue, or cell by a method described herein is increased compared to the delivery of the agent to the subject, tissue, or cell by a control method that does not involve a polymer of Formula (I) as described herein.

In yet another aspect, the present disclosure provides polymers of Formula (I), and pharmaceutical compositions thereof, for use in delivering a polynucleotide to the subject or cell.

In certain embodiments, the polynucleotide is a DNA. In certain embodiments, the polynucleotide is a pDNA. In certain embodiments, the polynucleotide is an RNA. In certain embodiments, the polynucleotide is an siRNA. In certain embodiments, the polynucleotide is an mRNA. In certain embodiments, the polynucleotide is a vaccine.

In yet another aspect, the present disclosure provides polymers of Formula (I), and pharmaceutical compositions thereof, for use in treating and/or preventing a disease, e.g, a genetic disease, proliferative disease, hematological disease, neurological disease, liver disease, spleen disease, lung disease, painful condition, psychiatric disorder, musculoskeletal disease, a metabolic disorder, inflammatory disease, infectious disease, autoimmune disease, or a disease of the gastrointestinal tract. In certain embodiments, the disease that is treated and/or prevented by the inventive methods is a genetic disease. In certain embodiments, the disease that is treated and/or prevented is cancer. In certain embodiments, the disease that is treated and/or prevented is a benign neoplasm. In certain embodiments, the disease that is treated and/or prevented by the inventive methods is pathological angiogenesis. In certain embodiments, the disease that is treated and/or prevented by the inventive methods is an inflammatory disease. In certain embodiments, the disease that is treated and/or prevented by the inventive methods is an infectious disease (e.g., a virus). In certain embodiments, the disease that is treated and/or prevented by the inventive methods is an autoimmune disease. In certain embodiments, the disease that is treated and/or prevented by the inventive methods is a hematological disease, e.g., anemia. In certain embodiments, the disease that is treated and/or prevented by the inventive methods is a neurological disease. In certain embodiments, the disease that is treated and/or prevented by the inventive methods is a disease of the gastrointestinal tract. In certain embodiments, the disease that is treated and/or prevented by the inventive methods is a painful condition.

In another aspect, the present disclosure provides for the use polymers of Formula (I), and pharmaceutical compositions thereof, in the manufacture of a medicament for treating and/or preventing a disease, e.g, a genetic disease, proliferative disease, hematological disease, neurological disease, liver disease, spleen disease, lung disease, painful condition, psychiatric disorder, musculoskeletal disease, a metabolic disorder, inflammatory disease, infectious disease, autoimmune disease, or a disease of the gastrointestinal tract. In certain embodiments, the disease that is treated and/or prevented by the inventive methods is a genetic disease. In certain embodiments, the disease that is treated and/or prevented is cancer. In certain embodiments, the disease that is treated and/or prevented is a benign neoplasm. In certain embodiments, the disease that is treated and/or prevented by the inventive methods is pathological angiogenesis. In certain embodiments, the disease that is treated and/or prevented by the inventive methods is an inflammatory disease. In certain embodiments, the disease that is treated and/or prevented by the inventive methods is an infectious disease (e.g., a virus). In certain embodiments, the disease that is treated and/or prevented by the inventive methods is an autoimmune disease. In certain embodiments, the disease that is treated and/or prevented by the inventive methods is a hematological disease, e.g., anemia. In certain embodiments, the disease that is treated and/or prevented by the inventive methods is a neurological disease. In certain embodiments, the disease that is treated and/or prevented by the inventive methods is a disease of the gastrointestinal tract. In certain embodiments, the disease that is treated and/or prevented by the inventive methods is a painful condition.

In certain embodiments, the subject is a human. In certain embodiments, the subject is a non-human animal.

EXAMPLES

In order that the present disclosure may be more fully understood, the following examples are set forth. The synthetic and biological examples described in this application are offered to illustrate the compounds, pharmaceutical compositions, methods, and uses provided herein and are not to be construed in any way as limiting their scope.

Materials: Dimethyl sulfoxide (DMSO), tris(2-amino ethylamine), 2,2' ethylenedioxy bis(ethylamine), cysteamine, N-methylethylenediamine, 5-amino-1-pentanol, 3-amino-1, 2-propanediol, and 3-amino-1-propanol were obtained from Sigma Aldrich. 1,4-butanediol diacrylate, 1,6-hexanediol diacrylate and 1-(3-aminopropyl)-4-methypiperazine were obtained from Alfa Aesar. 1,3-propanediol diacrylate was purchased from Monomer, Polymer and Dajac labs. 2,4,6 trinitrobenzylsulfonic acid (TNBSA) was purchased from ThermoFisher Scientific. CleanCap eGFP and Cre mRNA were purchased from Trilink BioTechnologies (San Diego, USA).

Example 1: Development of Branched Poly(β-Amino Esters) for Nucleic Acid Delivery Monomers used to prepare polymers of Formula (I) include amine alcohols and hydrophobic diacrylates, as described above. When these monomers were combined such that there was an excess of the amine, the polymers so generated transfected efficiently. Polymers were generated with an excess of diacrylate. This generated polymers with acrylate end-groups. These polymers were then reacted with a small amount of linkers (e.g., amines) such that multiple polymer chains could complex onto the same linker molecule. Finally, these polymers were end capped with an excess of primary amine. Based on the ratio of polymer: cross-linking amine used, the cross-linking amine used, and finally the ratio of the polymers used in this reaction, a library of polymers was generated. The characterization of these polymers is described in further detail below.

Synthesis of Linear Hybrid, Branched and Branched Hybrid Polymers

Select linear poly(P amino esters) (PBAEs) were prepared as described below. To prepare the linear PBAEs, amines and acrylates were weighed in a glass vial, placed on a hot plate at 90° C., and stirred overnight. The list of amines and diacrylates used are shown in FIG. 1A. The molar ratio of the amines and diacrylates used to prepare the linear PBAEs and polymer numbers used to identify them are shown below. For some linear polymers, an excess of diacrylate was used. After the overnight reaction, the polymers were dissolved in dimethylsulfoxide (DMSO) at a concentration of 100 mg/mL. An end-capping agent [1-(3-aminopropyl)-4-methylpiperazine] was added to the polymer and reacted for 2 hours.

To prepare linear hybrid polymers (FIG. 1C), acrylate-terminated polymers were dissolved in DMSO at various ratios at a concentration of 100 mg/mL. A linker molecule (5-amino-1-pentanol) was added to the polymer solution, and the reaction was allowed to proceed for 24 hours. At the end of this period, the end-capping agent was added to consume the unreacted acrylates, and the reaction allowed to proceed for 2 hours at room temperature.

Tables 1-3 show the components of various linear hybrid polymers and their polymer number used for linear hybrid polymers, their constituent linear polymers, the weight ratio of the two linear polymers, and the molar ratio of the linear polymers to the linker used in the reaction. Table 1 shows polymers where polymer A is #13. Table 2 shows polymers where polymer A is #29. Table 3 shows polymers where polymer A is #198. The linker used for the synthesis of the linear hybrid polymers was (5-amino-1-pentanol).

TABLE 1

Linear hybrid polymers

| Polymer A No. | Polymer B No. | Ratio A:B by wt. | Molar ratio of Linker:(A + B) | Polymer No. |
|---|---|---|---|---|
| 13 | 29 | 3:5 | 0.75 | 676 |
|   |   |   | 1 | 661 |
|   |   |   | 1.25 | 640 |
|   |   |   | 1.5 | 624 |
|   |   |   | 1.75 | 613 |
|   |   | 1:1 | 0.75 | 683 |
|   |   |   | 1 | 665 |
|   |   |   | 1.25 | 647 |
|   |   |   | 1.5 | 632 |
|   |   |   | 1.75 | 617 |
|   |   | 5:3 | 0.75 | 687 |
|   |   |   | 1 | 672 |
|   |   |   | 1.25 | 653 |
|   |   |   | 1.5 | 638 |
|   |   |   | 1.75 | 625 |
|   | 95 | 3:5 | 0.75 | 674 |
|   |   |   | 1 | 657 |
|   |   |   | 1.25 | 635 |
|   |   |   | 1.5 | 619 |
|   |   |   | 1.75 | 608 |
|   |   | 1:1 | 0.75 | 678 |
|   |   |   | 1 | 663 |
|   |   |   | 1.25 | 645 |
|   |   |   | 1.5 | 629 |
|   |   |   | 1.75 | 615 |
|   |   | 5:3 | 0.75 | 685 |
|   |   |   | 1 | 670 |
|   |   |   | 1.25 | 650 |
|   |   |   | 1.5 | 636 |
|   |   |   | 1.75 | 621 |

TABLE 2

Linear hybrid polymers

| Polymer A No. | Polymer B No. | Ratio A:B by wt. | Molar ratio of Linker:(A + B) | Polymer No. |
|---|---|---|---|---|
| 29 | 95 | 3:5 | 0.75 | 649 |
|   |   |   | 1 | 626 |
|   |   |   | 1.25 | 609 |
|   |   |   | 1.5 | 604 |
|   |   |   | 1.75 | 601 |
|   |   | 1:1 | 0.75 | 652 |
|   |   |   | 1 | 628 |
|   |   |   | 1.25 | 610 |
|   |   |   | 1.5 | 605 |
|   |   |   | 1.75 | 602 |

TABLE 2-continued

Linear hybrid polymers

| Polymer A No. | Polymer B No. | Ratio A:B by wt. | Molar ratio of Linker:(A + B) | Polymer No. |
|---|---|---|---|---|
| | | 5:3 | 0.75 | 654 |
| | | | 1 | 630 |
| | | | 1.25 | 611 |
| | | | 1.5 | 606 |
| | | | 1.75 | 603 |
| | 198 | 3:5 | 0.75 | 686 |
| | | | 1 | 671 |
| | | | 1.25 | 651 |
| | | | 1.5 | 637 |
| | | | 1.75 | 623 |
| | | 1:1 | 0.75 | 682 |
| | | | 1 | 664 |
| | | | 1.25 | 646 |
| | | | 1.5 | 631 |
| | | | 1.75 | 616 |
| | | 5:3 | 0.75 | 675 |
| | | | 1 | 660 |
| | | | 1.25 | 639 |
| | | | 1.5 | 622 |
| | | | 1.75 | 612 |

TABLE 3

Linear hybrid polymers

| Polymer A No. | Polymer B No. | Ratio A:B by wt. | Molar ratio of Linker:(A + B) | Polymer No. |
|---|---|---|---|---|
| 198 | 13 | 3:5 | 0.75 | 690 |
| | | | 1 | 681 |
| | | | 1.25 | 669 |
| | | | 1.5 | 659 |
| | | | 1.75 | 643 |
| | | 1:1 | 0.75 | 689 |
| | | | 1 | 680 |
| | | | 1.25 | 668 |
| | | | 1.5 | 658 |
| | | | 1.75 | 642 |
| | | 5:3 | 0.75 | 688 |
| | | | 1 | 679 |
| | | | 1.25 | 667 |
| | | | 1.5 | 656 |
| | | | 1.75 | 641 |
| | 95 | 3:5 | 0.75 | 673 |
| | | | 1 | 655 |
| | | | 1.25 | 633 |
| | | | 1.5 | 618 |
| | | | 1.75 | 607 |
| | | 1:1 | 0.75 | 677 |
| | | | 1 | 662 |
| | | | 1.25 | 644 |
| | | | 1.5 | 627 |
| | | | 1.75 | 614 |
| | | 5:3 | 0.75 | 684 |
| | | | 1 | 666 |
| | | | 1.25 | 648 |
| | | | 1.5 | 634 |
| | | | 1.75 | 620 |

Branched hybrid polymers were prepared by the same procedure as described for the linear hybrid polymers. However, instead of using a linker with only one primary amine, linker molecules with two primary amines, one primary amine and one secondary amine, three primary amines or one primary amine and a thiol were used. The synthetic scheme for making branched hybrid polymers is shown in FIG. 1C.

Branched polymers were prepared following the same procedure used to synthesize the branched hybrid polymers, except that the reaction was done with only one linear polymer instead of two. Tables 5-7 show the assigned polymer numbers used for branched hybrid polymers, their constituent linear polymers, weight ratio of the two polymers, and the molar ratio of the linear polymers to the linker used in the reaction. Polymers shown in bold were not used for future experimentation.

The branching reaction was confirmed by measuring the amount of amine remaining in the reaction using a colorimetric assay. As shown in FIG. 1D, amine decreased over time.

In a certain embodiments, branched and branched hybrid polymers were prepared as follows. To the linear polymers were dissolved in DMSO at a concentration of 166.7 mg/ml. Branching agents were dissolved in DMSO at a concentration of 100 mg/ml. The branching agent solution and the polymer solution were mixed in a 4-ml glass vial in mass ratios shown in FIG. 21 and FIG. 22.

DMSO was added to this mixture which brought the total volume to 0.58 ml. The samples were placed on a shaker at room temperature for 24 h. To synthesize the branched polymers, one linear polymer was used for each reaction. For the branched hybrid polymers, two linear polymers were used. Following the branching reaction, the polymers were end capped using 1-(3-aminopropyl)-4-methypiperazine as described above.

In certain embodiments, the progression of the branching reaction was determined as follows. Two orthogonal methods were used: one method measured the consumption of the terminal acrylate groups in the polymer; the second method evaluated the incorporation of the branching agent into the polymer. To evaluate the consumption of the acrylate groups in the branching reaction, the linear polymers were mixed with the branching agent using a method identical to the one described for polymer synthesis. At various times, the reaction mixture was analyzed using 1H-NMR (Brucker) and the area under the curve of the acrylate peak was measured. Linear polymers without any branching agent were used as the control. To confirm the progression of the branching reaction, the amount of unreacted branching agent in the reaction mixture was also measured. To perform this analysis, the linear polymers were mixed with the branching agent using a method identical to that which was used for the synthesis of the polymers. At various times, 0.1M sodium bicarbonate (pH 8.5) was added to the reaction mixture, which led to the precipitation of both the polymer and the reacted branching agent. The mixture was centrifuged and the supernatant containing unreacted branching agent was collected and stored at −20° C. until further analysis. The concentration of amines (branching agent) in the samples was measured using a TNBSA assay (ThermoFisher Scientific 28997) according to the manufacturer's protocol (FIG. 14). For each assay, a standard curve of the branching agent in question was prepared to ascertain the linearity of the assay.

Table 4 shows the components of various branched polymers and the assigned polymer numbers used to identify them. This table shows the assigned polymer numbers used for branched polymers, their constituent linear polymers, and the molar ratio of the linear polymers to the linker used in the reaction. One polymer (polymer #514) was converted into a gel during the reaction and was not used for any future experiments.

TABLE 4

Branched polymers generated using linkers with two primary amines

| Linear Polymer No. | Molar ratio of Linker:(A + B) | Linker β | Linker λ | Linker μ | Linker Θ |
|---|---|---|---|---|---|
| 13 | 0.75 | 520 | 560 | 540 | 580 |
|  | 1 | 518 | 558 | 538 | 578 |
|  | 1.25 | 516 | 556 | 536 | 576 |
|  | 1.5 | 513 | 553 | 533 | 573 |
|  | 1.75 | 510 | 550 | 530 | 570 |
| 29 | 0.75 | 514 | 554 | 534 | 574 |
|  | 1 | 508 | 548 | 528 | 568 |
|  | 1.25 | 506 | 546 | 526 | 566 |
|  | 1.5 | 504 | 544 | 524 | 564 |
|  | 1.75 | 502 | 542 | 522 | 562 |
| 95 | 0.75 | 511 | 551 | 531 | 571 |
|  | 1 | 507 | 547 | 527 | 567 |
|  | 1.25 | 505 | 545 | 525 | 565 |
|  | 1.5 | 503 | 543 | 523 | 563 |
|  | 1.75 | 501 | 541 | 521 | 561 |
| 198 | 0.75 | 519 | 559 | 539 | 579 |
|  | 1 | 517 | 557 | 537 | 577 |
|  | 1.25 | 515 | 555 | 535 | 575 |
|  | 1.5 | 512 | 552 | 532 | 572 |
|  | 1.75 | 509 | 549 | 529 | 569 |

TABLE 5

Branched hybrid polymers and assigned polymer number

| Polymer A No. | Polymer B No. | Ratio A:B by wt. | Molar ratio of Linker: (A + B) | β | λ | μ | Θ |
|---|---|---|---|---|---|---|---|
| 13 | 29 | 3:5 | 0.75 | 921 | 931 | 936 | 926 |
|  |  |  | 1 | 922 | 932 | 937 | 927 |
|  |  |  | 1.25 | 923 | 933 | 938 | 928 |
|  |  |  | 1.5 | 924 | 934 | 939 | 929 |
|  |  |  | 1.75 | 925 | 935 | 940 | 930 |
|  |  | 1:1 | 0.75 | 941 | 951 | 956 | 946 |
|  |  |  | 1 | 942 | 952 | 957 | 947 |
|  |  |  | 1.25 | 943 | 953 | 958 | 948 |
|  |  |  | 1.5 | 944 | 954 | 959 | 949 |
|  |  |  | 1.75 | 945 | 955 | 960 | 950 |
|  |  | 5:3 | 0.75 | 961 | 971 | 976 | 966 |
|  |  |  | 1 | 962 | 972 | 977 | 967 |
|  |  |  | 1.25 | 963 | 973 | 978 | 968 |
|  |  |  | 1.5 | 964 | 974 | 979 | 969 |
|  |  |  | 1.75 | 965 | 975 | 980 | 970 |
|  | 95 | 3:5 | 0.75 | 861 | 871 | 876 | 866 |
|  |  |  | 1 | 862 | 872 | 877 | 867 |
|  |  |  | 1.25 | 863 | 873 | 878 | 868 |
|  |  |  | 1.5 | 864 | 874 | 879 | 869 |
|  |  |  | 1.75 | 865 | 875 | 880 | 870 |
|  |  | 1:1 | 0.75 | 881 | 891 | 896 | 886 |
|  |  |  | 1 | 882 | 892 | 897 | 887 |
|  |  |  | 1.25 | 883 | 893 | 898 | 888 |
|  |  |  | 1.5 | 884 | 894 | 899 | 889 |
|  |  |  | 1.75 | 885 | 895 | 900 | 890 |
|  |  | 5:3 | 0.75 | 901 | 911 | 916 | 906 |
|  |  |  | 1 | 902 | 912 | 917 | 907 |
|  |  |  | 1.25 | 903 | 913 | 918 | 908 |
|  |  |  | 1.5 | 904 | 914 | 919 | 909 |
|  |  |  | 1.75 | 905 | 915 | 920 | 910 |

TABLE 6

Branched hybrid polymers

| Polymer A No. | Polymer B No. | Ratio A:B by wt. | Molar ratio of Linker: (A + B) | β | λ | μ | Θ |
|---|---|---|---|---|---|---|---|
| 29 | 95 | 3:5 | 0.75 | 1041 | 1051 | 1056 | 1046 |
|  |  |  | 1 | 1042 | 1052 | 1057 | 1047 |
|  |  |  | 1.25 | 1043 | 1053 | 1058 | 1048 |
|  |  |  | 1.5 | 1044 | 1054 | 1059 | 1049 |
|  |  |  | 1.75 | 1045 | 1055 | 1060 | 1050 |
|  |  | 1:1 | 0.75 | 1061 | 1071 | 1076 | 1066 |
|  |  |  | 1 | 1062 | 1072 | 1077 | 1067 |
|  |  |  | 1.25 | 1063 | 1073 | 1078 | 1068 |
|  |  |  | 1.5 | 1064 | 1074 | 1079 | 1069 |
|  |  |  | 1.75 | 1065 | 1075 | 1080 | 1070 |

TABLE 6-continued

Branched hybrid polymers

| Polymer A No. | Polymer B No. | Ratio A:B by wt. | Molar ratio of Linker: (A + B) | β | λ | μ | Θ |
|---|---|---|---|---|---|---|---|
| | | 5:3 | 0.75 | 1081 | 1091 | 1096 | 1086 |
| | | | 1 | 1082 | 1092 | 1097 | 1087 |
| | | | 1.25 | 1083 | 1093 | 1098 | 1088 |
| | | | 1.5 | 1084 | 1094 | 1099 | 1089 |
| | | | 1.75 | 1085 | 1095 | 1100 | 1090 |
| | 198 | 3:5 | 0.75 | 981 | 991 | 996 | 986 |
| | | | 1 | 982 | 992 | 997 | 987 |
| | | | 1.25 | 983 | 993 | 998 | 988 |
| | | | 1.5 | 984 | 994 | 999 | 989 |
| | | | 1.75 | 985 | 995 | 1000 | 990 |
| | | 1:1 | 0.75 | 1001 | 1011 | 1016 | 1006 |
| | | | 1 | 1002 | 1012 | 1017 | 1007 |
| | | | 1.25 | 1003 | 1013 | 1018 | 1008 |
| | | | 1.5 | 1004 | 1014 | 1019 | 1009 |
| | | | 1.75 | 1005 | 1015 | 1020 | 1010 |
| | | 5:3 | 0.75 | 1021 | 1031 | 1036 | 1026 |
| | | | 1 | 1022 | 1032 | 1037 | 1027 |
| | | | 1.25 | 1023 | 1033 | 1038 | 1028 |
| | | | 1.5 | 1024 | 1034 | 1039 | 1029 |
| | | | 1.75 | 1025 | 1035 | 1040 | 1030 |

TABLE 7

Branched hybrid polymers

| Polymer A No. | Polymer B No. | Ratio A:B by wt. | Molar ratio of Linker: (A + B) | β | λ | μ | Θ |
|---|---|---|---|---|---|---|---|
| 198 | 13 | 3:5 | 0.75 | 801 | 811 | 816 | 806 |
| | | | 1 | 802 | 812 | 817 | 807 |
| | | | 1.25 | 803 | 813 | 818 | 808 |
| | | | 1.5 | 804 | 814 | 819 | 809 |
| | | | 1.75 | 805 | 815 | 820 | 810 |
| | | 1:1 | 0.75 | 821 | 831 | 836 | 826 |
| | | | 1 | 822 | 832 | 837 | 827 |
| | | | 1.25 | 823 | 833 | 838 | 828 |
| | | | 1.5 | 824 | 834 | 839 | 829 |
| | | | 1.75 | 825 | 835 | 840 | 830 |
| | | 5:3 | 0.75 | 841 | 851 | 856 | 846 |
| | | | 1 | 842 | 852 | 857 | 847 |
| | | | 1.25 | 843 | 853 | 858 | 848 |
| | | | 1.5 | 844 | 854 | 859 | 849 |
| | | | 1.75 | 845 | 855 | 860 | 850 |
| | 95 | 3:5 | 0.75 | 1101 | 1111 | 1116 | 1106 |
| | | | 1 | 1102 | 1112 | 1117 | 1107 |
| | | | 1.25 | 1103 | 1113 | 1118 | 1108 |
| | | | 1.5 | 1104 | 1114 | 1119 | 1109 |
| | | | 1.75 | 1105 | 1115 | 1120 | 1110 |
| | | 1:1 | 0.75 | 1121 | 1131 | 1136 | 1126 |
| | | | 1 | 1122 | 1132 | 1137 | 1127 |
| | | | 1.25 | 1123 | 1133 | 1138 | 1128 |
| | | | 1.5 | 1124 | 1134 | 1139 | 1129 |
| | | | 1.75 | 1125 | 1135 | 1140 | 1130 |
| | | 5:3 | 0.75 | 1141 | 1151 | 1156 | 1146 |
| | | | 1 | 1142 | 1152 | 1157 | 1147 |
| | | | 1.25 | 1143 | 1153 | 1158 | 1148 |
| | | | 1.5 | 1144 | 1154 | 1159 | 1149 |
| | | | 1.75 | 1145 | 1155 | 1160 | 1150 |

Synthesis of PBAE Nanoparticles

Figure 15A:
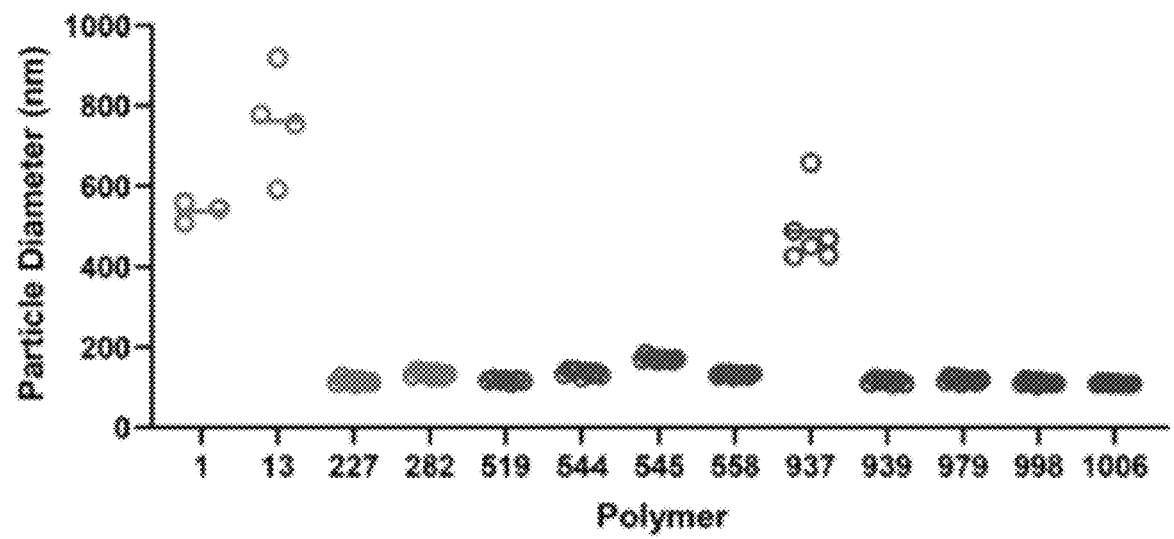
FIGS. 15A-15B show nanoparticle characterization.
Figure 15B:
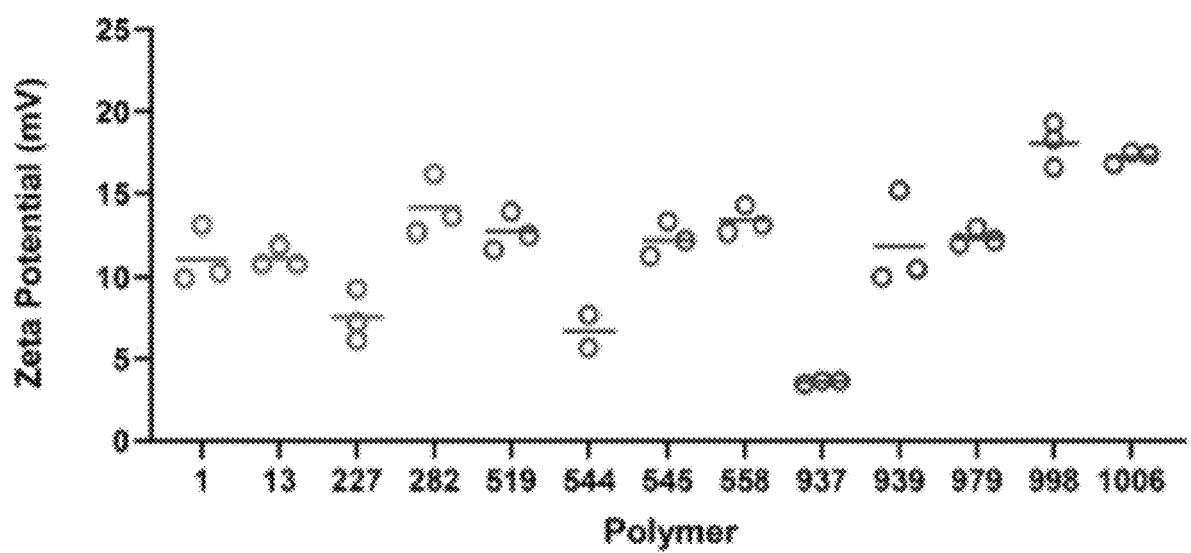
Figure 16B:
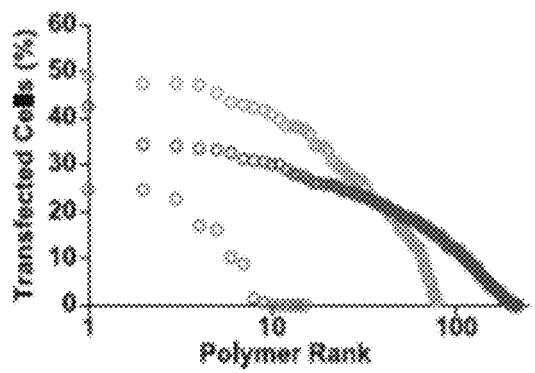
FIGS. 16B-16I show transfection efficiency of PBAE nanoparticles.
Figure 16C:
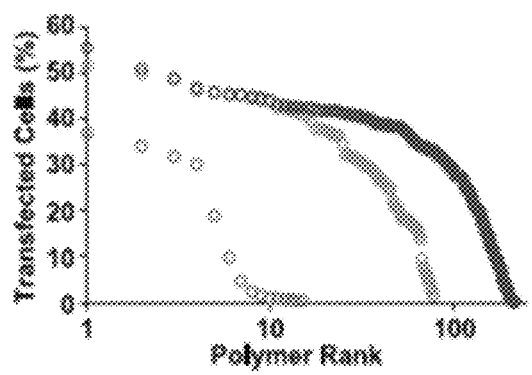
Figure 16D:
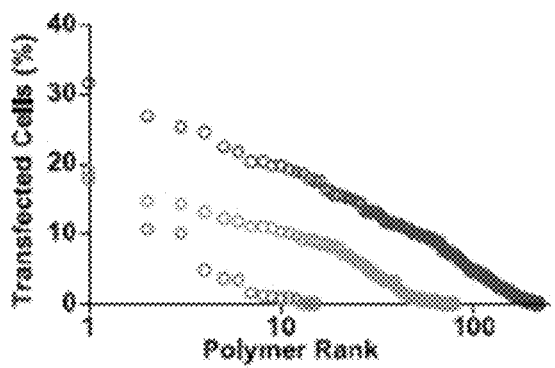
Figure 16E:
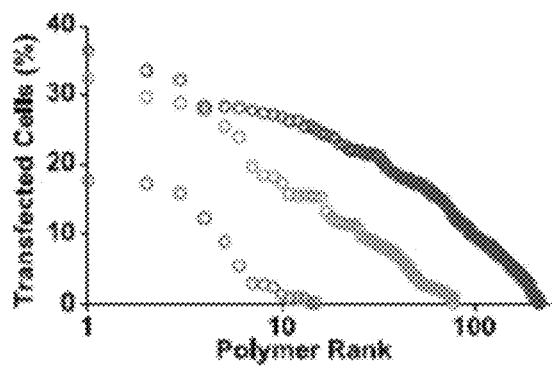
Figure 16F:
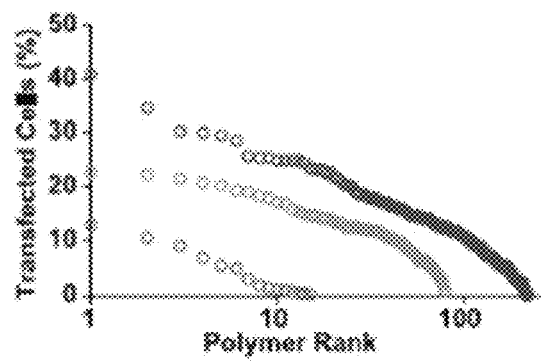
Figure 16G:
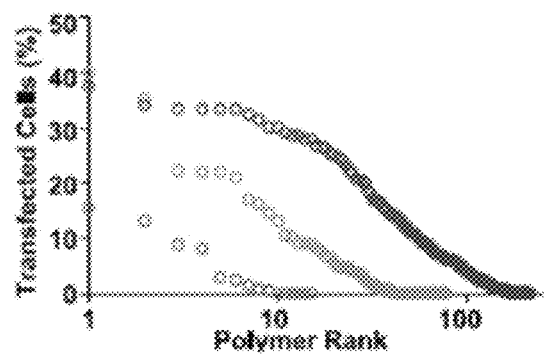
Figure 16H:
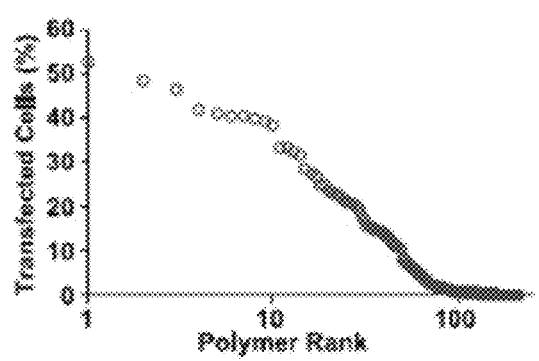
Figure 16I:
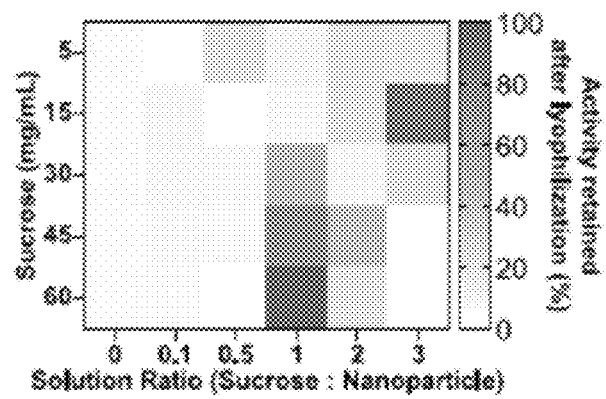
Figure 17A:
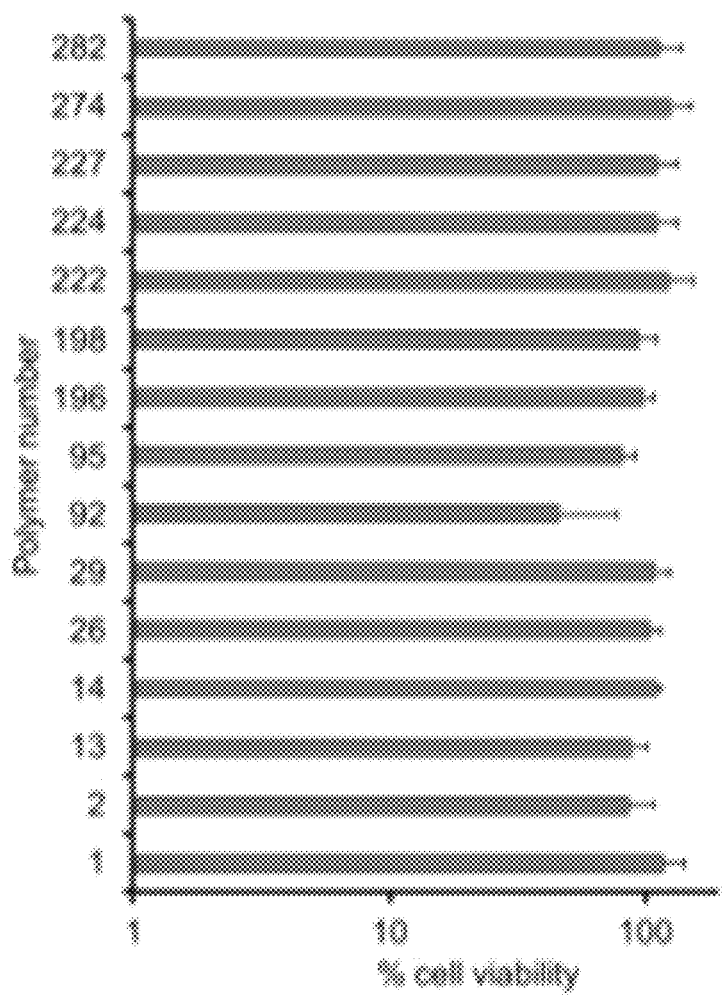
FIGS. 17A-17D show cell viability of HeLa cells upon exposure to plasmid-complexed nanoparticles. Mean±S.D., n=3.
Figure 17B:
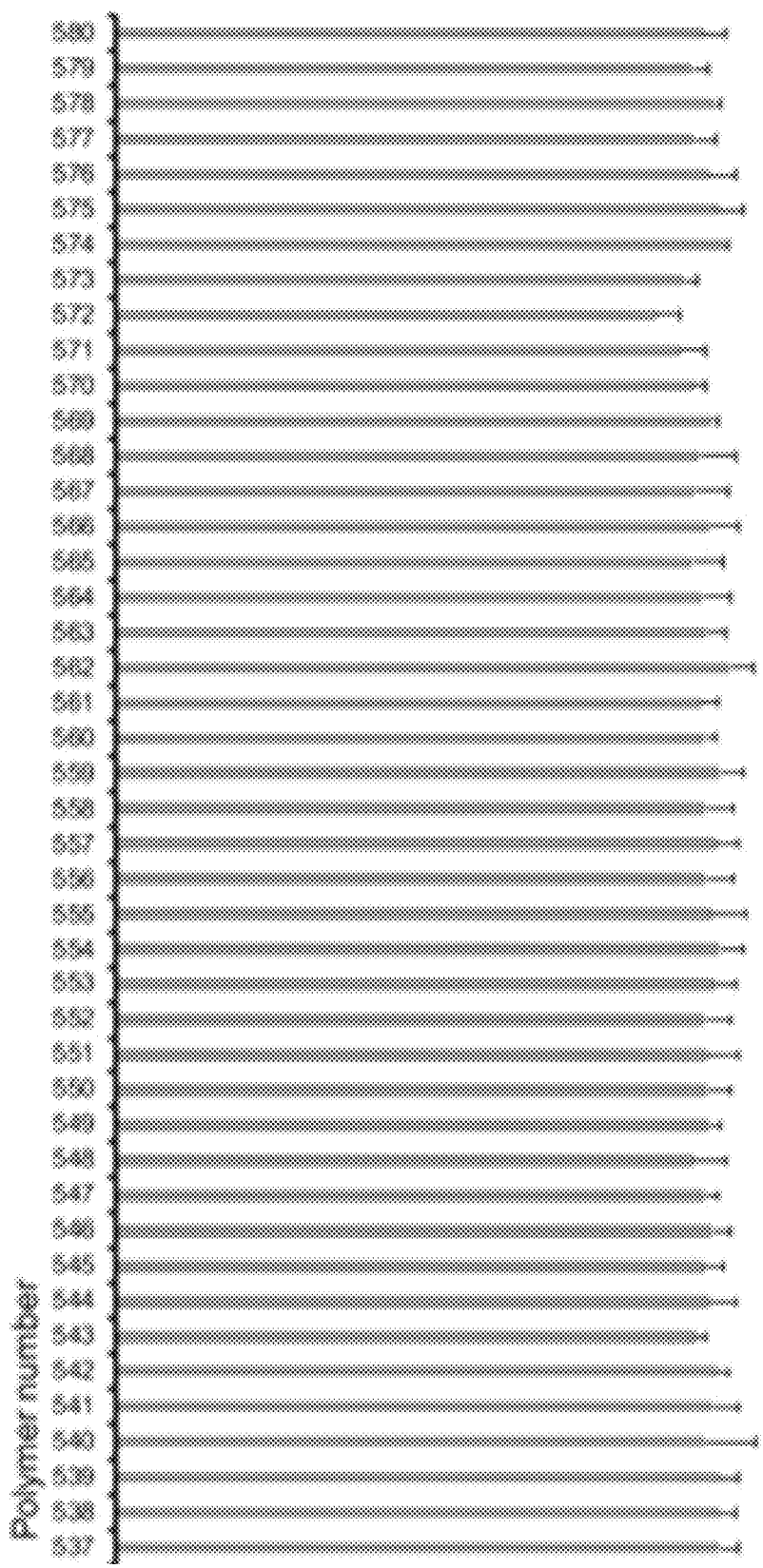
Figure 17C:
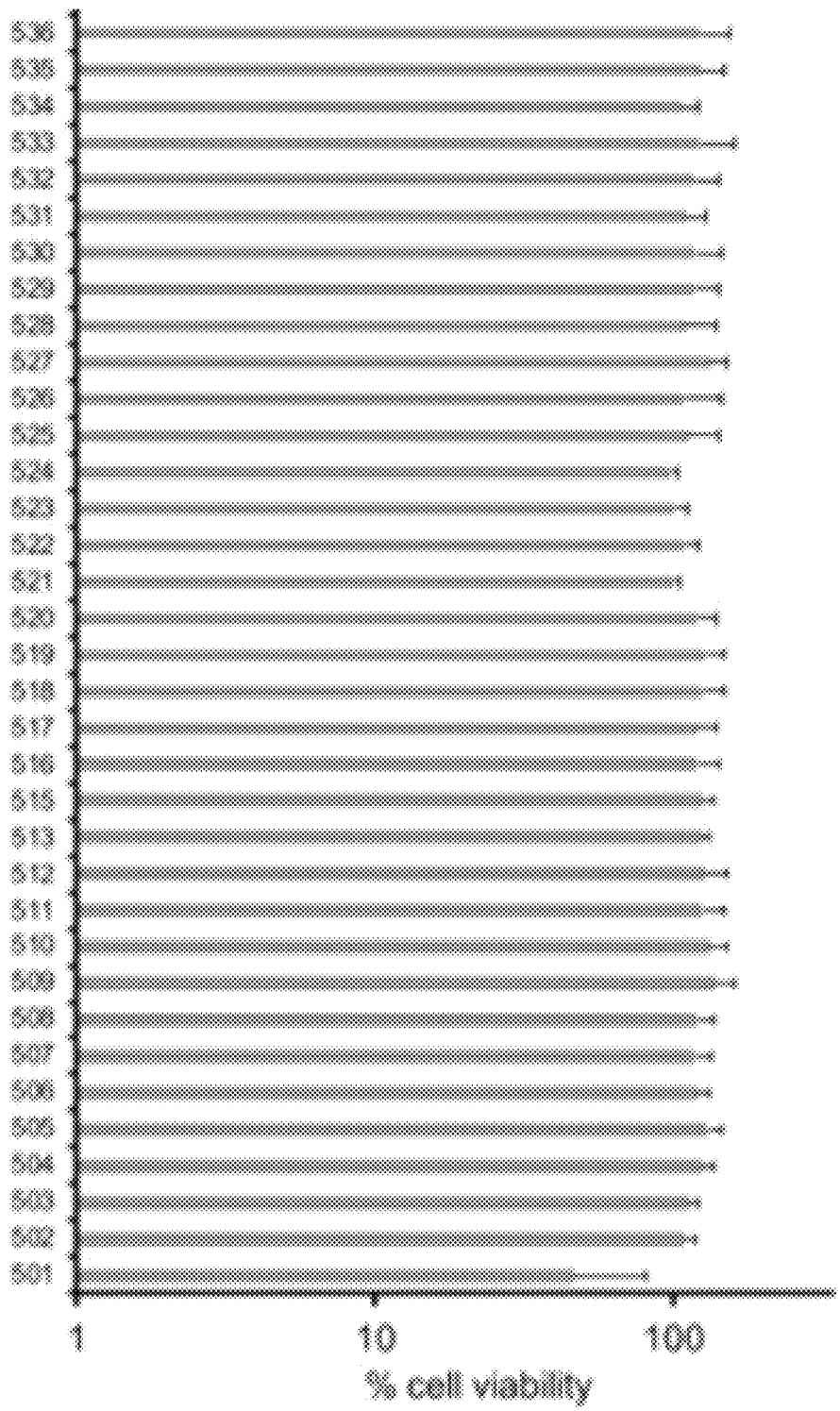
Figure 17D:
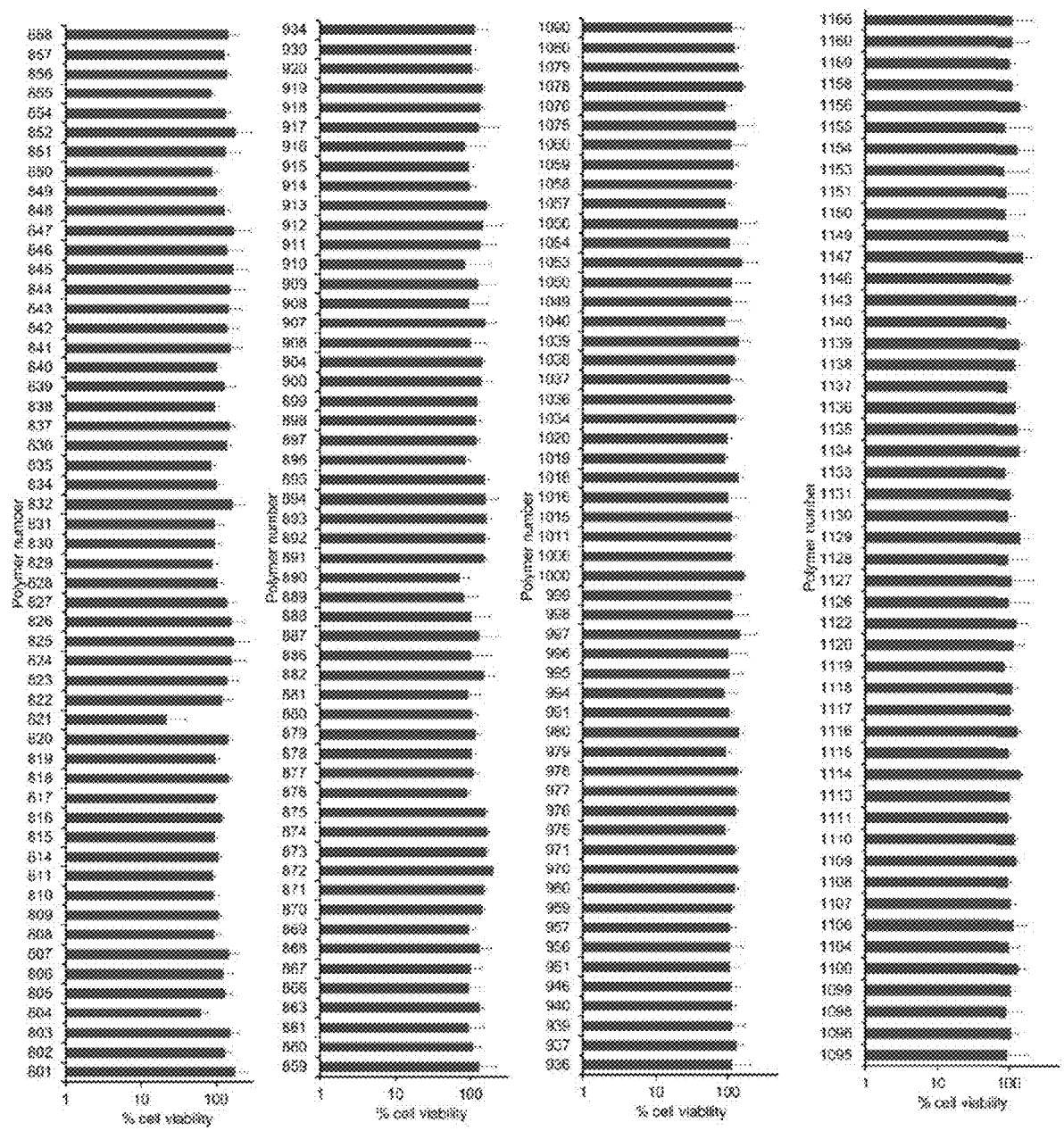

To synthesize the nanoparticles, DMSO-based solutions of the polymers were diluted in 25 mM sodium acetate buffer (pH 3.8) to a concentration of 2 mg/ml. Nucleic acid (plasmid DNA or mRNA) was diluted in the same buffer to a concentration of 0.02 mg/ml. Equal volumes of the polymer and nucleic acid solutions were mixed by adding the polymer solution to the solution of the nucleic acid and pipetting the mixture 15-20 times. The mixture was allowed to stand for 10 minutes to ensure complete formation of the nanoplexes. The nanoplexes were diluted in deionized water prior to analysis. Size and zeta potential of the nanoparticles were determined using Zeta NanoZS machine (Malvern) (FIG. 15).

Encapsulation efficiency was determined as follows. Nanoparticles were prepared as described above. Following the 10 minute standing, the nanoparticles were centrifuged at 12000 RPM for 15 minutes. The supernatant was discarded to remove the unencapsulated mRNA and the nanoparticle pellet was dispersed in Tris-EDTA buffer pH 8. The polymer-mRNA complex was disrupted by incubating with heparin (10 mg/ml, Tris-EDTA buffer) for 15 minutes at 37° C. Ribogreen reagent was added to the samples and fluorescence was measured. Standards of known concentrations were treated the same way and were used to produce a calibration curve.

High Throughput Analysis of the In Vitro Transfection Efficiency of PBAE Nanoparticles The ability of the nanoparticles to transfect a variety of cells in vitro was tested using high throughput flow cytometry. The nanoparticles were tested in RAW cells (mouse macrophage), PK15 cells (pig kidney), HeLa cells (human cervical cancer), human mesenchymal stem cells, Caco2 cells (human colon cancer cells), and primary human aortic endothelial cells. Cells were plated in a 96-well plate one day prior to transfection. For all cells except Caco2 cells, ten thousand cells were plated in each well. Twenty-five thousand cells were seeded in each well for Caco2 cells. On the day of the experiment, polymers dissolved in DMSO were diluted to 2 mg/ml in 25 mM acetate buffer. The polymer solution was mixed with a solution of plasmid DNA or mRNA [0.02 mg/ml in 25 mM acetate buffer; sfGFP-N1 plasmid (Addgene) or eGFP clean cap mRNA (Trilink)] to form the nanoparticles. The nanoparticles were added to the cells and diluted with serum free media to achieve a plasmid concentration of 1 µg/ml. After 4.5 hours, the treatments were replaced with complete media. Twenty-four hour later, cells were collected using appropriate dissociation media (trypsin for Caco2 cells, TrypLE for all other cells) and analyzed using flow cytometry on an Intellicyt iQue high throughput flow cytometer. Data in FIG. 16 is the median value reported from three biologically independent experiments. Each circle represents an individual polymer.

Nanoparticle Lyophilization

The goal of these experiments was to design a formulation of nanoparticles that retains its transfection efficiency following lyophilization. Nanoparticles were prepared as described above by mixing polymer 846 and mRNA. Sucrose solutions (5, 15, 30, 45 and 60 mg/ml) in acetate buffer were added to the nanoparticle dispersion at volume ratios of 0.1:1, 0.5:1, 1:1, 2:1 and 3:1. The suspensions were frozen at −80° C. and lyophilized (Labconco). Following lyophilization, the nanoparticles were dispersed in a mixture of water and serum-free media to ensure isotonicity. Following lyophilization, since the majority of the formulation contains sucrose, it appeared to be a translucent/opaque pellet. Following reconstitution in media, the appearance was clear and indistinguishable from freshly prepared nanoparticles. Nanoparticles were added to cells and incubated for 4.5 h, after which the treatments were replaced with serum containing media. Twenty-four hours later, transfection efficiency was assessed using high throughput flow cytometry as described above. Freshly prepared nanoparticles were used as positive controls. Transfection efficiency of lyophilized nanoparticles is expressed relative to that of the freshly prepared nanoparticles in FIG. 16H.

Lyophilization in the absence of a protectant led to a complete loss of transfection efficiency. However, adding sucrose in select concentrations led to a complete retention of transfection efficiency (FIG. 11) and allowed an increase in the concentration of nanoparticles by a factor of >100×.

Physicochemical Characterization of Polymer and Polymer-Plasmid Nanoparticles

Figure 2A:
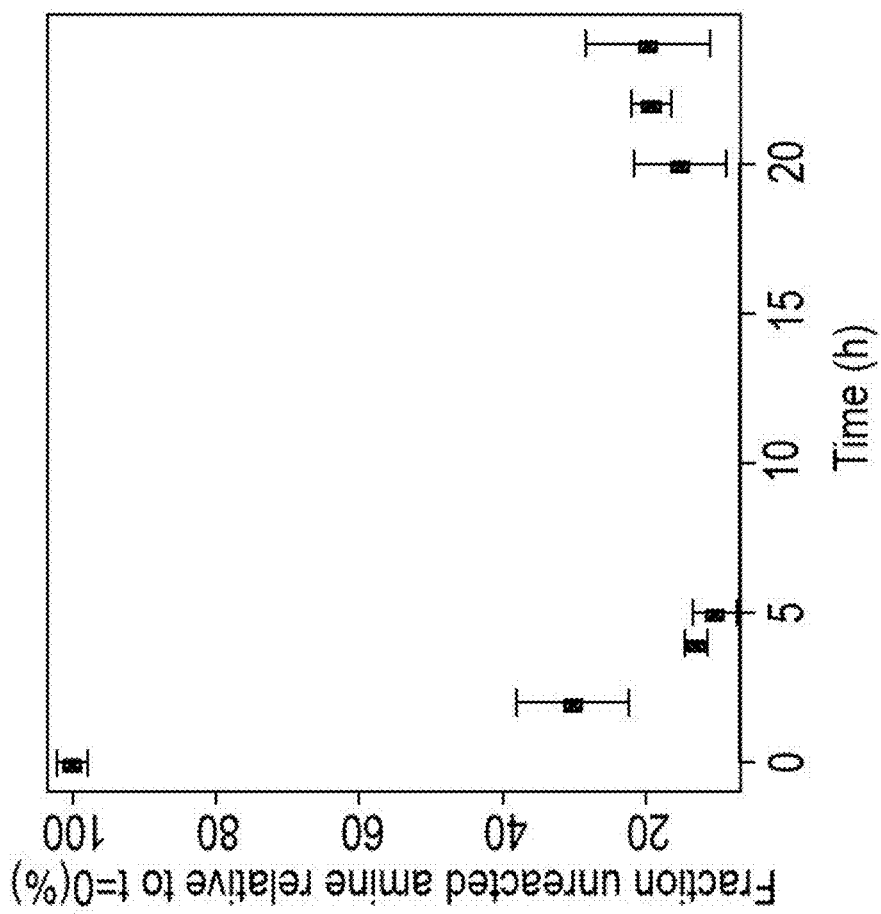
FIGS. 2A-2D show the physicochemical characterization of polymer and polymer-plasmid nanoparticles.

To determine the rate of reaction of the amine with the linear PBAE polymers, linear polymers 13 and 29 were mixed with the linker p in DMSO at ratios described for the preparation of polymer 979 in FIG. 2. At various times, the DMSO solution was added to 0.1 M sodium bicarbonate solution (pH 8.5) to precipitate the polymers. Only unreacted linker p remained in solution. The concentration of p was determined using an assay used to quantify primary amines according to the manufacturer's protocol (ThermoFisher Scientific catalogue #28997). Known concentrations of p in 0.1 M sodium bicarbonate (pH 8.5) were used to prepare a standard curve. FIG. 2A shows that nearly all of the linker was reacted within the first 6 hours of the reaction. Data is represented as mean±S.D., n=3.

Figure 2B:
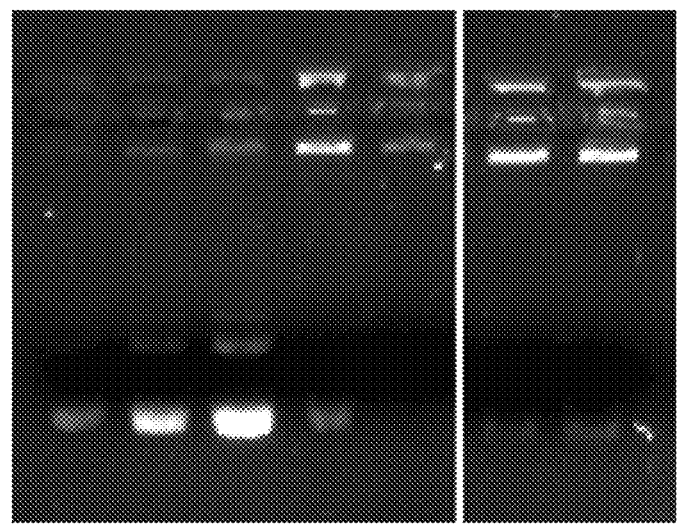

To determine if the newly synthesized polymers could complex plasmid DNA, plasmid DNA was mixed with either a linear polymer (100:1 w/w, linear polymer:plasmid DNA) or with a branched hybrid polymer. The mixture was then vortexed at high speed for 15 seconds, and then allowed to sit for 10 minutes at room temperature. The mixtures were then analyzed using a southern blot. As shown in FIG. 2B, the first three lanes show increasing amounts of free plasmid DNA. When combined with the linear polymer, the plasmid DNA was complexed, as evidenced by its reduced mobility in the gel. A similar complexation occurs when mixed with branched hybrid polymers.

Figures 2C, 2D:
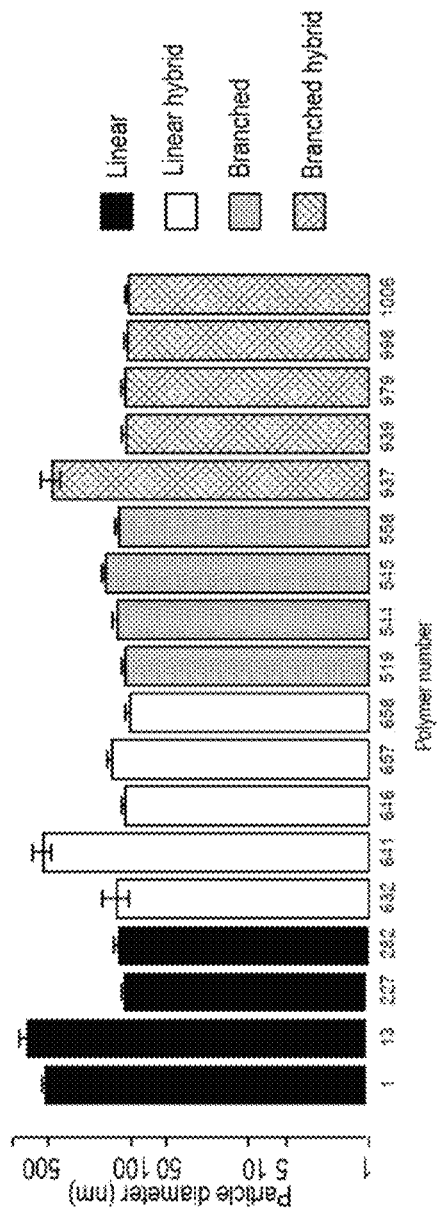

The complexes formed between linear, linear hybrid, branched and branched hybrid polymers with plasmid DNA were analyzed using dynamic light scattering. As shown in FIG. 2C, all polymers tested formed nanoparticles when combined with plasmid DNA, and their sizes varied depending on the polymer used. Data is represented as mean±S.D., n=10.

The zeta potential of the complexes between various polymers and plasmid DNA was also analyzed. As shown in FIG. 2D, all polymers formed complexes with a net positive zeta potential. Data is represented as mean±S. D., n=3.

Transfection Efficiency of Various Polymers in Human, Mouse and Pig Cell Lines

Cells were seeded into a 96-well plate (10000 cells/well) overnight. On the next day, cells were treated with nanoparticles formed by complexing plasmid DNA encoding green fluorescent protein (GFP) and different polymers. The ratio of polymer to plasmid DNA was fixed at 100:1 w/w, and a final concentration of 1 µg/mL plasmid DNA was added to the cells. The volume in each well was 0.1 mL. After 4.5 hours of incubation, the treatment was removed, and fresh media was added to the cells. On the next day, the cells were trypsinized and GFP expression in cells was analyzed using flow cytometry. Untreated cells were used as controls.

Figure 3A:
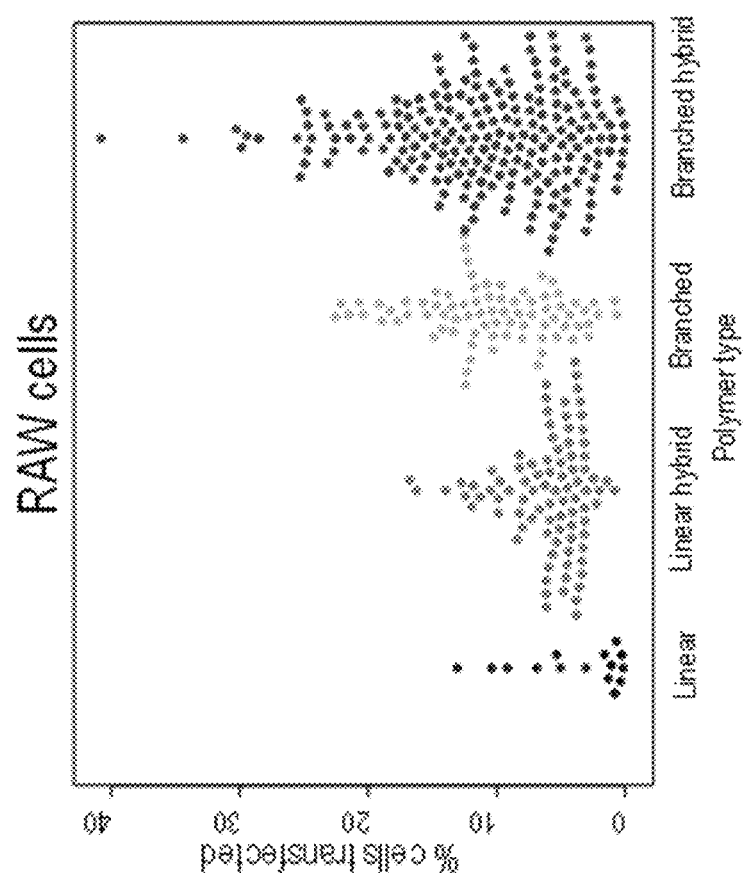
FIG. 3A shows the transfection efficiency of various polymers in a RAW cell line.
Figures 3B, 3C:
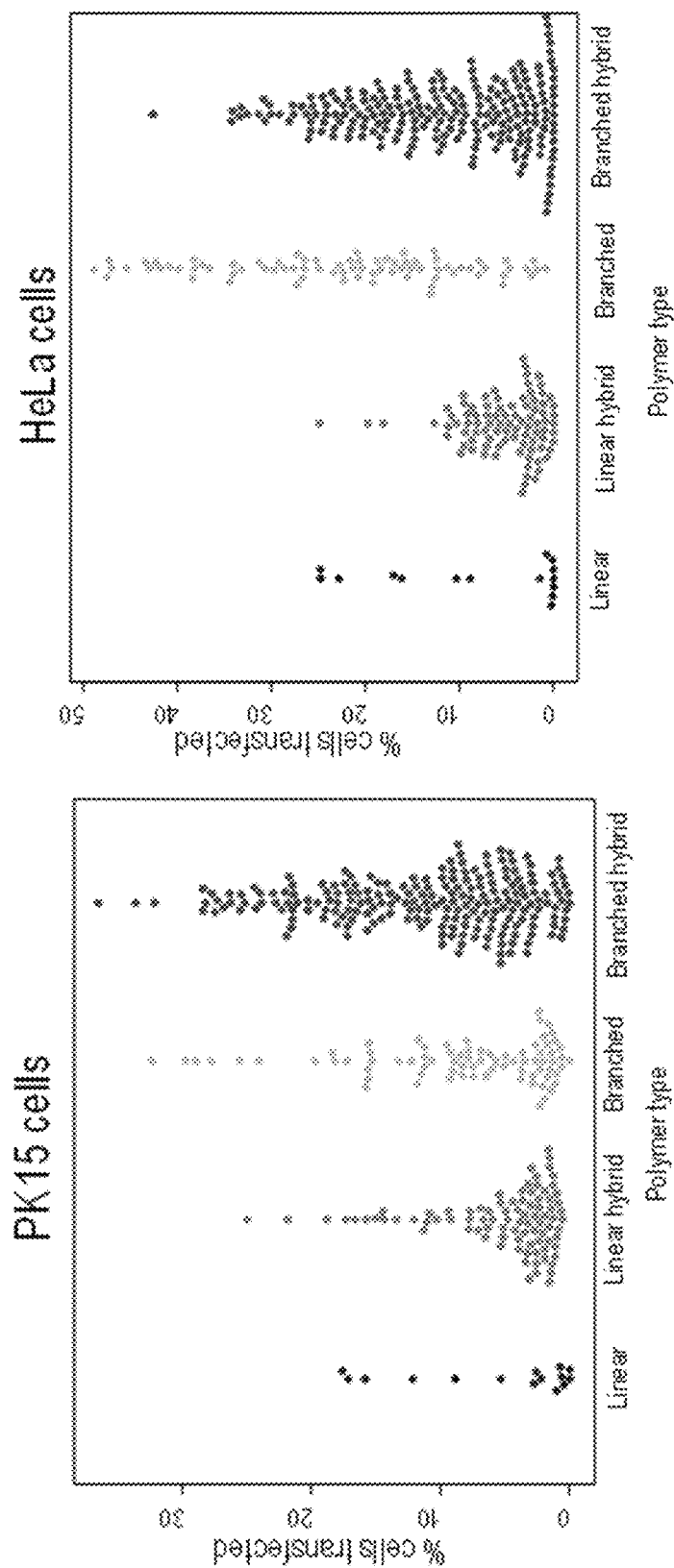
FIG. 3B shows the transfection efficiency of various polymers in PK15 cells.
FIG. 3C shows the transfection efficiency of various polymers in HeLa cells.
Figures 3D, 3E:
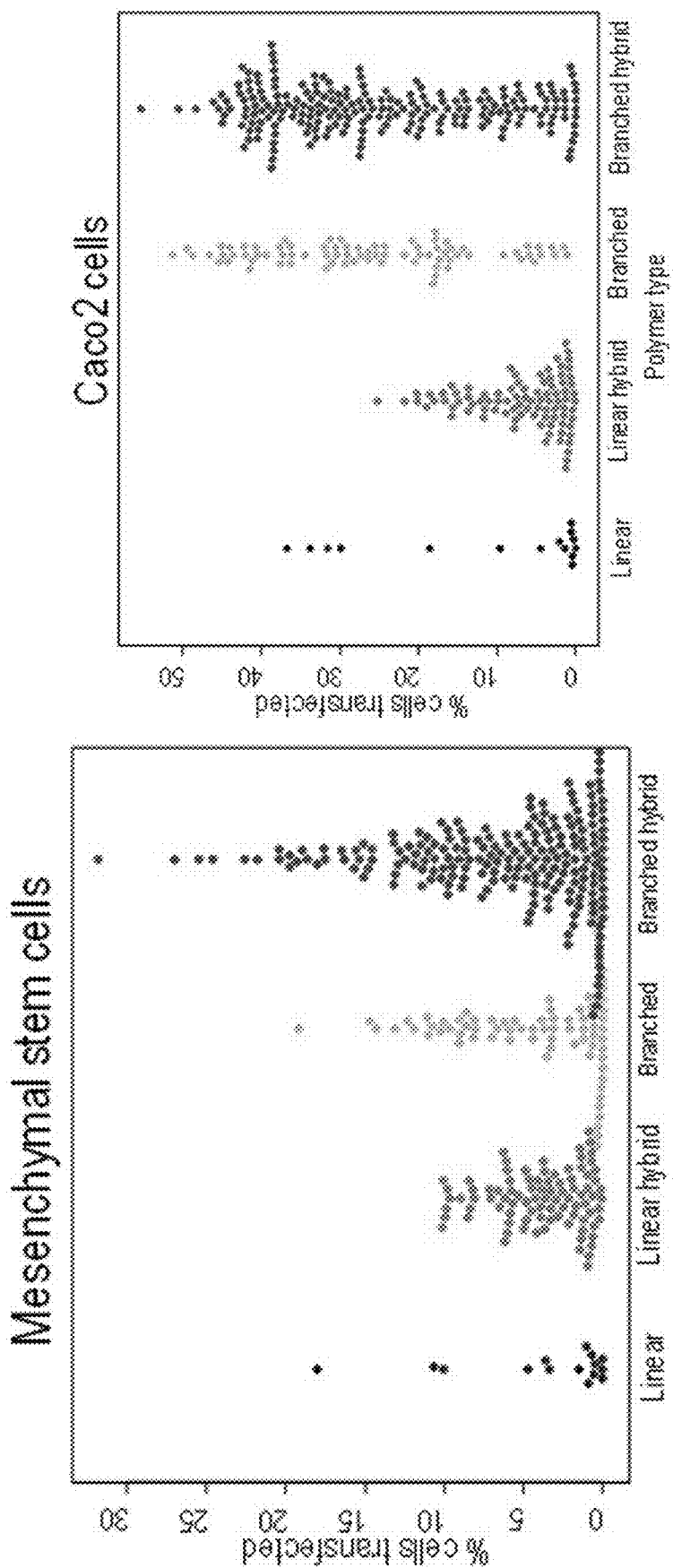
FIG. 3D shows the transfection efficiency of various polymers in mesenchymal stem cells.
FIG. 3E shows the transfection efficiency of various polymers in CaCo2 cells.
Figure 3F:
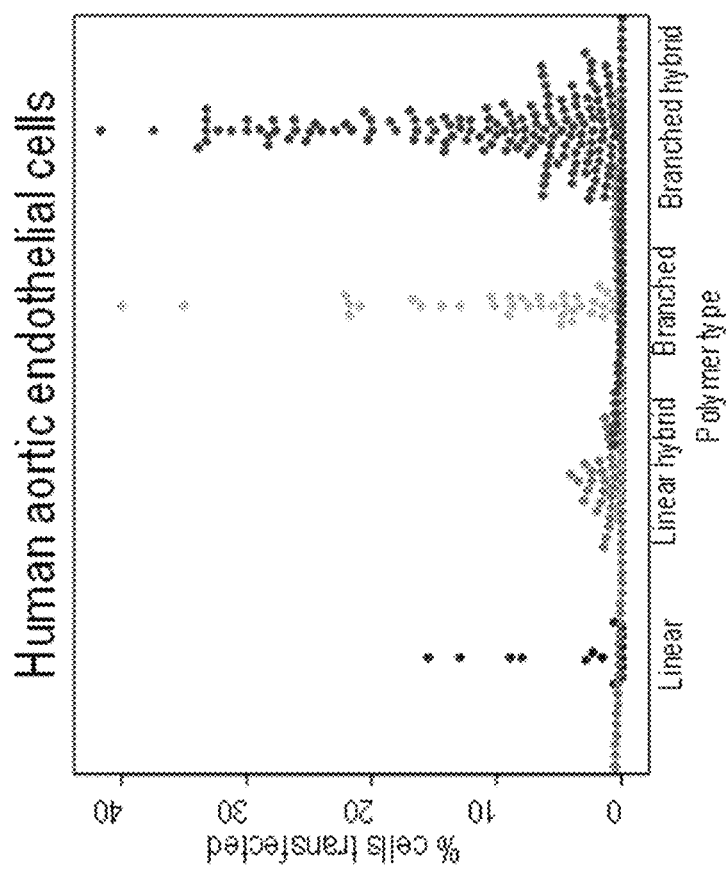
FIG. 3F shows the transfection efficiency of various polymers in human aortic endothelial cells.
Figure 3G:
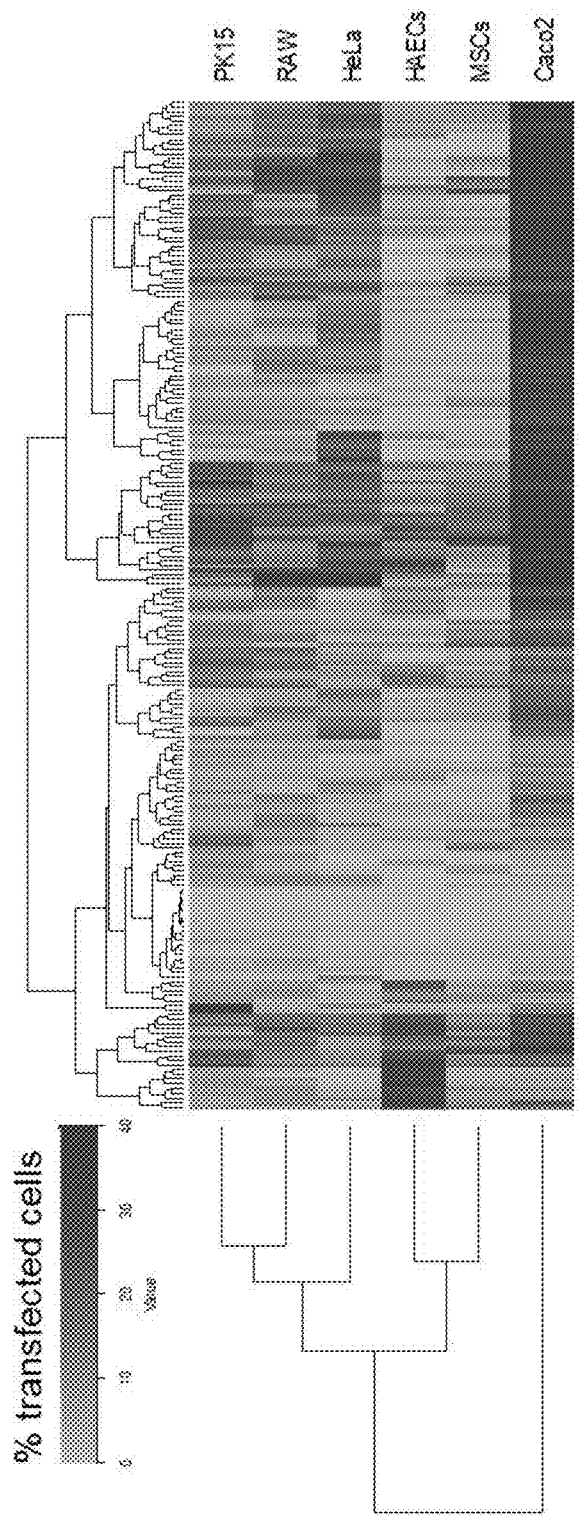
FIG. 3G shows transfection efficiency of the branched hybrid polymer library in the various cell lines in vitro. Each row in the heat map is a different cell line; each column is a different branched hybrid polymer; and the color code indicates transfection efficiency. Several polymers were found that transfect select cell lines potently, but that show less transfection in other cell lines.

The transfection efficiencies of various polymers in RAW cells (mouse macrophage) (FIG. 3A), PK1 6 cells (pig kidney) (FIG. 3B), HeLa cells (FIG. 3C), human mesenchymal stem cells (FIG. 3D), Caco2 cells (FIG. 3E), and primary human aortic endothelial cells (FIG. 3F) were measured. As shown in FIGS. 3A-3F, each circle in the plot indicates a single polymer and the polymers are classified into the four categories based on their method of synthesis. In all cell types studied, either one of the branched polymers or the branched hybrid polymers transfected cells more efficiently than the top performing linear polymer. The selectivity of the branched polymers is shown in FIG. 3G. The data is the median value of three biologically independent experiments.

Cell Uptake of Cy5-Labeled Plasmid DNA in HeLa and Mesenchymal Stem Cells

Figure 4A:
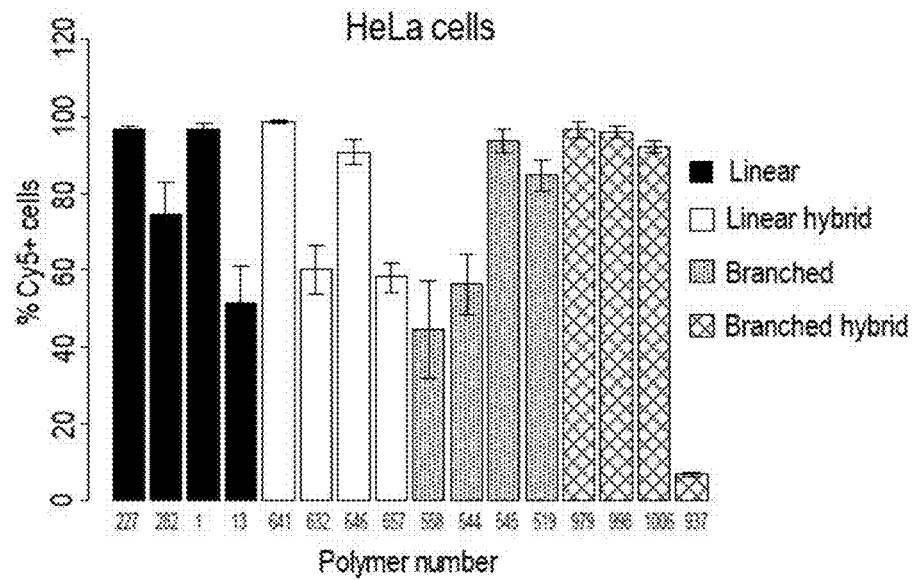
FIGS. 4A-4C show cell uptake of Cy5-labeled plasmid DNA in HeLa (FIG. 4A) and mesenchymal stem cells (MSC) (FIG. 4B).
Figure 4B:
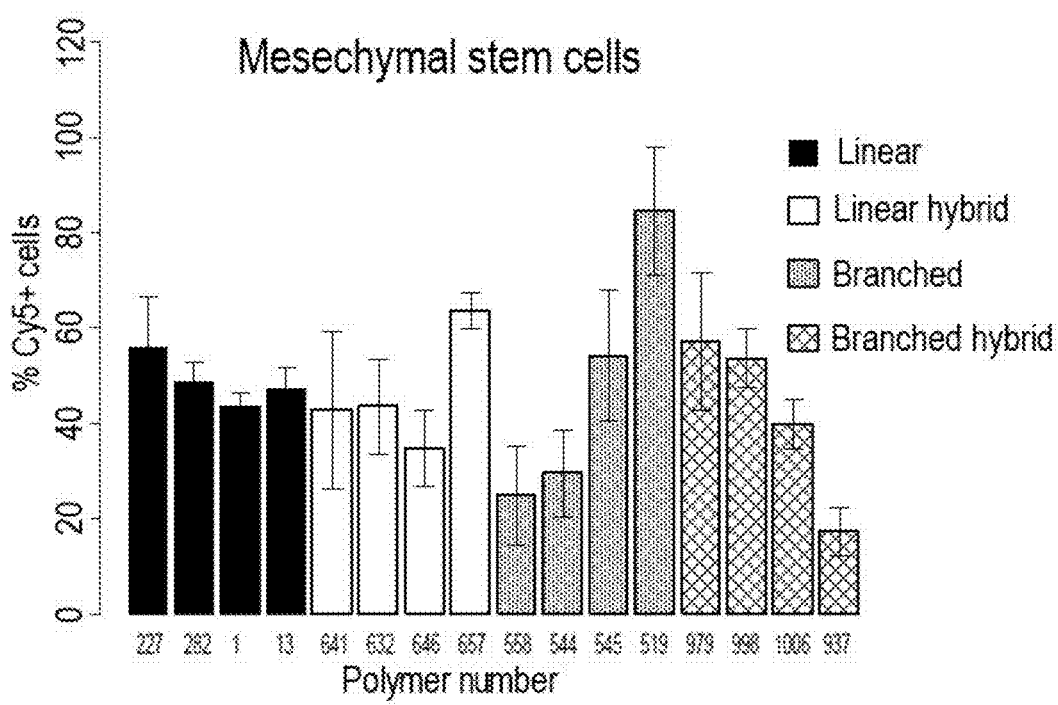
Figure 4C:
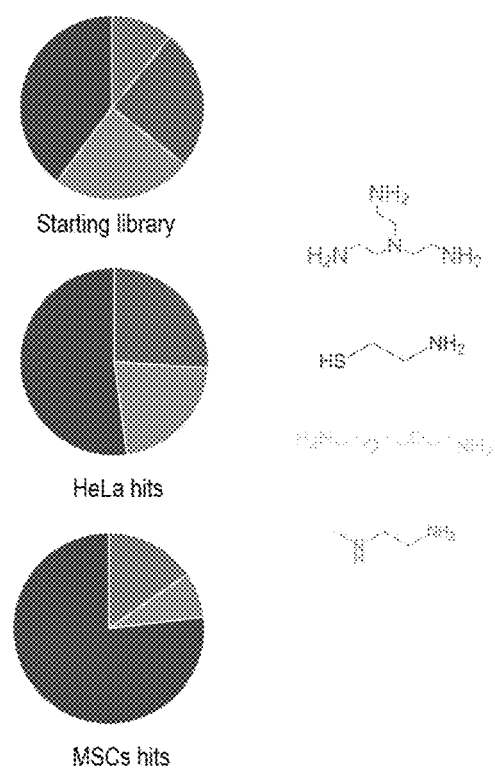

A Cy5 fluorophore was covalently conjugated to plasmid DNA according to the manufacturer's instructions (Mirus, MIR7021). The fluorescently labeled DNA was then complexed with various polymers as described above. HeLa (FIG. 4A) or mesenchymal stem cells (FIG. 4B) were then treated with various formulations for 4.5 hours. After the incubation time, treatments were removed and the cells were washed with phosphate buffered saline (0.15 mM, pH 7.4). The cells were trypsinized and analyzed using flow cytometry. Results showed that different polymers lead to different cell uptake efficiencies. Cell uptake in HeLa cells was generally higher than that observed in mesenchymal stem cells, perhaps due to a higher relative representation of the branching agents in the starting library (FIG. 4C).

Delivery of Fluorescently Labeled siRNA to HeLa and Caco2 Cells

Figure 5A:
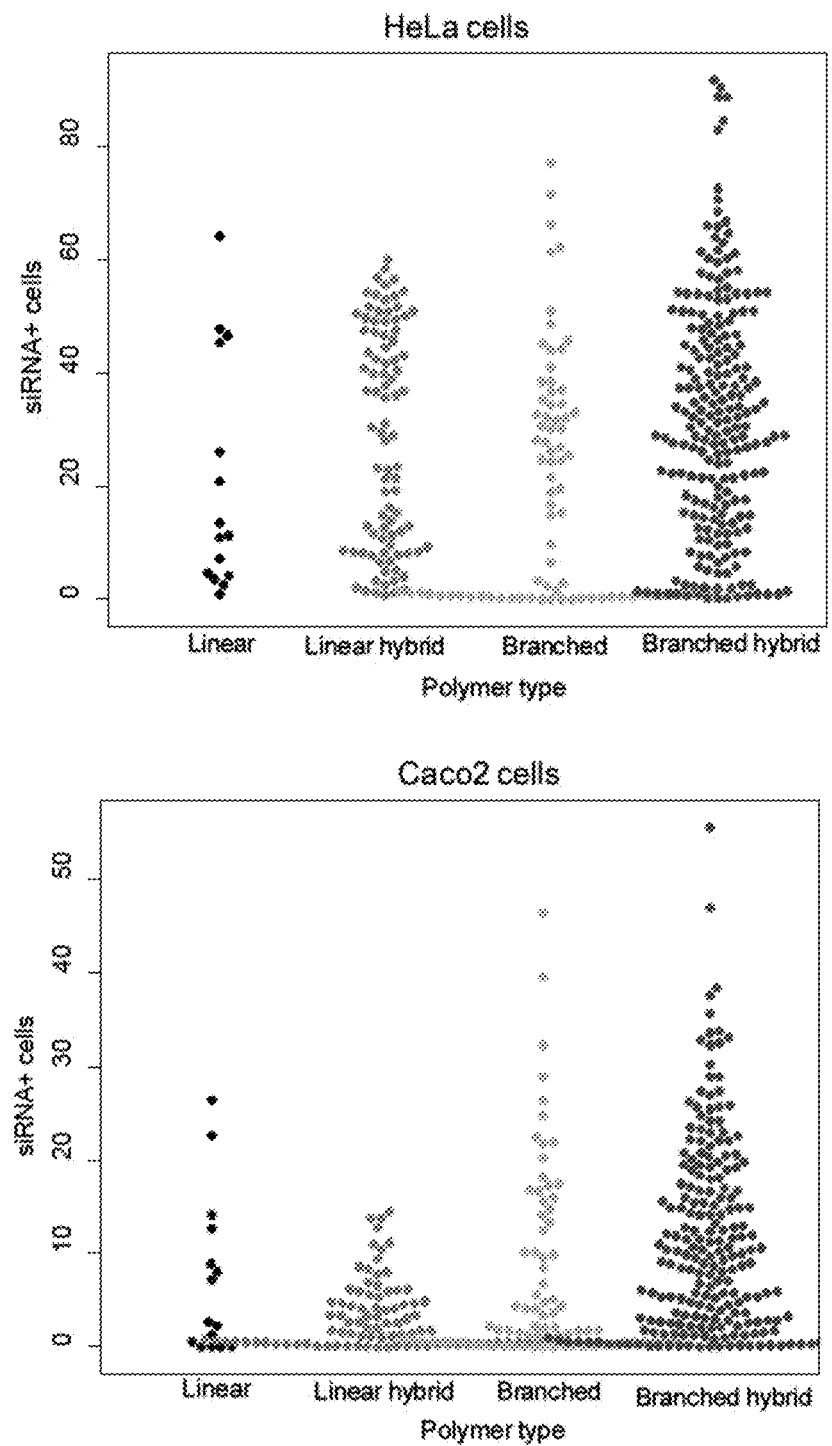
FIG. 5A shows delivery of fluorescently labeled siRNA to HeLa and Caco2 cells.
Figure 5B:
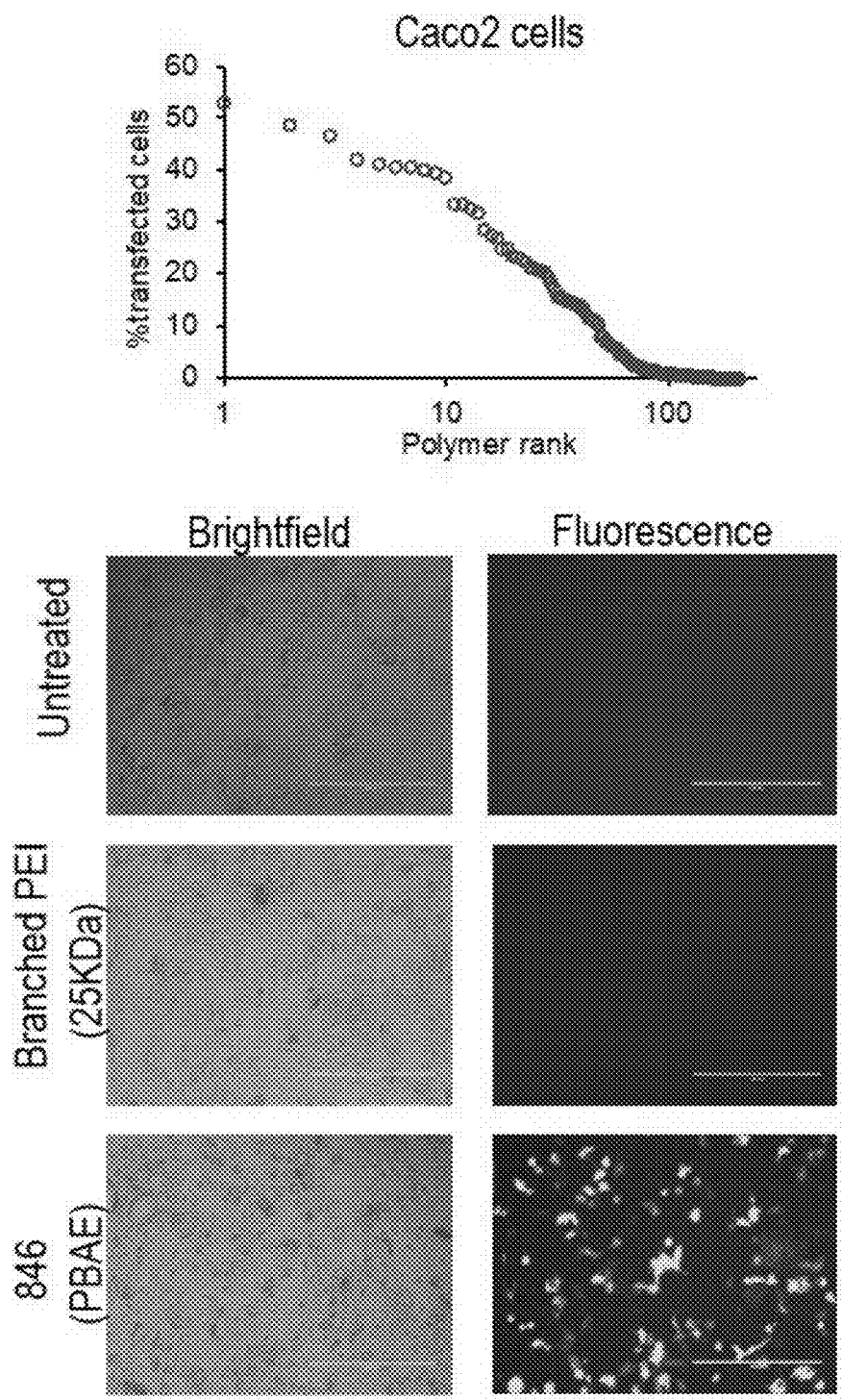
FIG. 5B shows mRNA delivery in Caco2 cells.
Figures 6A, 6B:
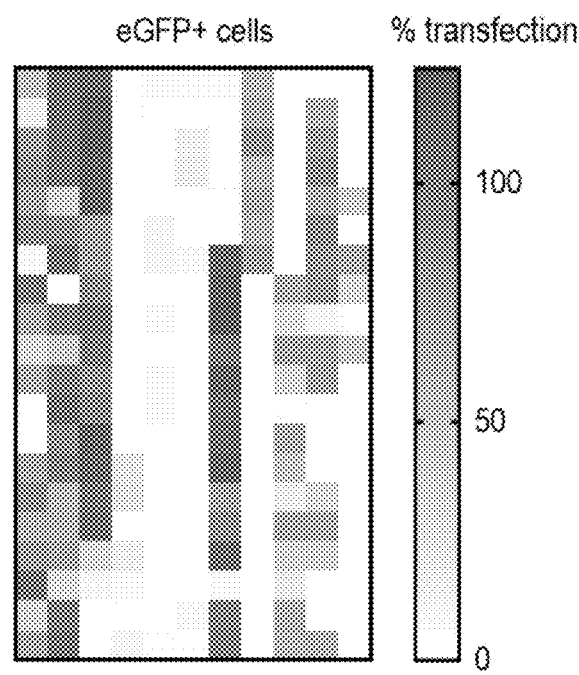
FIG. 6A shows the results of transfection of Caco-2 cells as measured by eGFP fluorescence intensity measured by flow cytometry method.
FIG. 6B shows the polymer number corresponding to the reaction well in FIG. 6A.
Figure 6C:
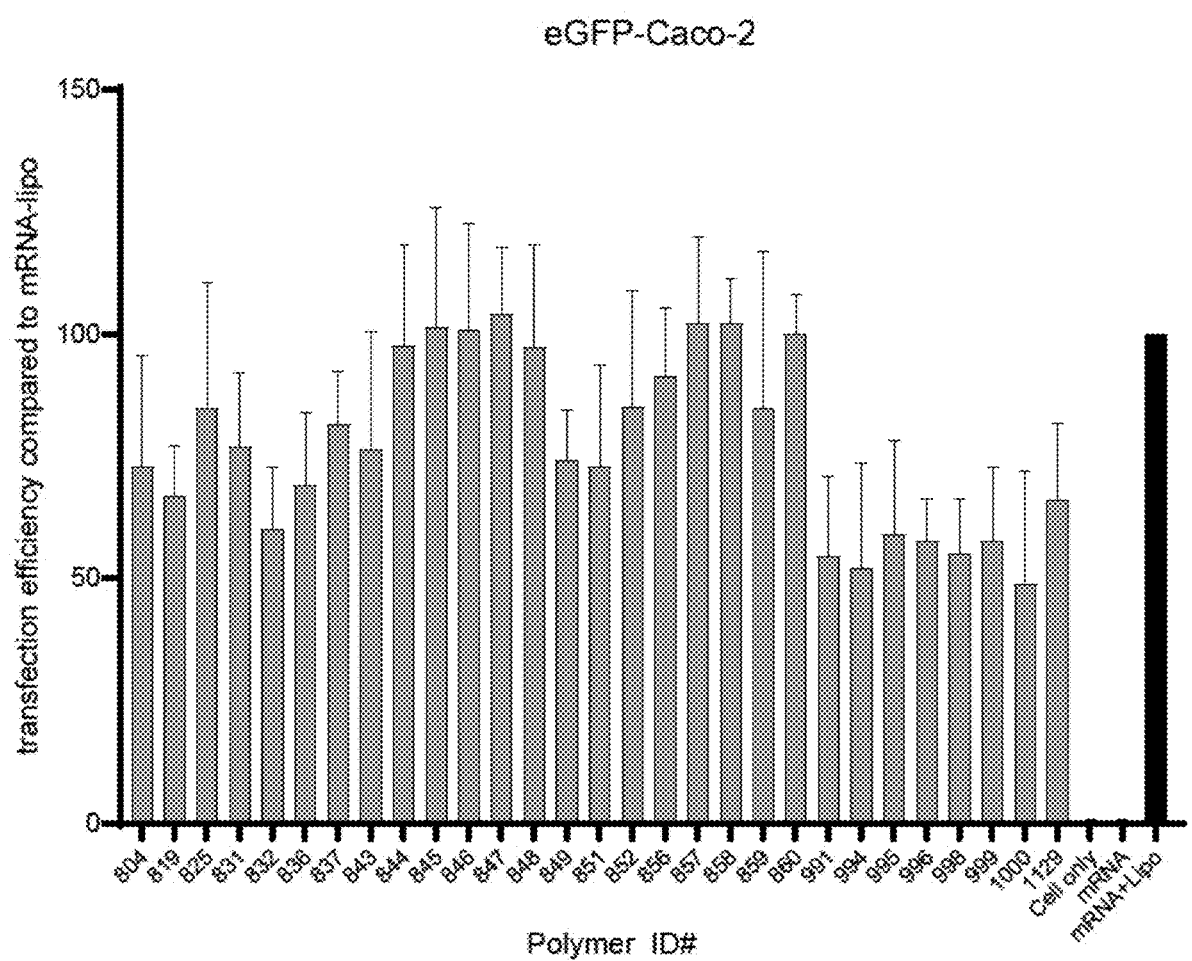
FIG. 6C shows the 29 polymers with 50+% transfection efficiency that were chosen for $2^{nd}$ round screening.
Figure 7:
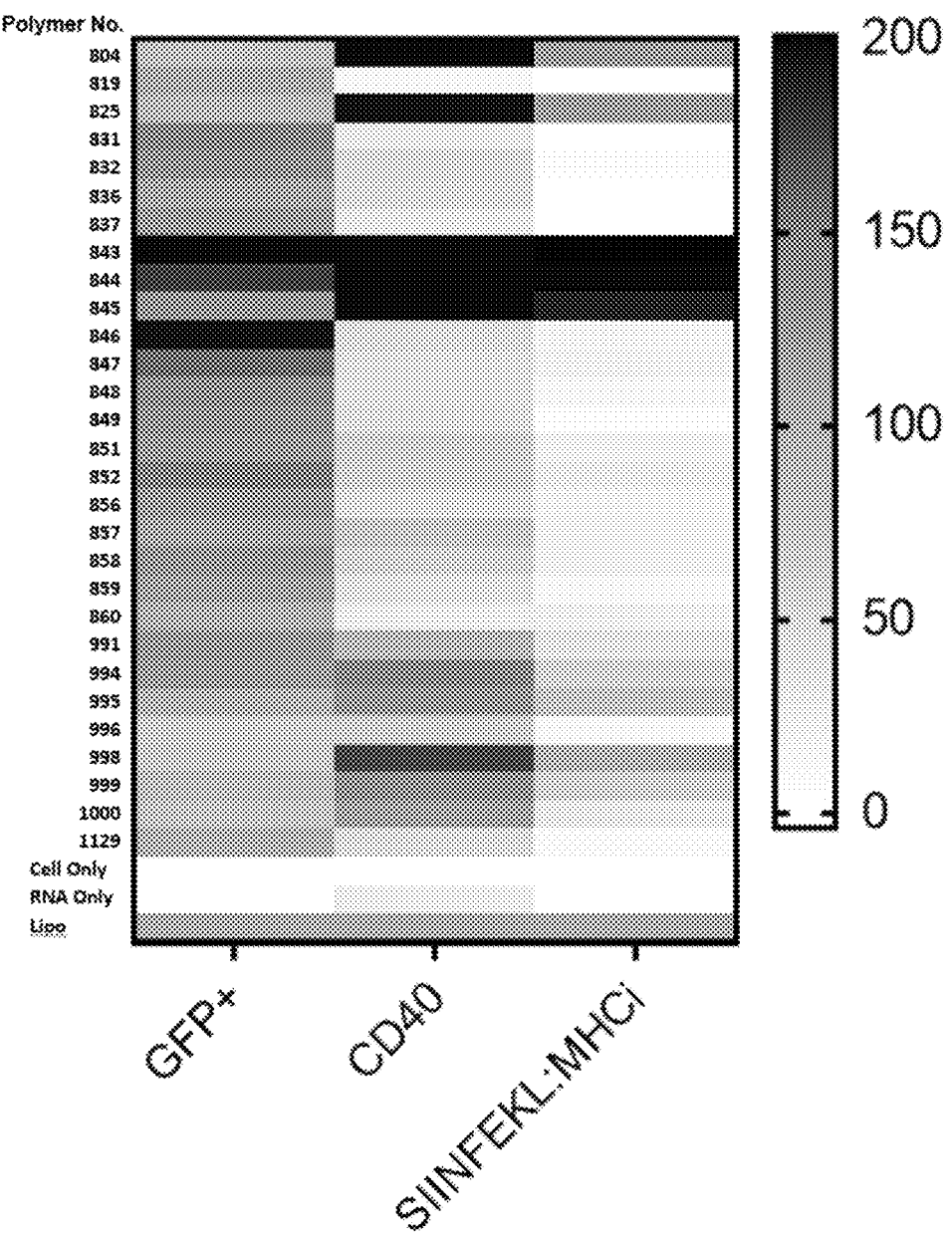
FIG. 7 shows results of a screen to identify polymers for immune cell transfection.

Fluorescently labeled siRNA was complexed with various polymers at a weight ratio of 1:100 w/w. These complexes were added to the cells and incubated for 4 hours. After 4 hours, the treatments were removed, and fresh media was added. Cell fluorescence was measured 24 hours later using flow cytometry (FIGS. 5A-5B). Each circle in a plot indicates a single polymer and the polymers are classified into the four categories based on their method of synthesis. Data is represented as the median of three biologically independent experiments.

Cytotoxicity of Plasmid Nanoparticles

Figure 18:
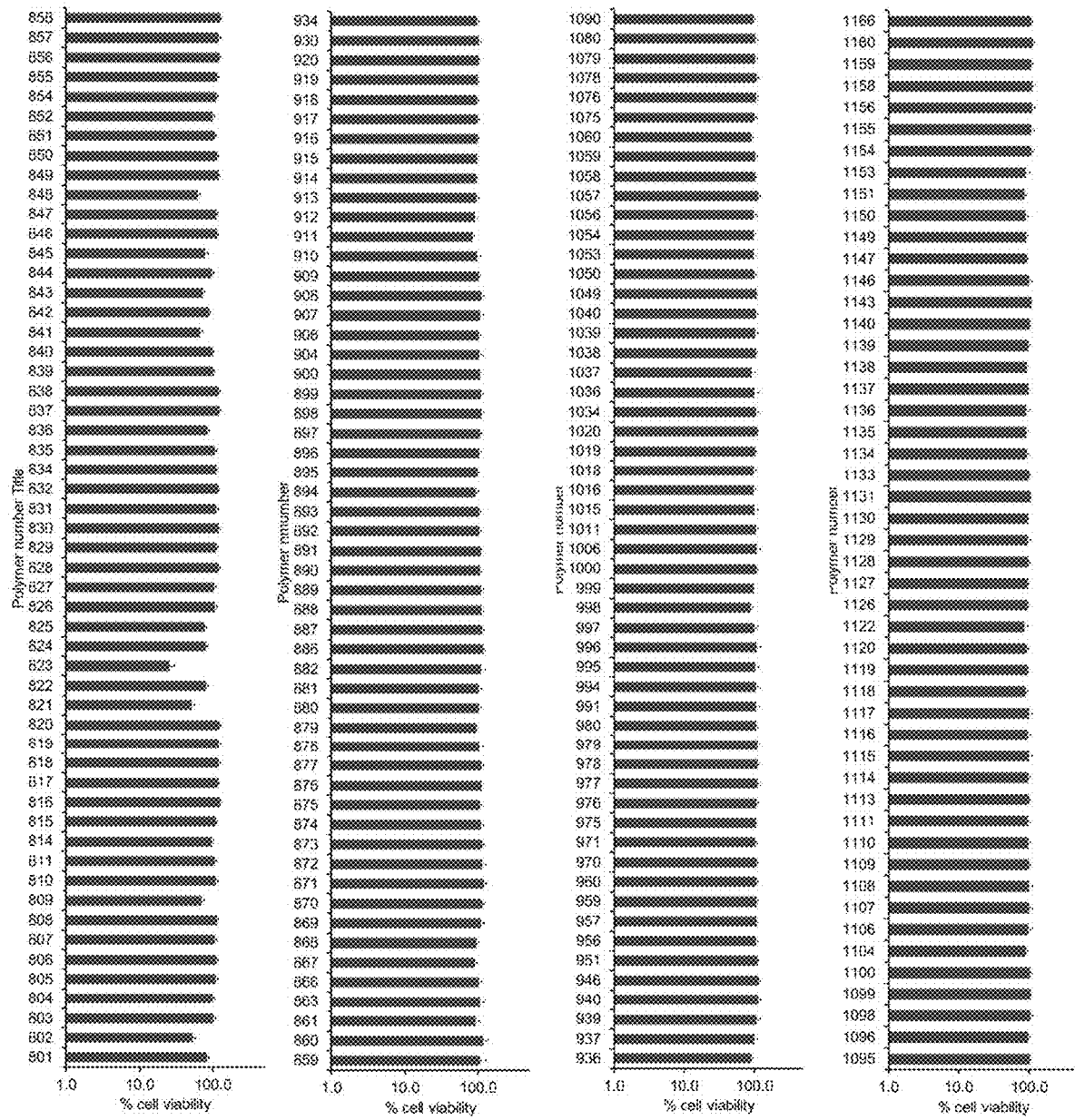
FIG. 18 shows cell viability of Caco2 cells upon exposure to mRNA-complexed nanoparticles. Mean±S.D., n=3.

The cytotoxicity of plasmid loaded nanoparticles was measured. Plasmid or mRNA nanoparticles were prepared and incubated with HeLa/Caco2 cells for 4 h. After 4 h, the treatments were removed, and the cells were incubated with fresh media for 24 h. The viability of cells was measured using an alamar blue assay according to the manufacturer's protocol. Cell viability is represented as a percentage of untreated cells. Data is presented in FIG. 17 and FIG. 18.

Example 2: mRNA Vaccine Strategy Using Hybrid PBAE Polymers

To identify a potent mRNA carrier platform, 211 hybrid PBAE polymers were screened for endothelial cell transfection and 29 polymers were selected. Among 29 polymers, polymer 844 showed potent transfection efficiency in immune cells. Based on in vitro assays, 844 polymer was examined in vivo, and both T cell and B cell stimulation efficacy of 844 based mRNA nanoparticles was observed. The screens are discussed in more detail below.

Identification of Polymers for Endothelial Cell Transfection

A nanoparticle complex was fabricated using PBAE polymers and enhanced green fluorescent protein (eGFP) mRNA. Caco-2 cells, an immortalized human colon cancer cell line and extensively used for in vitro intestinal endothelial model was incubated with nanoparticles.

Transfection of Caco-2 cells were examined by eGFP fluorescence intensity measured by flow cytometry method. Lipofectamine 2000 was used as positive control. Transfection efficiency was measured as [(% eGFP+ cells of polymer-% eGFP+ cells of RNA only)/(% eGFP+ cells of Lipofectamine+ cells-% eGFP+ cells of RNA only)]. As shown in FIGS. 6A-6C, 29 polymers showed 50+% transfection efficiency, and were chosen for 2nd round screening.

Identification of Polymers for Immune Cell Transfection

Figure 8A:
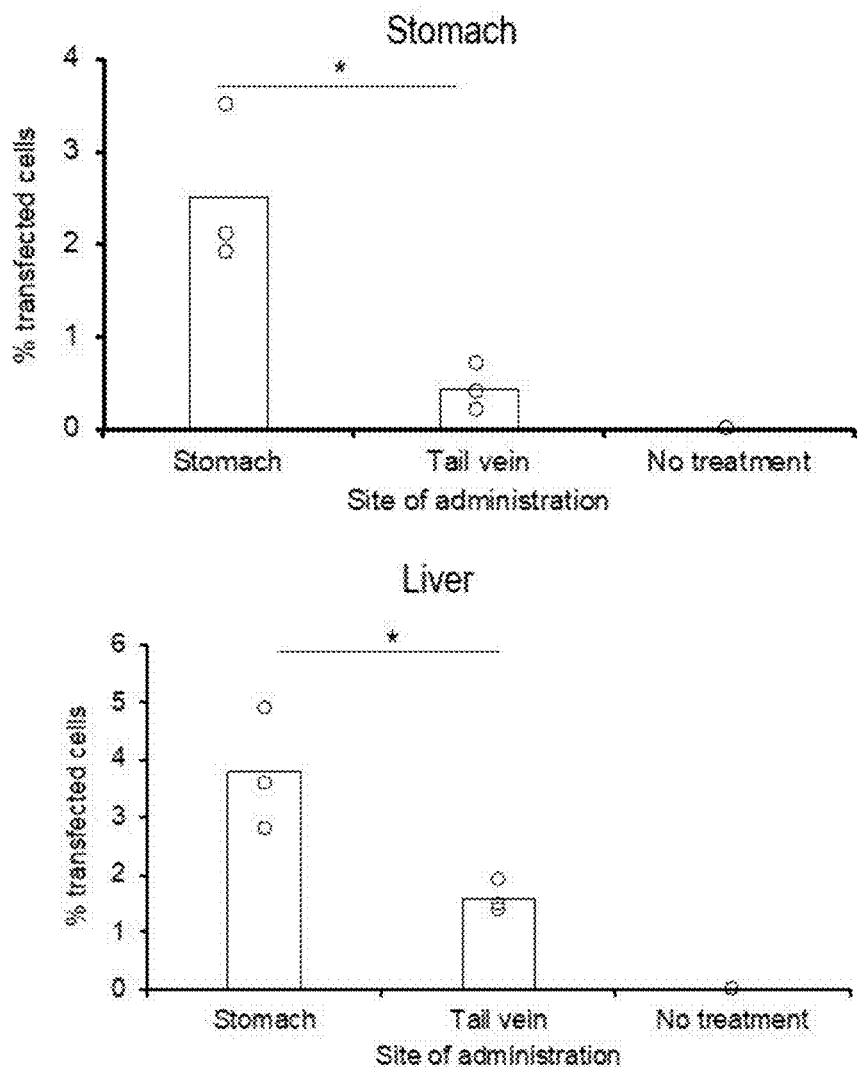
FIGS. 8A-8C show results of in vivo experiments.

The extent where nanoparticles can transfect immune cells was examined. Murine bone marrow derived dendritic cells (BMDCs) was harvested for in vitro assays. Similar to the above, eGFP transfection was first tested to measure transfection efficiency of polymers. To measure 'antigen' response, ovalbumin (OVA) mRNA that is extensively used for immunological experiments was used. CD40, a representative co-stimulatory molecule was measured to validate immunostimulatory effect of the nanoparticle. To investigate whether OVA-transfected BMDCs can process and present antigen the to the effector CD8 T cells, major histocompatibility 1 (MHC1)-SIINFEKL expression on the BMDCs was measured. As shown in FIG. 8, polymers 843, 844, and 845 were effective in all three categories, and considering polymer heterogeneity, polymer 844 was chosen for in vivo experiments.

In Vivo Activation of T Cells and B Cells

Figure 8B:
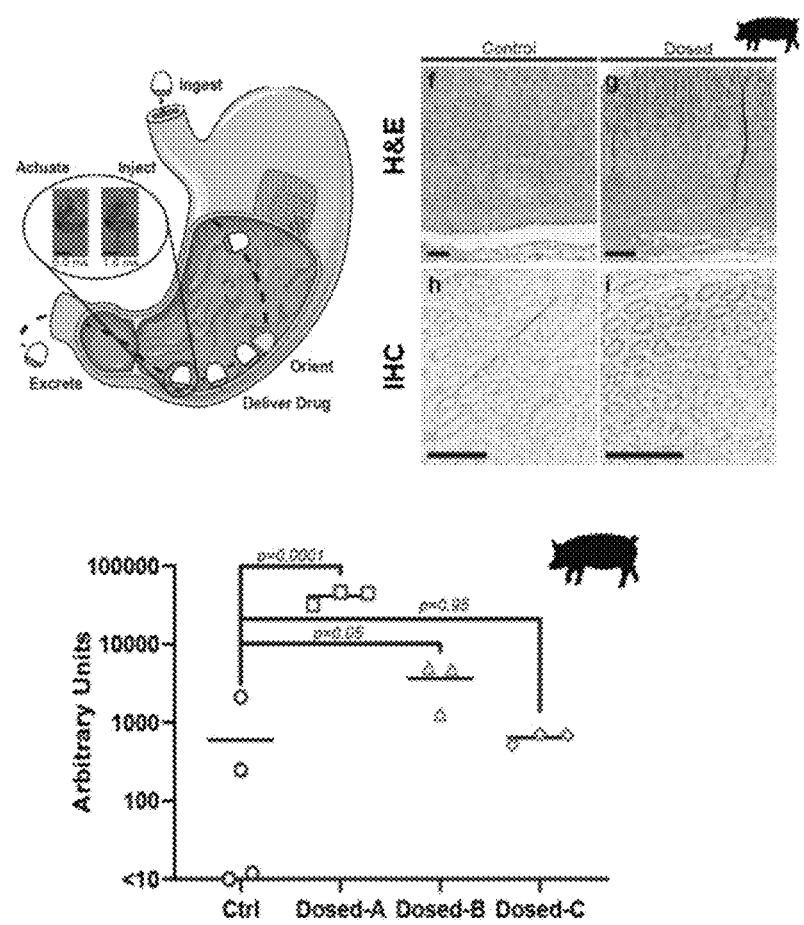
Figure 8C:
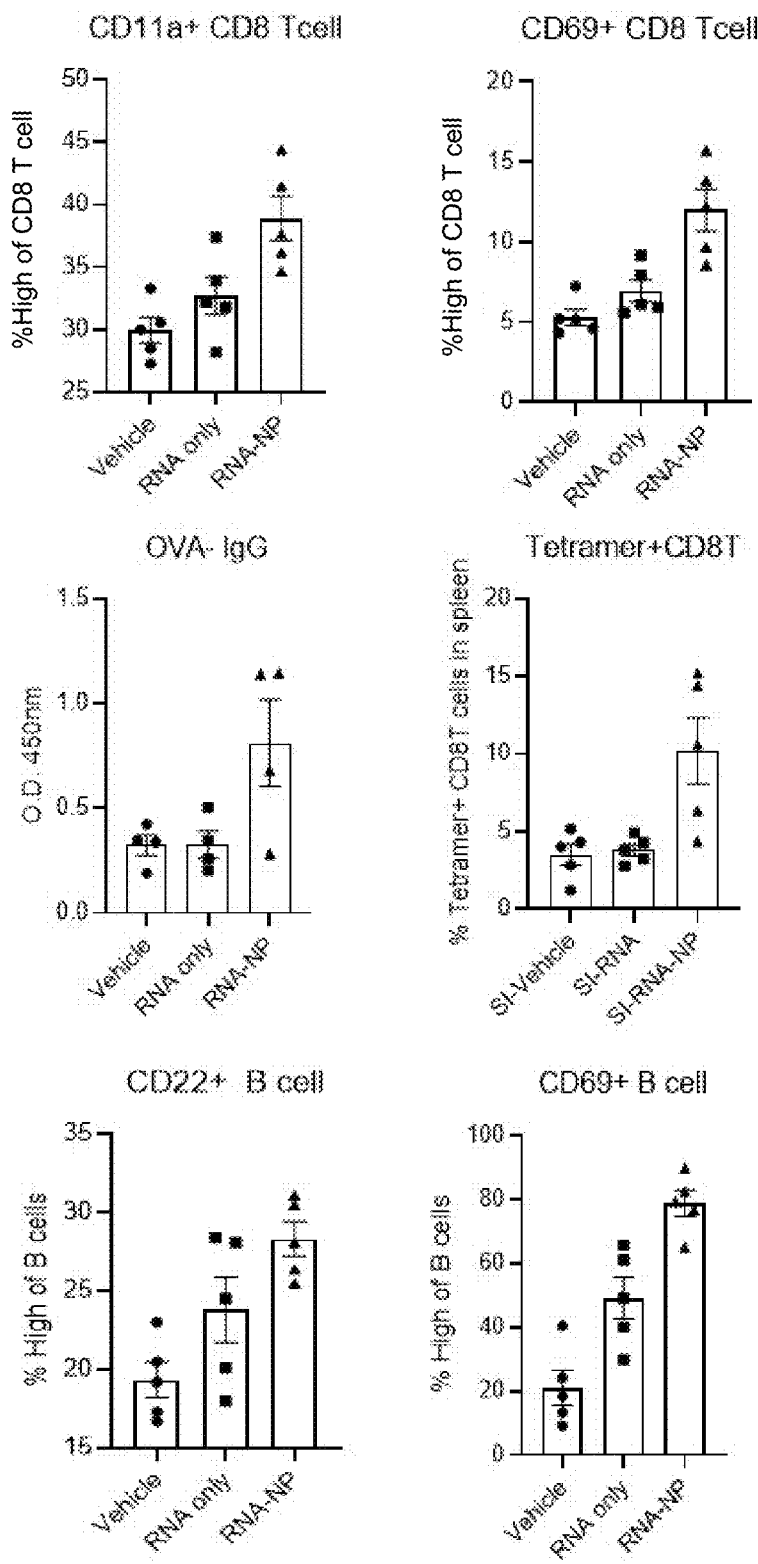

Preliminary in vivo experiments confirmed that gastric injection lead to systemic mRNA delivery in mice (FIG. 8A) and oral mRNA delivery in pigs led to robust protein expression (FIG. 8B). As such, the effectiveness of 844-Nanoparticles in in vivo models was further examined. OVA-Nanoparticles were fabricated using 844 and administered to small intestine of immunocompetent C57Bl6 mice. Nanoparticles suspended in physiological saline were directed administered via laparotomy, and spleen and serum samples were collected seven days after the immunization. Collected spleen was processed and stained for flow cytometry analysis and serum samples were used to measure humoral response (IgG). The nanoparticle treated group had higher frequency of T cell activation markers (CD69, CD11a), as well as antigen (OVA)-specific markers (Tetramer). B cell activation markers (CD22, CD69) also increased in nanoparticle vaccinated group as well as antigen (OVA)-specific IgG (FIG. 8).

Example 3: mRNA Delivery to Glomerular Podocytes

Characterization

Figures 9A, 9B:
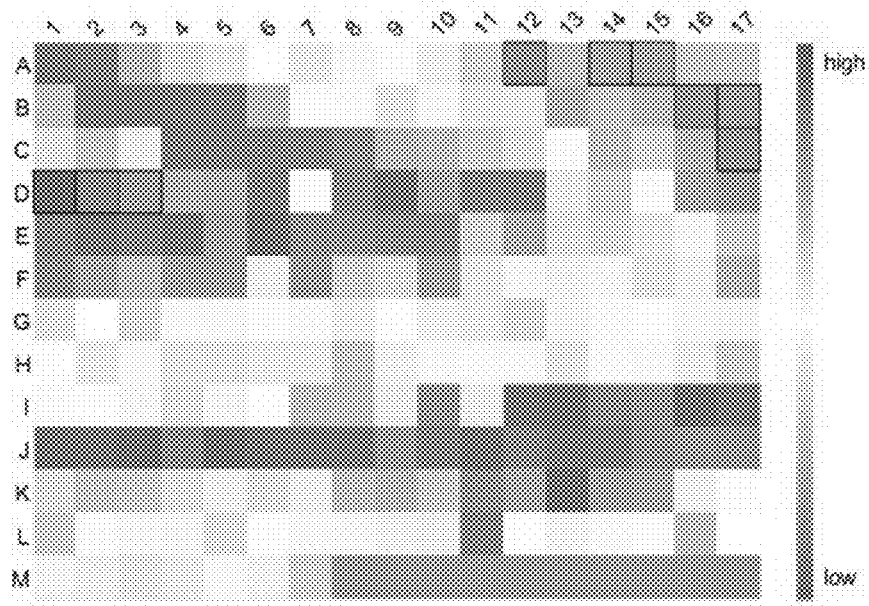
FIG. 9A shows hybrid-branched poly(beta-amino ester) (PBAE) luciferase mRNA delivery efficiency to cultured podocytes. Each square represents an individual polymer. Polymers that were further evaluated are outlined with a black box. An average of two biological replicates is shown; scale bar represents units of radiant efficiency.
FIG. 9B shows the polymer number corresponding to each well in the assays shown in FIG. 9A, and FIG. 11.

Hybrid-branched poly(beta-amino ester) (PBAE) polymers were screened for mRNA delivery efficiency against cultured mouse podocytes using luciferase mRNA and luciferase activity as a readout. From this initial panel of 211 polymers, described in Example 1, several families that exhibited enhanced mRNA delivery to cultured podocytes compared to others were identified (FIG. 9A).

Figure 10:
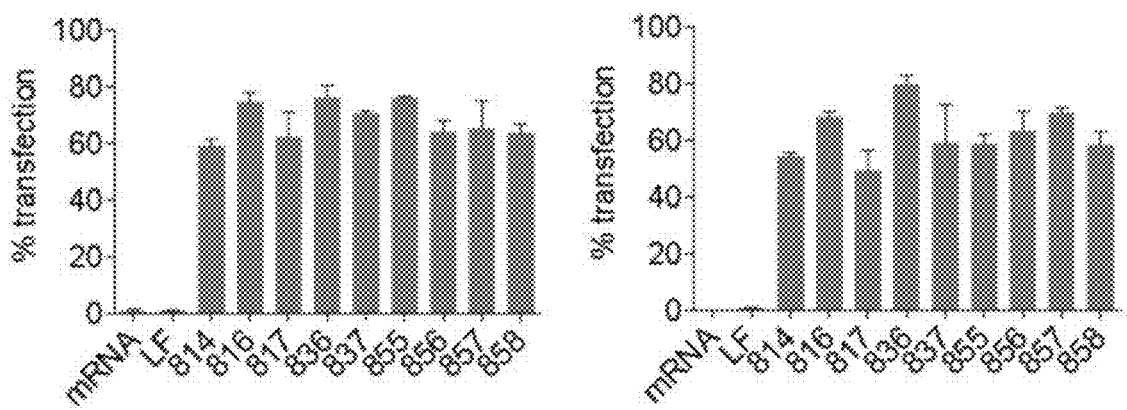
FIG. 10 shows mRNA delivery efficiency of select polymers. eGFP mRNA was used to assay the percent of cells transfected by flow cytometry. Lipofectamine 2000 (LF) was utilized as a control. In all treatments, 100 ng mRNA was delivered. Shown are two biological replicates.

From this panel screening 9 polymers (814, 816, 817, 836, 837, 855, 856, 857, 858) were selected and tested for eGFP mRNA delivery to cultured podocytes (FIG. 10). eGFP mRNA was used to assay the percent of cells transfected by flow cytometry. Lipofectamine 2000 (LF) was utilized as a control. In all treatments, 100 ng mRNA was delivered. Notably, all 9 of these polymers exhibited greater performance compared to the industry standard, Lipofectamine 2000 (LF), and exhibited significant transfection of cultured podocytes (50-80%).

Structure and Synthesis Details

Polymers were synthesized according to methods described in Example 1. The components and structures of the polymers are detailed in Table 8. Note that while constituent polymers may have been the same across hits, the molar amount of component polymer 1, component polymer 2, and branching agent varied. Analysis suggested that constituent polymers 198 and 13 were indispensable for function, and that there was a bias towards the branching agent N-methylethylenediamine, which enables 3 arms.

TABLE 8

Components of selected polymer hits screened against podocytes.

| polymer | component polymer 1 | component polymer 2 | branching agent | number of arms |
|---|---|---|---|---|
| 814 | 198 | 13 | 2,2' ethylenedioxy bis(ethylamine) | 4 |
| 816 | 198 | 13 | N-methylethylenediamine | 3 |
| 817 | 198 | 13 | N-methylethylenediamine | 3 |
| 836 | 198 | 13 | N-methylethylenediamine | 3 |
| 837 | 198 | 13 | N-methylethylenediamine | 3 |
| 855 | 198 | 13 | 2,2' ethylenedioxy bis(ethylamine) | 4 |
| 856 | 198 | 13 | N-methylethylenediamine | 3 |
| 857 | 198 | 13 | N-methylethylenediamine | 3 |
| 858 | 198 | 13 | N-methylethylenediamine | 3 | mRNA Delivery to Endothelial Cells

Figure 11:
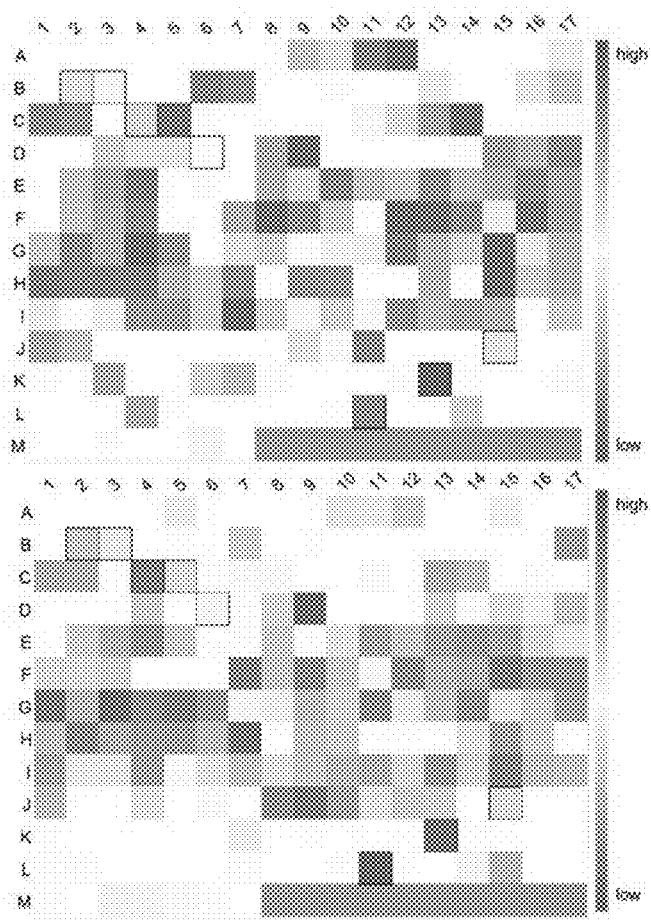
FIG. 11 shows hybrid-branched poly(beta-amino ester) (PBAE) luciferase mRNA delivery efficiency to HUVECs (top) and HAECs (bottom). Each square represents an individual polymer. Polymers that were further evaluated are outlined with a black box. An average of two biological replicates is shown; scale bar represents units of radiant efficiency.

Hybrid-branched poly(beta-amino ester) (PBAE) polymers were screened for mRNA delivery efficiency to human umbilical vein endothelial cells (HUVECs) and human aortic endothelial cells (HAECs) using luciferase mRNA and luciferase activity as a readout. From this initial panel of 211 polymers described above, several polymers that exhibited enhanced mRNA delivery to cultured HUVECs and HAECs compared to others were identified (FIG. 11).

Figure 12:
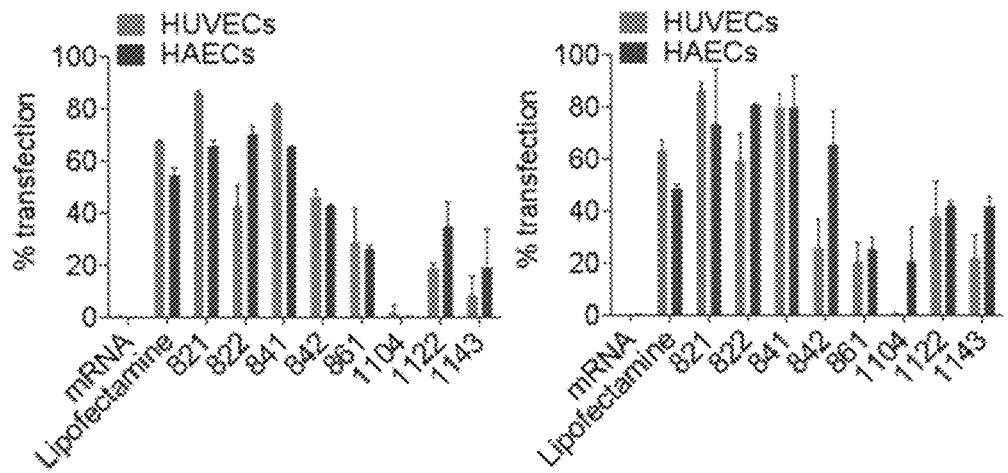
FIG. 12 shows mRNA delivery efficiency of select polymers. eGFP mRNA was used to assay the percent of cells transfected by flow cytometry. Lipofectamine 2000 (LF) was utilized as a control. In all treatments, 100 ng mRNA was delivered. Shown are two biological replicates.

From this panel screening 8 polymers (821, 822, 841, 842, 861, 1104, 1122, 1143) were tested and selected for eGFP mRNA delivery to HUVECs and HAECs (FIG. 12). eGFP mRNA was used to assay the percent of cells transfected by flow cytometry. Lipofectamine 2000 (LF) was utilized as a control. In all treatments, 100 ng mRNA was delivered. A subset of these polymers exhibited greater performance compared to the industry standard, Lipofectamine 2000 (LF), and exhibited significant transfection of endothelial cells (upwards of 90%).

Structure and Synthesis Details

Polymers were synthesized according to methods described above. The components and structures of the polymers are detailed in Table 9. Note that while constituent polymers may have been the same across hits, the molar amount of component polymer 1, component polymer 2, and branching agent varied. Analysis suggested that constituent polymers 198 and 13 were indispensable for function (e.g., polymers with higher transfection efficiency in HUVECs and HAECs contain these two constitutive polymers), and that there was a bias towards the branching agent tris(2-amino ethylamine), which enables 6 arms.

TABLE 9

Components of selected polymer hits screened against endothelial cells.

| polymer | component polymer 1 | component polymer 2 | branching agent | number of arms |
|---|---|---|---|---|
| 821 | 198 | 13 | tris(2-amino ethylamine) | 6 |
| 822 | 198 | 13 | tris(2-amino ethylamine) | 6 |
| 841 | 198 | 13 | tris(2-amino ethylamine) | 6 |
| 842 | 198 | 13 | tris(2-amino ethylamine) | 6 |
| 861 | 13 | 95 | tris(2-amino ethylamine) | 6 |
| 1104 | 198 | 95 | tris(2-amino ethylamine) | 6 |
| 1122 | 198 | 95 | tris(2-amino ethylamine) | 6 |
| 1143 | 198 | 95 | tris(2-amino ethylamine) | 6 |

Example 4. Radioprotective Nucleic Acid Delivery

Figure 13A:
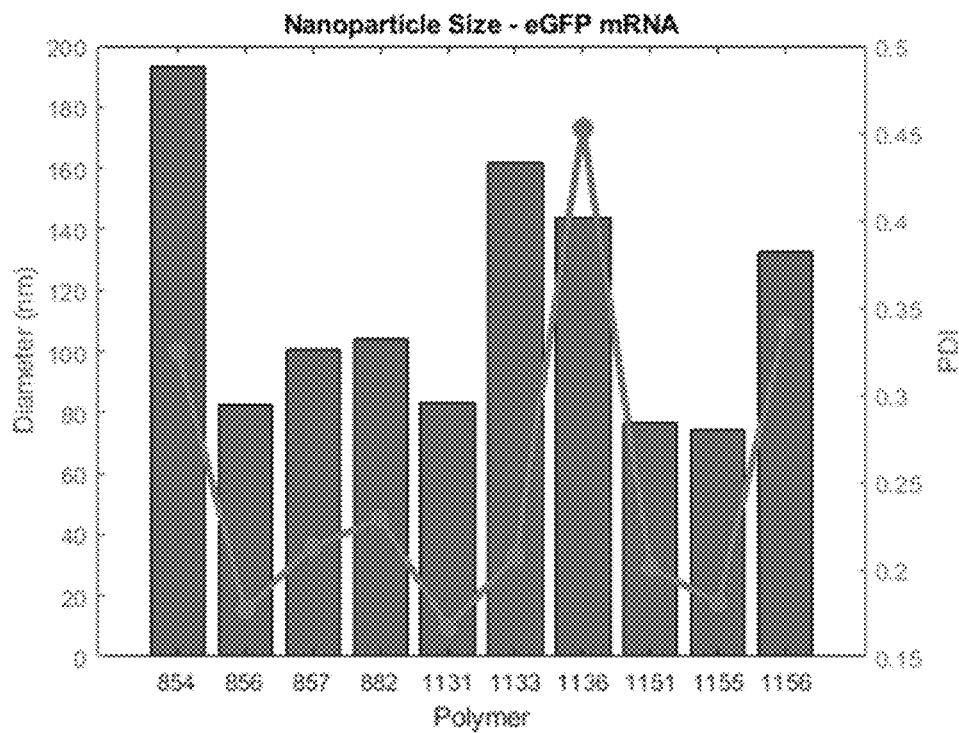
FIG. 13A shows the hydrodynamic diameter of representative mRNA containing polymer particles.

Particles are made up of branched hybrid PBAE polymers and mRNA with sizes <1 μm in hydrodynamic diameter as measured by dynamic light scattering. More than 200 branched hybrid poly beta amino ester polymer nanoparticles loaded with mRNA coding for enhanced green fluorescent protein (eGFP) were tested for their ability to transfect human oral epithelial cells. From this screen, the top 10 performing polymers were chosen for follow-up studies, results with these 10 polymers are shown in FIG. 13A.

Figure 13B:
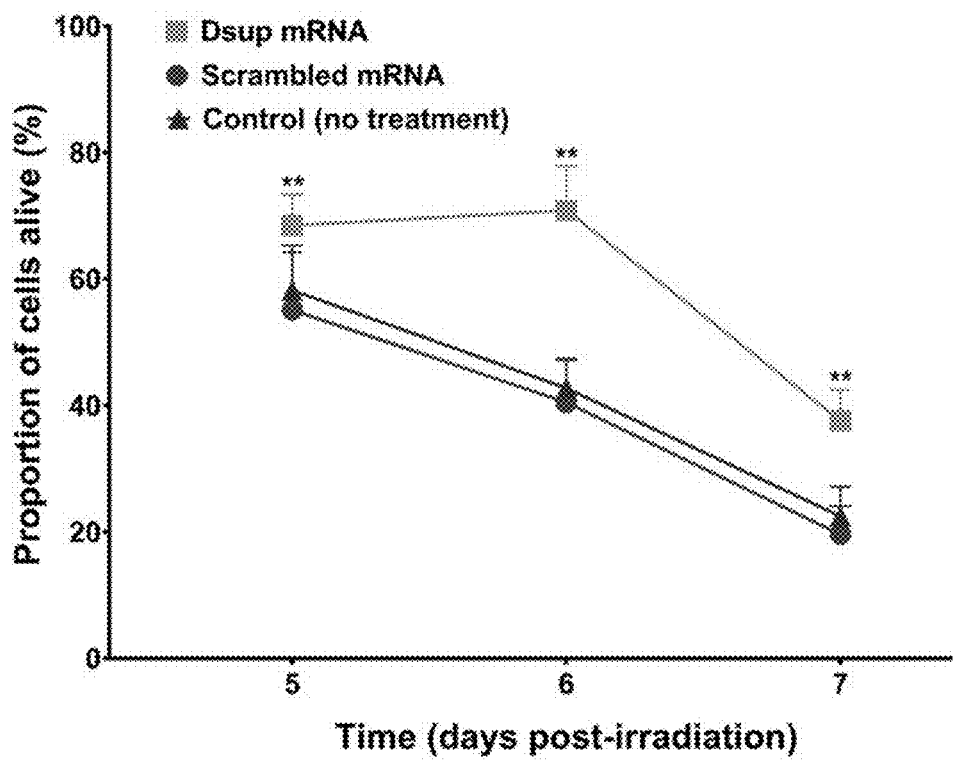
FIG. 13B shows the proportion of living cells following exposure to radiation.
Figure 13C:
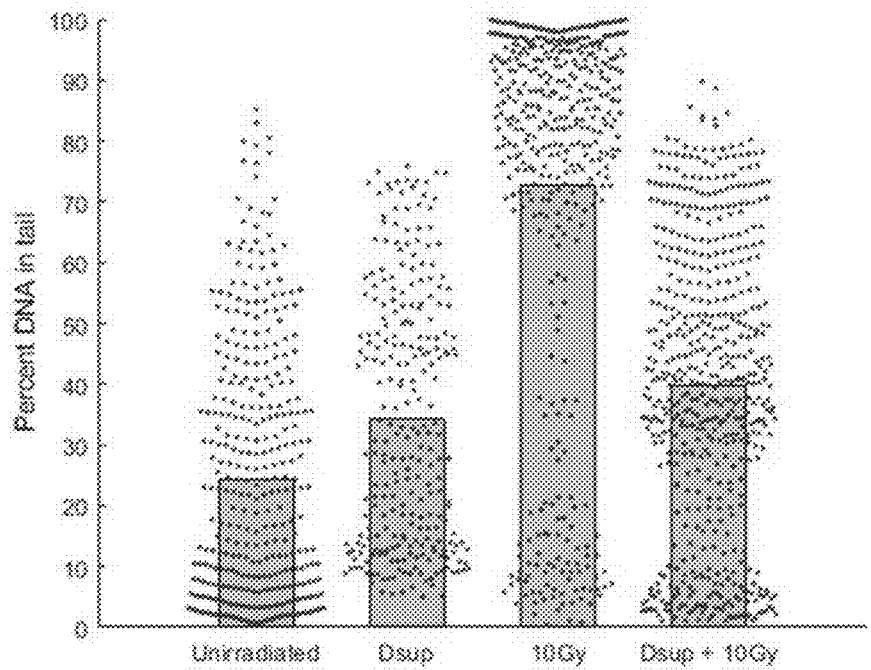
FIG. 13C. shows COMET assay results.
Figure 14A:
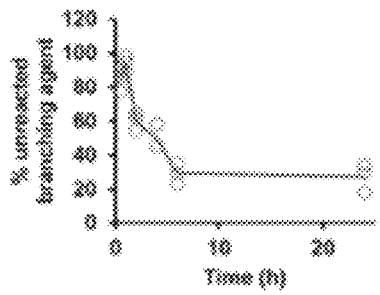
FIGS. 14A-14J show amine group consumption. Consumption of amines in branching agent for (FIGS. 14A-14E) lambda polymers 975, 995, 875, 814 and 1075 and (FIGS. 14F-14J) beta polymers 863, 904, 805, 1095 and 1104, respectively. n=3. Line=mean.
Figure 14B:
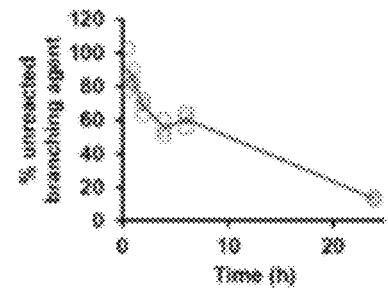
Figure 14C:
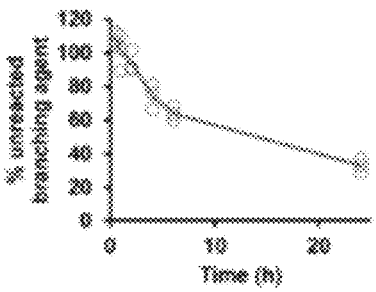
Figure 14D:
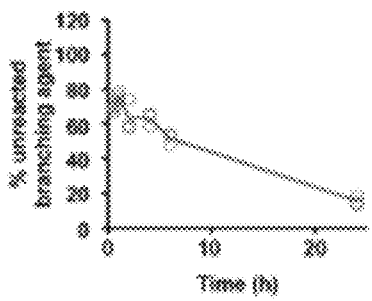
Figure 14E:
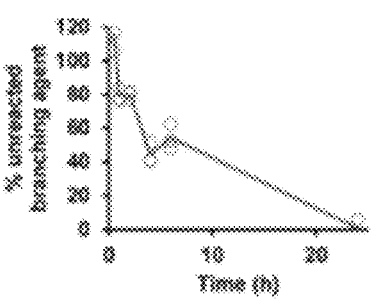
Figure 14F:
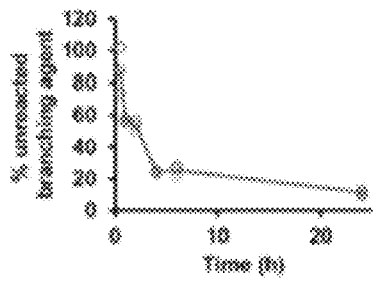
Figure 14G:
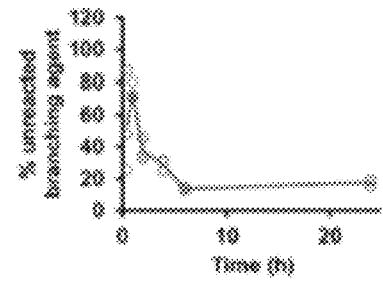
Figure 14H:
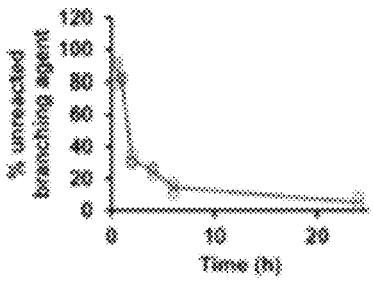
Figure 14I:
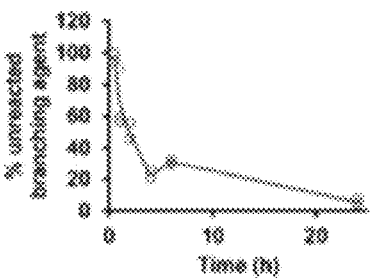
Figure 14J:
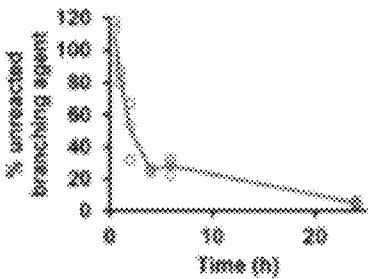

The expressed Dsup-eGFP protein has been shown to localize in the nucleus, as evidence by staining with a nuclear stain, DAPI. The cells were exposed to single high dose of radiation 1 day after administering the Dsup-eGFP mRNA and found significantly greater radiation protection by cytotoxicity and COMET assays (FIGS. 13B and 13C).

The particles can be delivered in suspension by injection or using active transport mechanisms such as iontophoresis or ultrasound.

Example 5. In Vivo Mouse Studies

Polymers 846, 877 and 995 were chosen for in vivo evaluation based on their differential transfection ability in vitro and differences in the constituent branching agents used.

Figure 19:
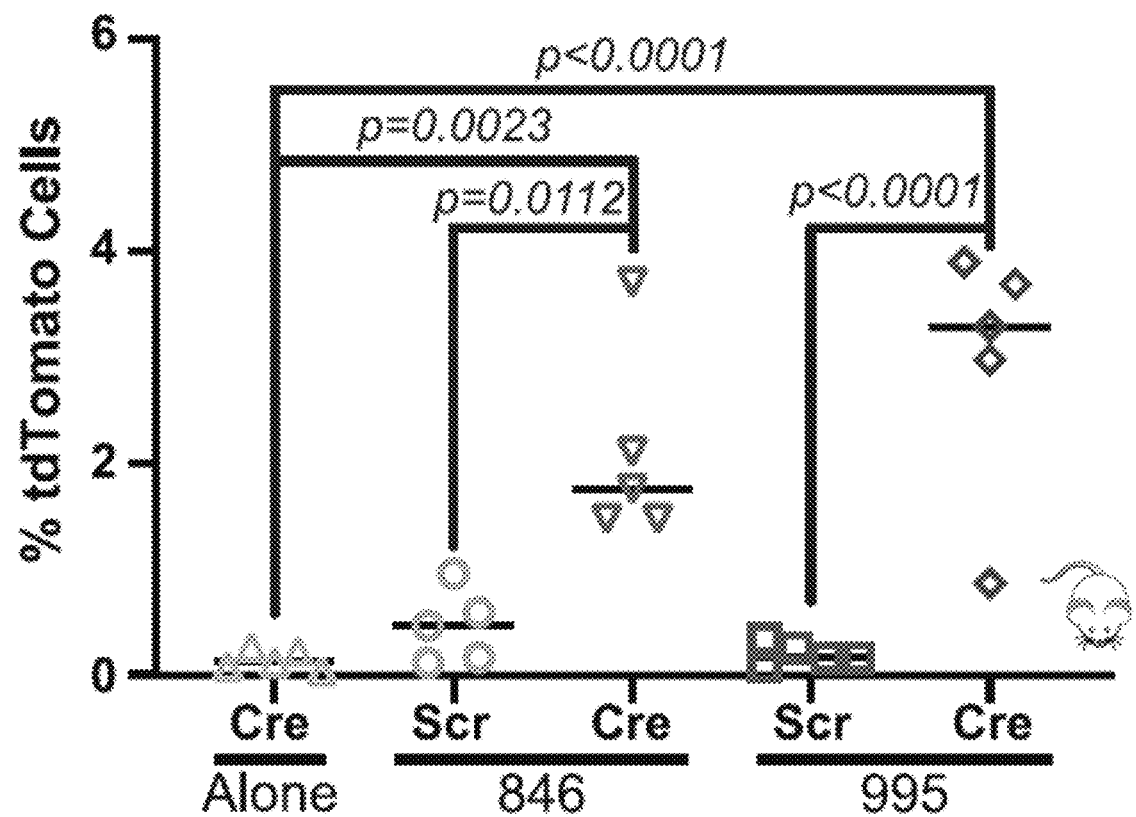
FIG. 19 shows flow cytometry-based quantification of transfection efficiency of 20 mg of Cre mRNA complexed with polymer 846 or 995 in mice after a direct injection to the stomach submucosa compared with delivery of scrambled (Scr) mRNA nanoparticles or Cre mRNA alone (n=5 per group, cells within group combined). Mean±SD, one-way ANOVA.
Figure 20:
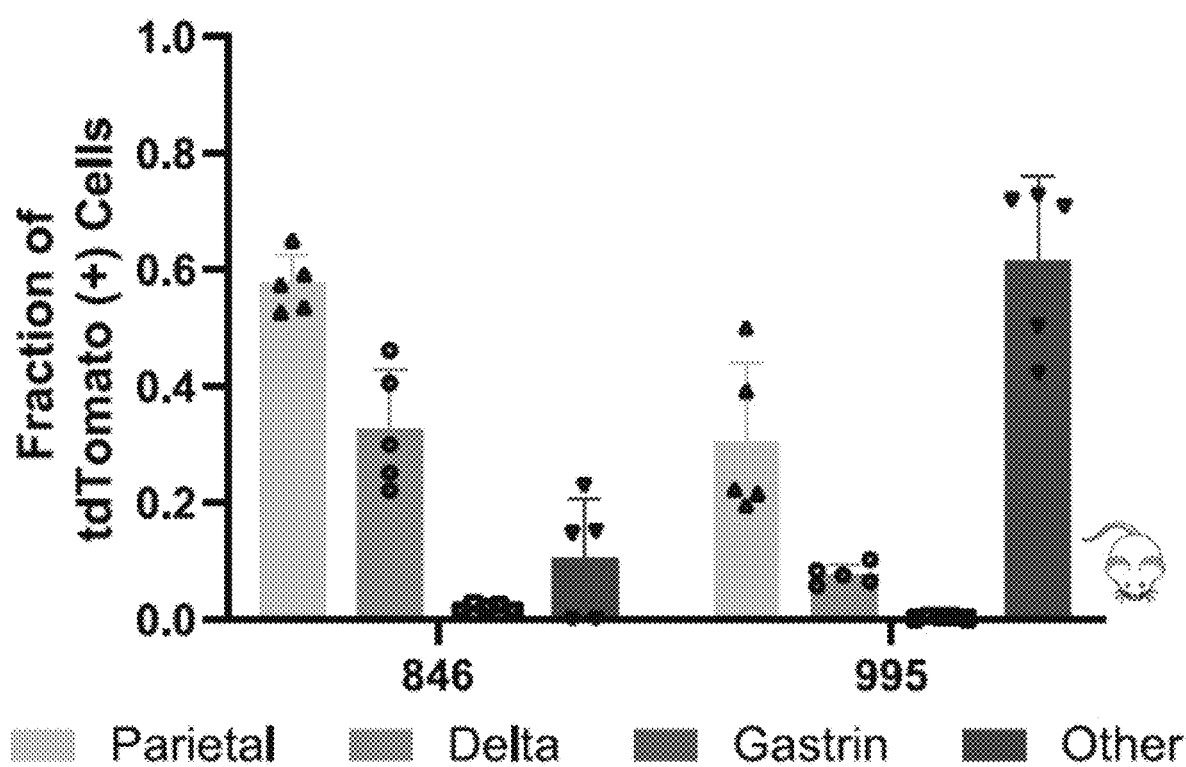
FIG. 20 shows flow cytometry-based analysis of the composition of tdTomato+ cells in the stomach in mice treated with gastric injection of Cre mRNA nanoparticles (n=5 per group, cells within group combined). Mean±SD.

To determine the transfection efficiency of the formulations in vivo, nanoparticles made from polymer 877 were first administered to mice via a tail vein injection. The transfection efficiency of this intravenous administration method was then compared to the delivery of the mRNA nanoparticles via a direct injection to the stomach submucosa (see procedure below), mimicking delivery by a stomach injection device. In these experiments, 20 μg (100 μL) of mRNA encoding Cre recombinase enzyme (Cre) was delivered to genetically modified mice designed to produce tdTomato fluorescent protein in the presence of the enzyme. This allowed quantification of total transfection efficiency and determination of the cell types targeted using a stomach injection delivery method and compare it to intravenous injection. Tissue samples were then harvested 48 hours after administration, which allowed enough time for Cre-mediated tdTomato expression. Flow cytometry data demonstrated that mRNA delivery via stomach injection using formulation 877 resulted in a greater tdTomato expression in the stomach compared to delivery via a tail vein injection. Additionally, systemic uptake via the stomach injection was confirmed by transfection of liver cells. In a follow-up experiment performed to determine the stomach cell types targeted during a direct stomach injection, mice were dosed with formulations of either 846 or 995 (FIG. 19). As controls, naked mRNA and nanoparticles made from the same polymers and loaded with scrambled mRNA were administered via direct stomach injections. Mouse stomachs were collected and stained with antibodies specific to parietal cells, gastrin cells, and delta cells. The data showed that the proportion of tdTomato+ cells in each cell group correlated with the cell populations in the stomach and were unaffected by the polymer used (FIG. 20).

All animal experiments were approved by and performed in accordance with the MIT Committee on Animal Care. Four to six week old B6.Cg-Gt(ROSA)$_{26}$ Sor$^{tm9(CAG-tdTomato)Hze}$/J mice were purchased from Jackson labs and were allowed one week to acclimate to their new environment. Mice received preemptive analgesia prior to surgery. Mice were given buprenorphine sustained release at 1 mg/kg SQ prior to recovery. They were given one dose of meloxicam 1-2 mg/kg SQ during surgical prep period. If they appeared to be in pain, meloxicam was continued daily for the next 2-3 days. Mice were anesthetized with isoflurane in an induction box and maintained on isoflurane for the duration of the procedure via a nose cone (2-3% isoflurane in oxygen for maintenance). The animal was placed in dorsal recumbency and the abdomen was shaved from just cranial to the xiphoid process to just caudal to the umbilical area. The skin was aseptically prepared with alternating cycles of betadine or similar scrub and 70% ethyl alcohol. The animal was maintained on a heating blanket (warm water circulating) and monitored for depth of anesthesia by quality of respiratory effort and response to toe pinch. A 1 cm incision was made on the ventral midline through both the skin and the linea alba. Using atraumatic forceps and sterile cotton tip applicators, the area of interest (stomach or small intestine) was stabilized. Using a 30 gauge needle, the biological molecule of interest suspended in PBS was injected into the subserosal side targeting the submucosal space. 100 μL of fluid was then delivered. To deliver this amount, up to 10 injections per mouse were performed in different locations of the tissue. Prior to recovery, mice were given sterile warm 0.9% NaCl subcutaneously (SQ) at 20 ml/kg. Mice were maintained on a heating blanket and given warm fluids subcutaneously as well as recovered in a cage on a heating blanket. The abdominal wall was closed with 5-0 PDS or similar absorbable monofilament using a simple interrupted pattern. The skin was closed with a wound clip. Mice were fed alfalfa-free food a week before and after surgery to prevent any background fluorescence. Forty-eight hours after surgery, mice were euthanized via $CO_2$ asphyxiation. The tissue was harvested and sent for histology and fluorescence-activated cell sorting (FACS).

REFERENCES

1. Li, W. & Szoka, F. C. Lipid-based Nanoparticles for Nucleic Acid Delivery. Pharm. Res. 24, 438-449 (2007).
2. Draghici, B. & Ilies, M. A. Synthetic Nucleic Acid Delivery Systems: Present and Perspectives. J. Med. Chem. 58, 4091-4130 (2015).
3. Anderson, D. G. et al. A polymer library approach to suicide gene therapy for cancer. Proc. Natl. Acad. Sci. 101, 16028-16033 (2004).
4. Akinc, A. et al. A combinatorial library of lipid-like materials for delivery of RNAi therapeutics. Nat. Biotechnol. 26, 561-569 (2008).
5. Kauffman, K. J. et al. Optimization of Lipid Nanoparticle Formulations for mRNA Delivery in Vivo with Fractional Factorial and Definitive Screening Designs. Nano Lett. 15, 7300-7306 (2015).
6. Fenton, O. S. et al. Synthesis and Biological Evaluation of Ionizable Lipid Materials for the In Vivo Delivery of Messenger RNA to B Lymphocytes. Adv. Mater. 1606944 (2017). doi:10.1002/adma.201606944
7. Putnam, D. Polymers for gene delivery across length scales. Nat. Mater. 5, 439-451 (2006).
8. Pack, D. W., Hoffman, A. S., Pun, S. & Stayton, P. S. Design and development of polymers for gene delivery. Nat. Rev. Drug Discov. 4, 581-593 (2005).
9. Yin, H. et al. Non-viral vectors for gene-based therapy. Nat. Rev. Genet. 15, 541-555 (2014).
10. Green, J. J., Langer, R. & Anderson, D. G. A Combinatorial Polymer Library Approach Yields Insight into Nonviral Gene Delivery. Acc. Chem. Res. 41, 749-759 (2008).
11. Green, J. J., Zugates, G. T., Langer, R. & Anderson, D. G. in 53-63 (2009). doi:10.1007/978-1-59745-429-2_4
12. Anderson, D. G., Akinc, A., Hossain, N. & Langer, R. Structure/property studies of polymeric gene delivery using a library of poly(β-amino esters). Mol. Ther. 11, 426-434 (2005).
13. Akinc, A., Anderson, D. G., Lynn, D. M. & Langer, R. Synthesis of Poly(β-amino ester)s Optimized for Highly Effective Gene Delivery. Bioconjug. Chem. 14, 979-988 (2003).
14. Lynn, D. M. & Langer, R. Degradable Poly(β-amino esters): Synthesis, Characterization, and Self-Assembly with Plasmid DNA. J. Am. Chem. Soc. 122, 10761-10768 (2000).
15. Sunshine, J. C., Peng, D. Y. & Green, J. J. Uptake and Transfection with Polymeric Nanoparticles Are Dependent on Polymer End-Group Structure, but Largely Independent of Nanoparticle Physical and Chemical Properties. Mol. Pharm. 9, 3375-3383 (2012).
16. Sunshine, J. C., Akanda, M. I., Li, D., Kozielski, K. L. & Green, J. J. Effects of Base Polymer Hydrophobicity and End-Group Modification on Polymeric Gene Delivery. Biomacromolecules 12, 3592-3600 (2011).
17. Sunshine, J. et al. Small-Molecule End-Groups of Linear Polymer Determine Cell-type Gene-Delivery Efficacy. Adv. Mater. 21, 4947-4951 (2009).
18. Zugates, G. T. et al. Gene delivery properties of end-modified poly(beta-amino ester)s. Bioconjug. Chem. 18, 1887-96
19. Seib, F. P., Jones, A. T. & Duncan, R. Comparison of the endocytic properties of linear and branched PEIs, and cationic PAMAM dendrimers in B16f10 melanoma cells. J. Control. Release 117, 291-300 (2007).
20. PCT Publication No. WO 2006/138380, Filed Jun. 14, 2006; PCT Publication No. WO 2004/106411, Filed May 26, 2004; PCT Publication No. WO 2008/011561, Filed: Jul. 20, 2007.

EQUIVALENTS AND SCOPE

In the claims articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention includes embodiments in which more than one, or all of the group members are present in, employed in, or otherwise relevant to a given product or process.

Furthermore, the invention encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group. It should it be understood that, in general, where the invention, or aspects of the invention, is/are referred to as comprising particular elements and/or features, certain embodiments of the invention or aspects of the invention consist, or consist essentially of, such elements and/or features. For purposes of simplicity, those embodiments have not been specifically set forth in haec verba herein. It is also noted that the terms "comprising" and "containing" are intended to be open and permits the inclusion of additional elements or steps. Where ranges are given, endpoints are included. Furthermore, unless otherwise indicated or otherwise evident from the context and understanding of one of ordinary skill in the art, values that are expressed as ranges can assume any specific value or sub-range within the stated ranges in different embodiments of the invention, to the tenth of the unit of the lower limit of the range, unless the context clearly dictates otherwise.

This application refers to various issued patents, published patent applications, journal articles, and other publications, all of which are incorporated herein by reference. If there is a conflict between any of the incorporated references and the instant specification, the specification shall control. In addition, any particular embodiment of the present invention that falls within the prior art may be explicitly excluded from any one or more of the claims. Because such embodiments are deemed to be known to one of ordinary skill in the art, they may be excluded even if the exclusion is not set forth explicitly herein. Any particular embodiment of the invention can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that various changes and modifications to this description may be made without departing from the spirit or scope of the present invention, as defined in the following claims.

What is claimed is:

1. A branched polymer of Formula (I):

$$\text{L-(R)}_n \qquad (I)$$

or a salt thereof, wherein:
L is a substituted or unsubstituted heteroalkylene;
n is 3, 4, 5, or 6; and
each R is independently hydrogen, Formula (II), or Formula (III);
wherein Formula (II) is:

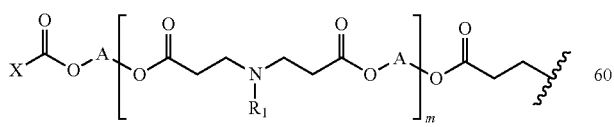

(II)

wherein:
m is an integer of 1-1000, inclusive;
A is optionally substituted alkylene or optionally substituted heteroalkylene;

X is —CH=CH$_2$, —CH$_2$CH$_2$OR$_2$, —CH$_2$CH$_2$SR$_3$, —CH$_2$CH$_2$N(R$_2$)(R$_3$), or —CH$_2$CH$_2$L(R$_4$)$_q$;
q is 2, 3, 4, or 5;
R$_1$ is optionally substituted alkyl or optionally substituted heteroalkyl;
R$_2$ is hydrogen, optionally substituted alkyl, or optionally substituted heteroalkyl;
R$_3$ is optionally substituted alkyl or optionally substituted heteroalkyl; or
R$_2$ and R$_3$ combine to form a 4-7 membered ring; and
each R$_4$ is independently hydrogen, Formula (II), or Formula (III);
wherein Formula (III) is:

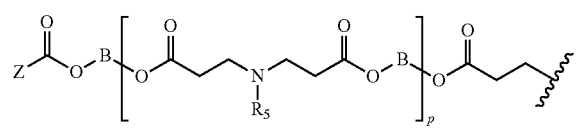

(III)

wherein:
p is an integer of 1-1000, inclusive;
B is optionally substituted alkylene or optionally substituted heteroalkylene;
Z is —CH=CH$_2$, —CH$_2$CH$_2$OR$_6$, —CH$_2$CH$_2$SR$_7$, —CH$_2$CH$_2$N(R$_6$)(R$_7$), or —CH$_2$CH$_2$L(R$_8$)$_v$;
v is 2, 3, 4, or 5;
R$_5$ is optionally substituted alkyl or optionally substituted heteroalkyl;
R$_6$ is hydrogen, optionally substituted alkyl, or optionally substituted heteroalkyl;
R$_7$ is optionally substituted alkyl or optionally substituted heteroalkyl; or
R$_6$ and R$_7$ combine to form a 4-7 membered ring; and
each R$_8$ is independently hydrogen, Formula (II), or Formula (III);
provided that at least one R is Formula (II) and at least one R is Formula (III), and provided that Formula (II) and Formula (III) are not the same.

2. The polymer of claim 1, wherein each R is independently Formula (II) or Formula (III).

3. The polymer of claim 1, wherein each L is independently of the formula:

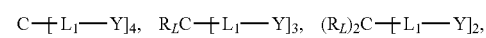
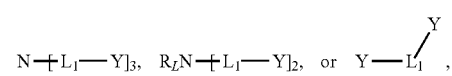

wherein
each Y is independently:

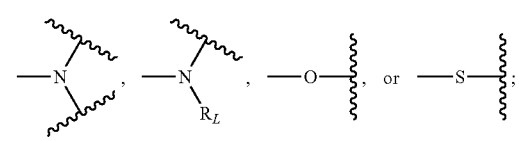

each L$_1$ is independently substituted or unsubstituted C$_{1-10}$ alkylene or substituted or unsubstituted C$_{1-10}$ heteroalkylene; and each $R_L$ is independently hydrogen, halogen, substituted or unsubstituted $C_{1-5}$ alkylene, or substituted or unsubstituted $C_{1-5}$ heteroalkylene.

4. The polymer of claim 1, wherein at least one $R_4$ is Formula (II) or Formula (III).

5. The polymer of claim 1, wherein at least one $R_8$ is Formula (II) or Formula (III).

6. The polymer of claim 1, wherein:
n is 3;
L is

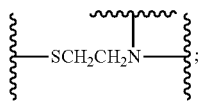

wherein in Formula (II):
A is —$(CH_2)_6$—;
X is —$CH_2CH_2N(R_2)(R_3)$ or —$CH_2CH_2L(R_4)_q$;
R is —$(CH_2)_3OH$;
$R_2$ is hydrogen;
$R_3$ is

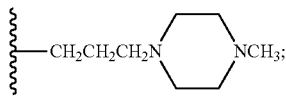

and
wherein in Formula (III):
B is —$(CH_2)_4$—;
Z is —$CH_2CH_2N(R_6)(R_7)$ or —$CH_2CH_2L(R_8)_v$;
$R_5$ is —$(CH_2)_5OH$;
$R_6$ is hydrogen; and
$R_7$ is

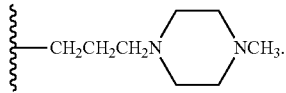

7. The polymer of claim 1, wherein:
n is 3;
L is

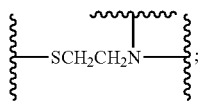

wherein in Formula (II):
A is —$(CH_2)_6$—;
X is —$CH_2CH_2N(R_2)(R_3)$;
R is —$(CH_2)_3OH$;
$R_2$ is hydrogen; and
$R_3$ is

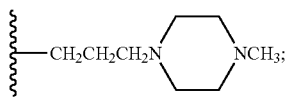

and
wherein in Formula (III):
B is —$(CH_2)_4$—;
Z is —$CH_2CH_2N(R_6)(R_7)$;
$R_5$ is —$(CH_2)_5OH$;
$R_6$ is hydrogen; and
$R_7$ is

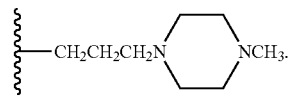

8. The polymer of claim 1, wherein:
n is 4;
L is

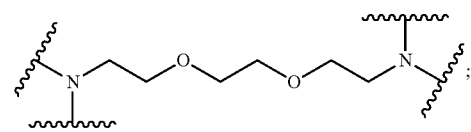 [SMILES: *N(*)CCOCCOCCN(*)*]

wherein in Formula (II):
A is —$(CH_2)_3$—;
X is —$CH_2CH_2N(R_2)(R_3)$ or —$CH_2CH_2L(R_4)_q$;
$R_1$ is —$(CH_2)_5OH$;
$R_2$ is hydrogen; and
$R_3$ is

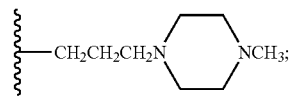

and
wherein in Formula (III):
B is —$(CH_2)_6$—;
Z is —$CH_2CH_2N(R_6)(R_7)$ or —$CH_2CH_2L(R_8)_v$;
$R_5$ is —$(CH_2)_3OH$;
$R_6$ is hydrogen; and
$R_7$ is

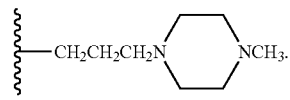

9. The polymer of claim 1, wherein:
n is 4;
L is

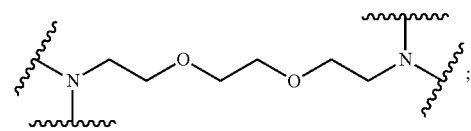 [SMILES: *N(*)CCOCCOCCN(*)*]

wherein in Formula (II):
A is —$(CH_2)_3$—;
X is —$CH_2CH_2N(R_2)(R_3)$;
$R_1$ is —$(CH_2)_5OH$;

$R_2$ is hydrogen; and
$R_3$ is

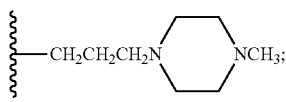

and
wherein in Formula (III):
  B is —$(CH_2)_6$—;
  Z is —$CH_2CH_2N(R_6)(R_7)$;
  $R_5$ is —$(CH_2)_3OH$;
  $R_6$ is hydrogen; and
  $R_7$ is

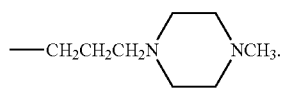

10. The polymer of claim 1, wherein:
n is 3;
L is

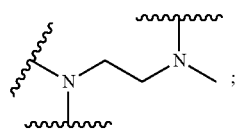 [SMILES: *N(*)CCN(*)C]

wherein in Formula (II):
  A is —$(CH_2)_4$—;
  X is —$CH_2CH_2N(R_2)(R_3)$ or —$CH_2CH_2L(R_4)_q$;
  $R_1$ is —$(CH_2)_5OH$;
  $R_2$ is hydrogen; and
  $R_3$ is

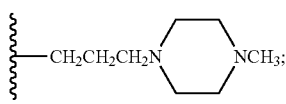

and
wherein in Formula (III):
  B is —$(CH_2)_6$—;
  Z is —$CH_2CH_2N(R_6)(R_7)$ or —$CH_2CH_2L(R_8)_v$;
  $R_5$ is —$CH_2CH(OH)CH_2OH$;
  $R_6$ is hydrogen; and
  $R_7$ is

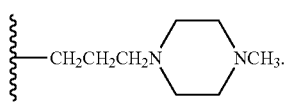

11. The polymer of claim 1, wherein:
n is 3;
L is

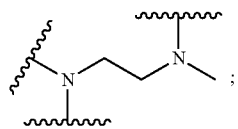 [SMILES: *N(*)CCN(*)C]

wherein in Formula (II):
  A is —$(CH_2)_4$—;
  X is —$CH_2CH_2N(R_2)(R_3)$;
  $R_1$ is —$(CH_2)_5OH$;
  $R_2$ is hydrogen; and
  $R_3$ is

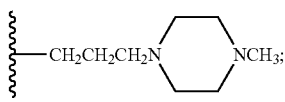

and
wherein in Formula (III):
  B is —$(CH_2)_6$—;
  Z is —$CH_2CH_2N(R_6)(R_7)$;
  $R_5$ is —$CH_2CH(OH)CH_2OH$;
  $R_6$ is hydrogen; and
  $R_7$ is

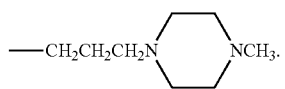

12. A composition comprising the polymer of claim 1, or a salt thereof; an agent; and optionally an excipient.

13. The composition of claim 12, wherein the agent is an organic molecule, inorganic molecule, nucleic acid, protein, peptide, polynucleotide, targeting agent, an isotopically labeled chemical compound, vaccine, an immunological agent, or an agent useful in bioprocessing.

14. The composition of claim 12, wherein the agent is a polynucleotide.

15. The composition of claim 14, wherein the agent is an RNA.

16. A kit comprising a polymer of claim 1; and instructions for using the kit.

17. A method of delivering an agent to a subject or cell, the method comprising administering to the subject or contacting the cell with a composition of claim 12.

18. The method of claim 17, wherein the cell is a liver cell, kidney cell, spleen cell, lung cell, skin cell, brain cell, epithelial cell, or a cell of the gastrointestinal tract.

19. A method of treating or preventing a disease in a subject in need thereof, the method comprising administering to the subject a composition of claim 12.

20. The method of claim 19, wherein the disease is a genetic disease, proliferative disease, hematological disease, neurological disease, liver disease, kidney disease, spleen disease, lung disease, painful condition, psychiatric disorder, musculoskeletal disease, a metabolic disorder, inflammatory disease, or autoimmune disease.

* * * * *